US012320661B2

(12) United States Patent
Moore et al.

(10) Patent No.: US 12,320,661 B2
(45) Date of Patent: Jun. 3, 2025

(54) MAPPING APPLICATION WITH TURN-BY-TURN NAVIGATION MODE FOR OUTPUT TO VEHICLE DISPLAY

(71) Applicant: Apple Inc., Cupertino, CA (US)

(72) Inventors: Bradford A. Moore, San Francisco, CA (US); Emanuele A. Vulcano, San Francisco, CA (US); Jorge Fino, San Jose, CA (US); Marcel Van Os, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/525,044

(22) Filed: Nov. 30, 2023

(65) Prior Publication Data

US 2024/0094023 A1    Mar. 21, 2024

Related U.S. Application Data

(63) Continuation of application No. 16/864,004, filed on Apr. 30, 2020, now Pat. No. 11,874,128, which is a
(Continued)

(51) Int. Cl.
G01C 21/36        (2006.01)
(52) U.S. Cl.
CPC ........... *G01C 21/362* (2013.01); *G01C 21/36* (2013.01); *G01C 21/3611* (2013.01); *G01C 21/3679* (2013.01); *G01C 21/3682* (2013.01)
(58) Field of Classification Search
CPC .. G01C 21/362; G01C 21/36; G01C 21/3611; G01C 21/3679; G01C 21/3682;
(Continued)

(56) References Cited

U.S. PATENT DOCUMENTS 1,102,037 A    6/1914   Gibson
4,846,836 A    7/1989   Reich
(Continued)

FOREIGN PATENT DOCUMENTS

AU    2014235244 A1    9/2015
AU    2014235248 A1    9/2015
(Continued)

OTHER PUBLICATIONS

Bose, Raja, et al. "Morphing smartphones into automotive application platforms." Computer 44.5 (2011): 53-61. (Year:2011).*
(Continued)

*Primary Examiner* — Peter D Nolan
*Assistant Examiner* — Ana D Thomas
(74) *Attorney, Agent, or Firm* — Invoke

(57) ABSTRACT

Some embodiments provide a method for an application executing on a mobile device. The method renders an animated navigation presentation for output to an external display screen not part of the mobile device. The navigation presentation includes an animated map showing at least a portion of a route to a destination. The method simultaneously displays information regarding a maneuver along the route on a display screen of the mobile device without displaying a same animated map on the mobile device. In some embodiments, the displayed information regarding the maneuver comprises a graphical instruction and a text instruction for a next maneuver along the route.

20 Claims, 53 Drawing Sheets

Related U.S. Application Data continuation of application No. 15/825,996, filed on Nov. 29, 2017, now Pat. No. 10,677,606, which is a continuation of application No. 14/081,915, filed on Nov. 15, 2013, now Pat. No. 9,857,193.

(60) Provisional application No. 61/832,818, filed on Jun. 8, 2013.

(58) Field of Classification Search
CPC . G01C 21/3617; G01C 21/265; G06F 3/0488; G06F 16/951
See application file for complete search history.

(56) References Cited

U.S. PATENT DOCUMENTS

| | | | |
|---|---|---|---|
| 4,914,605 A | 4/1990 | Loughmiller et al. |
| 5,289,572 A | 2/1994 | Yano et al. |
| 5,459,667 A | 10/1995 | Odagaki et al. |
| 5,654,892 A | 8/1997 | Fujii et al. |
| 6,101,443 A | 8/2000 | Kato et al. |
| 6,321,158 B1 | 11/2001 | Delorme et al. |
| 6,321,161 B1 | 11/2001 | Herbst et al. |
| 6,322,538 B1 | 11/2001 | Elbert et al. |
| 6,480,783 B1 | 11/2002 | Myr |
| 6,615,130 B2 | 9/2003 | Myr |
| 6,653,948 B1 | 11/2003 | Kunimatsu et al. |
| 6,710,774 B1 | 3/2004 | Kawasaki et al. |
| 6,764,518 B2 | 7/2004 | Godin |
| 6,845,776 B2 | 1/2005 | Stack et al. |
| 6,847,889 B2 | 1/2005 | Park et al. |
| 6,862,524 B1 | 3/2005 | Nagda et al. |
| 6,944,539 B2 | 9/2005 | Yamada et al. |
| 6,960,233 B1 | 11/2005 | Berg et al. |
| 7,149,625 B2 | 12/2006 | Mathews et al. |
| 7,158,878 B2 | 1/2007 | Rasmussen et al. |
| 7,200,394 B2 | 4/2007 | Aoki et al. |
| 7,254,580 B1 | 8/2007 | Gharachorloo et al. |
| 7,274,311 B1 | 9/2007 | MacLeod |
| 7,289,812 B1 | 10/2007 | Roberts et al. |
| 7,469,827 B2 | 12/2008 | Katragadda et al. |
| 7,552,009 B2 | 6/2009 | Nelson |
| 7,555,525 B2 | 6/2009 | Malik |
| 7,555,725 B2 | 6/2009 | Abramson et al. |
| 7,634,463 B1 | 12/2009 | Katragadda et al. |
| 7,702,456 B2 | 4/2010 | Singh |
| 7,708,684 B2 | 5/2010 | Demarais et al. |
| 7,729,854 B2 | 6/2010 | Muramatsu |
| 7,831,384 B2 | 11/2010 | Bill |
| 7,846,174 B2 | 12/2010 | Baker et al. |
| 7,847,686 B1 | 12/2010 | Atkins et al. |
| 7,860,645 B2 | 12/2010 | Kim et al. |
| 7,869,941 B2 | 1/2011 | Coughlin et al. |
| 7,885,761 B2 | 2/2011 | Tajima et al. |
| 7,917,288 B2 | 3/2011 | Cheung et al. |
| 7,925,427 B2 | 4/2011 | Zehler |
| 7,981,162 B2 | 7/2011 | Stack et al. |
| 8,020,104 B2 | 9/2011 | Robarts et al. |
| 8,078,397 B1 | 12/2011 | Zilka |
| 8,100,931 B2 | 1/2012 | Baker et al. |
| 8,190,326 B2 | 5/2012 | Nezu et al. |
| 8,205,157 B2 | 6/2012 | Van et al. |
| 8,255,830 B2 | 8/2012 | Ording et al. |
| 8,346,590 B2 | 1/2013 | Norton et al. |
| 8,355,862 B2 | 1/2013 | Matas et al. |
| 8,370,736 B2 | 2/2013 | Ording et al. |
| 8,423,052 B2 | 4/2013 | Ueda et al. |
| 8,428,871 B1 | 4/2013 | Matthews et al. |
| 8,463,289 B2 | 6/2013 | Shklarski et al. |
| 8,464,182 B2 | 6/2013 | Blumenberg et al. |
| 8,509,816 B2 | 8/2013 | Branch et al. |
| 8,510,665 B2 | 8/2013 | Ording et al. |
| 8,529,431 B2 | 9/2013 | Baker et al. |
| 8,564,544 B2 | 10/2013 | Jobs et al. |
| 8,584,050 B2 | 11/2013 | Ording et al. |
| 8,606,516 B2 | 12/2013 | Vertelney et al. |
| 8,607,167 B2 | 12/2013 | Matas et al. |
| 8,639,654 B2 | 1/2014 | Vervaet et al. |
| 8,694,791 B1 | 4/2014 | Rohrweck et al. |
| 8,745,018 B1 | 6/2014 | Singleton et al. |
| 8,756,534 B2 | 6/2014 | Ording et al. |
| 8,762,048 B2 | 6/2014 | Kosseifi et al. |
| 8,781,716 B1 | 7/2014 | Wenneman et al. |
| 8,798,918 B2 | 8/2014 | Onishi et al. |
| 8,825,362 B2 | 9/2014 | Kirsch |
| 8,825,381 B2 | 9/2014 | Tang |
| 8,849,564 B2 | 9/2014 | Mutoh |
| 8,881,060 B2 | 11/2014 | Chaudhri et al. |
| 8,881,061 B2 | 11/2014 | Chaudhri et al. |
| 8,886,398 B2 | 11/2014 | Kato et al. |
| 8,918,736 B2 | 12/2014 | Jobs et al. |
| 8,954,524 B1 | 2/2015 | Hamon |
| 9,043,150 B2 | 5/2015 | Forstall et al. |
| 9,060,844 B2 | 6/2015 | Kagan et al. |
| 9,170,122 B2 | 10/2015 | Moore et al. |
| 9,200,915 B2 | 12/2015 | Vulcano et al. |
| 9,223,494 B1 | 12/2015 | Desalvo et al. |
| 9,317,813 B2 | 4/2016 | Mcgavran et al. |
| 9,326,058 B2 | 4/2016 | Tachibana et al. |
| 9,347,787 B2 | 5/2016 | Moore et al. |
| 9,500,492 B2 | 11/2016 | Moore et al. |
| 9,574,894 B1 | 2/2017 | Karakotsios et al. |
| 9,631,930 B2 | 4/2017 | Mcgavran et al. |
| 2001/0056325 A1 | 12/2001 | Pu et al. |
| 2003/0040808 A1 | 2/2003 | Stack et al. |
| 2003/0093117 A1 | 5/2003 | Saadat |
| 2003/0156097 A1 | 8/2003 | Kakihara et al. |
| 2003/0200192 A1 | 10/2003 | Bell et al. |
| 2004/0009815 A1 | 1/2004 | Zotto et al. |
| 2004/0070602 A1 | 4/2004 | Kobuya et al. |
| 2004/0092892 A1 | 5/2004 | Kagan et al. |
| 2004/0128066 A1 | 7/2004 | Kudo et al. |
| 2004/0138761 A1 | 7/2004 | Stack et al. |
| 2004/0143342 A1 | 7/2004 | Stack et al. |
| 2004/0158395 A1 | 8/2004 | Yamada et al. |
| 2004/0160342 A1 | 8/2004 | Curley et al. |
| 2004/0172141 A1 | 9/2004 | Stack et al. |
| 2004/0193371 A1 | 9/2004 | Koshiji et al. |
| 2004/0220682 A1 | 11/2004 | Levine et al. |
| 2004/0236498 A1 | 11/2004 | Le et al. |
| 2004/0260457 A1 | 12/2004 | Kawase et al. |
| 2005/0096673 A1 | 5/2005 | Stack et al. |
| 2005/0096750 A1 | 5/2005 | Kagan et al. |
| 2005/0125148 A1 | 6/2005 | Van et al. |
| 2005/0131631 A1 | 6/2005 | Nakano et al. |
| 2005/0149261 A9 | 7/2005 | Lee et al. |
| 2005/0177181 A1 | 8/2005 | Kagan et al. |
| 2005/0192629 A1 | 9/2005 | Saadat et al. |
| 2005/0247320 A1 | 11/2005 | Stack et al. |
| 2005/0251324 A1 | 11/2005 | Wiener et al. |
| 2005/0273251 A1 | 12/2005 | Nix et al. |
| 2005/0273252 A1 | 12/2005 | Nix et al. |
| 2006/0004680 A1 | 1/2006 | Robarts et al. |
| 2006/0015246 A1 | 1/2006 | Hui |
| 2006/0025925 A1 | 2/2006 | Fushiki et al. |
| 2006/0041372 A1 | 2/2006 | Kubota et al. |
| 2006/0074553 A1 | 4/2006 | Foo et al. |
| 2006/0106539 A1* | 5/2006 | Choate ................. G06Q 50/02 702/2 |
| 2006/0155375 A1 | 7/2006 | Kagan et al. |
| 2006/0155431 A1 | 7/2006 | Berg et al. |
| 2006/0156209 A1 | 7/2006 | Matsuura et al. |
| 2006/0161440 A1 | 7/2006 | Nakayama et al. |
| 2006/0173841 A1 | 8/2006 | Bill |
| 2006/0179277 A1 | 8/2006 | Flachs et al. |
| 2006/0195257 A1 | 8/2006 | Nakamura |
| 2006/0206063 A1 | 9/2006 | Kagan et al. |
| 2006/0252983 A1 | 11/2006 | Lembo et al. |
| 2006/0264982 A1 | 11/2006 | Mola et al. |
| 2006/0271287 A1 | 11/2006 | Gold et al. |
| 2006/0287818 A1 | 12/2006 | Okude et al. |
| 2006/0293943 A1 | 12/2006 | Tischhauser et al. |
| 2007/0016362 A1 | 1/2007 | Nelson |
| 2007/0021914 A1 | 1/2007 | Song |

(56) References Cited

U.S. PATENT DOCUMENTS

| | | |
|---|---|---|
| 2007/0060932 A1 | 3/2007 | Stack et al. |
| 2007/0135990 A1 | 6/2007 | Seymour et al. |
| 2007/0140187 A1 | 6/2007 | Rokusek et al. |
| 2007/0166396 A1 | 7/2007 | Badylak et al. |
| 2007/0185374 A1 | 8/2007 | Kick et al. |
| 2007/0185938 A1 | 8/2007 | Prahlad et al. |
| 2007/0185939 A1 | 8/2007 | Prahland et al. |
| 2007/0200821 A1 | 8/2007 | Conradt et al. |
| 2007/0208429 A1 | 9/2007 | Leahy |
| 2007/0208498 A1 | 9/2007 | Barker et al. |
| 2007/0233162 A1 | 10/2007 | Gannoe et al. |
| 2007/0233635 A1 | 10/2007 | Burfeind et al. |
| 2007/0276596 A1 | 11/2007 | Solomon et al. |
| 2007/0276911 A1 | 11/2007 | Bhumkar et al. |
| 2007/0293716 A1 | 12/2007 | Baker et al. |
| 2007/0293958 A1 | 12/2007 | Stehle et al. |
| 2008/0015523 A1 | 1/2008 | Baker |
| 2008/0086455 A1 | 4/2008 | Meisels et al. |
| 2008/0109718 A1 | 5/2008 | Narayanaswami |
| 2008/0133282 A1 | 6/2008 | Landar et al. |
| 2008/0162031 A1 | 7/2008 | Okuyama et al. |
| 2008/0208356 A1 | 8/2008 | Stack et al. |
| 2008/0208450 A1 | 8/2008 | Katzer |
| 2008/0228030 A1 | 9/2008 | Godin |
| 2008/0228393 A1 | 9/2008 | Geelen et al. |
| 2008/0238941 A1 | 10/2008 | Kinnan et al. |
| 2008/0250334 A1 | 10/2008 | Price |
| 2008/0255678 A1 | 10/2008 | Cully et al. |
| 2008/0319653 A1 | 12/2008 | Moshfeghi |
| 2009/0005082 A1 | 1/2009 | Forstall et al. |
| 2009/0005981 A1 | 1/2009 | Forstall et al. |
| 2009/0006994 A1 | 1/2009 | Forstall et al. |
| 2009/0010405 A1 | 1/2009 | Toebes |
| 2009/0012553 A1 | 1/2009 | Swain et al. |
| 2009/0016504 A1 | 1/2009 | Mantell et al. |
| 2009/0033786 A1* | 2/2009 | Finkelstein .......... H04N 23/632 348/E5.024 |
| 2009/0037093 A1 | 2/2009 | Kurihara et al. |
| 2009/0063041 A1 | 3/2009 | Hirose et al. |
| 2009/0063048 A1 | 3/2009 | Tsuji |
| 2009/0100037 A1 | 4/2009 | Scheibe |
| 2009/0106681 A1 | 4/2009 | Gupta et al. |
| 2009/0143977 A1 | 6/2009 | Beletski et al. |
| 2009/0156178 A1 | 6/2009 | Elsey et al. |
| 2009/0157294 A1 | 6/2009 | Geelen et al. |
| 2009/0157615 A1 | 6/2009 | Ross et al. |
| 2009/0164110 A1 | 6/2009 | Basir |
| 2009/0177215 A1 | 7/2009 | Stack et al. |
| 2009/0182497 A1 | 7/2009 | Hagiwara |
| 2009/0192702 A1 | 7/2009 | Bourne et al. |
| 2009/0216434 A1 | 8/2009 | Panganiban et al. |
| 2009/0240427 A1 | 9/2009 | Siereveld et al. |
| 2009/0254273 A1 | 10/2009 | Gill et al. |
| 2009/0284476 A1 | 11/2009 | Bull et al. |
| 2009/0293011 A1 | 11/2009 | Nassar |
| 2009/0326803 A1 | 12/2009 | Neef et al. |
| 2010/0010738 A1 | 1/2010 | Cho |
| 2010/0045704 A1 | 2/2010 | Kim |
| 2010/0067631 A1 | 3/2010 | Ton et al. |
| 2010/0069054 A1 | 3/2010 | Labidi et al. |
| 2010/0070253 A1 | 3/2010 | Hirata et al. |
| 2010/0082239 A1 | 4/2010 | Hardy et al. |
| 2010/0088631 A1 | 4/2010 | Schiller |
| 2010/0100310 A1 | 4/2010 | Eich et al. |
| 2010/0153010 A1 | 6/2010 | Huang |
| 2010/0174790 A1 | 7/2010 | Dubs et al. |
| 2010/0174998 A1 | 7/2010 | Lazarus et al. |
| 2010/0179750 A1 | 7/2010 | Gum |
| 2010/0185382 A1 | 7/2010 | Barker et al. |
| 2010/0186244 A1 | 7/2010 | Schwindt |
| 2010/0191454 A1 | 7/2010 | Shirai et al. |
| 2010/0204914 A1 | 8/2010 | Gad et al. |
| 2010/0220250 A1 | 9/2010 | Vanderwall et al. |
| 2010/0248746 A1 | 9/2010 | Saavedra et al. |
| 2010/0287024 A1 | 11/2010 | Ward et al. |
| 2010/0293462 A1 | 11/2010 | Bull et al. |
| 2010/0295803 A1 | 11/2010 | Kim et al. |
| 2010/0309147 A1 | 12/2010 | Fleizach et al. |
| 2010/0309149 A1 | 12/2010 | Blumenberg et al. |
| 2010/0312466 A1 | 12/2010 | Katzer et al. |
| 2010/0312838 A1 | 12/2010 | Lyon et al. |
| 2010/0324816 A1 | 12/2010 | Highstrom et al. |
| 2010/0328100 A1 | 12/2010 | Fujiwara et al. |
| 2011/0022305 A1 | 1/2011 | Okamoto |
| 2011/0029237 A1 | 2/2011 | Kamalski |
| 2011/0039584 A1 | 2/2011 | Merrett |
| 2011/0077850 A1 | 3/2011 | Ushida |
| 2011/0082620 A1 | 4/2011 | Small et al. |
| 2011/0082627 A1 | 4/2011 | Small et al. |
| 2011/0090078 A1 | 4/2011 | Kim et al. |
| 2011/0098918 A1 | 4/2011 | Siliski et al. |
| 2011/0106592 A1 | 5/2011 | Stehle et al. |
| 2011/0112750 A1 | 5/2011 | Lukassen |
| 2011/0137834 A1 | 6/2011 | Ide et al. |
| 2011/0143726 A1 | 6/2011 | De Silva |
| 2011/0145863 A1 | 6/2011 | Alsina et al. |
| 2011/0153186 A1 | 6/2011 | Jakobson |
| 2011/0161001 A1 | 6/2011 | Fink |
| 2011/0167058 A1 | 7/2011 | Van Os |
| 2011/0170682 A1 | 7/2011 | Kale et al. |
| 2011/0183627 A1 | 7/2011 | Ueda et al. |
| 2011/0185390 A1 | 7/2011 | Faenger et al. |
| 2011/0191516 A1 | 8/2011 | Xiong et al. |
| 2011/0194028 A1 | 8/2011 | Dove et al. |
| 2011/0210922 A1 | 9/2011 | Griffin |
| 2011/0213785 A1 | 9/2011 | Kristiansson et al. |
| 2011/0227843 A1 | 9/2011 | Wang |
| 2011/0230178 A1 | 9/2011 | Jones et al. |
| 2011/0238289 A1 | 9/2011 | Lehmann et al. |
| 2011/0238297 A1 | 9/2011 | Severson |
| 2011/0246891 A1 | 10/2011 | Schubert et al. |
| 2011/0257973 A1 | 10/2011 | Chutorash et al. |
| 2011/0264234 A1 | 10/2011 | Baker et al. |
| 2011/0265003 A1 | 10/2011 | Schubert et al. |
| 2011/0270517 A1 | 11/2011 | Benedetti |
| 2011/0270600 A1 | 11/2011 | Bose et al. |
| 2011/0282576 A1 | 11/2011 | Cabral et al. |
| 2011/0285717 A1 | 11/2011 | Schmidt et al. |
| 2011/0291860 A1 | 12/2011 | Ozaki et al. |
| 2011/0291863 A1 | 12/2011 | Ozaki et al. |
| 2011/0298724 A1 | 12/2011 | Ameling et al. |
| 2011/0307455 A1 | 12/2011 | Gupta et al. |
| 2012/0016554 A1 | 1/2012 | Huang |
| 2012/0035924 A1 | 2/2012 | Jitkoff et al. |
| 2012/0041674 A1 | 2/2012 | Katzer |
| 2012/0059812 A1 | 3/2012 | Bliss et al. |
| 2012/0065814 A1 | 3/2012 | Seok |
| 2012/0095675 A1 | 4/2012 | Tom et al. |
| 2012/0109516 A1 | 5/2012 | Miyazaki et al. |
| 2012/0143503 A1 | 6/2012 | Hirai et al. |
| 2012/0143504 A1 | 6/2012 | Kalai et al. |
| 2012/0155800 A1 | 6/2012 | Cottrell et al. |
| 2012/0179361 A1 | 7/2012 | Mineta et al. |
| 2012/0179365 A1 | 7/2012 | Miyahara et al. |
| 2012/0191343 A1 | 7/2012 | Haleem |
| 2012/0208559 A1 | 8/2012 | Svendsen et al. |
| 2012/0242510 A1* | 9/2012 | Choi .................. G01C 21/3688 340/988 |
| 2012/0253659 A1 | 10/2012 | Pu et al. |
| 2012/0254804 A1 | 10/2012 | Sheha et al. |
| 2012/0260188 A1 | 10/2012 | Park et al. |
| 2012/0265433 A1 | 10/2012 | Mola et al. |
| 2012/0303263 A1 | 11/2012 | Alam et al. |
| 2012/0303268 A1 | 11/2012 | Su et al. |
| 2012/0310882 A1 | 12/2012 | Werner et al. |
| 2012/0322458 A1 | 12/2012 | Shklarski et al. |
| 2012/0329520 A1 | 12/2012 | Akama |
| 2013/0006520 A1 | 1/2013 | Dhanani et al. |
| 2013/0035853 A1 | 2/2013 | Stout et al. |
| 2013/0110343 A1 | 5/2013 | Ichikawa et al. |
| 2013/0110842 A1 | 5/2013 | Donneau-Golencer et al. |
| 2013/0130742 A1 | 5/2013 | Dietz et al. |
| 2013/0158855 A1 | 6/2013 | Weir et al. |
| 2013/0166096 A1 | 6/2013 | Jotanovic |

(56) References Cited

U.S. PATENT DOCUMENTS

| | | |
|---|---|---|
| 2013/0173577 A1 | 7/2013 | Cheng et al. |
| 2013/0190978 A1 | 7/2013 | Kato et al. |
| 2013/0191020 A1 | 7/2013 | Emani et al. |
| 2013/0191790 A1 | 7/2013 | Kawalkar |
| 2013/0238241 A1 | 9/2013 | Chelotti et al. |
| 2013/0275899 A1 | 10/2013 | Schubert et al. |
| 2013/0321178 A1 | 12/2013 | Jameel et al. |
| 2013/0322665 A1 | 12/2013 | Bennett et al. |
| 2013/0325332 A1 | 12/2013 | Rhee et al. |
| 2013/0325856 A1 | 12/2013 | Soto et al. |
| 2013/0326384 A1 | 12/2013 | Moore et al. |
| 2013/0344899 A1 | 12/2013 | Stamm et al. |
| 2013/0345961 A1 | 12/2013 | Leader et al. |
| 2013/0345975 A1 | 12/2013 | Vulcano et al. |
| 2014/0058659 A1 | 2/2014 | Kolling |
| 2014/0093100 A1 | 4/2014 | Jeong et al. |
| 2014/0095066 A1 | 4/2014 | Bouillet et al. |
| 2014/0122605 A1 | 5/2014 | Merom et al. |
| 2014/0123062 A1 | 5/2014 | Nguyen |
| 2014/0137219 A1 | 5/2014 | Castro et al. |
| 2014/0156262 A1 | 6/2014 | Yuen et al. |
| 2014/0163882 A1 | 6/2014 | Stahl et al. |
| 2014/0171129 A1 | 6/2014 | Benzatti et al. |
| 2014/0207373 A1 | 7/2014 | Lerenc |
| 2014/0236916 A1 | 8/2014 | Barrington et al. |
| 2014/0277937 A1 | 9/2014 | Scholz et al. |
| 2014/0278051 A1 | 9/2014 | Mcgavran et al. |
| 2014/0278070 A1 | 9/2014 | Mcgavran et al. |
| 2014/0278086 A1 | 9/2014 | San et al. |
| 2014/0279723 A1 | 9/2014 | Mcgavran et al. |
| 2014/0281955 A1 | 9/2014 | Sprenger |
| 2014/0309914 A1 | 10/2014 | Scofield et al. |
| 2014/0317086 A1 | 10/2014 | James |
| 2014/0344420 A1 | 11/2014 | Rjeili et al. |
| 2014/0358437 A1 | 12/2014 | Fletcher |
| 2014/0358438 A1 | 12/2014 | Cerny et al. |
| 2014/0364149 A1 | 12/2014 | Marti et al. |
| 2014/0364150 A1 | 12/2014 | Marti et al. |
| 2014/0365113 A1 | 12/2014 | Mcgavran et al. |
| 2014/0365120 A1 | 12/2014 | Vulcano et al. |
| 2014/0365124 A1 | 12/2014 | Vulcano et al. |
| 2014/0365125 A1 | 12/2014 | Vulcano et al. |
| 2014/0365126 A1 | 12/2014 | Vulcano et al. |
| 2014/0365459 A1 | 12/2014 | Clark et al. |
| 2014/0365505 A1 | 12/2014 | Clark et al. |
| 2015/0022468 A1* | 1/2015 | Cha .................. G06F 3/03545 345/173 |
| 2015/0024789 A1 | 1/2015 | Bilgen et al. |
| 2015/0032366 A1 | 1/2015 | Man et al. |
| 2015/0046209 A1 | 2/2015 | Choe |
| 2015/0066360 A1 | 3/2015 | Kirsch |
| 2015/0116350 A1* | 4/2015 | Lin .......................... G06N 7/01 345/620 |
| 2015/0117783 A1* | 4/2015 | Lin .......................... G06T 7/162 382/195 |
| 2015/0117784 A1* | 4/2015 | Lin .......................... G06T 11/60 382/195 |
| 2015/0139407 A1 | 5/2015 | Maguire et al. |
| 2015/0161267 A1 | 6/2015 | Sugawara et al. |
| 2015/0177017 A1 | 6/2015 | Jones |
| 2015/0282230 A1 | 10/2015 | Kim |
| 2015/0334171 A1 | 11/2015 | Baalu et al. |
| 2016/0029085 A1 | 1/2016 | Mountain |
| 2016/0183063 A1 | 6/2016 | Kang et al. |
| 2016/0212229 A1 | 7/2016 | Mcgavran et al. |
| 2016/0357393 A1 | 12/2016 | Gross |
| 2017/0132713 A1 | 5/2017 | Bowne et al. |
| 2017/0176208 A1 | 6/2017 | Chung et al. |
| 2017/0205243 A1 | 7/2017 | Moore et al. |
| 2017/0205246 A1 | 7/2017 | Koenig et al. |
| 2017/0350703 A1 | 12/2017 | Mcgavran et al. |
| 2017/0358033 A1 | 12/2017 | Montoya et al. |
| 2019/0025070 A1 | 1/2019 | Moore et al. |
| 2019/0063940 A1 | 2/2019 | Moore et al. |
| 2019/0113344 A1 | 4/2019 | Stamm et al. |
| 2019/0121512 A1 | 4/2019 | Gross |
| 2020/0160223 A1 | 5/2020 | Mcgavran et al. |
| 2021/0165544 A1 | 6/2021 | Gross |

FOREIGN PATENT DOCUMENTS

| | | |
|---|---|---|
| CN | 1754147 A | 3/2006 |
| CN | 1815438 A | 8/2006 |
| CN | 1900657 A | 1/2007 |
| CN | 101210824 A | 7/2008 |
| CN | 101438133 A | 5/2009 |
| CN | 101517362 A | 8/2009 |
| CN | 101582053 A | 11/2009 |
| CN | 101641568 A | 2/2010 |
| CN | 201555592 U | 8/2010 |
| CN | 101821763 A | 9/2010 |
| CN | 101858749 A | 10/2010 |
| CN | 102398600 A | 4/2012 |
| CN | 102449435 A | 5/2012 |
| CN | 102497477 A | 6/2012 |
| CN | 102567440 A | 7/2012 |
| CN | 102607570 A | 7/2012 |
| CN | 102622233 A | 8/2012 |
| CN | 102663842 A | 9/2012 |
| CN | 102713906 A | 10/2012 |
| CN | 102759359 A | 10/2012 |
| CN | 102781728 A | 11/2012 |
| CN | 102826047 A | 12/2012 |
| CN | 102840866 A | 12/2012 |
| CN | 102939515 A | 2/2013 |
| CN | 103856896 A | 6/2014 |
| CN | 104272770 A | 1/2015 |
| DE | 112013002794 T5 | 4/2015 |
| EP | 1063494 A1 | 12/2000 |
| EP | 1102037 A1 | 5/2001 |
| EP | 1944724 A1 | 7/2008 |
| EP | 1995564 A1 | 11/2008 |
| EP | 2355467 A2 | 8/2011 |
| EP | 2369299 A1 | 9/2011 |
| EP | 2479538 A2 | 7/2012 |
| EP | 2546104 A1 | 1/2013 |
| EP | 2617604 A1 | 7/2013 |
| EP | 2672225 A2 | 12/2013 |
| EP | 2672226 A2 | 12/2013 |
| EP | 2698968 A1 | 2/2014 |
| EP | 2778614 A1 | 9/2014 |
| EP | 2778615 A2 | 9/2014 |
| EP | 2946172 A1 | 11/2015 |
| EP | 2712152 B1 | 9/2016 |
| EP | 3101392 A1 | 12/2016 |
| JP | 2002-365080 A | 12/2002 |
| JP | 2003-207340 A | 7/2003 |
| JP | 2003-232646 A | 8/2003 |
| JP | 2005-004527 A | 1/2005 |
| JP | 2005-031068 A | 2/2005 |
| JP | 2005-198345 A | 7/2005 |
| JP | 2005-228020 A | 8/2005 |
| JP | 3957062 B2 | 8/2007 |
| JP | 2009-098781 A | 5/2009 |
| JP | 2010-261803 A | 11/2010 |
| JP | 2013-508725 A | 3/2013 |
| JP | 2014-035234 A | 2/2014 |
| JP | 2014-235015 A | 12/2014 |
| JP | 2015-021863 A | 2/2015 |
| KR | 10-1034426 B1 | 5/2011 |
| KR | 10-2012-0069778 A | 6/2012 |
| KR | 10-2015-0008501 A | 1/2015 |
| TW | 200811422 A | 3/2008 |
| TW | 200949281 A | 12/2009 |
| TW | 201017110 A | 5/2010 |
| TW | M389063 U | 9/2010 |
| TW | 201202079 A | 1/2012 |
| TW | 201216667 A | 4/2012 |
| WO | 2005/015425 A1 | 2/2005 |
| WO | 2005/094257 A2 | 10/2005 |
| WO | 2008/079891 A2 | 7/2008 |
| WO | 2008/101048 A2 | 8/2008 |
| WO | 2009/073806 A2 | 6/2009 |
| WO | 2009/143876 A1 | 12/2009 |

(56) References Cited

FOREIGN PATENT DOCUMENTS

| | | | |
|---|---|---|---|
| WO | 2010/040405 A1 | 4/2010 |
| WO | 2011/076989 A1 | 6/2011 |
| WO | 2011/146141 A1 | 11/2011 |
| WO | 2011/160044 A2 | 12/2011 |
| WO | 2012/034581 A1 | 3/2012 |
| WO | 2012/036279 A1 | 3/2012 |
| WO | 2012/127768 A1 | 9/2012 |
| WO | 2012/141294 A1 | 10/2012 |
| WO | 2012/164333 A1 | 12/2012 |
| WO | 2013/173511 A2 | 11/2013 |
| WO | 2013/184348 A2 | 12/2013 |
| WO | 2013/184444 A2 | 12/2013 |
| WO | 2013/184449 A2 | 12/2013 |
| WO | 2014/145127 A2 | 9/2014 |
| WO | 2014/145134 A1 | 9/2014 |
| WO | 2014/145145 A2 | 9/2014 |
| WO | 2014/151151 A1 | 9/2014 |
| WO | 2014/151152 A2 | 9/2014 |
| WO | 2014/151153 A2 | 9/2014 |
| WO | 2014/151155 A1 | 9/2014 |
| WO | 2014/197115 A2 | 12/2014 |
| WO | 2014/197155 A1 | 12/2014 |
| WO | 2014/200736 A1 | 12/2014 |
| WO | 2014/200763 A1 | 12/2014 |

OTHER PUBLICATIONS

Gil-Castiñeira, Felipe, David Chaves-Diáguez, and Francisco J. González-Castaño. "Integration of nomadic devices with automotive user interfaces." IEEE Transactions on Consumer Electronics 55.1 (2009): 34-41. (Year: 2009).*
A blind navigation system using RFID for indoor environments Chumkamon, S.; Tuvaphanthaphiphat, P.; Keeratiwintakorn, P. Electrical Engineering/Electronics, Computer, Telecommunications and Information Technology, 2008. ECTI-CON 2008. 5th International Conference on Year: 2008, vol. 2 pp. 765-768, DOI: 10.1109/ECTICON.2008.4600543.
Archibald, Christopher, et al., "Human Motion Prediction for Indoor Mobile Relay Networks," 2011 IEEE International Conference on High Performance Computing and Communications, Sep. 2-4, 2011, pp. 989-994, IEEE, Banff, Canada.
Ashbrook et al., "Using GPS to Learn Significant Locations and Preduct Movement Across Multiple Users", College of Computing, Atlanta, GA, May 15, 2003, 15 pages.
Author Unknown, "Android 2.3.4 User's Guide", May 20, 2011, pp. 1-384, Google, Inc.
Author Unknown, "Blaupunkt chooses NNG navigation software for new aftermarket product," May 24, 2011, 2 pages, available at http://telematicsnews.info/2011/05/24/blaupunktchooses-nnq-navigation-software-for-new-afterm arket-product my224 1 /.
Author Unknown, "GARMIN. nuvi 1100/1200/1300/1400 series owner's manual," Jan. 2011, 72 pages, Garmin Corporation, No. 68, Jangshu 2nd Road, Sijhih, Taipei County, Taiwan.
Author Unknown, "Google Maps Voice Navigation in Singapore," software2tech, Jul. 20, 2011, 1 page, available at http://www.youtube.com/watch?v=7B9JN7BkvME.
Author Unknown, "Hands-on with Sony Mirrorlink head units," Jan. 13, 2012, 1 page, uudethuong, available at http://www.youtube.com/watch?v=UMkF478_Ax0.
Author Unknown, "Introducing Mimics—Control your iPhone from a Touch Screen," May 13, 2011, 3 pages, mp3Car.com, available at http://www.youtube.com/watch?v=Y cggnNVTNwI.
Author Unknown, "iPhone Integration on Mercedes Head Unit," Dec. 3, 2011, 1 page, Motuslab, available at http://www.youtube.com/watch?v=rXy6lpQAtDo.
Author Unknown, "Magellan (Registered) Road Mate (Registered) GPS Receiver: 9020/9055 user Manual," Month Unknown, 2010, 48 pages, MiTAC International Corporation, CA, USA.
Author Unknown, "Magellan (Registered) Road Mate (Registered): 2010 North America Application User Manual," Month Unknown, 2009, 24 pages, MiTAC Digital Corporation, CA, USA.
Author Unknown, "Magellan Maestro 3100 User Manual," Month Unknown 2007, 4 pages, Magellan Navigation, Inc., San Dimas, USA.
Author Unknown, "MAZDA: Navigation System—Owner's Manual", available at http://download.tomtom.com/open/manuals/mazda/nva-sd8110/Full_Manual_EN.pdf, Jan. 1, 2009, 159 pages.
Author Unknown, "Touch & Go' Owner's Manual," Jul. 2011, 218 pages, TOYOTA, United Kingdom.
Blandford Rafe, "Nokia's terminal Mode (car integration) progressing", www.allaboutsymbian.com, Jul. 15, 2021 (2-10-07-15) 1-10 pages.
Braun, Elmar, and Max Muhlhauser. "Automatically generating user interfaces for device federations." Seventh IEEE International Symposium on Multimedia (ISM'05). IEEE, 2005. (Year: 2005).
Chumkamon, Sakmongkon, et al., "A Blind Navigation System Using RFID for Indoor Environments," Proceedings of ECTI-CON 2008, May 14-17, 2008, pp. 765-768, IEEE, Krabi, Thailand.
Diewald, Stefan, et al., "Mobile Device Integration and Interaction in the Automotive Domain", Autonui:Automotive Natural User Interfaces Workshop at the 3rd International Conference on Automotive User Interfaces and Interactive Vehicular Applications (AutomotiveUI '11), Nov. 29-Dec. 2, 2011, 4 pages, XP002732023, Salzburg,Austria.
Dube, Ryan, "Use Google Maps Navigation For Turn-By-Turn GPS [Android]", available at http://www.makeuseof.com/tag/google-maps-navigation-turnbyturn-gps-android/, Jun. 24, 2010, 7 Pages.
Feng, Tao, et al. "Continuous mobile authentication using touchscreen gestures." 2012 IEEE conference on technologies for homeland security (HST). IEEE, 2012. (Year: 2012).
Fischer, Philipp, and Andreas Nurnberger. "Adaptive and multimodal interaction in the vehicle." 2008 IEEE International Conference on Systems, Man and Cybernetics. IEEE, 2008. (Year: 2008).
Hightower et al., "Learning and Recognizing the Places We Go", Intel Researc, Seattle, WA, Jul. 15, 2005, 18 pages.
Hueger, Fabian. "Platform independent applications for in-vehicle infotainment systems via integration of CE devices." 2012 IEEE Second International Conference on Consumer Electronics-Berlin (ICCE-Berlin). IEEE, 2012. (Year: 2012).
Human Motion Prediction for Indoor Mobile Relay Networks Archibald, C.; Ying Zhang; Juan Liu High Performance Computing and Communications (HPCC), 2011 IEEE 13th International Conference on Year: 2011 pp. 989-994, DOI: 10.1109/HPCC.2011.145 Referenced in: IEEE Conference Publications.
International Search Report and Written Opinion for PCT/US2014/025112, mailed on Aug. 7, 2014.
International Search Report and Written Opinion for PCT/US2014/025115, Sep. 11, 2014 (mailing date), Apple Inc.
International Search Report and Written Opinion for PCT/US2014/025117, Oct. 7, 2014 (mailing date), Apple Inc.
International Search Report and Written Opinion for PCT/US2014/029841, dated Aug. 12, 2014.
International Search Report and Written Opinion for PCT/US2014/033100, mailed on Dec. 9, 2014.
Invitation to Pay Additional Fees for PCT/US2014/025115, Jul. 7, 2014 (mailing date), Apple Inc.
Invitation to Pay Additional Fees with Partial Search Report for PCT/US2013/042029 dated 11- 2013 for Apple Inc.
Invitation to Pay Additional Fees with Partial Search Report for PCT/US2014/025117, dated Jul. 2014 for Apple Inc.
Kim, Sangho, Kosuke Sekiyama, and Toshio Fukuda. "User-adaptive interface with reconfigurable keypad for in-vehicle information systems." 2008 International Symposium on Micro-NanoMechatronics and Human Science. IEEE, 2008. (Year: 2008).
Lawrence, Steve, "Review: Sygic Mobile Maps 2009," Jul. 23, 2009, 4 pages, available at http://www.iphonewzealand.co.nz/2009/all/review-sygic-mobile-maps-2009/.
Liu Jianghong, "Analysis of the impact of in-vehicle information system on driving safety and improvement measures", Dec. 31, 2011, vol. 37, No. 4.
Magellan Maestro 3100 User Manual, 2007 Magellan Navigation Inc., 631459-01 A, Pages Cover, III, 27 and 28.

(56) References Cited

OTHER PUBLICATIONS

Mohan et al., "Adapting Multimedia Internet Content For Universal Access," IEEE Transactions on Multimedia, Mar. 1999, pp. 104-114.

Moren ("Google unveils free turn-by-turn directions for Android devices," Macworld, http://www.macworld.eom/article/1143547/android_turnbyturn.htmll7/8/2016 9:58:56 AM], Oct. 28, 2009).

Next place predictions based on user mobility traces Prabhala, Bhaskar; La Porta, Thomas Computer Communications Workshops (INFOCOM WKSHPS), 2015 IEEE Conference on Year: 2015 pp. 93-94, DOI: 10.1109/INFCOMW.2015.7179359 Referenced in: IEEE Conference Publications.

Prabhala, Bhaskar, et al., "Next Place Predictions Based on User Mobility Traces," 2015 IEEE Conference on Computer Communications Workshops (INFOCOM WKSHPS), Apr. 26-May 1, 2015, pp. 93-94, IEEE, Hana Kana, China.

Ridhawi, I. AL, et al., "A Location-Aware User Tracking and Prediction System," 2009 Global Information Infrastructure Symposium, Jun. 23-26, 2009, pp. 1-8, IEEE, Hammamet, Tunisia.

Ruhs, Chris, "My Favorite Android Apps: Maps," Jun. 24, 2011, 1 page, available at http://www.youtube.com/watch?v=v2aRkLkLT3s.

Simonds C., "Software for the next-generation automobile", IT Professional, Nov. 1, 2003, 5 Pages.

Sun Jiaping, "Design and implementation of in-vehicle navigation system", Outstanding Master's Thesis in China Full Text Database Engineering Science and Technology II Series, Feb. 15, 2010.

Toth, Balint, and Geza Nemeth. "Challenges of creating multimodal interfaces on mobile devices." ELMAR 2007. IEEE, 2007. (Year: 2007).

\* cited by examiner

MAPPING APPLICATION WITH TURN-BY-TURN NAVIGATION MODE FOR OUTPUT TO VEHICLE DISPLAY

INCORPORATION BY REFERENCE; DISCLAIMER

Each of the following applications are hereby incorporated by reference: application Ser. No. 16/864,004 filed on Apr. 30, 2020; application Ser. No. 15/825,996 filed on Nov. 29, 2017; application Ser. No. 14/081,915 filed on Nov. 15, 2013; application No. 61/832,818 filed on Jun. 8, 2013. The Applicant hereby rescinds any disclaimer of claim scope in the parent application(s) or the prosecution history thereof and advises the USPTO that the claims in this application may be broader than any claim in the parent application(s).

BACKGROUND

Portable media devices, such as smartphones, have the capability to run advanced mapping and navigation applications (e.g., Apple Maps®, which operates on the iPhone®, iPad®, and iPad Mini®). Some of these mapping and navigation applications include turn-by-turn navigation features, which can be helpful while driving. However, interacting with the mapping and navigation application while driving may be difficult due to the small size of many mobile devices, and therefore the small size of the various controls on the mobile devices.

In addition, many vehicles include in-car navigation systems. These in-car navigation systems operate independently of any of the driver's other devices, and offer a larger and conveniently positioned screen. However, these in-car navigations systems generally provide a more limited experience than the more robust mapping applications of the mobile device due to the inherent limitations of the vehicle.

BRIEF SUMMARY

Some embodiments of the invention provide an application that generates multiple user interfaces for display on multiple devices at the same time. In some embodiments, the application is an integrated mapping and navigation application that runs on a mobile device (e.g., a smart phone, tablet computer, media player, etc.) and generates both (i) a user interface for display on the mobile device and (ii) a user interface for display on a screen of a vehicle to which the mobile device connects. The integrated mapping and navigation application (referred to below as a mapping application) generates both user interfaces simultaneously for simultaneous output and display.

In addition, the mapping application of some embodiments generates different user interfaces for display on the screens of different types of vehicles. Some embodiments generate different user interfaces for each different individual vehicle. On the other hand, some embodiments generate different user interfaces for categories of vehicle screens, such as high-quality touchscreens, low-quality touchscreens, and non-touch screens (with which a user interacts via separate controls built into the vehicle). The mapping application of some embodiments, when connected to a vehicle, identifies the type of display screen built into the vehicle, and automatically outputs the correct user interface for the vehicle.

A user of the mapping application may interact with the application via the vehicle interface as well as the mobile device interface (a touchscreen interface in some embodiments). Because of the different capabilities of the different interfaces, as well as the differences in likely user behavior for interactions with the different interfaces, the same operation or type of operation may be implemented differently between the mobile device interface and the vehicle interface. For instance, the mobile device may have the capability to interpret multi-touch gestures (e.g., a pinch gesture to zoom in or out), whereas the vehicle interface may not have multi-touch capability (or any touch capability), and therefore requires different user interaction to zoom (e.g., selection of zoom in and zoom out buttons, either on the touchscreen or the vehicle interface).

Furthermore, because of the different capabilities of the different types of display screens, a user may interact differently with the application user interfaces displayed on high-quality touchscreens, low-quality touchscreens, and non-touchscreens. For instance, the interaction for scrolling through a map on a vehicle touchscreen may involve a similar swiping gesture as to scrolling through the map on a mobile device. However, a low-quality touchscreen may not have the ability to interpret such gestural input, and therefore the user interface for low-quality touchscreens includes selectable (e.g., via a tap input) arrows for scrolling in different directions. The non-touchscreen vehicle interface, of course, will require input through other controls (e.g., a joystick, buttons, etc.) that are built into the vehicle.

Beyond simply exploring a map (e.g., by scrolling and zooming), the vehicle interface output by the mapping application provides additional features in some embodiments. In some embodiments, the vehicle screen interface for the mapping application is geared towards identifying a destination for a user and entering a navigation mode for a route to that destination, with as little user interaction as possible (because the user is often the driver). For example, through the vehicle interface, a user (e.g., the driver of the vehicle, a passenger of the vehicle, etc.) may search for destinations on the map. The user may search for a specific address, a specific place name, a generic type of place name, etc. In some embodiments, the user searches through the vehicle interface via voice interaction (i.e., dictating a search into a microphone of either the mobile device or the vehicle). The user can scroll through these results in the vehicle interface (through touchscreen interactions, built-in vehicle control interactions, etc.), and choose to enter a navigation mode with a search result as a destination.

In addition, the mapping application of some embodiments offers a predictive routing feature accessible through the vehicle user interface. While driving, the user can select an option to enter the predictive routing mode, in which the mapping application presents various likely routes to the user for navigation. The mapping application may generate the likely routes based on a variety of factors, including upcoming appointments or events on a calendar or other scheduling application that runs on the mobile device, analysis of routes taken in the past by the mobile device (e.g., a route from a user's home to work). The predictive routing feature may additionally factor in traffic to identify potential difficulties in a usual route or in reaching a location on time.

The mapping application of some embodiments also offers a recent locations feature that provides a user with recent destinations, results of recent searches, etc. Some embodiments provide search results exclusively from recent searches entered or destinations navigated to through the vehicle interface. On the other hand, some embodiments additionally include search results from recent searches made through the device, even before the connection of the device to the vehicle interface. Thus, if a user searches for a particular destination on her mobile device while walking to her car, then enters the car and connects her device to the car interface, the particular destination will appear as a recent and easily selectable search, without requiring the user to re-enter the search.

Once the user selects a destination, the mapping application enters a turn-by-turn navigation mode in some embodiments. In this mode, some embodiments output different displays to the vehicle display and the mobile device display. The vehicle display, in some embodiments, displays the user's location and the upcoming route, in either a two dimensional mode or a three dimensional mode. The application of some embodiments generates this display from a perspective rendering position within a three dimensional navigation scene, though the view may be shown from directly above the scene so as to render a two dimensional view. The user can interact with the vehicle user interface to, e.g., view a list of maneuvers to make for the route (e.g., a right turn onto a particular street), change between two and three dimensions, and other interactions. Furthermore, in some embodiments, when the vehicle reaches a location within a particular threshold of the next maneuver, a portion of the vehicle screen displays a representation for the maneuver (e.g., an intersection with an arrow that represents the vehicle's path through the intersection, as well as text directions for the maneuver). Once the vehicle has passed through the intersection, the representation of the maneuver disappears from the display screen of the vehicle. While the vehicle display shows the upcoming route on a map, the mobile device display of some embodiments subsequently shows a representation for the upcoming maneuver, irrespective of the distance for the vehicle to travel before making the maneuver.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments of the invention provide an application that generates multiple user interfaces for display on multiple devices at the same time. In some embodiments, the application is an integrated mapping and navigation application that runs on a mobile device (e.g., a smart phone, tablet computer, media player, etc.) and generates both (i) a user interface for display on the mobile device and (ii) a user interface for display on a screen of a vehicle to which the mobile device connects. The integrated mapping and navigation application (referred to below as a mapping application) generates both user interfaces simultaneously for simultaneous output and display.

Figure 1:
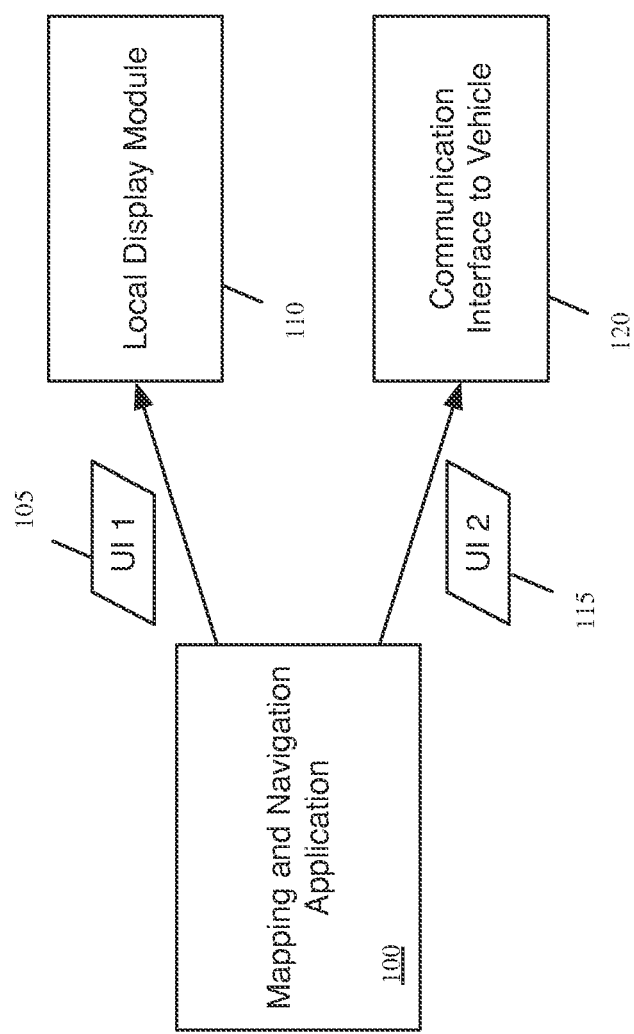
FIG. 1 conceptually illustrates a mapping and navigation application that generates multiple user interfaces simultaneously.

FIG. 1 conceptually illustrates such a mapping and navigation application 100 that generates multiple user interfaces simultaneously. In some embodiments, the mapping and navigation application 100 operates on a mobile device such as a smart phone or tablet device (e.g., an iPhone®, iPad®, etc.). As shown in this figure, the mapping and navigation application 100 outputs a first user interface 105 to a local display module 110 of the mobile device and a second user interface 115 to a communication interface 120 with a vehicle.

The local display module 110 of some embodiments handles display of the first user interface 105 on a display screen of the mobile device on which the mapping application 100 operates. In some embodiments, a user of the mapping application may interact with the mobile device user interface 105 (e.g., through touchscreen interactions).

The communication interface 120 to the vehicle is an interface for a wired (e.g., USB, etc.) or wireless (e.g., Bluetooth®, Wi-Fi, etc.) connection with a vehicle electronic system. In some embodiments, the vehicle may be a car, truck, boat, or other motor vehicle with a display screen and ability to connect to the mobile device. The vehicle electronic system of some embodiments includes a display screen through which the second user interface 115 is displayed. In addition to interacting with the user interface 105 displayed on the mobile device, the user may also interact with the vehicle user interface 115 through various vehicle controls. These controls may include a touchscreen and/or various hardware controls (e.g., buttons, knobs, joysticks) built into the vehicle.

Many portions of this application describe the mobile device generating a graphical user interface (or user interface) for the vehicle display screen. In some embodiments, this means that the mobile device generates a graphical user interface display (i.e., an image or series of images) which is sent through the connection to the vehicle-resident system for display on the display screen of the vehicle. The graphical display may be sent as a bitmap in some embodiments, a different format that requires translation into a displayed image by the vehicle system, or a combination of bitmaps and different formats.

This display screen, which may be a touchscreen, makes up the vehicle user interface, possibly along with other controls (e.g., joystick, knob, built-in buttons, trackpad, trackball, etc.). These various controls receive inputs and send signals to the mobile device indicating the inputs performed by the user. The mapping application on the mobile device (or the operating system, which in some embodiments translates the signals from the vehicle) is configured to recognize these inputs and perform various actions to modify the mapping application graphical display on the vehicle screen, the mobile device screen, or both. The interface of some embodiments for a mobile device to communicate with the vehicle in this way is described in further detail in U.S. Patent Publications 2009/0284476, 2010/0293462, 2011/0145863, 2011/0246891, and 2011/0265003, which are incorporated herein by reference. In addition, this interface of some embodiments is described in further detail in the following applications: U.S. Provisional Patent Application 61/832,841, entitled "Device and Method for Generating User Interfaces from a Template"; U.S. Provisional Patent Application 61/832,842, entitled "Device, Method, and Graphical User Interface for Synchronizing Two or More Displays"; and U.S. patent application Ser. No. 13/913,428, entitled "Application Gateway for Providing Different User Interfaces for Limited Distraction and Non-Limited Distraction Contexts". U.S. applications Ser. Nos. 61/832,841, 61/832,842, and Ser. No. 13/913,428 are incorporated herein by reference.

Figure 2:
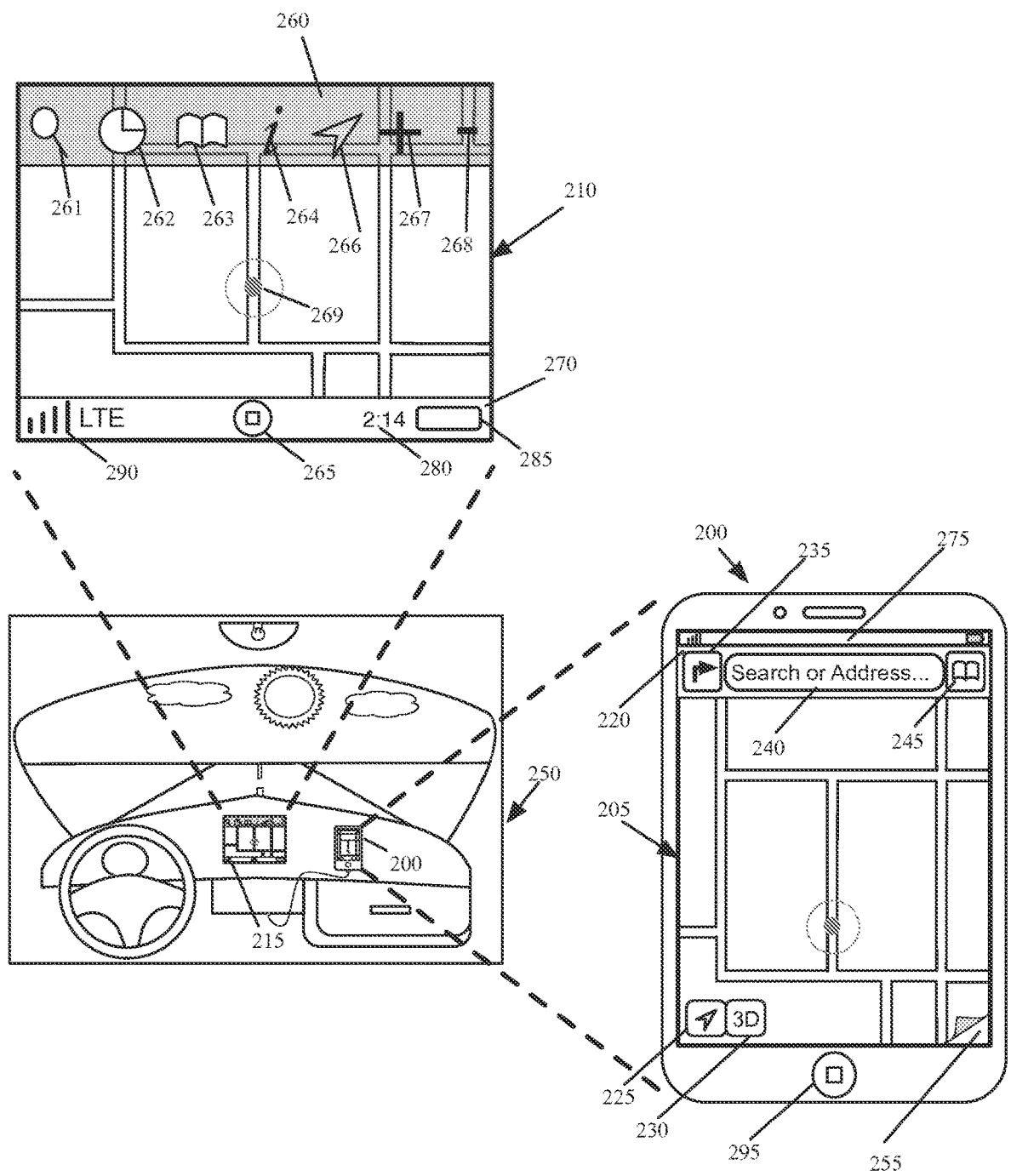
FIG. 2 illustrates an example of a mobile device connected to the interface of a vehicle system.

FIG. 2 illustrates an example of a mobile device 200 connected to the interface of a vehicle system. A mapping application operates on the mobile device 200, and outputs both a first user interface 205 for the mobile device display screen and a second user interface 210 for the vehicle dashboard display screen 215. The figure illustrates the interior of a vehicle 250, in which the mobile device 200 connects via a wired connection to the vehicle, and outputs a user interface for display on a dashboard screen 215 of the vehicle. While this example, as well as others to follow, illustrates a single display screen in the vehicle, some vehicles include multiple screens (e.g., a center dashboard console screen as well as a screen directly in front of the driver). Some embodiments output only a single user interface to the center dashboard screen in this case, while other embodiments output the same user interface to multiple screens, and yet other embodiments output different interfaces to the different screens.

The figure also illustrates a blown-up view of the mobile device 200 and the dashboard screen 215. As shown, both of these display a map of the same location, but within the context of different user interfaces. In addition to the map, the mobile device interface 205 of some embodiments includes several user interface (UI) controls arranged in a top bar 220 and as floating controls (although other embodiments do not include floating controls and instead include these controls within either the top bar or a second control bar). The floating controls of some embodiments include a position control 225 and a 3D control 230, while the top bar 220 includes a direction control 235, a search field 240, and a bookmark control 245.

The direction control 235 opens a page through which a user can request the mapping application to identify a route (e.g., by accessing a mapping and routing server) between a starting location and an ending location. Upon receiving a selection (e.g., through a tap gesture) of the direction control 235, the mapping application presents a page allowing the user to select a starting location (e.g., the user's current location or a different location) and an ending location for a route. Once a route has been identified that starts at the current location of the device (e.g., through the direction control 235 or through a different aspect of the UI 205), some embodiments enable the user to enter a turn-by-turn navigation mode of the mapping application by selecting a UI control. In the turn-by-turn navigation mode of some embodiments, the mapping application presents a view along the selected route, while also providing instructions for upcoming maneuvers to perform (e.g., as road signs with both text and graphical instructions). In some embodiments, the mapping application generates this view from a perspective rendering position within a three dimensional navigation scene that the device renders.

In some embodiments, the user can initiate a search by tapping in the search field 240. This directs the application to present an animation that (1) presents an on-screen keyboard and (2) opens a search table with various completions for the user's search entry. When the search field is empty (e.g., because the user has not yet entered any search terms), the table contains a list of "recents", which in some embodiments are recent searches and/or route directions that the user (or a different user of the mapping application on the mobile device 200) has previously requested. In some embodiments, the recents list may also include addresses searched for or added from other applications on the mobile device (e.g., a web browser), received via various different forms of messaging (e.g., SMS messages, e-mail, etc.), recently accessed contacts, or other mechanisms. After any edit in the search field 240, the mapping application fills the table with search completions both from local sources (e.g., bookmarks, contacts, recent searches, recent route directions, etc.) and remote servers. In addition to searching through the search field 240, in some embodiments users can activate a voice recognition feature of the mobile device in order to perform searches within the mapping application.

The bookmark control 245 allows location and routes to be bookmarked by the application. Through various aspects of the mapping application user interface, a user can add a location or a route as a bookmark. For instance, a user can select a location (e.g., a place of business) on the map to cause the application to present an information screen for the location that, along with various information, includes a selectable control for adding the location as a bookmark.

The position control 225 allows the current position of the device to be specifically noted on the map, as is the case in this figure. Once the position control is selected in some embodiments, the application maintains the current position of the device in the center of the map as the device moves. In some embodiments, the position control can also be used to direct the application to identify the direction to which the device is currently oriented. The mapping application of some embodiments identifies the location of the device using coordinates (e.g., longitudinal, latitudinal, and altitudinal coordinates) in a GPS signal that the device receives. Alternatively or conjunctively, the mapping application (or a separate application or operating system of the device) uses other methods (e.g., cell tower triangulation) to compute the current location.

The 3D control 230 is a control for viewing the map or inspecting a route in three dimensions. The mapping application provides the 3D control as a quick mechanism for entering or exiting a 3D mode. This control also serves as (1) an indicator that the current map view is a 3D view and (2) an indicator that a 3D perspective is available for a given map view (e.g., a map view that is zoomed out might not have a 3D view available).

Some embodiments additionally include a page curl control 255 that allows the application to minimize the number of on-screen controls, by placing certain less frequently used actions in a secondary UI page, which is accessible through the "page curl" control displayed on the map. The page curl indicates the location of another set of controls that are conceptually located "behind" the map view. These controls, in some embodiments, include selectable controls to drop a pin, show traffic on the map, print a map, or select different map types (e.g., satellite, standard, or a hybrid map type).

The above described the UI output by the mapping application for display on the mobile device 200. In addition, the mapping application outputs (i.e., generates for display) a UI for display on the vehicle dashboard screen 215. In some embodiments, this second UI provides a subset of the functionalities of the first mobile device UI, and is designed to focus the user towards identifying a navigation destination with minimal touch interaction, as the user will often be the driver of the vehicle.

The vehicle user interface 210 includes, in addition to the map, several UI controls arranged in a top bar 260, and a home button 265 located within a lower information bar 270. As will be described below, the vehicle user interface 210 is dependent, in some embodiments, on the type of user interface provided by the vehicle. Some embodiments generate different user interfaces for each different individual vehicle make or model. On the other hand, some embodiments generate different user interfaces for categories of vehicle screens, such as high-quality touchscreens, low-quality touchscreens, and non-touch screens (with which a user interacts via separate controls built into the vehicle). The mapping application of some embodiments, when connected to a vehicle, identifies the type of display screen built into the vehicle, and automatically outputs the correct user interface for the vehicle. In the case of FIG. 2, the high-quality touchscreen interface of some embodiments is displayed.

The lower information bar 270 is designed to implement certain features of the mobile device user interface outside of the mapping application. In fact, in some embodiments, the lower information bar 270 is generated by the device operating system for the vehicle display rather than by the mapping application. As shown, the lower information bar 270 includes features also included in an upper information bar 275 of the mobile device user interface, including a clock 280, a battery charge indicator 285, and a connection indicator 290. The clock 280 indicates a current time, the battery charge indicator 285 indicates an amount of battery charge remaining for the mobile device, and the connection indicator 290 indicates a network connection of the mobile device (e.g., LTE, Wi-Fi, etc.).

The home button 265 of some embodiments is designed to replicate the functionality of the physical home button 295 of some embodiments, which enables the user of the mobile device to exit an application and return to a home page of the device. Similarly, in some embodiments, the user can touch the home button 265 to return to a home page of the vehicle user interface, which in some embodiments is also generated by the mobile device 200 (e.g., by the operating system of the mobile device). The home page of the vehicle user interface, as will be described below, displays a set of controls for opening a set of applications available through the vehicle interface (e.g., phone, messages, music, and other applications that run on the mobile device and are available through the vehicle interface). In some embodiments, when the user selects the home button 265, the mobile device displays these controls (e.g., above the mapping application interface) without exiting the mapping application. The user can then select one of the application controls or dismiss the set of controls by either waiting a short period of time or selecting a location within the mapping application.

In some embodiments, the mobile device 200 displays the same application on both the vehicle display 215 and its own display in most situations. For example, when the device is connected to the vehicle system and the user enters the mapping application via the mobile device, the device 200 also outputs the mapping application UI 210 to the display 215. When a user selects the home button 295 on the mobile device, the UI output to the display screen 215 exits the mapping application as well.

The top bar 260 of some embodiments is translucent and includes a search control 261, a recents control 262, a bookmarks control 263, a predictive routing control 264, a position control 266, and zoom controls 267 and 268. In addition, different user interfaces for different types of vehicles may include different controls (e.g., different zoom controls), or a completely different arrangement of controls (e.g., for non-touch interfaces).

The search control 261 of some embodiments directs the application towards a search functionality. Unlike the mobile device search control 240, the search functionality accessed through the vehicle interface 210 does not include a typing function. Instead, searching is done through voice recognition. When the user selects search control 261, the application presents an interface that prompts the user to speak into a microphone of either the mobile device or the vehicle. Based on the search term(s) dictated by the user, the mapping application either (1) presents the user with several selectable options for a search or (2) identifies a requested destination or destinations and presents the destination(s) on the map. For instance, if a user dictates a unique address or business name, the application automatically displays the requested location on the map display. On the other hand, when the user dictates an ambiguous destination (e.g., "Bobby's House", where there are multiple contacts named Bobby), the user interface provides two or more options for the user to select. In addition, when the user dictates a generic request (e.g., "hotel"), the mapping application of some embodiments may present multiple destinations on the map, when several destinations that match the generic request are located nearby.

The recents control 262 of some embodiments directs the application to present a list of recent destinations, results of recent searches, etc. Unlike the mobile device UI, the recents list of some embodiments for the vehicle interface does not provide routes from one location to another, because the vehicle interface is primarily designed for identifying a destination to which to navigate from the current location of the vehicle and device. Some embodiments provide search results exclusively from recent searches entered or destinations navigated to through the vehicle interface. On the other hand, some embodiments additionally include search results from recent searches made through the device, even before the connection of the device to the vehicle interface. Thus, if a user searches for a particular destination on her mobile device while walking to her car, then enters the car and connects her device to the car interface, the particular destination will appear as a recent and easily selectable search, without requiring the user to re-enter the search through the search control 261.

The bookmarks control 263 of some embodiments is similar to the bookmarks control 245 of the device interface, in that it enables access to a list of bookmarked locations. Again, as with the recents list, the bookmarks list of some embodiments only provides bookmarked destinations, and does not provide routes. In some embodiments, the bookmarked destinations are those bookmarked on the mapping application running on the mobile device. In other embodiments, the mapping application UI displayed on the vehicle screen includes the ability to add a destination to the bookmarks.

The predictive routing control 264 enables access to a predictive routing display of the mapping application, in which the mapping application presents various likely routes to the user for navigation. The mapping application may generate the likely routes based on a variety of factors, including upcoming appointments or events on a calendar or other scheduling application that runs on the mobile device, or analysis of routes taken in the past by the mobile device (e.g., a route from a user's home to work). The predictive routing feature may additionally factor in traffic to identify potential difficulties in a usual route or in reaching a location on time. In some embodiments, the application presents the likely routes with a navigation view on one portion of the display and information about the route (including estimated arrival time, metadata about the source of the route, etc.) on a second portion of the display, with the ability to scroll through the routes.

The position control 266 functions similar to the position control 225 of some embodiments, in that its selection will cause the mapping application to center the map view on the current location of the device. However, in some embodiments, the position control does not include an additional feature of enabling the user to identify the orientation of the vehicle. Instead, some embodiments automatically orient the map based on the direction of travel of the vehicle, or provide a setting through which the user enables this automatic orientation of the map. Other embodiments automatically orient the map with north facing up irrespective of the vehicle travel direction.

Figure 9:
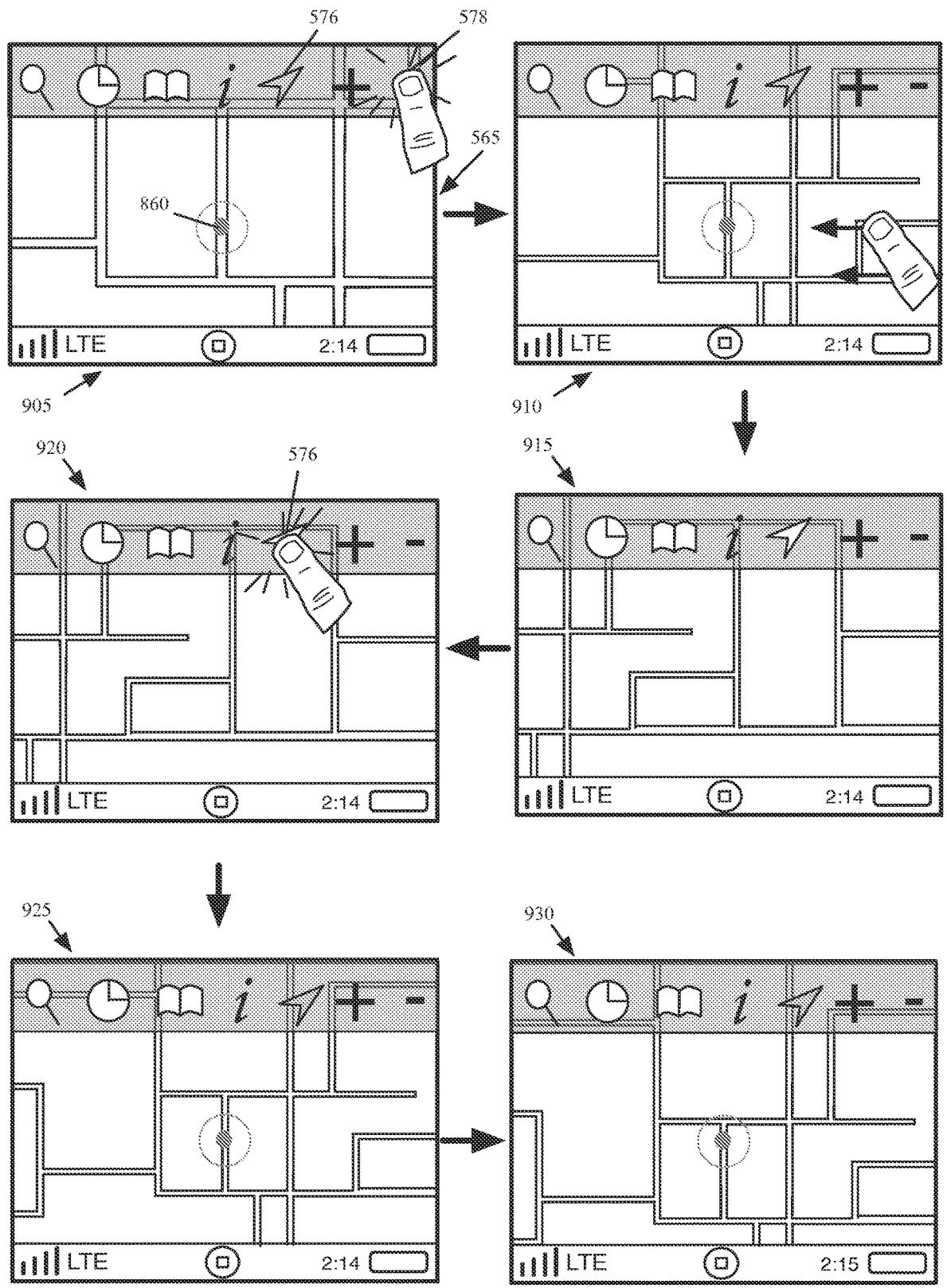
FIG. 9 illustrates the user of zoom and scroll functionality as well as the position control to re-center the displayed map region on the device's current location in the high-quality touchscreen interface of some embodiments.

In this case, the map view is centered on the position indicator 269 that indicates the current location of the device. Some embodiments disable the position control when the map view is centered on the position indicator. As such, the position control 266 is displayed in grayed-out fashion, to indicate its current disabled state. FIG. 9 below illustrates the enabling of the position control as the user moves the map region so that the position control is no longer centered.

The zoom controls 267 and 268 enable the user to zoom in (with control 267) and out (with control 268) of the map view in some embodiments. In addition to zooming to explore the map view, users may also scroll through the map region. In some embodiments of the mapping application, the scrolling and zooming features differ for different types of vehicle interfaces because of the different capabilities of the different types of display screens. For instance, UI 210 is a high-quality touchscreen interface, and the user scrolls the map view via swipe, or drag, gestures. However, a low-quality touchscreen may not have the ability to interpret such gestural (i.e., touch movement) input, and therefore the user interface for low-quality touchscreens includes selectable arrows for scrolling in different directions. Rather than zoom controls 267 and 268, some embodiments present a different control that the user selects to activate the selectable arrows as well as zoom controls similar to those for the high-quality touch interface 210. The non-touchscreen vehicle user interface, of course, requires input through other controls in order to zoom and scroll. These other controls may include a joystick, trackball, various buttons, etc. that are built into the vehicle.

As indicated, many of the features of the vehicle UI 210 are designed to enable the user to select a destination for navigation. Once the user selects a destination, the mapping application enters a turn-by-turn navigation mode in some embodiments. In this mode, some embodiments output different displays to the vehicle display and the mobile device display. The vehicle display, in some embodiments, displays the user's location and the upcoming route, in either a two dimensional mode or a three dimensional mode. In some embodiments, the mapping application generates this view from a perspective rendering position within a three dimensional navigation scene that the device renders. This perspective rendering position is adjustable in some embodiments and can be viewed as a virtual camera that can capture the three dimensional navigation scene from a variety of different perspectives (e.g., from a variety of different positions and orientations). Accordingly, in some embodiments, the turn-by-turn navigation presents an animated rendering of a navigated route rendered from the vantage point of a virtual camera that traverses along the direction of the route based on the traversal direction and speed of the vehicle to which the device is connected. In some embodiments, this direction and speed is captured by data (e.g., GPS data, triangulated cell tower data, etc.) associated with the device.

The user can interact with the vehicle user interface to, e.g., view a list of maneuvers to make for the route (e.g., a right turn onto a particular street), change between two and three dimensions, and other interactions. Furthermore, in some embodiments, when the vehicle reaches a location within a particular threshold of the next maneuver, a portion of the vehicle screen displays a representation for the maneuver (e.g., an intersection with an arrow that represents the vehicle's path through the intersection, as well as text directions for the maneuver). Once the vehicle has passed through the intersection, the representation of the maneuver disappears from the display screen of the vehicle. While the vehicle display shows the upcoming route on a map, the mobile device display of some embodiments subsequently shows a representation for the upcoming maneuver, irrespective of the distance for the vehicle to travel before making the maneuver.

FIGS. 1 and 2 illustrate examples of a mapping application operating on a mobile device that outputs both a first UI for the mobile device and a second UI for a vehicle to which the mobile device connects. Several more detailed examples are described below. Section I describes the different types of vehicle interfaces generated by the mapping application of some embodiments, while Section II describes map exploration features of these different vehicle interfaces. Section III then describes the search feature accessible through the vehicle user interfaces of the mapping application of some embodiments. Next, Section IV describes a feature of the vehicle user interfaces of some embodiments for accessing recent destinations, while Section V describes a predictive routing interface of some embodiments. Section VI describes a turn-by-turn navigation mode of the mapping application of some embodiments. Section VII then describes electronic devices that employ the mapping application of some embodiments. Finally, Section VIII describes location services used by some embodiments of the invention.

I. Different Types of Vehicle User Interfaces

As described above, the mapping application of some embodiments, in addition to generating a first user interface for the device on which it operates, also generates different user interfaces for different types of vehicles to which the device may connect. In some embodiments, the application categorizes vehicle interfaces into high-quality touchscreen interfaces, low-quality touchscreen interfaces, and non-touchscreen interfaces. While this description primarily focuses on these three types of interfaces, one of ordinary skill in the art will recognize that many different types of interfaces may be generated by some embodiments. For instance, some embodiments generate a UI for vehicles that include a touchscreen interface along with additional hardware controls. In addition, the mapping application of some embodiments generates different UIs for vehicles with different non-touchscreen controls. Some embodiments, in fact, generate different UIs for each different make or model of vehicle.

Figure 3:
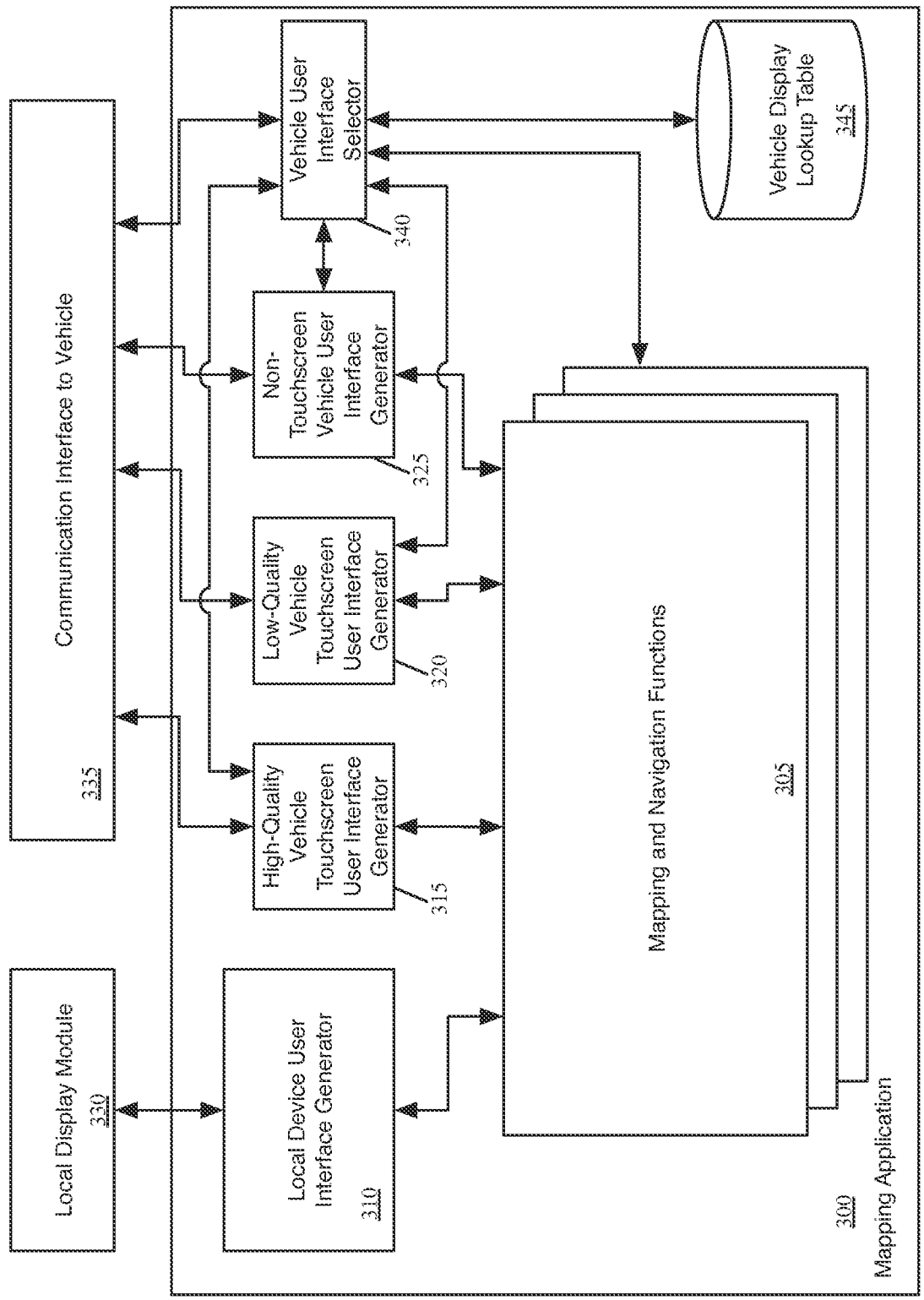
FIG. 3 conceptually illustrates a simplified software architecture for a mapping and navigation application of some embodiments FIG. 4 conceptually illustrates a process of some embodiments performed by the mapping application to output a vehicle user interface.

FIG. 3 conceptually illustrates a simplified software architecture for a mapping and navigation application 300 of some embodiments. As with the mapping application 100 described above, the application 300 operates on a mobile device that can be connected to a vehicle. In some embodiments, the vehicle connection requires a wired connection that additionally enables charging of the electronic device (e.g., a USB connection). In other embodiments, the mobile device can connect wirelessly to the vehicle display interface.

As shown, the mapping application 300 includes various mapping and navigation functions 305, a local device user interface generator 310, a high-quality vehicle touchscreen user interface generator 315, a low-quality vehicle touchscreen user interface generator 320, a non-touch vehicle touchscreen user interface generator 325, and a vehicle user interface selector 340 that uses a vehicle display lookup table 345. In addition, FIG. 3 also displays a local display module 330 and a communication interface 335 for connecting to a vehicle electronic system. The local display module 330 and the communication interface 335 are also part of the mobile device on which the mapping application 300 operates, though not part of the mapping application 300 itself.

The mapping and navigation functions 305 perform a wide variety of mapping and/or navigation processes for the mapping application. These functions may include identifying map tiles from which to generate map displays and retrieving the map tiles from a remote server, matching a device location to a location on a map, storing and retrieving bookmarked or recent search results, retrieving route information from a server, generating predicted routes based on analyzing data travel history, data from other applications, etc., generating text and/or graphical navigation instructions for a route based on the retrieved route information, and other functions.

The local device user interface generator 310 of some embodiments generates the mapping application UI for display on the mobile device on which the mapping application 300 operates. In some embodiments, the UI generator 310 receives a rendered map from the mapping and navigation functions and adds additional user interface controls (e.g., the floating controls 225 and 230, the controls in the top bar 220, etc.). In other embodiments, the UI generator 310 receives a description of the map to be rendered, adds the overlaid controls, and sends the entire UI to a rendering engine for rendering. In addition, the UI generator 310 sends the UI to the local display module 330 for display on the local display device.

The local display module 330 of some embodiments handles display of the mobile device user interface of the mapping application. In some embodiments, the mobile device display is a touchscreen which, in addition to displaying a user interface, accepts touchscreen interactions. Either the local display module 330 or a separate touchscreen interaction reader receives these touchscreen interactions and translates the interactions into multi-touch gestures (e.g., one-finger tap, one-finger double tap, one-finger swipe, two-finger swipe, etc.) at particular locations (e.g., coordinates) of the touchscreen. These gestures are sent from the operating system to the mapping application 300 (e.g., to the local device user interface generator 310 or a separate module that translates the gesture and location into an interaction with the displayed mapping application constructs.

The high-quality vehicle touchscreen user interface generator 315, the low-quality vehicle touchscreen user interface generator 320, and the non-touchscreen vehicle user interface generator 325 generate three different user interfaces for display on the screens of different vehicles (e.g., screens located in the dashboards of the vehicles). As indicated by the names assigned here to the modules, the mapping application 300 of some embodiments generates a first user interface for high-quality touchscreens, a second user interface for low-quality touchscreens, and a third user interface for non-touchscreen displays.

Various differences between the different user interfaces will be described in the sections to follow, as well as by reference to FIG. 5 below. The high-quality touchscreens may not have the ability to interpret multi-touch gestures, but have a high enough touch resolution to interpret swipe/drag gestures, whereas the low-quality touchscreens may not be able to provide reliable swipe/drag gesture data. Some low-quality touchscreens can detect swipes or other gestures, but without adequate resolution for some interactions. Thus, the low-quality touchscreen interface may allow gestural inputs for interactions that do not require location data of the gesture (e.g. swiping between screens), but not for interactions where location of the gesture is important (e.g., precise positioning of a map). Furthermore, the high-quality touchscreens may have a greater ability than the low-quality touchscreens to resolve the position of selection (e.g., tap or double-tap) gestures, and therefore the UI for high-quality touchscreens can have selectable items located more closely together.

Each of the vehicle UI generators 315-325 sends their UIs to the communication interface 335 that connects to the vehicle system. While the figure shows all three modules communicating with the interface, in some embodiments only one of the UIs will be generated at a given time, depending on the vehicle to which the device is connected. In some embodiments, this communication interface is a Universal Serial Bus (USB) interface through which the device communicates with the vehicle system, as well as through which the device is charged. In other embodiments, the communication interface may be one of several different interfaces (e.g., USB, Bluetooth, etc.) depending on how the user chooses to connect the device to the vehicle system.

The mapping application 300 also receives interactions with the vehicle system (i.e., touchscreen and/or non-touchscreen interactions) to control the mapping and navigation functions through the communication interface 335. In some embodiments, the vehicle system identifies the location and type of touchscreen gestures (e.g., single or double tap centered at a particular set of coordinates) and sends this information to the mapping application 300 for its interpretation with respect to the displayed user interface. In other embodiments, the vehicle system sends the raw touchscreen data (e.g., pressure data) to the mobile device for translation into gestures at particular locations. The interactions received through the vehicle interface may also include non-touchscreen interactions, such as the pushing of specific buttons, joystick motion, etc.

The vehicle user interface selector 340 identifies which of the three types of vehicle user interfaces should be generated and communicates this information to both the mapping and navigation functions 305 and the different user interface generators 315-325. In some embodiments, the vehicle user interface selector 340 is part of the operating system of the mobile device rather than part of the mapping application. The vehicle user interface selector 340 receives information about the vehicle display screen through the communication interface 335 (e.g., through a specific communication channel of the interface). This information, in some embodiments, includes one or more characteristics of the vehicle display screen. These characteristics, in some embodiments, include whether or not a touchscreen is available, the latency of the touchscreen (i.e., how quickly is the screen able to process inputs), the touch and display resolutions of the touchscreen, whether or not the touchscreen is multi-touch capable, and what type of additional inputs the vehicle includes (e.g., knob, joystick, trackball, number pad, additional buttons, etc.). Based on the received information, the vehicle user interface selector 340 uses the vehicle display lookup table 345 to select one of the three types, or categories, of interfaces for the mapping application to generate. In some embodiments, the mapping application generates numerous different interfaces that cater to the specifics of the vehicle displays with greater granularity. For instance, some embodiments generate multi-touch capable vehicle user interfaces, interfaces for vehicles that include both touchscreen and knob-type inputs, etc.

Figure 4:
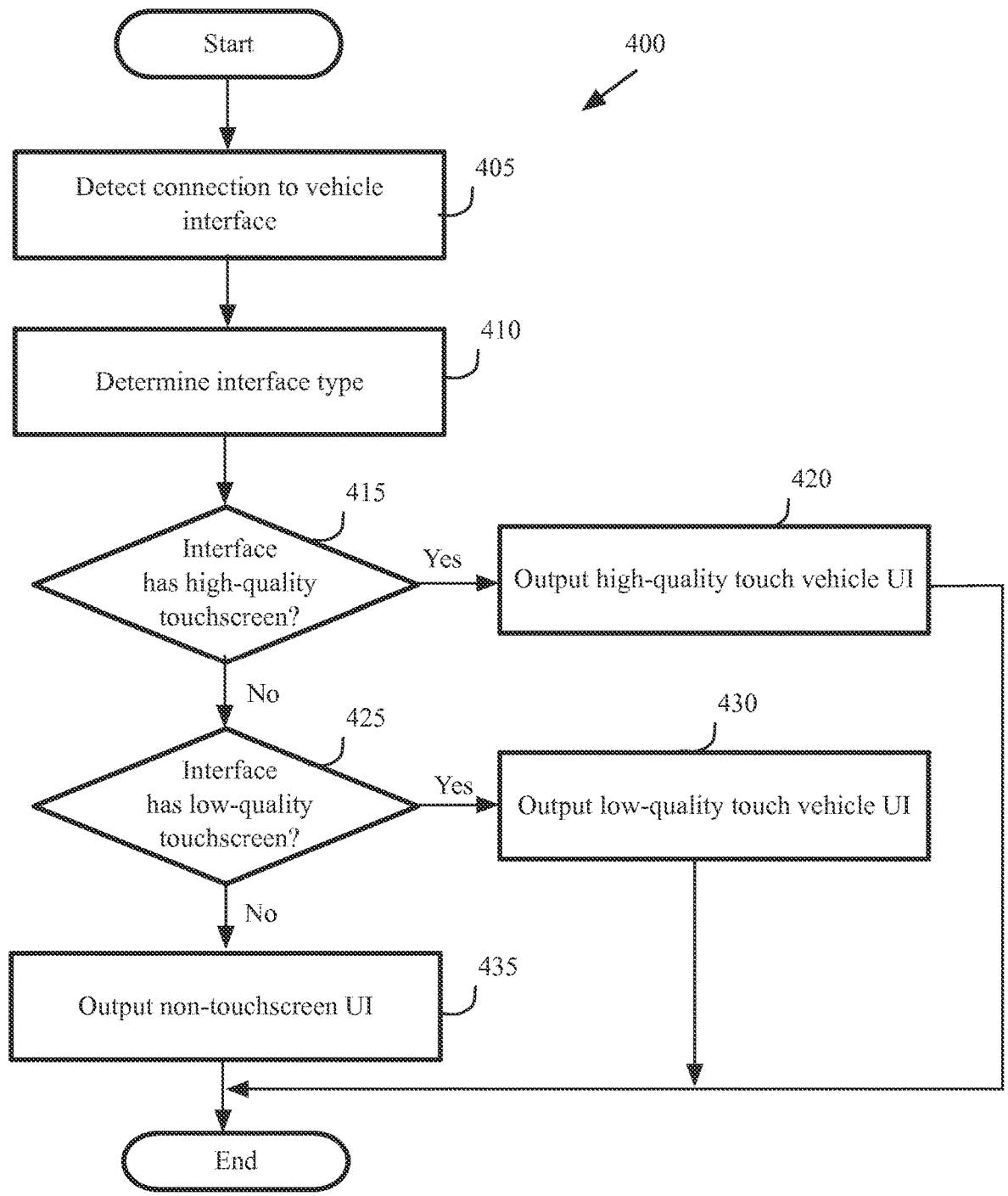

As mentioned, in some embodiments, the mapping application 300 only generates one vehicle user interface, in addition to the local device user interface for display on the mobile device on which the mapping application operates. FIG. 4 conceptually illustrates a process 400 of some embodiments performed by the mapping application to output a vehicle user interface. FIG. 4 will be described by reference to FIG. 5, which illustrates three different mapping application user interfaces for display on different types of vehicle display screens. Specifically, FIG. 5 illustrates a first example 505 of a high-quality touchscreen user interface, a second example 510 of a low-quality touchscreen user interface, and a third example 515 of a non-touch user interface.

As shown, the process 400 begins by detecting (at 405) a connection to a vehicle interface. In some embodiments, the process is started by the mapping application when the mobile device on which the application operates connects to the vehicle interface (e.g., by a user connecting the device with a USB connector) and the mapping application is running on the device (e.g., running in the background or foreground of the device).

The process then determines (at 410) a vehicle interface type. In some embodiments, the vehicle does not identify itself as one of three categories (high-quality touch, low-quality touch, and non-touch), but instead, identifies itself based on the make and model of the vehicle, or the particular built-in system make and model number. In some embodiments, the mapping application (or the device operating system) stores a lookup table that identifies, for different vehicle systems, whether the vehicle has a high-quality touchscreen interface, a low-quality touchscreen interface, or a non-touchscreen interface.

In other embodiments, the vehicle system identifies properties of its display device (e.g., touch latency, touch resolution, display resolution, additional inputs (e.g., knobs, etc.). Based on the identified properties, the mapping application (or the device operating system) identifies a type of user interface (e.g., high-quality touch, low-quality touch, non-touch) to generate from a stored matrix or lookup table.

The process then determines (at 415) whether the interface has a high-quality touchscreen. As mentioned, in some embodiments, a high-quality touchscreen may not have the ability to interpret multi-touch gestures, but will have a better touch input resolution than the low-quality touchscreens. When the vehicle interface has a high-quality touchscreen, the process generates and outputs (at 420) a high-quality touchscreen vehicle user interface. The process then ends.

Figure 5:
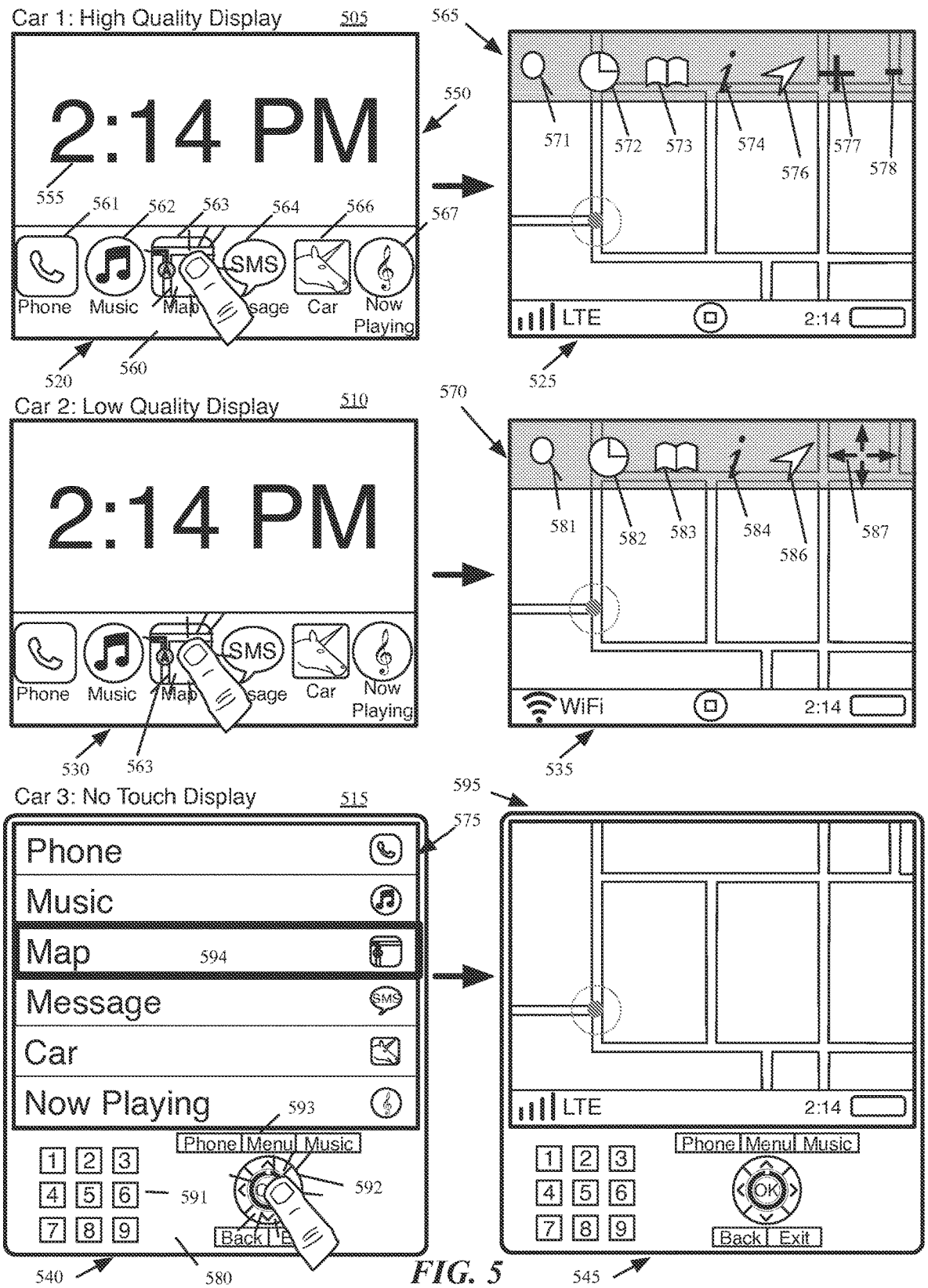
FIG. 5 illustrates a first example of a high-quality touchscreen user interface, a second example of a low-quality touchscreen user interface, and a third example of a non-touch user interface.

The first example 505 of FIG. 5 illustrates such an interface output to a first vehicle by the mapping application. This first example illustrates two stages 520 and 525 of a high-quality touchscreen vehicle display. The first stage 520 illustrates a home page user interface 550 of some embodiments output by the mobile device operating system when the mobile device is connected to a vehicle system with a high-quality touchscreen interface. The home page 550 includes a clock 555 and a menu bar 560 that includes several controls. The menu bar 560 includes a phone control 561, a music control 562, a map control 563, a messaging control 564, a car control 566, and a now playing control 567. In some embodiments, this user interface includes controls for accessing various applications or functions that operate on the mobile device that a user is most likely to access while driving.

The phone control 561 enables the user to access the phone application in order to place a phone call. In some embodiments, selection of the phone control causes the application to provide an interface for identifying a phone number (e.g., a phone number of a stored contact, of a place of business, etc.) to call. In some embodiments, the interface prompts the user to dictate search terms (e.g., a contact name) in order to identify a phone number. Other embodiments provide a touchscreen interface for navigating through a contacts list, entering a phone number, etc.

The music control 562 enables the user to access a particular media storage, access, and playback application (e.g., iTunes®) in order to access media available through the application. The media may be stored on the device or accessible through the application via a connection to an associated cloud storage service (e.g., iCloud®). As with the phone UI, the music UI may involve touchscreen interaction, voice interaction, or a combination thereof.

The messaging control 564 enables the user to access the messaging application of the mobile device in order to send a short messaging service (SMS), or text, message. In some embodiments, much like for the phone application, the UI for the messaging application is designed to quickly identify a contact to which to send a text message, via touchscreen interactions, voice interactions, or a combination thereof. Once one or more recipients have been identified for the message, in some embodiments the user composes the message by dictation.

The car control 566 enables the user to access a UI provided by the vehicle manufacturer, or by the in-vehicle system manufacturer. This is the UI displayed by default when the mobile device is not connected to the vehicle system, and varies from one vehicle to the next. The UI provided with the vehicle may include options such as a built-in navigation system, access to satellite radio, AM radio, FM radio, etc., and other functions.

The now playing control 567 enables the user to access any media applications that may be operating on the user's mobile device (e.g., streaming online radio applications, streaming video applications, etc.). Depending on the application, the mobile device may output different user interface for different applications. In some embodiments, the media applications may not have specific UIs for the vehicle display, and the device simply outputs the media while requiring interaction with the mobile device UI.

The map control 563 enables the user to access the mapping application described herein. The first stage 520 of this example illustrates a user selecting the map control 563 with a touch selection. The second stage 525 illustrates the resultant mapping application user interface 565 for high-quality touchscreens. This mapping application UI 565 is the same as the UI 210 described above by reference to FIG. 2, and includes the lower information bar in addition to a search control 571, a recents control 572, a bookmarks control 573, a predictive routing control 574, a position control 576, and zoom controls 577 and 578. The functions of these controls are described above by reference to FIG. 2.

Returning to FIG. 4, when the vehicle interface does not have a high-quality touchscreen, the process determines (at 425) whether the vehicle interface has a low-quality touchscreen. Low-quality touchscreens, in some embodiments, do not have the ability to recognize gestural input (e.g., drag/swipe gestures, etc.). This may be due to the vehicle system not being programmed to recognize such gestures or due to the touchscreen sensors having too low a resolution to identify such gestures with a reasonable level of accuracy. When the vehicle interface has a low-quality touchscreen, the process generates and outputs (at 430) a low-quality touchscreen vehicle user interface. The process then ends.

The second example 510 of FIG. 5 illustrates such an interface output to a second vehicle by the mapping application. This second example illustrates two stages 530 and 535 of a low-quality touchscreen vehicle display. The first stage 530 illustrates the same home page user interface 550 as the high-quality touchscreen example 505, output by the mobile device operating system when the mobile device is connected to a vehicle system with a low-quality touchscreen interface. Some embodiments include the same home page for the vehicle UI irrespective of the quality of the touchscreen. The controls for this home page are described above by reference to the first example 505. As in that first example, at the first stage 530 the user selects the map control 563 with a touch selection. The second stage 535 illustrates the resultant mapping application user interface 570 for low-quality touchscreens. This mapping application UI 570 is similar to the high-quality touchscreen interface shown above, with some differences. The UI 570 includes the same lower information bar with a home button, as well as the top bar with a search control 581, a recents control 582, a bookmarks control 583, a predictive routing control 584, and a position control 586. As opposed to the zoom controls 577 and 578 of the high-quality touchscreen interface 565, the low-quality touchscreen interface 570 includes a zoom and scroll control 587.

In some embodiments, the search control 581, recents control 582, bookmarks control 583, predictive routing control 584, and position control 586 perform the same functions as in the high-quality touchscreen interface 570, as described above by reference to FIG. 2. These various functions (search by dictation, recent destinations, bookmarked destinations, predictive routing, current location indication) work in the same manner in both the high-quality touchscreen user interface and the low-quality touchscreen user interface in some embodiments, though in other embodiments differences exist between the features. For instance, the high-quality touchscreen UI for the predictive routing feature allows the user to swipe between suggested routes, while the low-quality touchscreen UI includes other constructs to enable the user to change the route shown.

The zoom and scroll control 587, as will be described in greater detail in the following section, enables the user to access various controls for exploring the map on the vehicle screen. Because of the unreliability or unavailability of swipe gesture input, the low-quality touchscreen UI 570 uses different controls for scrolling that are selectable with tap inputs rather than gestural swipe inputs. In some embodiments, the selection of the zoom and scroll control 587 causes the application to overlay selectable arrows pointing up, down, left, and right over the map view, which the user can select in order to scroll the map in the selected direction. In addition, the application displays zoom in and zoom out controls over the map display that are similar to the controls 577 and 578 of the high-quality touchscreen interface 565.

Returning again to FIG. 4, when the vehicle interface does not have a touchscreen (i.e., does not have a low-quality or high-quality touchscreen), then the vehicle interface will have a non-touch display screen. As such, the process generates and outputs (at 435) a non-touchscreen vehicle user interface. The process then ends.

The third example 515 of FIG. 5 illustrates such an interface output to a third vehicle by the mapping application. This third example illustrates two stages 540 and 545 of the non-touchscreen vehicle display. The first stage 540 illustrates a home menu user interface 575 displayed on the vehicle screen, as well as vehicle hardware controls 580. While this figure illustrates the vehicle hardware controls 580 located directly below the display screen, different vehicles may have their controls located in different places. For instance, some embodiments include controls in the center console between the driver and passenger seats, on the steering wheel, etc.

In this example, the vehicle hardware controls 580 include a keypad 591, a joystick 592, as well as several additional buttons located above and below the joystick. These additional buttons enable the user to access various functions of the vehicle system (e.g., music, phone calls with a connected phone), as well as navigate a set of menus provided by the vehicle system (e.g., to access an in-car navigation system provided with the vehicle). In some embodiments, the mobile device operating system and/or mapping application leverage these buttons as well as the joystick for interactions with the user interface provided by the mobile device.

In this and other figures, the joystick 592 is shown with an "OK" button in the center and four arrows pointing up, down, left, and right. These are illustrated to represent various interactions that a user can perform with a joystick, trackball, or other directional hardware control. For instance, with a trackball (or joystick), in some embodiments a user can press downwards on the trackball to make a selection, or shift the trackball in one of the four directions to signal a move (e.g., of a selector) in that direction.

The non-touch user interface home menu 575 output by the mobile device illustrates the same options as in the touchscreen user interface 550, but arranged differently. In some embodiments, the vehicle display initially displays only the clock, and the user accesses the home menu UI 575 by selecting a menu button 593. The home menu 575 includes a phone option, music option, map option, messaging option, car option, and now playing option, which correspond to the controls 560-567 of the touchscreen UI 550. In some embodiments, the user can use the joystick 592 (or a trackball, arrow buttons, turnable knob, etc.) to scroll between the different menu options.

The first stage 540 illustrates that, with the map menu option 594 selected, the user performs a selection input by pressing downwards on the joystick 592. This selects the mapping application, and causes the display of the mapping application non-touch user interface 595 at the second stage 545. Because the display screen is a non-touch screen, the user interface does not display any controls, and only has the map view and the lower information bar. The lower information bar, unlike those for the touchscreen UIs 565 and 570, does not include a home button. Instead, in some embodiments, the user can select a hardware control (e.g., the back or exit button) to perform the function of the home button. In addition, as will be shown below, in some embodiments the user selects the menu button 593 to access a list of menu options in order to perform functions similar to those provided by the various controls 571-576 of the high-quality touchscreen UI 565 (e.g., search, recents, bookmarks, predictive routing, current location, etc.).

Figure 6:
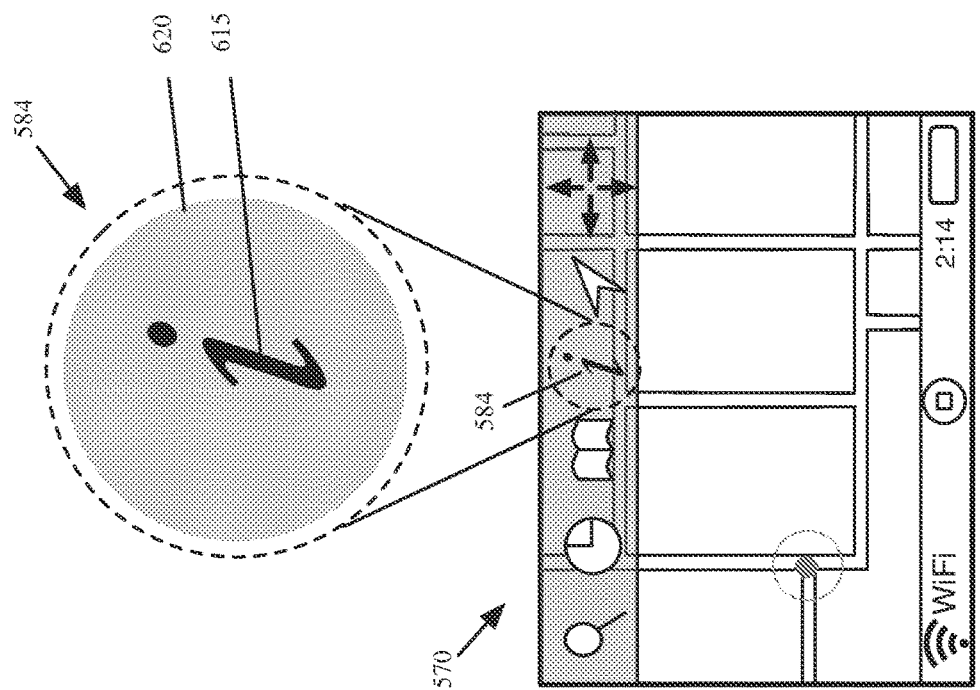
FIG. 6 illustrates an additional difference between the high-quality touchscreen interface and the low-quality touchscreen interface of the mapping application in some embodiments.
Figure 6:
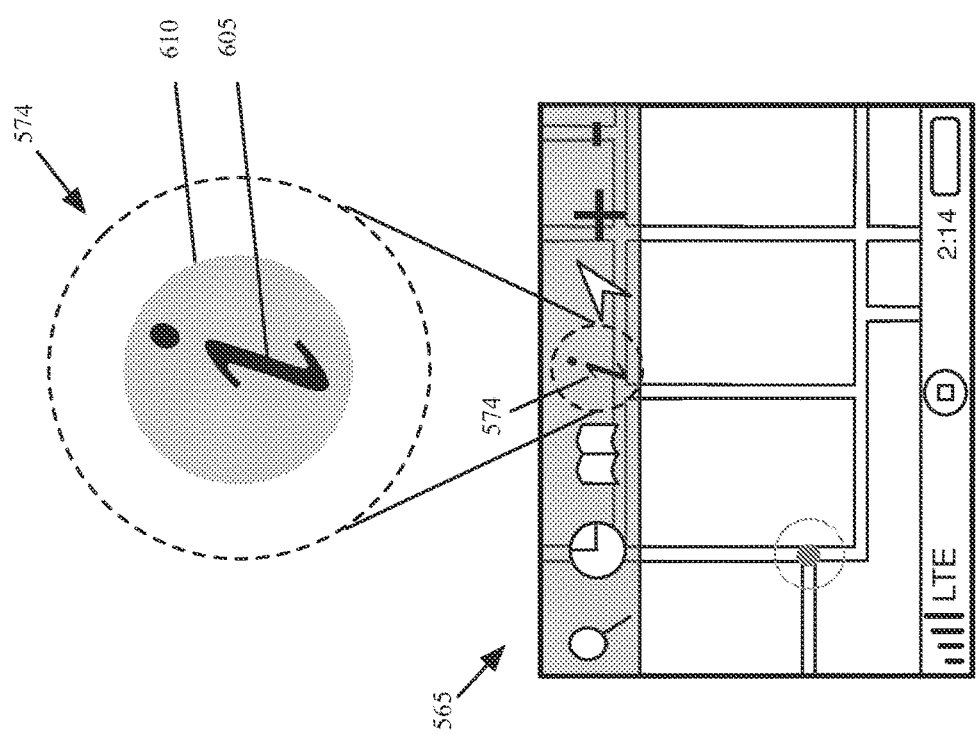

FIG. 6 illustrates an additional difference between the high-quality touchscreen interface 565 and the low-quality touchscreen interface 570 of the mapping application in some embodiments. This figure illustrates expanded views of the predictive routing control 574 of the high-quality touchscreen interface and the predictive routing control 584 of the low-quality touchscreen interface. The expanded views illustrate the difference in the controls between the two interfaces. The high-quality touchscreen interface predictive routing control 574 includes an icon 605 and a buffer region 610 around the icon. Similarly, the low-quality touchscreen interface predictive routing control 584 includes an icon 615 and a buffer region 620 around the icon.

The two icons 605 and 615 from the two interfaces are the same; however, the buffer regions around the icons are not. Specifically, the buffer 620 in the low-quality interface is larger than the buffer 610 in the high-quality interface. This allows additional leeway in the touchscreen's interpretation of a user's touch selection for the low-quality case. While the predictive routing control is used as an example, one of ordinary skill in the art will recognize that the larger touch buffer in the low-quality touchscreen interface may apply to other touch selectable controls (sometimes called affordances) as well, such as the other controls in the top bar (e.g., search, bookmarks, recents, etc.), the home button, arrows for stepping through search results shown below, etc.

II. Map Exploration in Different User Interfaces

The above section introduced the different mapping application user interfaces output to vehicle displays. The operations of the mapping application vehicle UIs, including some of the differences between the UIs for different types of vehicle displays will be described in this section. Subsection A describes the operation of the high-quality touchscreen UI, while subsections B and C describe differences in the operation of the low-quality touchscreen and non-touchscreen UIs, focusing on the zoom and scroll operations.

A. High-Quality Touchscreen Interface

Figure 7:
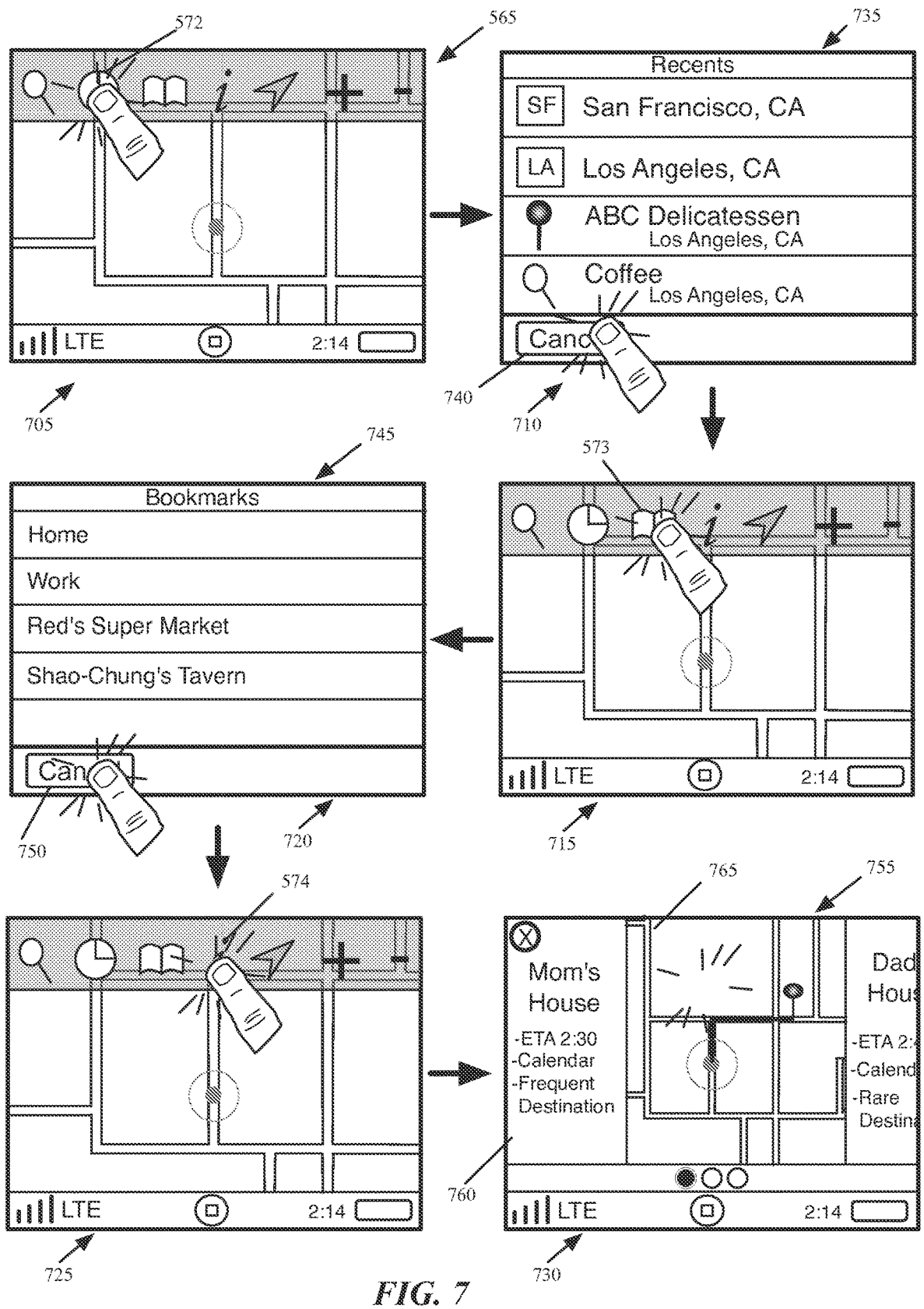
FIG. 7 illustrates the high-quality touchscreen vehicle user interface of some embodiments in which the user navigates through various features of the interface, including the recent destinations feature, the bookmarked destinations feature, and the predictive routing feature.

FIG. 7 illustrates six stages 705-730 of the high-quality touchscreen vehicle user interface 565 in which the user navigates through various features of the interface, including the recent destinations feature, the bookmarked destinations feature, and the predictive routing feature. The first stage 705 illustrates the user interface 565 as shown in the previous FIG. 5. In addition, at this stage, a user selects the recents control 572.

The second stage 710 illustrates a resulting recent destinations page 735. The recent destinations page 735 includes a list of recently searched places of business (Hubcap BBQ Palace), recently searched geographic locations (San Francisco. Los Angeles), recently performed searches (Coffee), recent destinations of routes, etc. The various destinations may have been searched for individually within the mapping application via either the vehicle UI or the mobile device UI, selected on the map view within the mapping application, etc. The items in the list are individually selectable in order to display a map centered on the selected destination in some embodiments. In addition, the recent destinations page 735 includes a cancel button 740, which the user is shown selecting (with a tap selection) in stage 710. The user selects the cancel button 740 in order to exit the recent destinations page 735 and return to the map view UI 565, as shown at the third stage 715.

Also at the third stage 715, the user selects the bookmarks control 573. The fourth stage 720 illustrates a resulting bookmarked destinations page 745. These destinations, unlike those on the recents page 735, do not change based on recent user activity within the mapping application (unless that activity specifically adds a destination as a bookmark or removes a destination from the bookmarks). The bookmarks, in some embodiments, appear as names chosen by the user (e.g., "Home"), rather than addresses or proper business names, unless those are the names chosen. As with the recent destinations page 735, the bookmarked destinations page 745 includes a cancel button 750, which the user is shown selecting (with a tap selection) in stage 720. The user selects the cancel button 750 in order to exit the bookmarked destinations page 745 and return to the map view UI 565, as shown at the fifth stage 725.

Also at the fifth stage 725, the user selects the predictive routing control 574. The sixth stage 730 illustrates a predictive routing user interface 755, which will be described in greater detail in Section V below. The predictive routing UI 755 displays, in order of likelihood as computed by a predictive routing engine of the mapping application, one or more likely routes for the user to follow. The predictive routing engine of some embodiments uses travel history, contact information, calendar or other appointment-keeping information, traffic information, etc. to identify likely destinations and optimal routes to the destination.

The predictive routing UI 755 of some embodiments displays, for each route, a first panel 760 with information about the route and a second panel 765 with a map view of the route. The information panel 760, in some embodiments, displays a name for the route as well as metadata about the route. The route name may be based on a destination name identified from contact information, a calendar appointment name, a business name, an address, a primary road used by the route, etc. In addition, the metadata shown may include an estimated arrival time (ETA), the source of the route for the predictive routing engine (e.g., calendar, passbook, travel history, etc.), whether the destination of the route is a frequent or less traveled destination for the device, and other information. The map view 765, in some embodiments, displays a map to the destination with the selected route. In some embodiments, the routing engine factors in traffic information to select an optimal route to the destination, and may warn a user if a typically-traveled route has worse traffic than usual.

Figure 8:
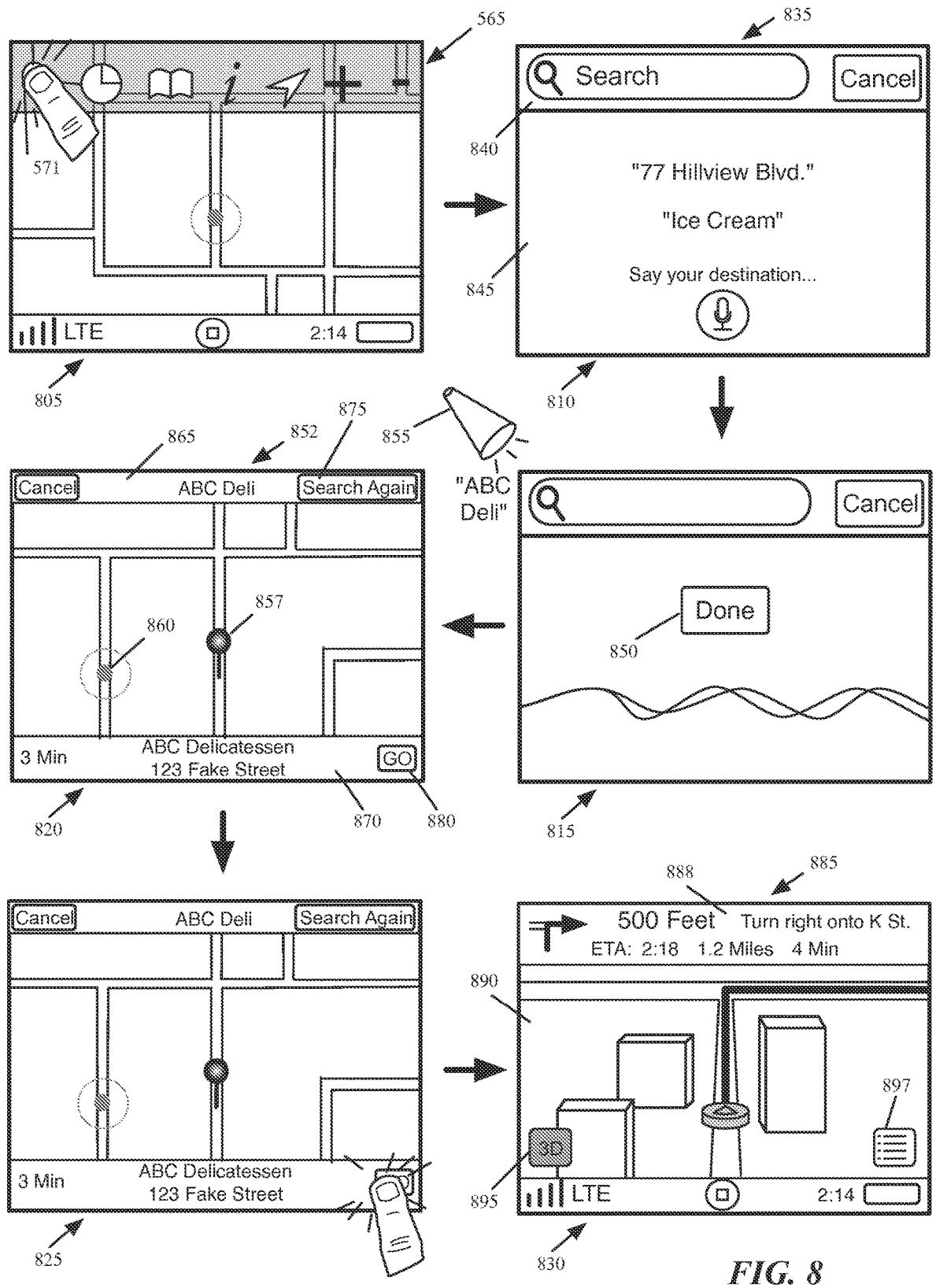
FIG. 8 illustrates the use of the search function of some embodiments to identify a destination and then enter a navigation mode.

Each of the above features (recents, bookmarks, predictive routing) is designed to quickly identify a destination for navigation. In addition, users can use the search control to identify a destination when the desired result is not available through the more directed options (e.g., because the destination is a new destination). FIG. 8 illustrates the use of the search function to identify a destination and then enter a navigation mode over six stages 805-830. The first stage 805 illustrates the user interface 565 as shown in FIG. 5. In addition, at this stage, a user selects the search control 571.

The second stage 810 illustrates a resulting search function page 835. In some embodiments, the search function available through the vehicle display is a dictation-only (i.e., no typing) interface that avoids requiring the driver to type in a desired destination. If a passenger in the vehicle wants to type in a destination, the passenger can do so through the mapping application interface displayed on the mobile device in some embodiments.

As shown, the search function page 835 displays a search bar 840 with a cancel button, and a results region 845 that initially includes a set of example searches that the user could dictate and a prompt to the user to verbally recite the desired destination. In the third stage 815, as the user begins speaking, the results region 845 now illustrates a waveform to indicate that the interface is receiving a voice prompt and a dictation completion control 850 for the user to select upon completion of the dictation. In some embodiments, the application will either identify the end of the user's dictation based on the selection of the completion control 850 or the identification of a gap of a threshold duration in the user's speaking. Some embodiments only use the identification that the user has stopped speaking to end dictation, and do not include the touchscreen completion control.

In this case, the user has spoken "ABC Deli", as represented by the megaphone 855 conceptually illustrated next to the display. In some embodiments, the mapping application uses a microphone in the vehicle to record the audio, but performs the audio analysis for voice recognition at the mobile device (e.g., using a voice recognition function of the mobile device or of a server with which the mobile device communicates). In other embodiments, the mobile device additionally uses its own microphone to record the audio for analysis.

As shown by the automatic (with no touch interaction) transition to the fourth stage 820 in FIG. 8, when the search term is unambiguous, some embodiments automatically display the result in a search result map view page 852. The handling of ambiguous search terms, as well as additional aspects of the search function, will be described below in Section III. The search result map view page 852 shows a new map centered on the searched destination, for which the application displays a pin 857, and selects this pin. When the device's current location is within the displayed map region, the application continues to display the position indicator 860. The mapping application also displays a top information bar 865 and a lower information bar 870.

The search function, in some embodiments, is biased around the current location of the device. That is, the search function will prefer close destinations (e.g., in the same city as the current location, within a particular distance of the current location, etc.) rather than those in other parts of the world. In addition, some embodiments use past destination history to influence search results, expanding the search range for destinations previously selected by a user. The search function may also use information such as the contacts information stored on the device.

In this case, only one search result is identified for the search parameters, ABC Delicatessen. In other cases, the search term may have multiple possible results. For example, a search for a chain restaurant may yield multiple locations for different franchises of the chain. The user may also search for a generic type of location (e.g., bars, restaurants, coffee shops, etc.), which will often result in multiple possible destinations.

In addition, a specific search may result in ambiguity if the user searches for, e.g., "work", but works multiple jobs. In some embodiments, when the mapping application cannot identify the specific search term dictated, or another ambiguity arises (such as the two different "work" locations), the application displays a list of possible search terms from which the user can choose. In other embodiments, however, the mapping application always identifies one set of search terms using the voice recognition function of the device.

The top information bar 865 includes two selectable items. In case the user does not like the search results, the user can either cancel the search to return to the default map view UI 565 or select a search again control 875 to perform another search. Furthermore, the top information bar 865 displays the search term or terms spoken by the user and interpreted by the device (in this case, "ABC Deli").

The lower information bar 870 includes information about the specific destination currently selected. In some embodiments, this information, as shown, includes the name and/or address of the destination and the estimated arrival time of an optimally calculated route to the destination (3 minutes, in this case, due to the proximity of the destination to the user's current location). Furthermore, the lower information bar 870 includes a selectable button 880 for entering a turn-by-turn navigation mode directed towards the destination.

The fifth stage 825 displays the user selecting the button 880 in order to enter navigation to the selected destination (ABC Delicatessen). The sixth stage 830 illustrates a navigation mode user interface 885 of some embodiments. The navigation UI 885 includes the lower information bar from the initial map UI 565 (as provided by the operating system, in some embodiments), a navigation information bar 888, a navigation map 890, a 3D control 895, and a direction list control 897. The navigation information bar 888 displays instructions for a next maneuver to perform along the navigated route, as well as estimated arrival time information (i.e., travel time, travel distance, and arrival time). The 3D control 895 enables a user to toggle the navigation map 890 between 3D and 2D animation. The 3D control 895 is shown as currently selected at stage 825, and the application displays the navigation map 890 in three dimensions. Some embodiments automatically select the 3D option upon entering the turn-by-turn navigation mode. The list control 897 enables the user to access a list of maneuvers for the route. The navigation mode will be described in greater detail below in Section VI.

In addition to using the various features that facilitate the identification of a destination for navigation, users may also wish to explore the map region via the vehicle display screen. FIG. 9 illustrates various user interface actions available in some embodiments to enable such exploration of the map region. Specifically, over six stages 905-930 of the user interface 565, FIG. 9 illustrates the user of zoom and scroll functionality as well as the position control 576 to re-center the displayed map region on the device's current location.

The first stage 905 illustrates the high-quality touchscreen vehicle user interface 565, currently tracking the device's current location. As mentioned, the mapping application of some embodiments tracks the current location of the mobile device and by default centers the map region displayed for the vehicle UI on the position indicator 860. As a result of the display of the position indicator 860 in the center of the map, the mapping application currently is displaying the position control 576 in a grayed-out manner to indicate that it has been disabled. In addition, at this stage, the user selects (e.g., with a single tap input) the zoom out control 578.

The second stage 910 illustrates the map after the mapping application has performed the zoom out operation on the displayed map region in the vehicle user interface 565. The map view now shows a larger area of the map because the mapping application displays it at a different zoom level, from a conceptual point of reference higher above the map. In some embodiments, the zoom function on the vehicle display modifies the zoom level by a particular amount (e.g., a particular conceptual distance from the ground, a particular multiplier to the map scale, etc.). In addition, some embodiments use an inertial stop animation to slow down and stop the animation of the map changing zoom level. For example, to transition from the first stage 905 to the second stage 910, the mapping application zooms out on the map at a particular defined rate, then gradually slows the zoom animation down to a stop, rather than suddenly stopping the animation.

In some embodiments, the map changes zoom levels by an amount proportional to the duration for which the user holds the touchscreen input over the zoom in or out control, while using an inertial stop animation after the user releases the press-and-hold input. Some such embodiments differentiate between a tap input and a press-and-hold input, so that a tap input causes the application to change the zoom level of the map a greater amount than would be the case for a press-and-hold having the short duration of the tap gesture.

In this case, the mapping application zooms the map region about the center of the display, which also coincides with the position indicator 860. Some embodiments always center the zoom about the center of the map, while other embodiments always center the zoom about the current location of the device. In some embodiments, the mapping application centers the zoom about the current location when the position indicator is within the displayed map region and about the center of the displayed map when the position indicator is not within the displayed map region.

The second stage 910 also illustrates that the user is performing a touchscreen swipe input to scroll the map to the left (thereby enabling viewing of the map region currently off of the screen to the right). The third stage 915 illustrates the result of the swipe/drag gesture, with the mapping application having moved the viewed region of the map rightward enough that the current location indicator is now off the display screen (to the left). The high-quality touchscreen user interface of some embodiments resolves all such swipe gestures over the map view to either up, down, left, or right, while other embodiments calculate the angle of the swipe gesture and move the map in the calculated direction. In some embodiments, only high-quality touchscreens allow for this direct manipulation of the map region, allowing drag inputs in which the movement of the touch input from a first touchscreen location to a second touchscreen location causes the map location displayed in the first touchscreen location to move to the second touchscreen location, as though the user was dragging the map itself.

As a result of the manual scrolling of the map, the position indicator 860 is no longer centered on the map. Thus, the mapping application enables the position control 576, displaying the control more vividly to indicate that the user can now select it.

The fourth stage 920 illustrates the user selecting the position control 576. As described above, selection of the position control of some embodiments causes the mapping application to center the map region about the current location of the device, irrespective of the map region previously displayed on the map. The fifth stage 925 illustrates that the position indicator 860 is again displayed in the center of the map region in the UI 565. In addition, the position control 576 of some embodiments does not cause the mapping application to change the zoom level at which the map is displayed.

As the user drives and the device moves, some embodiments automatically scroll the map so that the current location stays centered in the map view. The sixth stage 930 illustrates the UI 565 after the user has not interacted with the display, but has driven a short distance along the current road. The clock has rolled forward to 2:15, and the map display has shifted downwards so that the device's current location remains in the center. In some embodiments, the mapping application only automatically moves the map region along with the current location when the map view is already centered on the position indicator 860 (i.e., when the user has selected the position control 576 without subsequently scrolling the map via a swipe gesture).

The previous example illustrates the high-quality touchscreen user interface of some embodiments, but does not indicate the behavior of the mapping application user interface displayed on the mobile device on which the mapping application operates. In general, some embodiments of the mapping application allow independent map exploration on the two user interfaces, only synchronizing the interfaces once the user performs an action to identify a possible destination (e.g., performing a search, selecting a recent destination, etc.).

Figure 10:
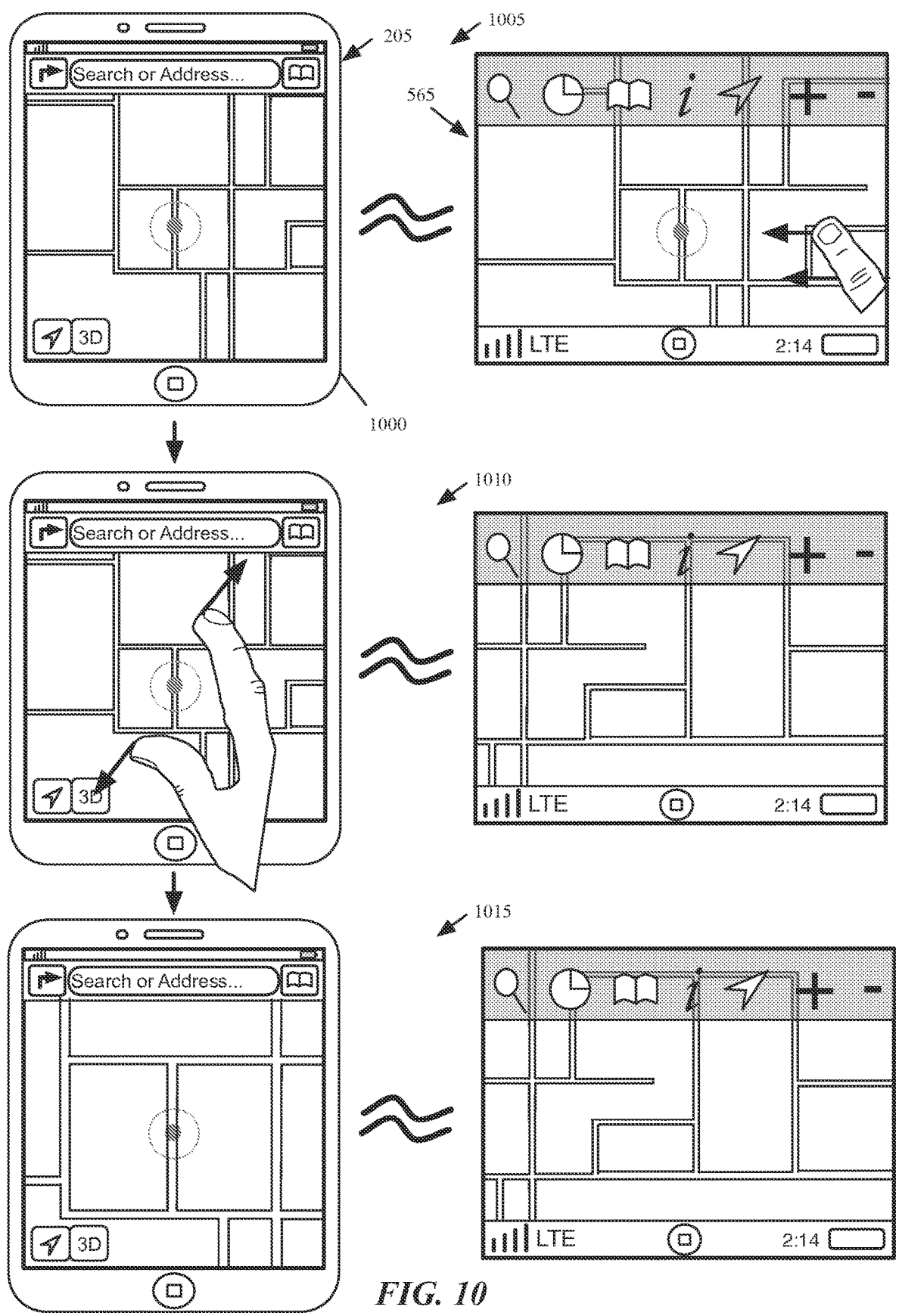
FIG. 10 illustrates a user exploring a map in both the mapping application interface displayed on a mobile device as well as the high-quality vehicle touchscreen interface displayed on the screen of a vehicle to which the mobile device connects.

FIG. 10 illustrates a user exploring a map in both the mapping application interface 205 displayed on a mobile device 1000 as well as the high-quality vehicle touchscreen interface 565 displayed on the screen of a vehicle to which the mobile device 1000 connects over three stages 1005-1015. As shown in the first stage 1005, the mapping application is open in both the mobile device and the touchscreen. In the mobile device user interface 205 and both the vehicle touchscreen user interface 565, the map region currently displays a region surrounding the current location of the device, with the current location centered and tracked.

In the first stage 1005, the user performs a leftward swipe gesture over the map region in the high-quality vehicle touchscreen user interface 565 in order to pan the map to the right. The second stage 1010 illustrates that the map displayed in the vehicle screen is no longer centered on the current location of the device, with a different portion of the map region displayed instead. However, the map region displayed on the mobile device 1000 has not changed. At this stage, the user performs a pinch multi-touch gesture over the map region displayed on the mobile device in order to zoom in on the map region. Thus, the third stage 1015 illustrates that the mobile device user interface 205 displays the map region at a closer zoom level, while the vehicle user interface 565 does not change from the second to the third stage.

B. Low-Quality Touchscreen Interface

The above section described interaction with the high-quality touchscreen user interface of some embodiments. Many of these interactions are the same or similar for the low-quality touchscreen interface in some embodiments. For example, the bookmarks and recents lists only require gestural input for scrolling through a list of possible choices, when the list is too numerous to fit entirely on the screen. Some embodiments therefore place scroll arrows next to the list for non-gestural (e.g., tap) selection. The search feature does not involve any gestural input (except in rare instances when the search term is ambiguous, with numerous possibilities that require scrolling) or high touch sensitivity resolution and therefore this feature is the same for the low-quality touchscreen interface as the high-quality touchscreen interface.

Figure 11:
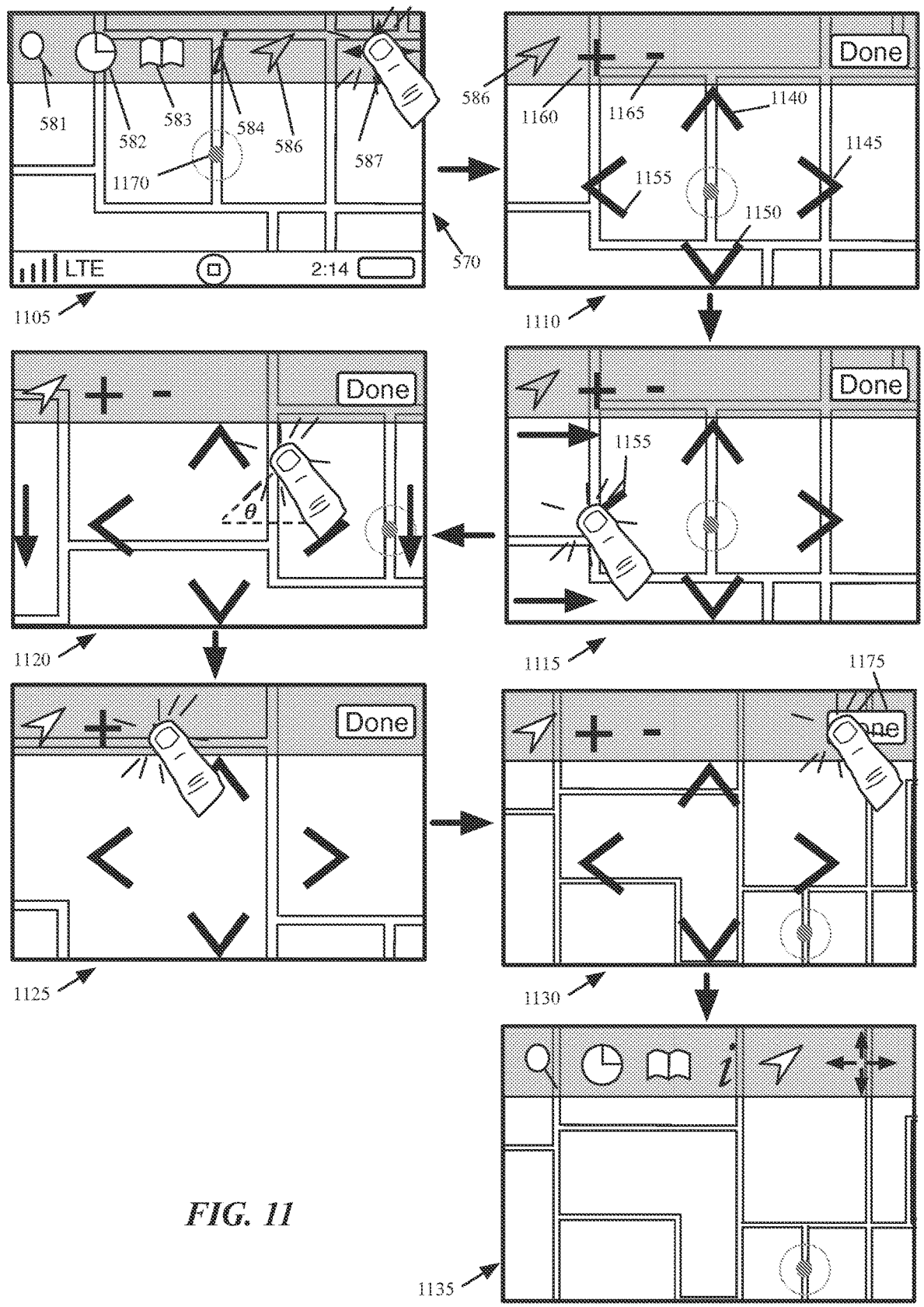
FIG. 11 illustrates various map exploration functions, including zooming, scrolling, etc. in the low-quality touchscreen interface of some embodiments.

Scrolling through the map in the high-quality touchscreen interface, however, uses swipe gestures that some touchscreens may not be able to process accurately. As such, as shown in FIG. 5, the low-quality touchscreen interface of some embodiments uses different interactions for the map exploration features. FIG. 11 illustrates various map exploration functions, including zooming, scrolling, etc. over seven stages 1105-1135 of the low-quality touchscreen interface of some embodiments.

The first stage 1105 illustrates the low-quality touchscreen map view user interface 570 of some embodiments, with six controls 581-587 in the upper section. As described above, this interface 570 is similar to the high-quality touchscreen interface 565 with the difference being that the upper bar of controls includes a single zoom and scroll control 587 instead of the zoom controls 577 and 578, and the touchscreen does not recognize swipe gesture inputs to scroll the map. This may be due to the screen not recognizing movement of touch inputs or because the latency of the touchscreen is so high as to make direct manipulation of the map view (e.g., touchscreen inputs that give the impression of directly dragging the map) too difficult. In addition, at the first stage, the position indicator 1170 that indicates the current location of the device is shown at the center of the displayed map region.

The first stage 1105 also illustrates that the user selects the zoom and scroll control 587, with a tap selection input. As shown at the second stage 1110, this input results in the display of additional controls within the map view user interface 570. These additional controls include four scroll arrow controls 1140-1155, position control 586, and zoom controls 1160 and 1165. The position control 586 is the same position control as in the first stage 1105, but has been relocated to a different position within the top control bar. As before, the position control 586 enables the user to cause the mapping application to re-center the map view on the device's current location. The zoom controls 1160 and 1165 have the same function as zoom controls 577 and 578 of the high-quality touchscreen interface 565. That is, the control 577 causes the mapping application to zoom in on the map region while the control 578 causes the mapping application to zoom out of the map region.

The scroll arrows 1140-1155 enable the user to scroll through the map region incrementally in some embodiments. When a user selects one of the arrows 1140-1155, the displayed map region moves in the direction opposite the arrow in order to reveal a region of the map in the direction of the arrow. The third stage 1115 illustrates a user selecting the left scroll arrow control 1155. The user may select the scroll arrows 1140-1155 with a tap input in some embodiments, or a press and hold input in other embodiments.

The third stage 1115 also illustrates (by showing the two right-facing arrows, which are not displayed within the user interface and are shown only for explanatory purposes) that the map region shifts (scrolls) to the right as a result of the selection of the scroll arrow 1155. In other embodiments, selecting an arrow facing a particular direction results in the map scrolling in that direction, rather than the opposite direction; however, selecting a left arrow to cause the map to shift (i.e., pan) rightwards and thereby reveal the portion of the map to the left provides a more intuitive interaction.

The fourth stage 1120 illustrates the result of the user interaction to select the left scroll arrow 1155. The position indicator 1170 has been moved rightwards to near the edge of the screen. When a user selects one of the scroll arrow controls, some embodiments scroll the map a fixed percentage of the display screen (e.g., one half the display screen height), which will cause the actual map distance to vary based on the zoom level. In addition, some embodiments use an inertial stop animation to slow down and stop the animation of the map panning. For example, to transition from the third stage 1115 to the fourth stage 1120, the mapping application pans the map to the right at a particular defined speed, then gradually slows the panning animation down to a stop, rather than suddenly stopping the animation.

In some embodiments, the map scrolls by a distance proportional to the duration for which the user holds the touchscreen input over the scroll arrow control, while using an inertial stop animation after the user releases the press-and-hold input. Some such embodiments differentiate between a tap input and a press-and-hold input, so that a tap input causes the application to pan the map further than would be the case for a press-and-hold having the short duration of the tap gesture. As shown below, when a user presses and holds the scroll arrows in other embodiments, the mapping application accelerates the rate at which it scrolls through the map region.

The fourth stage 1120 additionally illustrates the user selecting a position between the two scroll arrow controls 1140 and 1145, at an angle θ above the horizontal. This stage also illustrates, by showing the two down-facing arrows (which are not displayed in the user interface, and only shown for explanatory purposes), that the map region shifts (scrolls) downwards as a result of the user input. Some embodiments, as shown in this figure, only scroll in the orthogonal directions (up, down, left, and right), and therefore resolve all inputs within the map view while showing the scroll arrows 1140-1155 to one of the four scroll directions. In this case, the angle θ is greater than 45° above the horizontal, and therefore resolves to a selection of the scroll arrow 1140.

Figure 12:
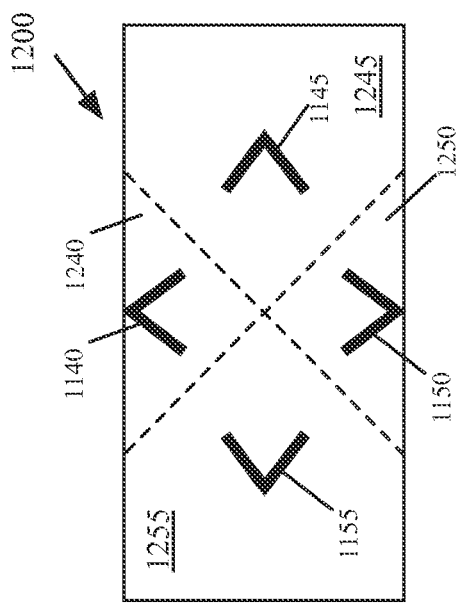
FIG. 12 conceptually illustrates a region representing the map view area of the low-quality touchscreen user interface.

FIG. 12 conceptually illustrates a region representing the map view area 1200 of the low-quality touchscreen user interface, with the scroll arrows 1140-1155 displayed in the map view area. In addition, this figure shows two dashed lines at right angles that divide the map view area 1200 into four quadrants 1240-1255. In some embodiments, each of these four quadrants is associated with one of the scroll arrows 1140-1155. That is, a touch input anywhere within the quadrant 1255 will result in a selection of the scroll arrow 1155 and cause the map to scroll to the right, showing the map region previously off of the screen to the left. Different embodiments may divide the display differently (e.g., the far right and far left portions may not be associated with scroll arrows 1145 and 1155). Furthermore, as described below, some embodiments do not limit the scrolling to only up/down and left/right, but instead also allow for diagonal scrolling.

Returning to FIG. 11, the fifth stage 1125 illustrates the result of the user selection of the upwards scroll arrow 1140, which causes the map display to shift downwards, revealing a map portion previously off the top of the display screen, and pushing the position indicator 1170 off of the bottom of the screen. Furthermore, at this stage, the user selects the zoom out control 1165. The selection of this control operates in a similar manner as the selection of the zoom out control 578 shown in FIG. 9 for the high-quality touchscreen interface. That is, the mapping application displays the map at a new zoom level from a conceptual distance higher above the map, thereby revealing more of the map and with a fixed portion of the display representing a larger distance.

The sixth stage 1130 illustrates the map in such a zoomed out state, with enough of the map now shown to reveal the position indicator 1170 in the lower right portion of the display. Finally, at this stage 1130, the user selects a "Done" control 1175, to indicate that she has completed her use of the zoom and scroll controls to explore the map region. The seventh stage 1135 illustrates the user interface 570 with the same controls as in the first stage, and the displayed map region that from the previous stage.

Figure 13:
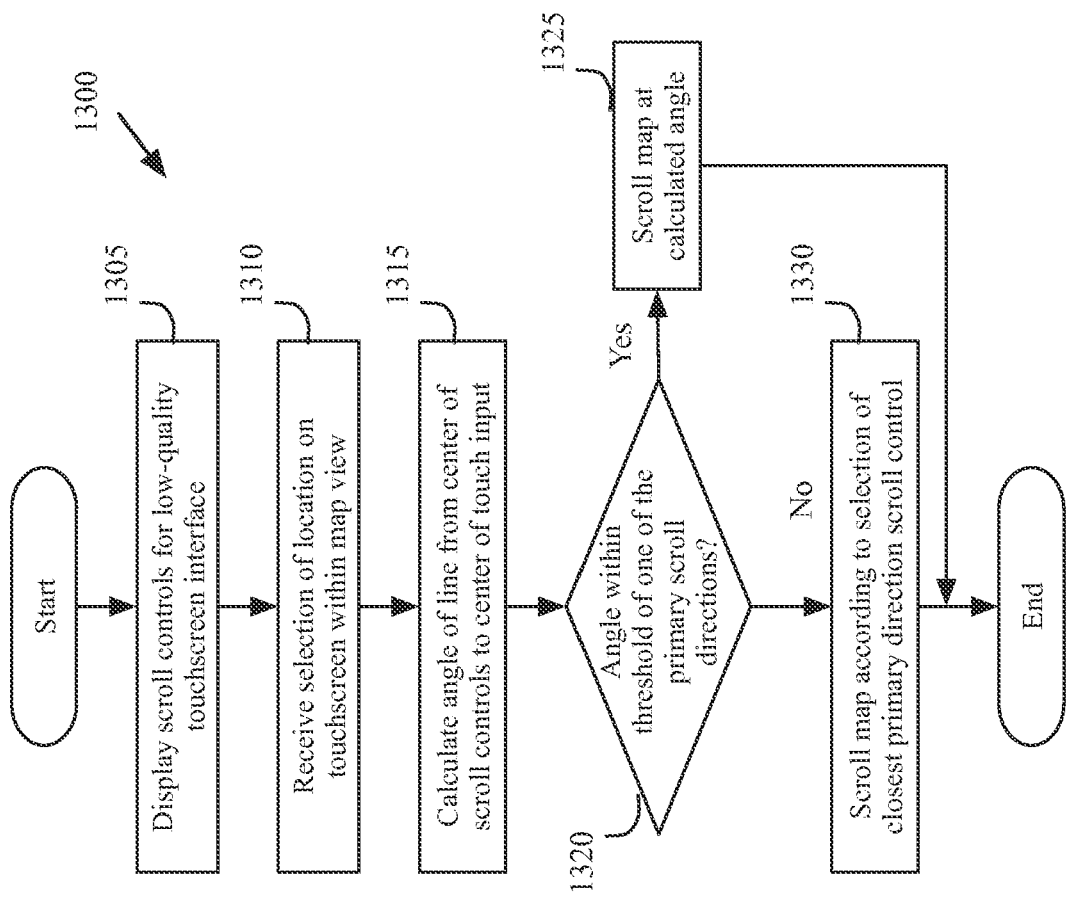
FIG. 13 conceptually illustrates a process performed by the mapping application of some embodiments in order to translate a selection input into a scroll of the map display for a low-quality touchscreen vehicle interface.

As mentioned, in some embodiments, the low-quality touchscreen interface has the capability to scroll the displayed map diagonally as well as up, down, left, and right. FIG. 13 conceptually illustrates a process 1300 performed by the mapping application of some embodiments in order to translate a selection input into a scroll of the map display for a low-quality touchscreen vehicle interface. The process 1300 will be described by reference to FIG. 14, which illustrates three stages 1405-1415 of a low-quality touchscreen interface 1400. The user interface 1400 is the same as the previously described interface 570, except for the treatment of diagonal scrolling input when the zoom and scroll control is activated.

Figure 14:
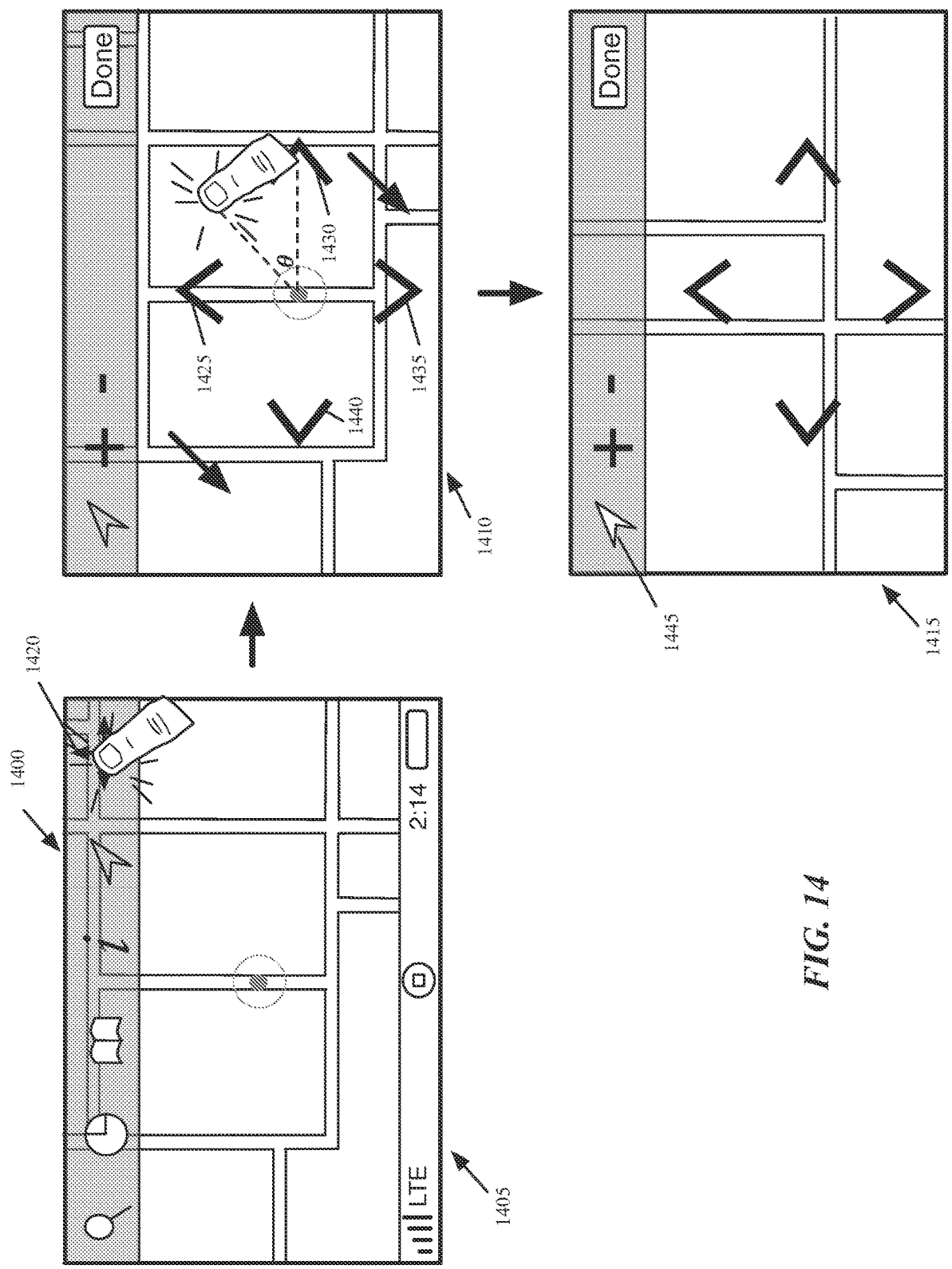
FIG. 14 illustrates an alternative low-quality touchscreen interface of some embodiments.

The process 1300 begins by displaying (at 1305) scroll controls for the low-quality touchscreen interface. This occurs when the mapping application receives input to select the zoom and scroll control of the low-quality touchscreen interface. The first stage 1405 of FIG. 14 illustrates a low-quality touchscreen interface 1400. At this stage, a user selects the zoom and scroll control 1420. As a result, the second stage 1410 illustrates the zoom and scroll controls, including scroll arrows 1425-1440.

Next, the process 1300 receives (at 1310) a selection of a location on the vehicle touchscreen within the map view. That is, the selection is not a selection of the zoom controls, position indicator, done button, etc., but rather is within the map where the mapping application displays the scroll controls. The second stage 1410 of FIG. 14 illustrates that the user makes a selection at a specific touchscreen location between the up arrow 1425 and the right arrow 1430.

The process 1400 then calculates (at 1315) the angle of a line from the center of the scroll controls to the center of the touch input. In some embodiments, as shown in the figures, the center of the scroll controls does not exactly coincide with the center of the vehicle display screen because the top bar with the zoom and position controls takes up a portion of the display. To determine the center of the touch input, in some embodiments the vehicle touchscreen system translates its touch input into a selection at a particular location, which the vehicle system sends to the mobile device (via the mobile device's connection to the vehicle system). Using this information, the mapping application can calculate the angle. The second stage of FIG. 14 illustrates that in this example, the angle between the user's selection location and the horizontal is again 0.

After calculating the angle, the process determines (at 1320) whether the angle is within a threshold of one of the primary scroll directions. This threshold, in some embodiments, is a particular angular range (e.g., 5°, 10°, etc.) from the horizontal or vertical. In some embodiments, the range is defined based on the display of the scroll arrows: if the selection input is within the minimum range that includes the entirety of the displayed scroll control, then the selection is within a threshold of that primary scroll direction. When the angle is within the threshold of one of the primary scroll directions, the process scrolls (at 1330) the map according to the selection of the closest primary direction scroll control. Thus, if the selection is near the right arrow 1430, the map will shift leftwards to display the portion previously off the screen to the right.

On the other hand, when the angle is not within the threshold of any of the primary scroll directions, the process scrolls (at 1325) the map at the calculated angle. That is, the map pans in the direction opposite the calculated angle, as if the user had selected a scroll arrow at the calculated angle. Thus, the second stage 1410 shows two arrows (not actually displayed as part of the user interface) pointing down and leftwards to indicate that the map shifts in that direction. The third stage 1415 of FIG. 14 illustrates the result of the map having been scrolled down and left according to the user input. In addition to showing a different portion of the map region, the position control 1445 has been activated by the mapping application, in case the user wants to return to having the map follow the device location.

Figure 15:
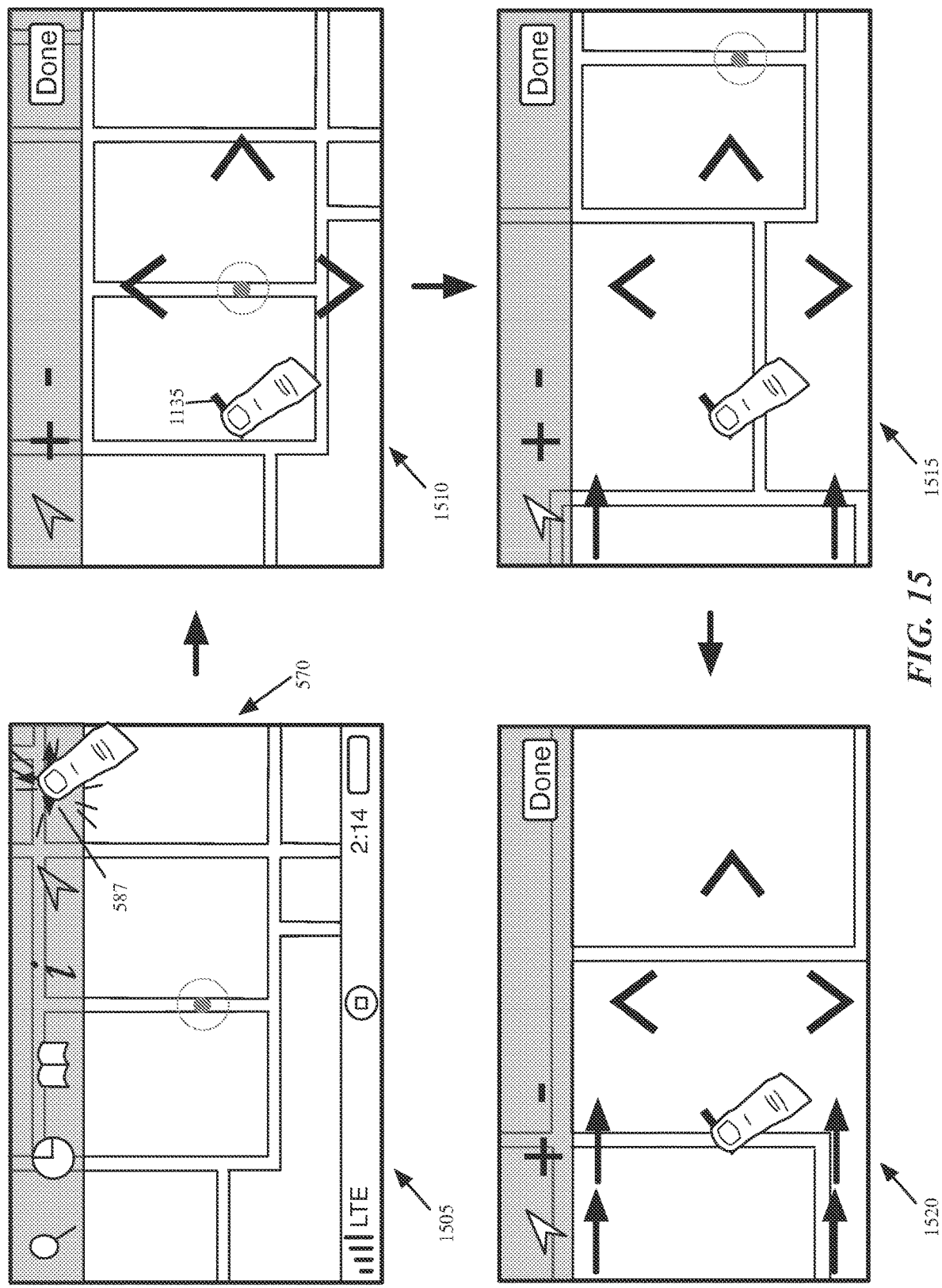
FIG. 15 illustrates a feature of the scroll arrows of the low-quality touchscreen interface of some embodiments, in which when as a user holds down a touch input for an extended period of time over one of the scroll arrows, the map scrolling accelerates.

FIG. 15 illustrates another feature of the scroll arrows of the low-quality touchscreen interface of some embodiments. Specifically, in some embodiments as a user holds down a touch input for an extended period of time over one of the scroll arrows, the map scrolling accelerates. FIG. 15 illustrates this acceleration of the map scrolling over four stages 1505-1520 of the user interface 570. The first stage 1505 illustrates the user interface, as a user selects (via a tap input on the touchscreen) the zoom and scroll control 587. In the second stage 1510, the zoom and scroll controls have appeared in the user interface 570.

The second stage 1510 also illustrates that the user has begun to press down on the left scroll arrow 1135. The third stage 1515 illustrates (by showing the two right-facing arrows that are not actually displayed in the UI) that the map scrolls to the right by a particular distance as the user holds down the scroll arrow 1135. The third stage also illustrates that the user continues to hold down the scroll arrow 1135.

At the fourth stage, the user continues holding down the scroll control arrow 1135. As shown by the two sets of arrows (also not actually displayed within the UI), the map scrolls to the right at twice the speed as in the previous stage. Different embodiments treat the acceleration of the scrolling differently. For instance, some embodiments continue speeding up as a user continues to hold down the same scroll arrow. Other embodiments have a fixed number of different scrolling speeds (as percentages of the map region displayed, rather than physical distances represented by the map). For instance, if the user continued to hold down the scroll arrow 1135, some embodiments would accelerate the scroll speed to three times the original speed. In addition, the threshold time after which the application begins to accelerate the scrolling may vary. For instance, some embodiments change the speed of the scrolling after every second that a user has continuously held down the scroll control.

Figure 16:
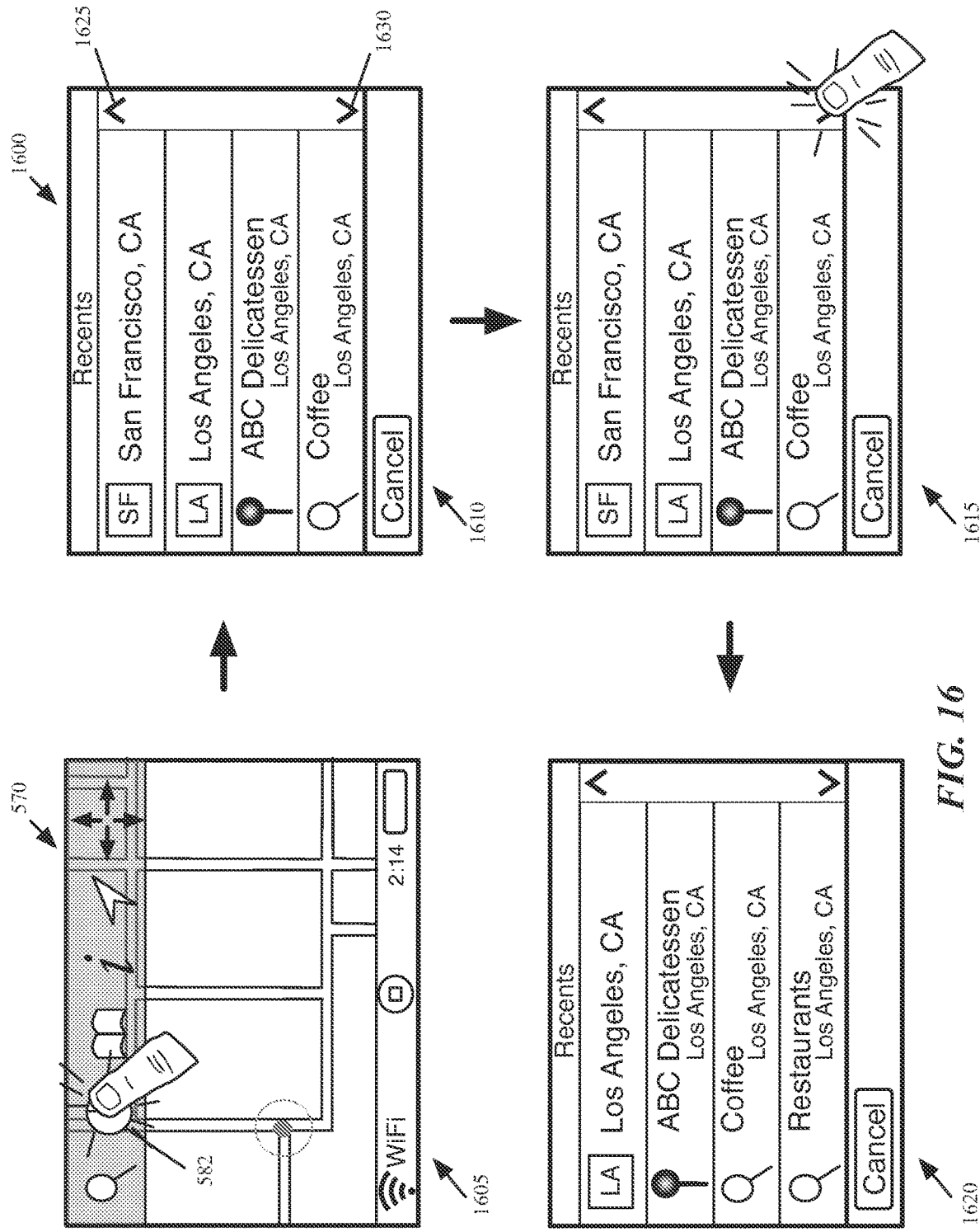
FIG. 16 illustrates the use of scroll arrows to navigate through a list of recents in the low-quality touchscreen interface of some embodiments.

As mentioned, the bookmarks and recents lists may include scroll arrows for scrolling through a list of bookmarks or recents (e.g., recent searches, destinations, etc.). FIG. 16 illustrates the use of scroll arrows to navigate through a list of recents over four stages 1605-1620 of the low-quality touchscreen interface of some embodiments. The first stage 1605 illustrates the low-quality vehicle touchscreen mapping application interface 570. At this stage, the user selects the recents control 582 in order to open a recents list.

The second stage 1610 illustrates a recents page 1600, which is similar to the recents page 735 shown above for the high-quality touchscreen interface. However, the low-quality recents page 1600 includes scroll arrows 1625 and 1630 for navigating through the list of recents. The third stage 1615 illustrates the user selecting the scroll down arrow 1630 (with a tap selection). As a result, the fourth stage 1620 illustrates that the recents list has shifted upwards by one item, so that the application no longer displays the recent location of San Francisco at the top of the list, and instead displays a recent search for restaurants in Los Angeles at the bottom of the list.

C. Non-Touch User Interface

The above subsections described map exploration (and introduced other features) for different types of touchscreen interfaces for vehicle display screens. Some vehicles, however, have center console display screens that do not accept touch input. In this case, different vehicles may have different types of controls, such as a knob, a trackball, a joystick, non-touchscreen buttons, etc. Before describing the details of the search and zoom features, the operation of the user interface generally will be described.

Figure 17:
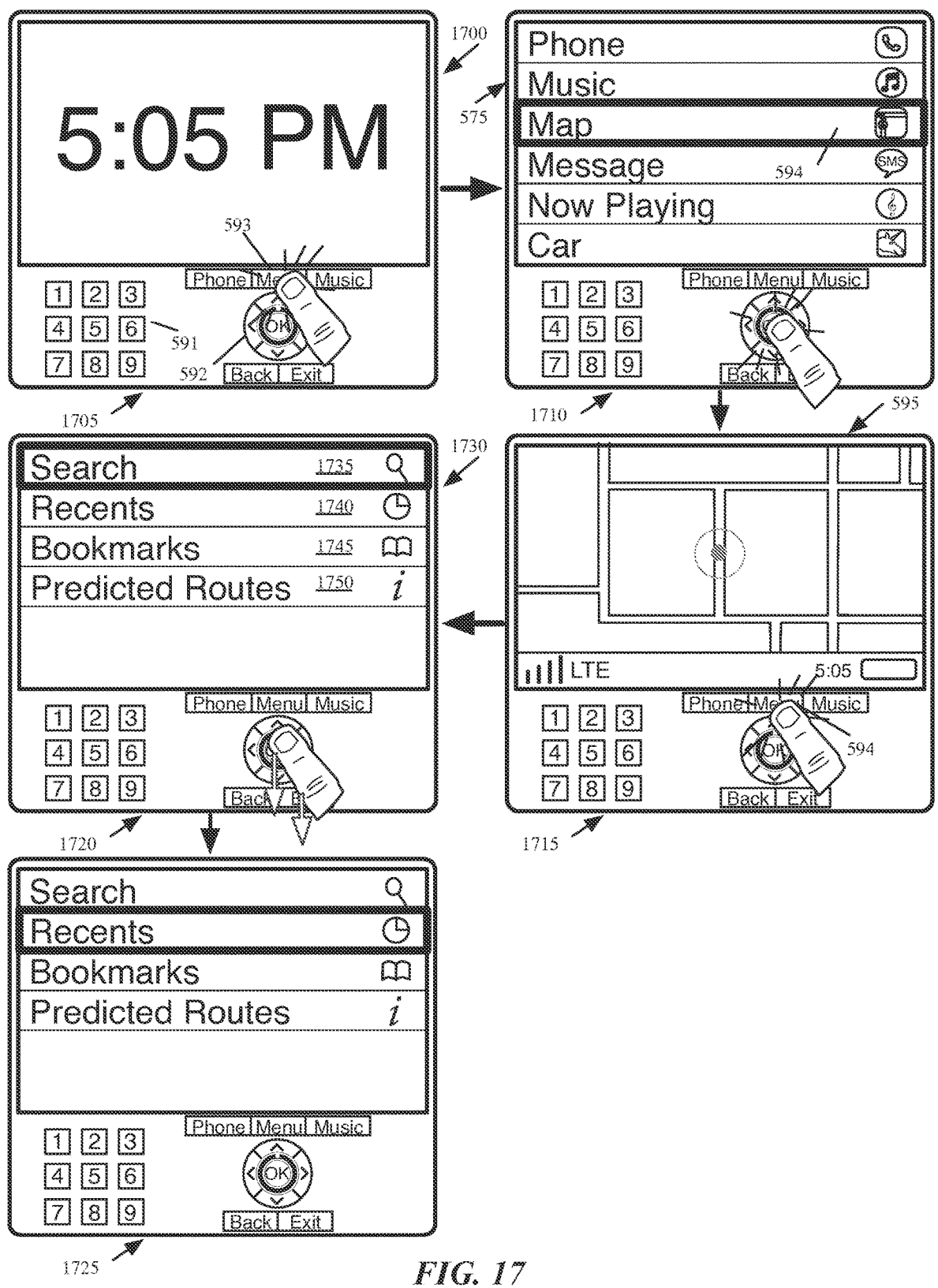
FIG. 17 illustrates the operation of such a non-touchscreen vehicle user interface according to some embodiments.
Figure 18:
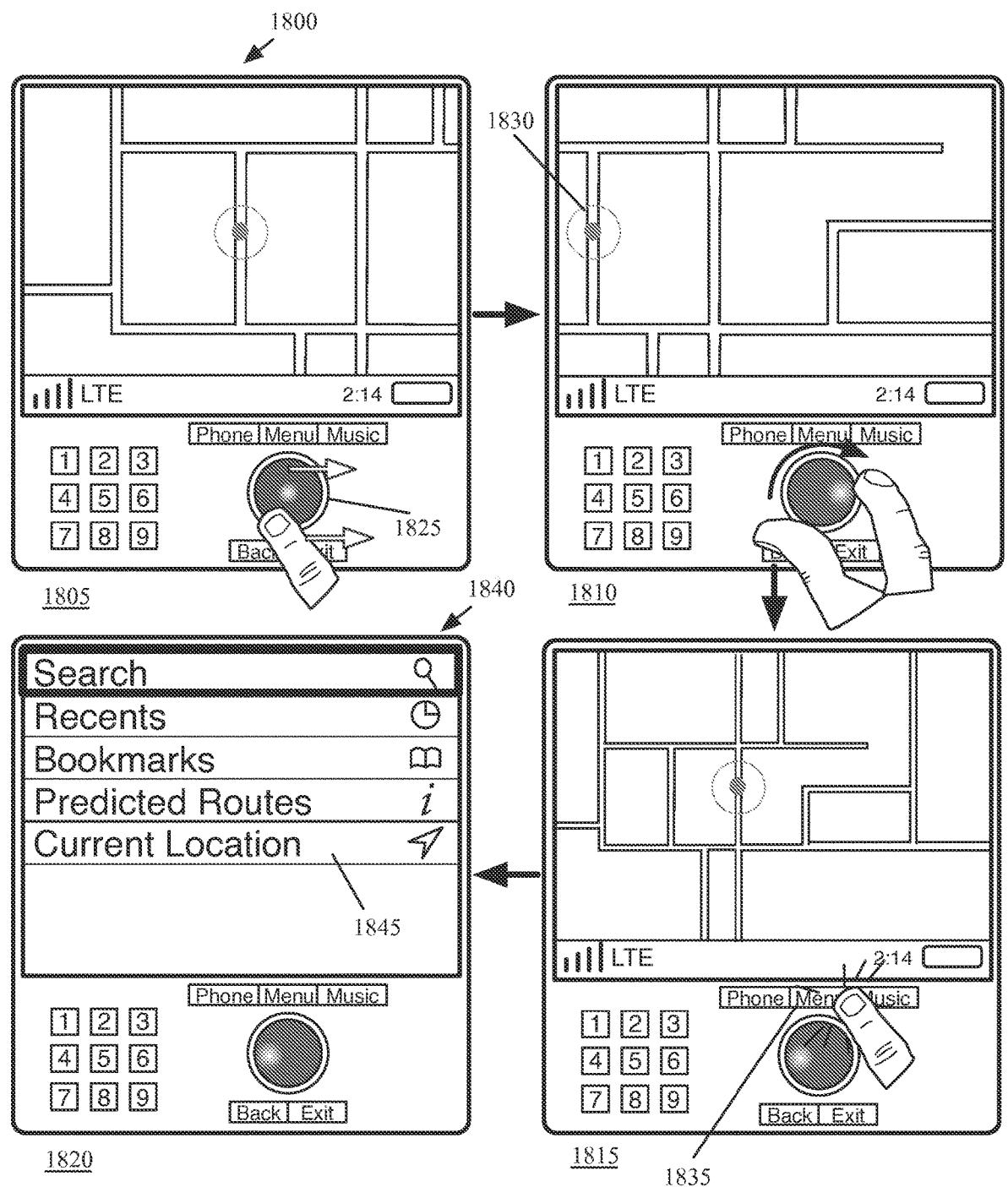
FIG. 18 illustrates an example of map exploration in a non-touchscreen vehicle user interface of some embodiments.

FIG. 17 illustrates the operation of such a non-touchscreen vehicle user interface 1700 according to some embodiments over five stages 1705-1725. The first stage 1705 illustrates a default non-touchscreen home page 1700. Whereas the home page for the touchscreen vehicle user interfaces includes various selectable controls, the non-touchscreen home page of some embodiments only shows the time. The first stage 1705 additionally illustrates the vehicle hardware controls 580, including the keypad 591, joystick 592, and additional buttons. As mentioned, various different embodiments include different types of controls. While this figure shows a joystick 592. FIG. 18, described below, illustrates a trackball. Additional vehicles may use a knob, various types of buttons, etc.

As shown at the first stage 1705, the user presses the menu button 593. The second stage illustrates the result of this selection, with the home menu user interface 575 displayed on the non-touchscreen display screen. The home menu interface 575 is described by reference to FIG. 5. In some embodiments that do not include such a menu button, the user accesses this menu in a variety of different ways. For instance, in some embodiments simply scrolling a trackball, turning a knob, or moving a joystick while in the home page 1700 will activate the menu 575. As in FIG. 5, the user selects the map menu option 594 by navigating to that option with the joystick 592 and pressing down on the joystick to perform a selection. With different sets of controls, a user might rotate a knob and then press the knob inwards to select one of the options, or move a trackball to choose an option and then press inwards on the trackball to select one of the options.

The third stage 1715 illustrates the result of the selection of the map menu option 594. As in the previous FIG. 5, the device outputs the mapping application non-touchscreen vehicle interface 595 for display on the vehicle screen. Furthermore, at this stage 1715, the user again selects the menu button 594.

The fourth stage 1720 illustrates the result of this selection. The mapping application user interface now displays a menu 1730 with four options 1735-1750. These four options include a search option 1735, a recents option 1740, a bookmarks option 1745, and a predictive routing option 1750. These options correspond to the selectable controls 571-574 of the touchscreen user interface 565, and enable the user to access the various different features of the mapping application on the non-touch display screen. In some embodiments, a fifth menu option for tracking the device's current location in the map is available only when the current location is not presently centered on the map. By default, the first menu option 1735 is presently selected. Some embodiments always select the search option (or a different option when the menu options have a different order) upon opening the menu. Other embodiments, however, select the most recently selected option upon activation of the menu.

The fourth stage 1720 additionally illustrates the user moving the joystick downwards. As a result, the fifth stage 1725 illustrates that the selection marker in the menu has moved down to the recents option 1740, such that a selection input (e.g., pressing down on the joystick) will select the recents option. Some embodiments use up and down to scroll through the menu and use right and left to either select and option (a rightward movement) or go back to a previous page (a leftward movement).

The above figure illustrates menu navigation with the non-touchscreen user interface. Map exploration presents a unique challenge, however, because the map must be scrollable and zoomable, actions that have more natural inputs via a touchscreen with direct manipulation type actions available (e.g., drag gestures, pinch gestures, or touchscreen controls that do not need to conform to those provided by a vehicle system).

FIG. 18 illustrates one example of such map exploration in a non-touchscreen vehicle user interface 1800 over four stages 1805-1820. The user interface output by the mapping application is the same as in the previous example, but the vehicle controls are different. Instead of a joystick, the vehicle controls include a trackball 1825. The trackball 1825 is a ball that sits in a well, and moves within the well in various directions in response to user input. A user (e.g., a driver or passenger) can roll the trackball up, down, left, or right (i.e., rotating about one of the two horizontal axes of the trackball). In addition, the user can rotate the trackball about the vertical axis through the center of the trackball. Furthermore, with some trackball inputs, the user can press down as a separate input and/or "shift" the trackball forwards, backwards, leftwards, or rightwards.

In the first stage 1805, the user rolls the trackball 1825 to the right. As shown by the arrows illustrated facing the left (which are not actually displayed in the user interface), the rightward scroll of the trackball results in the map shifting leftwards, revealing a portion of the map previously off of the screen to the right. The second stage 1810 illustrates this shift of the map, as the map region (and the position indicator 1830 that shows the device's current location) have moved to the left in the display screen.

The second stage 1810 also illustrates that the user is rotating the trackball 1825 clockwise about its center axis. In some embodiments, this rotation action of the trackball causes the application to zoom either in or out (e.g., zooming in for clockwise rotation and zooming out for counterclockwise rotation). In this case, because the rotation is clockwise, the mapping application changes the zoom level to zoom in on the map, as illustrated by the third stage 1815.

Additionally, at the third stage 1815, the user selects the menu button 1835. As in the previous FIG. 17, this selection causes the mapping application to display a menu 1840, similar to the menu 1730. In this case, the menu includes the same four initial options (search, recents, bookmarks, and predictive routing), but also includes a fifth option 1845 for the current location (because the map is no longer centered on the current location of the device). The selection of the current location option 1845 is similar to the selection of the position control in the touchscreen interfaces, and results in the mapping application centering the map on the current location of the device and subsequently tracking that location.

Vehicles with different types of inputs (other than trackballs) may perform these scroll and zoom actions differently. For instance, a device with only a knob for input may initially scroll the map left and right in response to rotations of the knob (e.g., clockwise to scroll the map rightwards and counterclockwise to scroll the map leftwards). Upon receiving a push of the knob, subsequent rotation will scroll the map up and down. After a second push of the knob, additional rotation of the knob will zoom in or out of the map. With a joystick, shifting the joystick left, right, up or down causes the map to move in the shifted direction (or opposite the shifted direction) in some embodiments. Some embodiments interpret rotation of the joystick as zoom input, while in other embodiments the joystick can be pushed inwards or pulled outwards to change the zoom level.

III. Search Feature in Vehicle User Interface

The previous section introduced the search feature available through the vehicle interface of some embodiments. As shown, in some embodiments the vehicle interface only permits search input via dictation, rather than via a keyboard or other typing mechanism. This is to dissuade the user from attempting to type in locations while driving, though a passenger still has the ability to enter search terms through the mobile device interface via typing.

In some embodiments, the mobile device that runs the mapping application also has voice recognition functions to perform searches or answer other questions. In some embodiments, whereas the vehicle interface search is a pure dictation search, the voice recognition functions on the device are more interactive. That is, on the mobile device, the user can dictate successive requests, in which the voice recognition functions use context of previous requests to analyze the meaning of subsequent requests. On the other hand, because the vehicle maps interface is optimized towards quickly and efficiently identifying a destination for navigation, each dictated request is treated as a separate search. The following section describes various aspects of the vehicle search interface in greater detail.

Above, FIG. 8 illustrated the search feature of some embodiments in the touchscreen vehicle user interface. As shown in that figure, when the search term is recognized without ambiguity, the mapping application automatically transitions from the search function page to a map view showing search results for the unambiguous search term. On the other hand, when the mapping application cannot unambiguously identify the search term, the application presents the user with a set of choices for the search.

Figure 19:
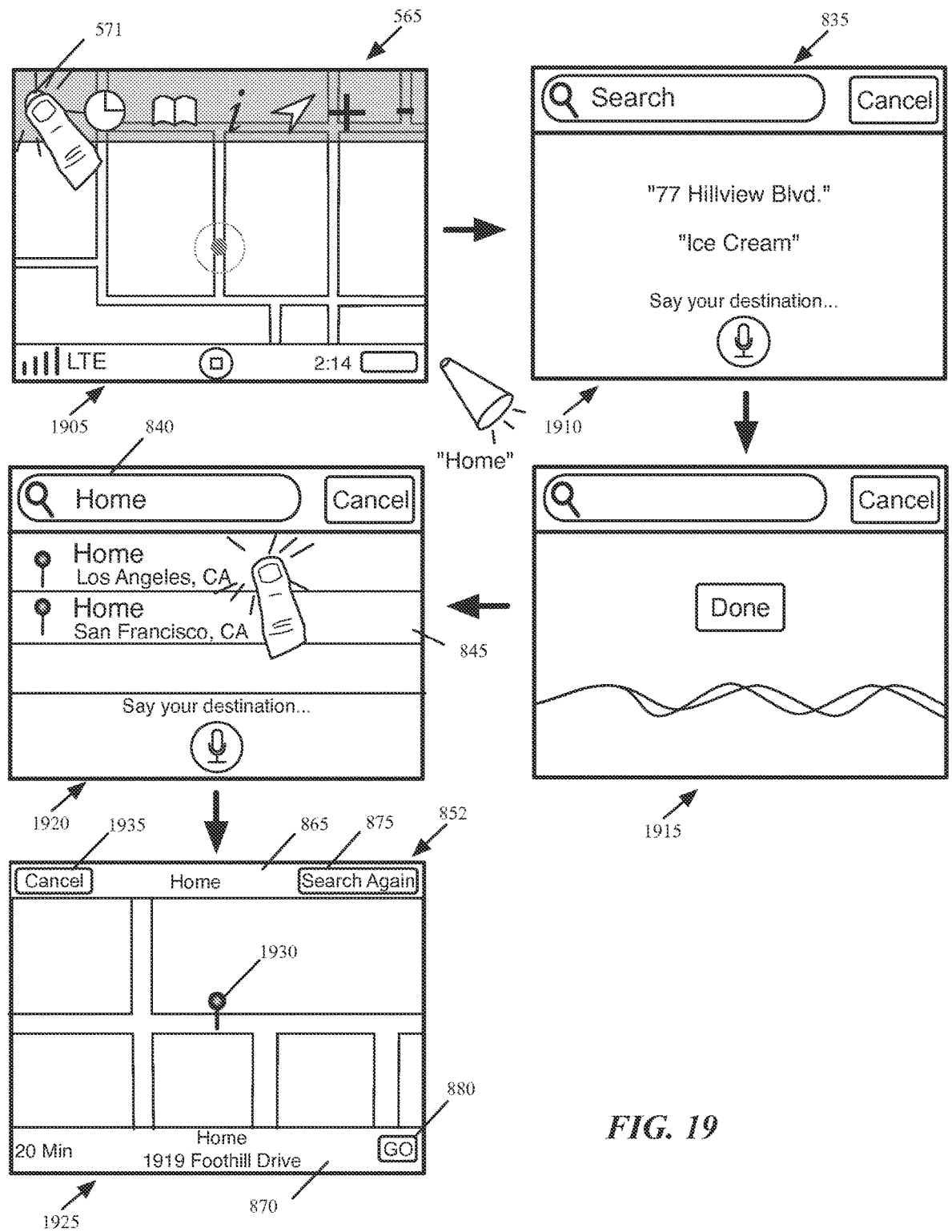
FIGS. 19 and 20 illustrate the search feature of some embodiments in different cases of ambiguous search terms.

FIG. 19 illustrates the search feature in the case of an ambiguous search term over five stages 1905-1925 of the high-quality touchscreen user interface. The search feature, in some embodiments, operates the same in both the high-quality and low-quality touchscreen interfaces, and similarly in the non-touchscreen interface, with differences that will be explained in detail below.

The first three stages 1905-1915 are the same as the first three stages 805-815 of FIG. 8, with the exception of the phrase spoken by the user in the third stage 815. The first stage 1905 illustrates the user selecting the search control 571 in the high-quality vehicle touchscreen interface 565. The second stage 1910 illustrates the search function page 835 that prompts the user to speak her destination and the third stage 1915 illustrates the page as the user speaks. In this case, the user dictates "Home" into the vehicle microphone, which is then processed by the mobile device voice recognition system. In some embodiments, for the mapping application search function, the voice recognition processing performs pure dictation, rather than natural language processing. That is, the voice recognition does not attempt to parse out the meaning of phrases or expressions within the user's search request. Thus, if the user states "go home", the mapping application would look for search terms that match this phrase, rather than identifying "go" as a desire for the application to navigate towards a particular location. On the other hand, some embodiments perform natural language processing for the mapping application search requests received through the vehicle interface. In such embodiments, if the user stated "go home", the application would recognize the user's intention and perform the search shown in FIG. 19.

As shown at the fourth stage 1920, the mapping application cannot determine which of two search terms a user has requested through dictation. Because the search term is ambiguous, the search function page 835 displays the terms as searched ("Home") in the search bar 840, with a list of possible search results in the search results region 845. In this case, the user has two locations stored as "Home", one in Los Angeles and one in San Francisco.

The search feature, in some embodiments, initially searches a set of databases that store information relevant to the user of the device. These databases, in some embodiments, include the user's stored contact information (e.g., address book records), recent searches performed within maps (i.e., results available through the recents feature of the interface), stored bookmark information (i.e., results available through the bookmarks feature of the interface), as well as harvested address and location information. In some embodiments the mobile device running the mapping application is one of several devices connected via a user account. These devices share information via a content-sharing service, and this content-sharing service (with permissions from the user) identifies addresses and/or possible destinations from sources such as the user's e-mail, messages, web browsing, etc. This harvested address and location information is described in detail in U.S. Provisional Application 61/832,850, filed Jun. 8, 2013, as well as in U.S. application Ser. No. 14/081,850, filed Nov. 15, 2013, entitled "Harvesting Addresses." U.S. Provisional Application 61/832,850 and U.S. Non-provisional application Ser. No. 14/081,850 are both incorporated herein by reference.

In some embodiments, only when the various databases do not provide any search results does the search function use a more general search engine to identify locations within the user's vicinity. In this case, the databases find multiple results for "Home", as the user has two separate addresses stored for their home. As shown at the fourth stage 1920, the user selects the Los Angeles home address.

As a result, the fifth stage 1925 displays the search result map view page 852, with a pin 1930 displayed at the location of the user's Los Angeles home. The mapping application centers the map about this dropped pin 1930, and the lower information bar 870 displays information about the location, including the name ("Home"), the address "1919 Foothill Drive"), the estimated travel time to the location, and a selectable control 880 for entering the turn-by-turn navigation mode of the mapping application with the selected location as the destination. In addition, the upper information bar 865 displays the search term as translated by the voice recognition functions ("Home"), along with a cancel control 1935 (to return to the standard map exploration interface) and a search again control 875 to return to the search function page 835 displayed in the second stage 1910 of this figure.

Figure 20:
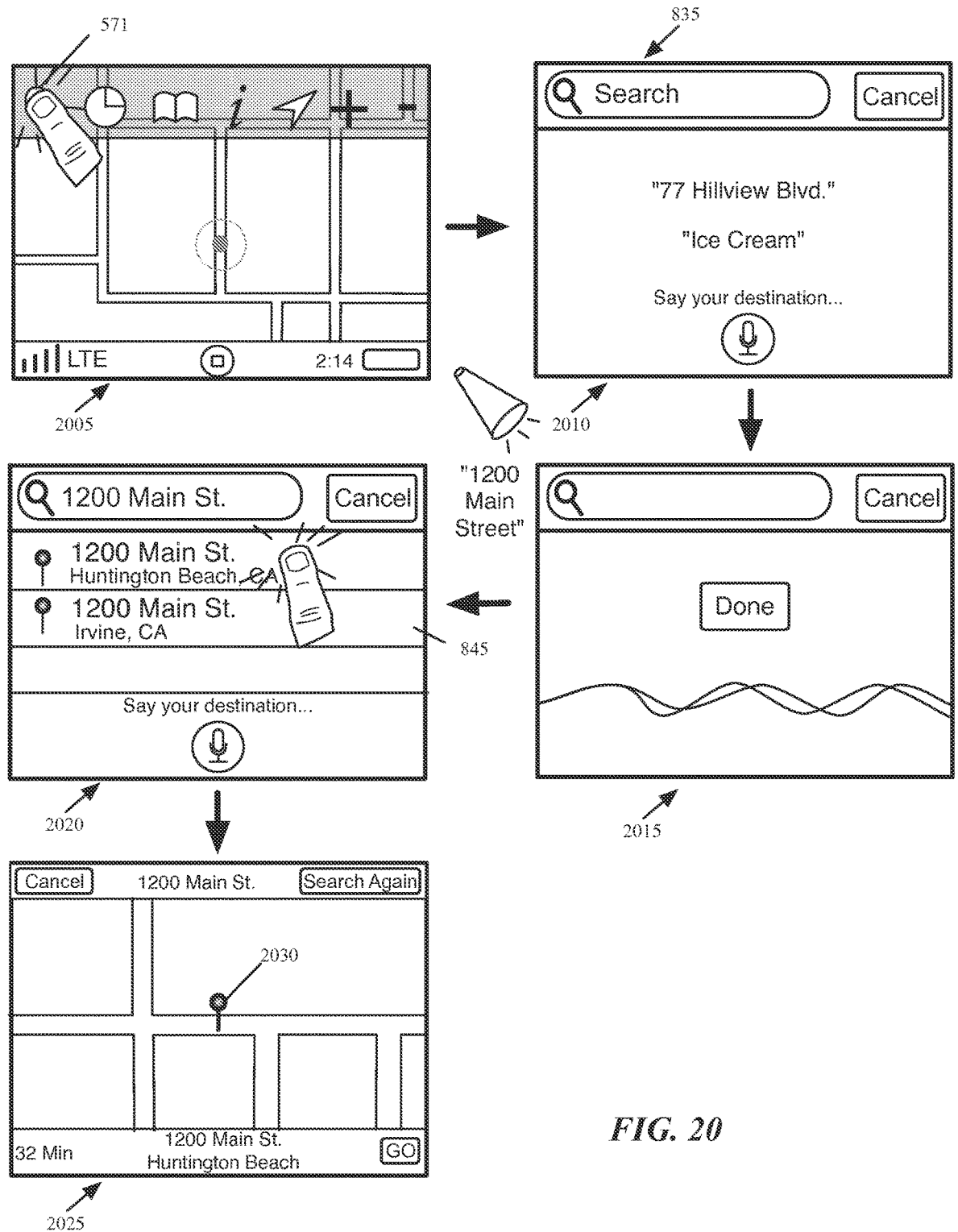

FIG. 19 illustrates ambiguous results identified within the databases searched by the mapping application search function (specifically, the address book information). In some embodiments, ambiguities may also arise from search engine results (e.g., when a user dictates a street address that may resolve to addresses in multiple different cities). FIG. 20 illustrates such a case of ambiguous results returned by the search engine.

Specifically, FIG. 20 illustrates the search feature of the mapping application identifying ambiguous results for an address search over five stages 2005-2025 of the high-quality vehicle touchscreen interface. In this case, the first three stages 2005-2015 are the same as the first three stages of FIGS. 8 and 19, with the user selecting the search control 571, the search function page 835 appearing, and the user dictating a search query. In this case, at the third stage, the user dictates "1200 Main St.". Though not shown in the figure, for reference in this case the user is driving in the Orange County area of Southern California.

Without the search terms specifying a city, the mapping application cannot determine whether the user is searching for the 1200 Main St. located in Huntington Beach or the 1200 Main St. located in Irvine. As such, the fourth stage 2020 illustrates that the search function page 835 displays these two possible results in the search results region 845. The user selects the address located in Huntington Beach, and the fifth stage 2025 illustrates that the mapping application displays a map centered at this location, with a pin 2030 displayed at the requested address.

Figure 21:
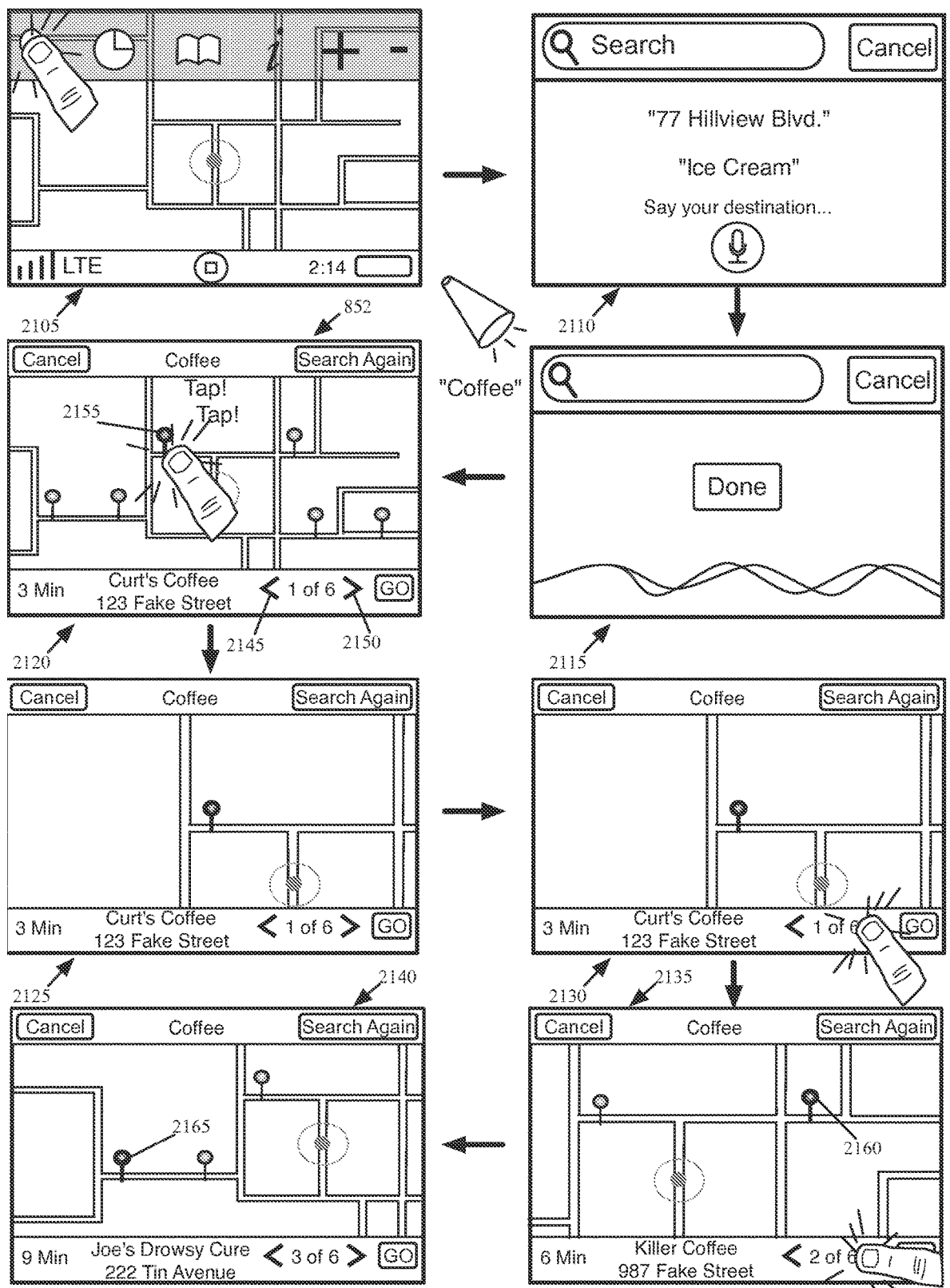
FIG. 21 illustrates an example of such a search that produces multiple results.

The previous examples illustrate the case in which the dictated search term produces a single result or ambiguous results displayed in a list from which the user selects the desired search result. Some search queries will not be ambiguous, but produce multiple matching results. FIG. 21 illustrates an example of such a search that produces multiple results over eight stages 2105-2140. As with the previous examples, the first three stages 2105-2115 are the same, with the exception of the user's dictated search query. In this case, as shown at the third stage 2115, the user dictates the search "Coffee".

In this case, the search is not ambiguous. The mapping application does not find any results in the local databases (e.g., recents, address book, etc.), and therefore performs a search for coffee in the region surrounding the device location. While the search finds multiple results, the search term itself ("coffee") is not ambiguous. Instead, the mapping application search feature recognizes this as a more generic search looking for one or more results for a particular type of location (coffee shops).

Thus, as shown at the fourth stage 2120, the application automatically transitions to the search results map view page 852, with the search term "Coffee" appearing in the upper information bar 865. This search term produces six search results within the region searched (e.g., within a particular distance of the device, or drivable within a particular duration from the location of the device). The map region displays a map with a pin for each of the six search results, and one of these pins displayed as selected. Some embodiments automatically initially select the search result closest to the device's current location. In some embodiments, other factors may affect the ordering (i.e., ranking) of the search results returned by a search engine (e.g., a search server). The search engine may use popularity (by review quality, or by number of people reviewing a location) and relevance in addition to distance when determining the ordering of search results. For example, when the user searches for coffee, the closest result in terms of proximity might be a restaurant that happens to serve coffee, but the search engine may return a coffee shop located slightly further from the current location instead, based on a combination of relevance and popularity.

The lower information bar 870 displays the information for the selected destination (in this case, Curt's Coffee, which is three minutes away), and the selectable control for entering navigation. In addition, because the search term resulted in more than one search result, the application displays a left arrow control 2145 and a right arrow control 2150, with the text "1 of 6" located between the arrows. In some embodiments, when the search returns multiple results displayed together on the map, the vehicle interface includes a mechanism for stepping between the search results. As shown in subsequent stages of this figure, selection of the arrow controls 2145 and 2150 causes the application to step through the search results.

At this fourth stage 2120, however, the user makes a particular type of selection (in this case, a double tap) of the currently selected pin 2155 for Curt's Coffee. The fifth stage 2125 illustrates that this double-tap selection of the pin 2155 results in the mapping application centering the selected pin in the map region and zooming in on the pin as well. The fifth stage 2125 illustrates the same user interface except for the map region now centered on the pin and at a closer zoom level such that less of the surrounding region is displayed. In some embodiments, when a search gives more than one result, such selection (e.g., a double-tap within the vicinity of a pin) causes the application to zoom in on the pin, and a second such selection causes the application zoom back out to show all of the results. In some embodiments, the user cannot zoom in and out in this way when only one search result is found.

At the sixth stage 2130, with the map region still centered on the pin 2155 for Curt's Coffee, the user selects (via a tap input) the right arrow control 2150. The seventh stage 2135 illustrates that the mapping application has selected the second closest result to the user's location. Killer Coffee, and shifted the map region so that the pin 2160 for this location is now in the displayed portion of the map region. Though not the case in this example, some embodiments center each particular pin upon stepping through the search results to the particular pin and selecting the particular pin. Other embodiments, as shown in this figure, modify the map display so that the pin is within a particular threshold of the center and the center of the displayed map region is equidistant from the selected pin and the current location.

The seventh stage also illustrates the user again selecting the right arrow control 2150 (again with a tap input). In the eighth stage 2140, the mapping application selects the third closest result to the user's location, Joe's Drowsy Cure, and shifts the map region so that the pin 2165 for this location is now visible within the map display. Furthermore, in order to include both the current location of the device and the selected pin 2140, the mapping application zooms out from the map while shifting the map region.

The above examples illustrate the mapping application search feature for the touchscreen vehicle user interfaces. In some embodiments, the only difference between the high-quality touchscreen interface search feature and the low-quality touchscreen interface search feature is the size of the buffers for touch selectability around the various controls (e.g., the pins, the right and left arrow controls for stepping through the search results, etc.). The differences in buffer size of some embodiments are described above by reference to FIG. 6.

Figure 22:
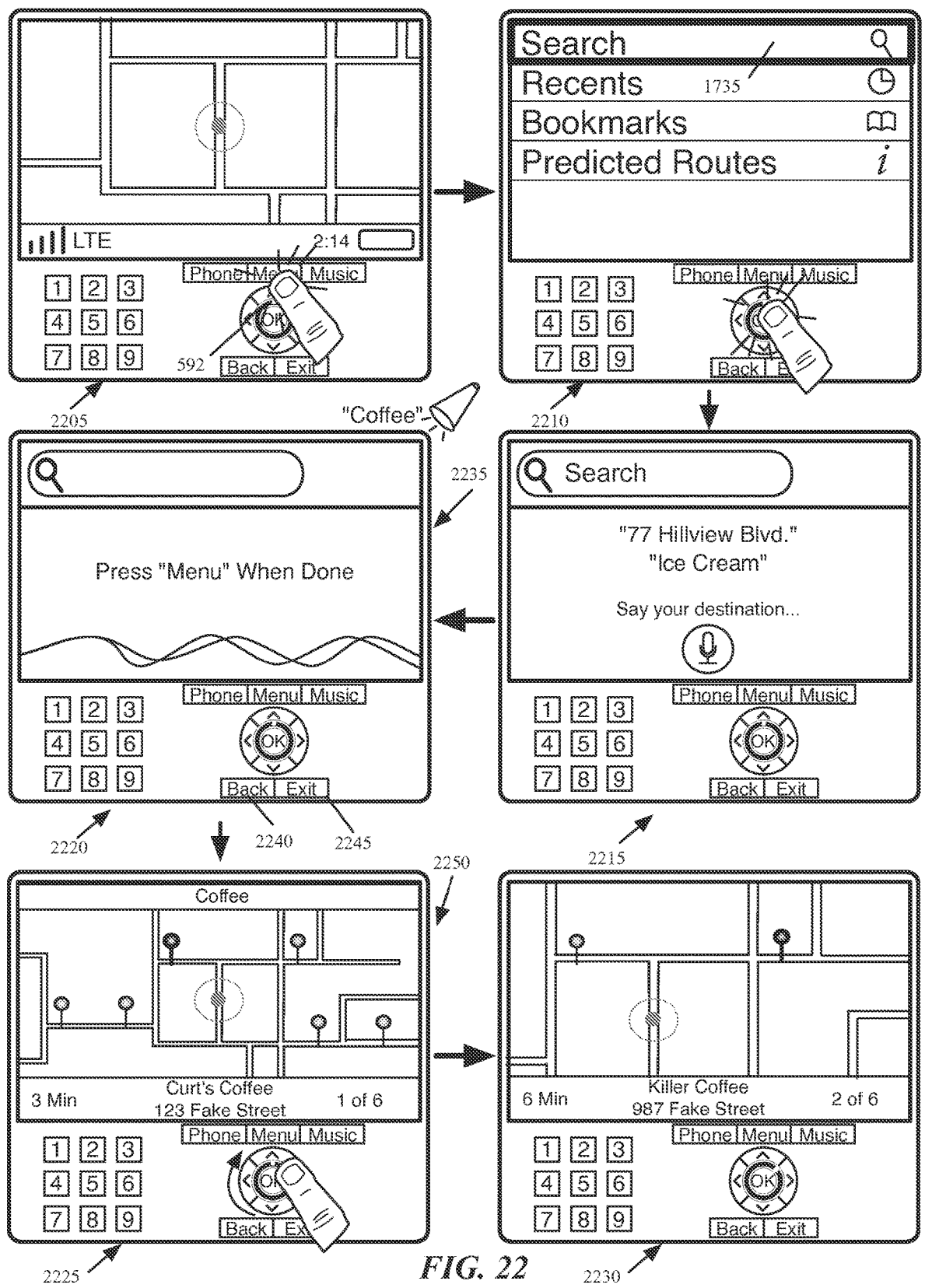
FIG. 22 illustrates the operation of the mapping application search feature for the non-touchscreen vehicle user interface of some embodiments.

FIG. 22 illustrates the operation of the mapping application search feature for the non-touchscreen vehicle user interface of some embodiments, over six stages 2205-2230. The first stage 2205 and second stage 2210 are the same as the third and fourth stages 1715 and 1720 of FIG. 17, described above. In this case, however, at the second stage, the user performs a selection input (e.g., pushing the joystick 592 inwards, pushing a knob inwards, pressing a particular hardware button, performing a specific input on a trackball, etc.) with the search menu option 1735 selected.

As shown at the third stage 2215, this selection activates the search feature, causing the display of a search function page 2235. The search function page 2235 is analogous to the touchscreen search function page 835, and prompts the user to dictate a destination along with examples. However, the page does not have a cancel option, because there is no touchscreen. Instead, in some embodiments the user can cancel the search by pressing the physical back button 2240 or exit button 2245.

Instead, as shown at the fourth stage, the user dictates the search "coffee", the same search term used above in FIG. 21. At this stage, the search function page has the same waveform animation as in the touchscreen interface, but does not include a touchscreen button to indicate completion of the dictation. As with the touchscreen interface, the mapping application can recognize when the user has completed speaking in some embodiments. In addition, the search function page 2235 displays instructions to the user to press the menu button upon completion of the dictation. In various embodiments, the user can perform different inputs via the built-in vehicle controls in order to end the search (e.g., pressing inwards or upwards on the joystick, pushing a knob, etc.).

The fifth stage 2225 illustrates that the search algorithms function in the same way irrespective of the interface. The same search for coffee with the device in the same location gives the same six results as in the touchscreen interface, in the same order. Thus, the fifth stage 2225 illustrates the map region displayed in the non-touchscreen interface, with six pins representing the six search results, and the closest location to the device's current location selected. The non-touchscreen interface search results map view 2250, unlike the search results map view 852 of the touchscreen interface, does not include touchscreen buttons such as the cancel, search again, or enter navigation controls. Instead, the mapping application relies on user interaction with the built-in vehicle controls to perform these actions (e.g., pressing inwards on a joystick to enter navigation, using the back or exit buttons to respectively search again or cancel the search function).

Other than the control to enter navigation, the lower information bar in the search results map view 2250 is similar to that in the touchscreen interface. In addition to the lack of this control, the user interface additionally does not have selectable arrows on either side of the text "1 for 6" that indicates the number of search results that can be stepped through via non-touchscreen input. In this case, the user rotates the joystick 592 clockwise. As a result, at the sixth stage 2230, the mapping application selects the second search result (as ordered by the search engine, using various factors, such as proximity to the current location of the device, popularity, relevance, etc.).

Figure 23:
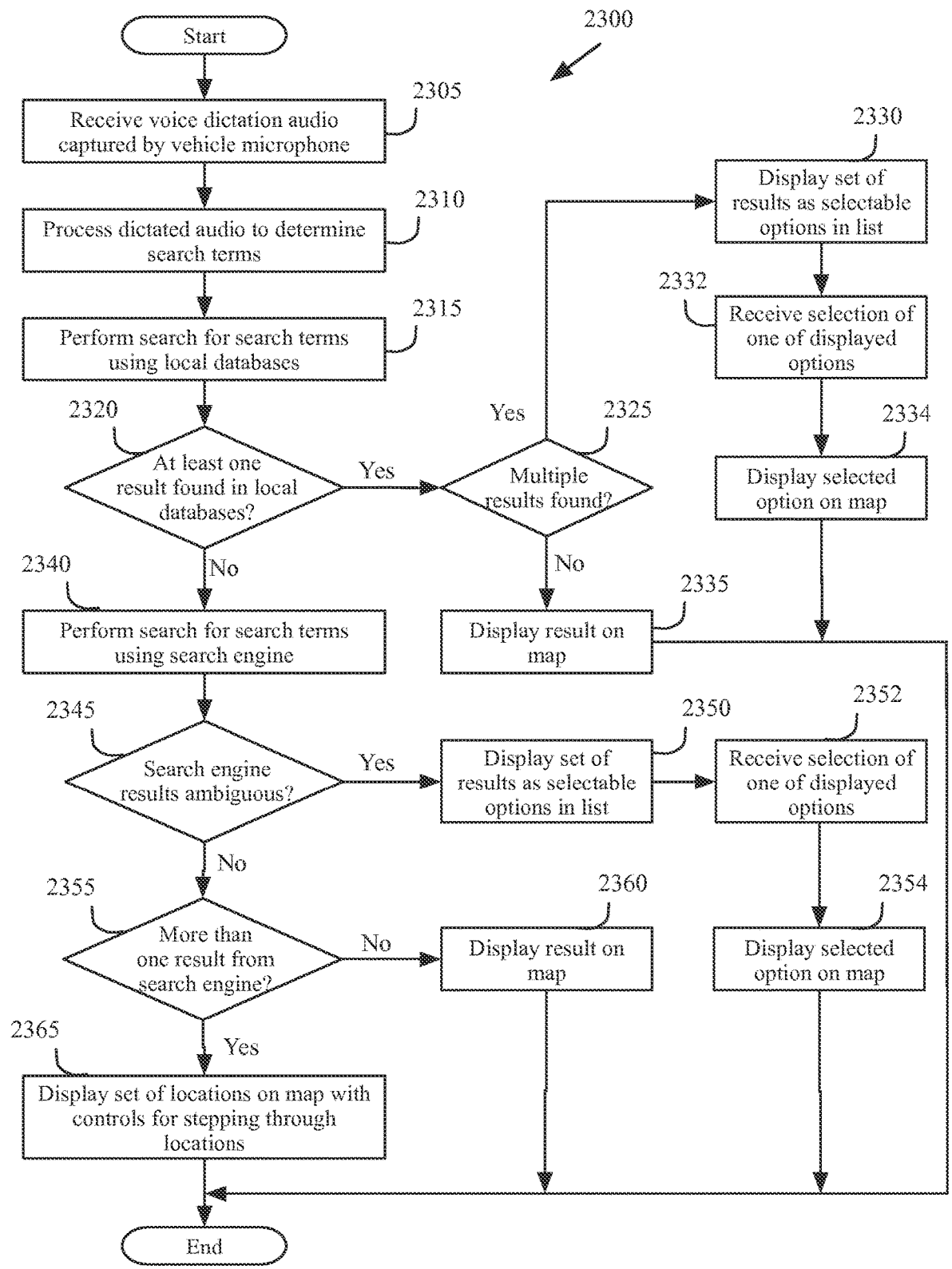
FIG. 23 conceptually illustrates a process performed by the mapping application of some embodiments in order to retrieve search results for a search dictated through the vehicle user interface.

As described above, in some embodiments the mapping application search function initially searches various local databases, then uses a search engine to perform a local search when unable to find a result via the local databases. FIG. 23 conceptually illustrates a process 2300 performed by the mapping application of some embodiments in order to retrieve and display search results for a search dictated through the vehicle user interface.

As shown, the process 2300 begins by receiving (at 2305) voice dictation audio captured by a microphone in the vehicle. In some embodiments, the user first activates a search function through the vehicle interface of the mapping application, which prompts the application to receive the audio recorded by the vehicle microphone. Using the vehicle microphone (which, in some embodiments, must have the ability to record audio of at least a threshold quality) enables the user to avoid the need to pick up the mobile device and speak into the device microphone. However, other embodiments use a microphone in the mobile device to record the voice dictation.

Next, the process 2300 processes (at 2310) the dictated audio to determine the search terms. In some embodiments, the mobile device includes voice recognition software leveraged by the application in order to identify the search terms spoken by the user. In other embodiments, the mapping application connects to a voice recognition server that performs the voice analysis. As mentioned above, some embodiments perform dictation translation that does not account for natural language phrasing. On the other hand, in addition to simply translating the audio into words, some embodiments parse phrases to determine the user's desired search. For instance, when the user says "go home", the voice recognition process identifies that the user is searching for "home", and can ignore the "go". Similarly, when a user dictates "Find the best coffee", some embodiments identify coffee as the search, and "best" as a modifier to use quality ratings for identified locations in the area.

With the search terms identified, the process performs (at 2315) a search for the identified terms using local databases. In some embodiments, these local databases include the user's address book (e.g., information about the user's contacts) and addresses and/or destinations harvested from other applications. These harvested destinations may include addresses or destinations in e-mails, SMS messages, etc., either sent or received by the user. In addition, the harvested destinations include in some embodiments addresses either specifically sent to the mapping application from a web browser or other application (such as Yelp®) on the mobile device or on web pages or locations navigated to with the web browser or other application. Furthermore, in some embodiments, these addresses are not restricted to those identified by the mobile device connected to the vehicle interface. The mobile device may connect to an information-and/or content-sharing service (e.g., iCloud®) that enables the sharing of content and information between multiple device connected by an account. In this case, destinations may be harvested from all of the user's devices connected to the account, and distributed to the mobile device on which the mapping application operates for use by the mapping application search feature. In addition to these databases, some embodiments also include recent search results from previous searches by the mapping application in the initial search of local databases.

The process 2300 then determines (at 2320) whether at least one result is found in the local databases. As described below, when no results are found via this search, the process proceeds to 2340 to perform a search using a search engine. When at least one result is found by the local database search, the process 2300 determines (at 2325) whether multiple results are found within the local database search. In some embodiments, the search function treats multiple results identified in the local databases as ambiguous results.

Thus, when multiple results are found, the process displays (at 2330) the set of results as selectable options in a list. FIG. 19 is an example of such a search result, in which two results for the search "home" are found. Other searches that might turn up ambiguous results in the local databases include "work" when the user works multiple jobs or has multiple work locations, or "Bobby's house", when the address book has information for multiple people named Bobby. After some period of time, the process receives (at 2332) a selection of one of the displayed options. While this is shown as a linear process, one of ordinary skill in the art will recognize that the application may receive a selection of a cancel option, or may wait an indeterminate amount of time between operation 2330 and operation 2332 until the user makes a selection. Upon receiving the selection, the process displays (at 2334) the selected option on the map.

When only one result is found, the process instead displays (at 2335) the singular result on the map view, without displaying a list of results. As shown in FIG. 8 (which is not an example in which the search result is necessarily found in the local databases), the mapping application of some embodiments displays a pin at the identified location, and provides the user with a control for entering a turn-by-turn navigation mode with the identified location as the destination.

On the other hand, when the search of the local databases does not turn up any results, the process performs (at 2340) a search for the dictated search terms using a search engine. In some embodiments, this is a search engine also available to a web browser on the mobile device, while in other embodiments the mapping application uses a different web browser. In addition, the mapping application constrains the search by location so that only results within a particular proximity of the device's current location will be found. For example, the application may constrain the search to a particular distance (e.g., a 5-mile radius, 10-mile radius, etc.) or a particular travel time (e.g., only locations that the user could reach by car within 15 minutes, 30 minutes, etc.). Some embodiments initially use a small distance or time constraint, then start increasing the constraint until the distance or travel time is large enough for at least one result to be identified.

The process then determines (at 2345) whether the search results are ambiguous. In the case of the search engine results, this does not determine simply whether one or more result was returned. Instead, search results are ambiguous if the application cannot determine with a threshold confidence what result the user desires.

When the search results are ambiguous, the process displays (at 2350) the set of results as selectable options in a list, as was the case for multiple results identified within the local databases. For instance, in the example of FIG. 20, the user searches for a particular address without specifying a city. As this happens to be an address in two difference cities nearby, the results are ambiguous because the user is clearly searching for a single location. Similarly, if the user were to dictate "Curt's Coffee", but two different unrelated coffee shops nearby had the names "Curt's Coffee" and "Kurt's Koffee", some embodiments would display these results in a list as ambiguous, allowing the user to select one. After some period of time, the process receives (at 2352) a selection of one of the displayed options. While this is shown as a linear process, one of ordinary skill in the art will recognize that the application may receive a selection of a cancel option, or may wait an indeterminate amount of time between operation 2350 and operation 2352 until the user makes a selection. Upon receiving the selection, the process displays (at 2354) the selected option on the map.

However, when the search results are not ambiguous, the process determines (at 2355) whether the search engine has yielded more than one result for an unambiguous search. When only one result is returned, the process displays (at 2360) the singular result on the map view, without displaying a list of results. As shown in FIG. 8, the mapping application of some embodiments displays a pin at the identified location, and provides the user with a control for entering a turn-by-turn navigation mode with the identified location as the destination When multiple results are returned, the process displays (at 2365) the returned set of locations on the map along with controls for stepping through the locations. FIGS. 21 and 22 are examples of such searches for different interfaces, with the controls displayed differently in for the different vehicle interfaces. The mapping application displays pins at each of the locations, and the user can select the different pins with the stepping controls. With any of the pins selected, the user can select an option to enter turn-by-turn navigation with the selected location as the destination. After displaying the results at any of the operations 2334, 2335, 2354, 2360, or 2365, the process ends. In the cases in which the process displays a set of selectable options in a list, the application proceeds to the map view display after the user selects one of the possible results.

The above process and examples illustrate the vehicle interface in cases in which the search is initiated through that interface. However, when the mobile device on which the mapping application operates is connected to the vehicle system, a user (e.g., a passenger) can continue to use the mapping application on the mobile device, and perform searches within the user interface displayed on the device.

Figure 24:
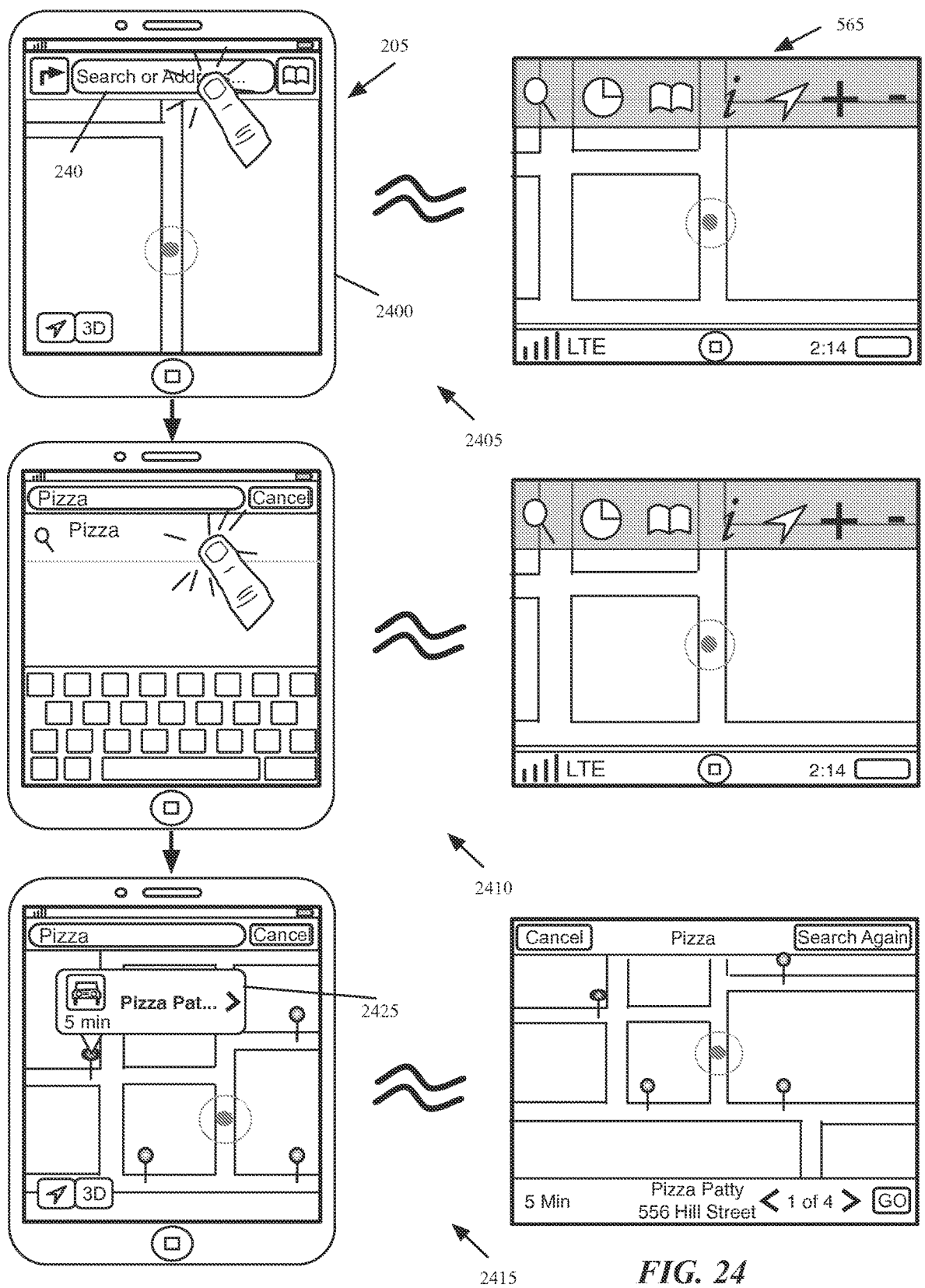
FIG. 24 illustrates an example of a user performing a search within the mapping application mobile device interface while the mobile device is connected to a vehicle interface.

FIG. 24 illustrates an example of a user performing a search within the mapping application mobile device interface while the mobile device is connected to a vehicle interface. Specifically, the figure illustrates three stages 2405-2415 of both interfaces in which the user initiates a search function, performs a search, and receives search results displayed on both interfaces.

The first stage 2405 illustrates a mobile device 2400 displaying the mapping application user interface 205 of some embodiments, as described above by reference to FIG. 2, as well as the high-quality vehicle user interface 565. Though not shown, the mobile device is currently connected to a vehicle that includes a touchscreen interface for displaying the vehicle UI 565. In this first stage 2405, the user selects the search field 240 to initiate a search operation on the mobile device.

At the second stage 2410, the user has utilized a touchscreen keyboard 2420 (not available in the vehicle user interfaces of some embodiments) to type a search for "Pizza" into the search field 240. As the user types, the search field 240 of some embodiments displays various autocompleted options for selection by the user. Thus, at this point the search field displays a selectable option of "Pizza", which the user selects via a touch input. As the user enters the search field and types a search on the mobile device 2400, the mapping application does not modify the vehicle user interface 565.

The third stage 2415 displays four dropped pins in the mobile device interface 205, corresponding to the search results for a generic search for pizza. In some embodiments, the mapping application changes the zoom level of the map view in the mobile device UI 205 in order to display all of the search results. The mapping application also selects the first search result (for a particular pizza location), and displays an expandable banner 2425 for the result. At this point, the mapping application also directs the vehicle user interface 565 to display the search results, as if the search had been performed using the vehicle interface.

Similarly, though not shown in the previous figures, once the user inputs a search term or terms into the mapping application via the vehicle user interface, the search results are displayed in the mobile device interface in some embodiments. In general, the mapping application allows separate map exploration in the two interfaces, and separate access of various features (e.g., search interface, recents or bookmarks, predicted routes, etc. However, once the mapping application reaches a result that corresponds to a possible destination (e.g., a selection of a recent location, a selection of a bookmarked location, a search result, etc.), the application synchronizes the interfaces to display the same possible destinations in the two interfaces.

IV. Accessing Recent Destinations

In describing the mapping application interface for vehicle displays above in Section II, the control for accessing the recent destinations feature was discussed. As shown, the touchscreen interfaces include a recents control selectable from the primary map view, and the non-touch interface includes a recents option in the primary mapping application menu. The following will discuss additional aspects of the recent destinations feature of some embodiments.

FIG. 7 above illustrated that when the user selects the recents control in a touchscreen interface (or selects the recents menu option in a non-touchscreen interface), the mapping application displays in that interface a list of destinations recently searched in the mapping application. In some embodiments, these recent destinations may include destinations that have appeared as search results in the mapping application when searched through the mobile device interface of the mapping application.

Figure 25:
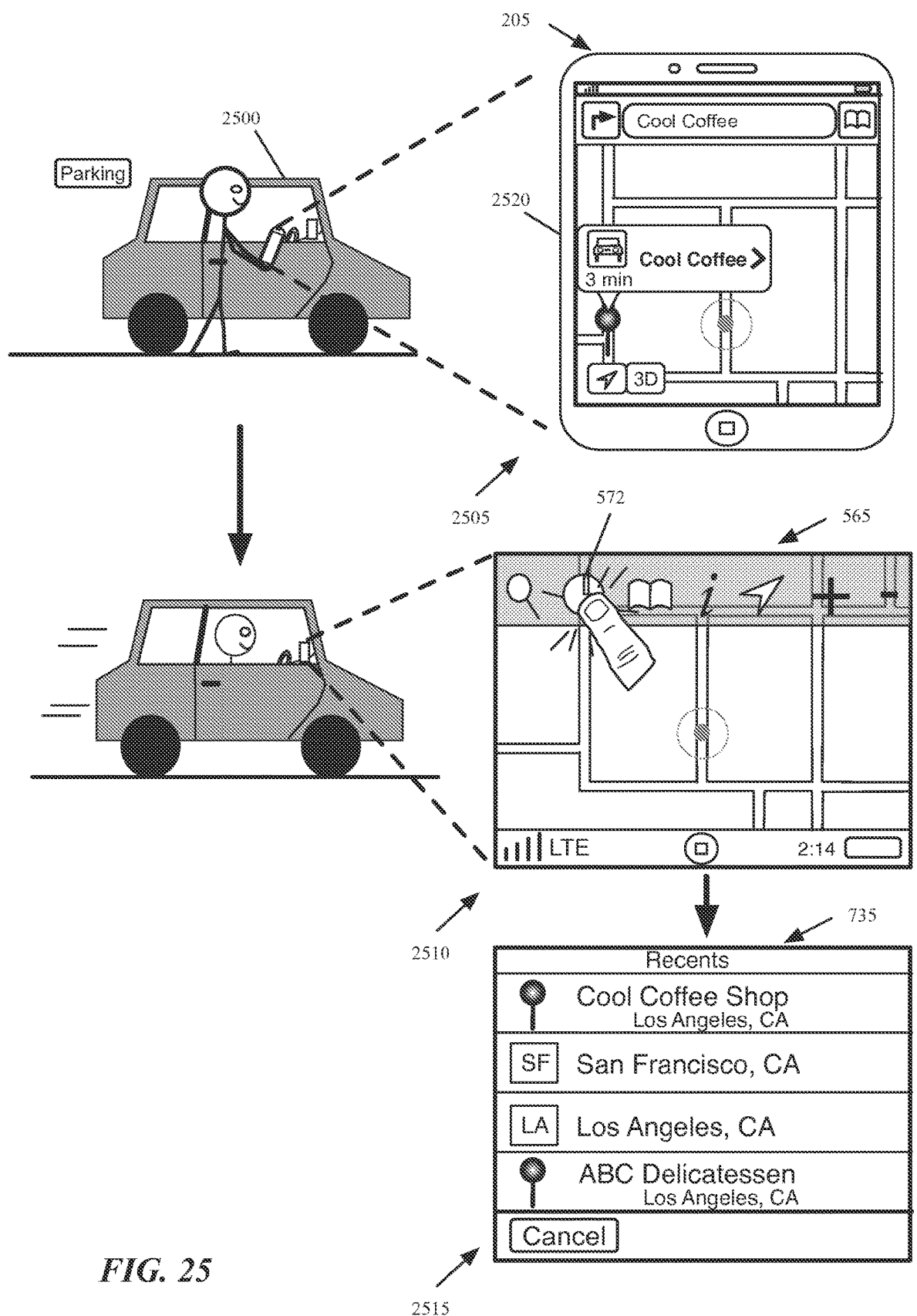
FIG. 25 illustrates the mapping application of some embodiments in which a user performs a search on the mobile device before connecting the device to the vehicle system, then accesses the recent destinations on the vehicle interface of the mapping application which now include the previously-searched destination.

FIG. 25 illustrates three stages 2505-2515 of the mapping application of some embodiments in which a user performs a search on the mobile device before connecting the device to the vehicle system, then accesses the recent destinations on the vehicle interface of the mapping application which now include the previously-searched destination. The first stage 2505 illustrates a person walking towards a vehicle 2500 while carrying a mobile device 2520 on which the mapping application of some embodiments operates. As shown in the mapping application mobile device UI 205, the user has searched for "Cool Coffee", and the mapping application displays a search result pin for the identified location in the map view.

At the second stage 2510, the user has entered the vehicle 2500 and begun driving. In addition, the user has connected her mobile device 2520 to the vehicle display system. As shown, at this point the display screen of the vehicle 2500 displays the mapping application UI 565. In some embodiments, when the device is connected while the mapping application is operating, the device automatically sends the mapping application vehicle user interface to the vehicle display screen. In other embodiments, upon connection to the vehicle system, the device operating system automatically sends the device and vehicle user interfaces to their respective home pages.

In the second stage 2510, the user selects the recents control 572. The third stage 2515 illustrates the recent destinations page 735 of some embodiments. In addition to various results from searches recently performed on the device (ABC Delicatessen, Los Angeles, and San Francisco), the recent destinations page 735 includes the Cool Coffee Shop, which was the search result identified by the mapping application based on a search through the mobile device interface 205 before the connection of the mobile device to the vehicle system.

Figure 26:
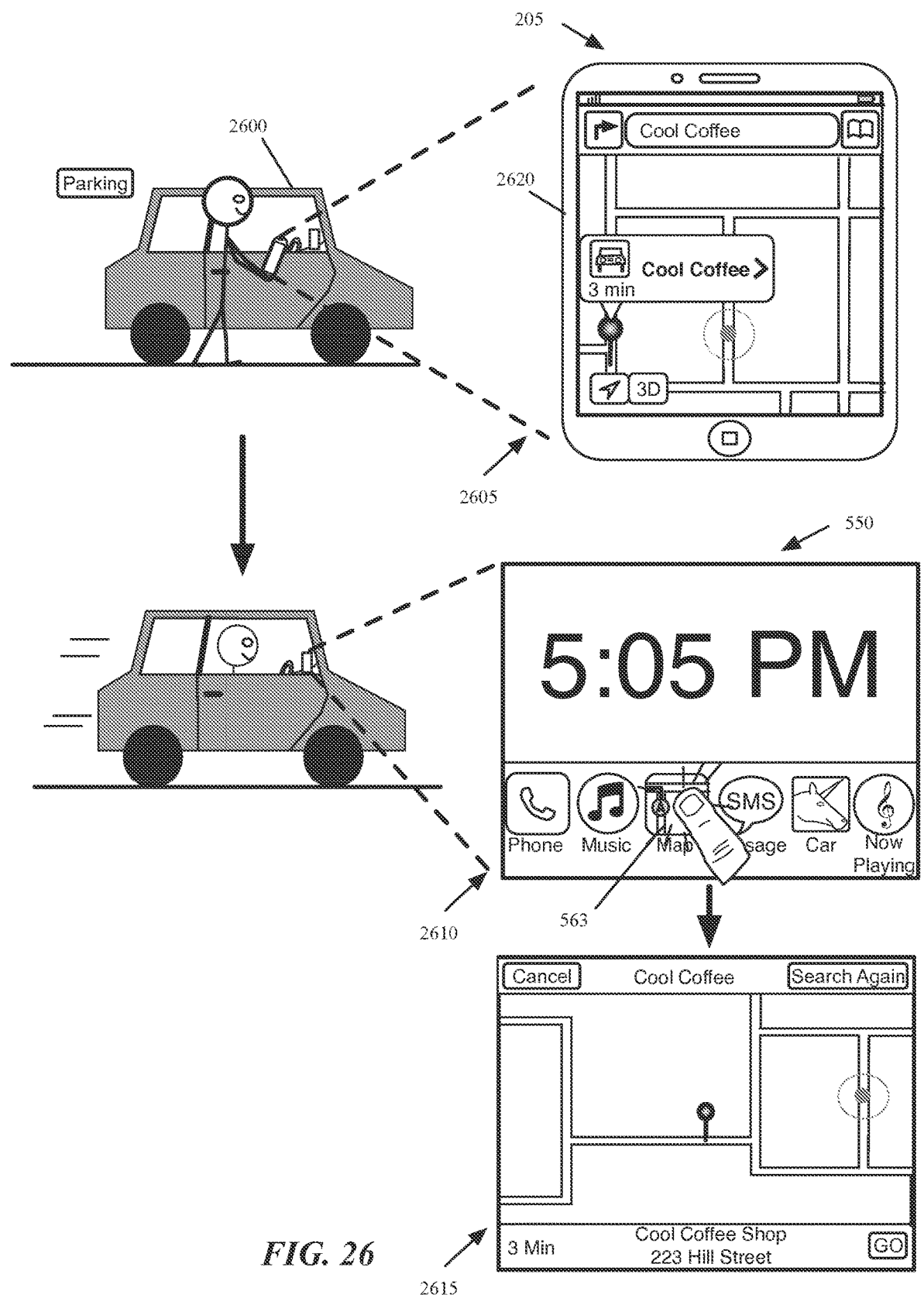
FIG. 26 illustrates the mapping application of some embodiments in which a user performs a search on the mobile device before connecting the device to the vehicle system, then opens the mapping application on the vehicle interface.

In the situation illustrated in FIG. 25, some embodiments automatically display the search result on the vehicle display screen once the mapping application is opened on the device after connection to the vehicle system. FIG. 26 illustrates three stages 2605-2615 of the mapping application of some embodiments in which a user performs a search on the mobile device before connecting the device to the vehicle system, then opens the mapping application on the vehicle interface. The first stage 2605 illustrates a person walking towards a vehicle 2600 while carrying a mobile device 2620 on which the mapping application of some embodiments operates. As shown in the mapping application mobile device UI 205, the user has searched for "Cool Coffee", and the mapping application displays a search result pin for the identified location in the map view.

At the second stage 2610, the user has entered the vehicle 2600 and begun driving. In addition, the user has connected her mobile device 2620 to the vehicle display system. As shown, at this point the display screen of the vehicle 2600 displays the home page user interface 550 for vehicle touchscreens. In the embodiment shown in this figure, the device automatically returns to its home page as well upon connection to the vehicle system.

In the second stage 2610, the user selects the map control 563 to enter the mapping application, which also causes the mobile device display to display the mapping application (not shown). The third stage 2615 illustrates the result of entering the mapping application, in that the application automatically displays a search results map view page (showing the one result for the Cool Coffee Shop) in the vehicle display for the recently performed search.

In some embodiments, the recent destinations page displays destinations from sources other than mapping application searches. For example, some embodiments display recently harvested locations from e-mails, SMS messages, etc. (as described above in relation to the search feature) as recent destinations. In addition, some embodiments enable the user to add destinations and addresses to the mapping application.

Figure 27:
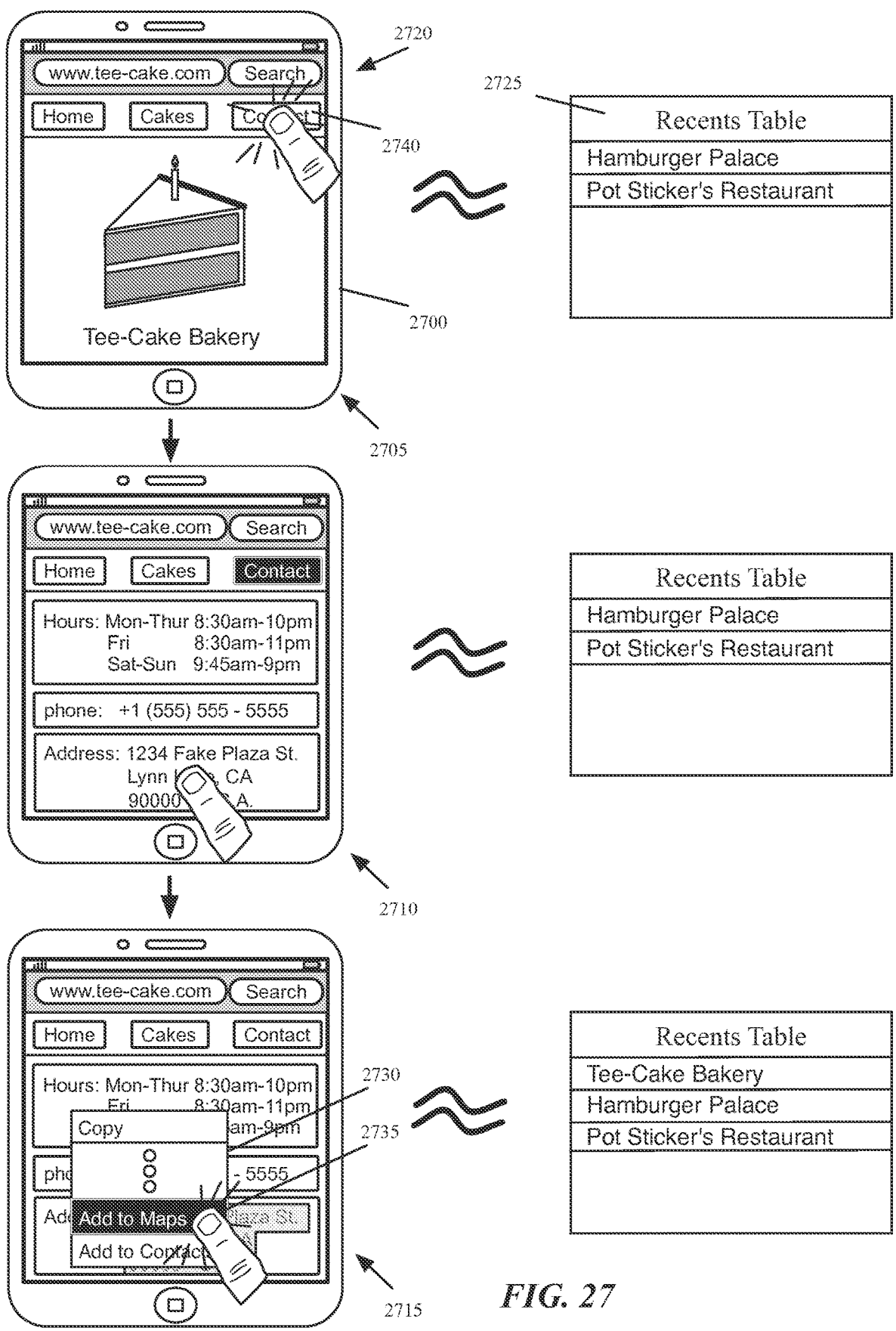
FIG. 27 illustrates three stages of a mapping application in which a user adds a location to the mapping application from a web browser on the mobile device, which adds the location to the mapping application table of recent destinations.

FIG. 27 illustrates three stages 2705-2715 of a mapping application in which a user adds a location to the mapping application from a web browser on the mobile device, which adds the location to the mapping application table of recent destinations. As shown, the first stage 2705 illustrates a mobile device 2700 on which a web browsing application interface 2720 is displayed. The web browsing application interface 2720 currently displays a web page for the Tee-Cake Bakery. In addition, the first stage (and subsequent stages) illustrates a recents table 2725 stored by the mapping application. This table, in some embodiments, indicates what the mapping application will display when the user selects a recents control in the mapping application user interface. The recents table 2725 includes two entries, for Hamburger Palace and Pot Sticker's Restaurant.

In the first stage 2705, the user selects a contact information tab 2740. The second stage 2710 illustrates that, as a result, the web browsing application interface 2720 displays various contact information for the Tee-Cake Bakery, including a physical location address. In addition, at the second stage 2710, the user presses and holds over the address in order to select the text that forms the address. At this point, the recents table 2725 is unchanged from the first stage 2705.

In the third stage 2715, as a result of selecting the address, the web browsing application interface displays a menu 2730 with several options relating to the selected text. The menu includes a copy option, as well as several options based on recognition by the mobile device that the selected text is an address. The device (e.g., a function of the device operating system or web browsing application) may detect addresses based on their formatting and/or matching them to a recognized address in map data. These menu options include an option to add the address to contacts as well as an option 2735 to add the address to the mapping application operating on the mobile device. The user selects this last option 2735 in the third stage 2715.

As a result of this selection, the mapping application recents table 2725 now includes a third entry, for the Tee-Cake Bakery. The entry for the bakery has been added to the top of the table, which represents the order in which the recent destinations will be displayed when a user selects the recents control in the vehicle user interface. Thus, because the bakery is the most recent destination, the application adds it at the top of the table. In some embodiments, when a user selects a destination from the recents (or searches again for the destination), the application resets the access time for the destination, placing it at the top of the table.

While the recent destinations page of some embodiments displays recent destinations in order from most recently added to earliest added by default, various factors can cause the application to rearrange the display order of the recent destinations. For instance, some embodiments identify when a first location is a more likely destination than a second location, and place the first location above the second location in the recents list.

Figure 28:
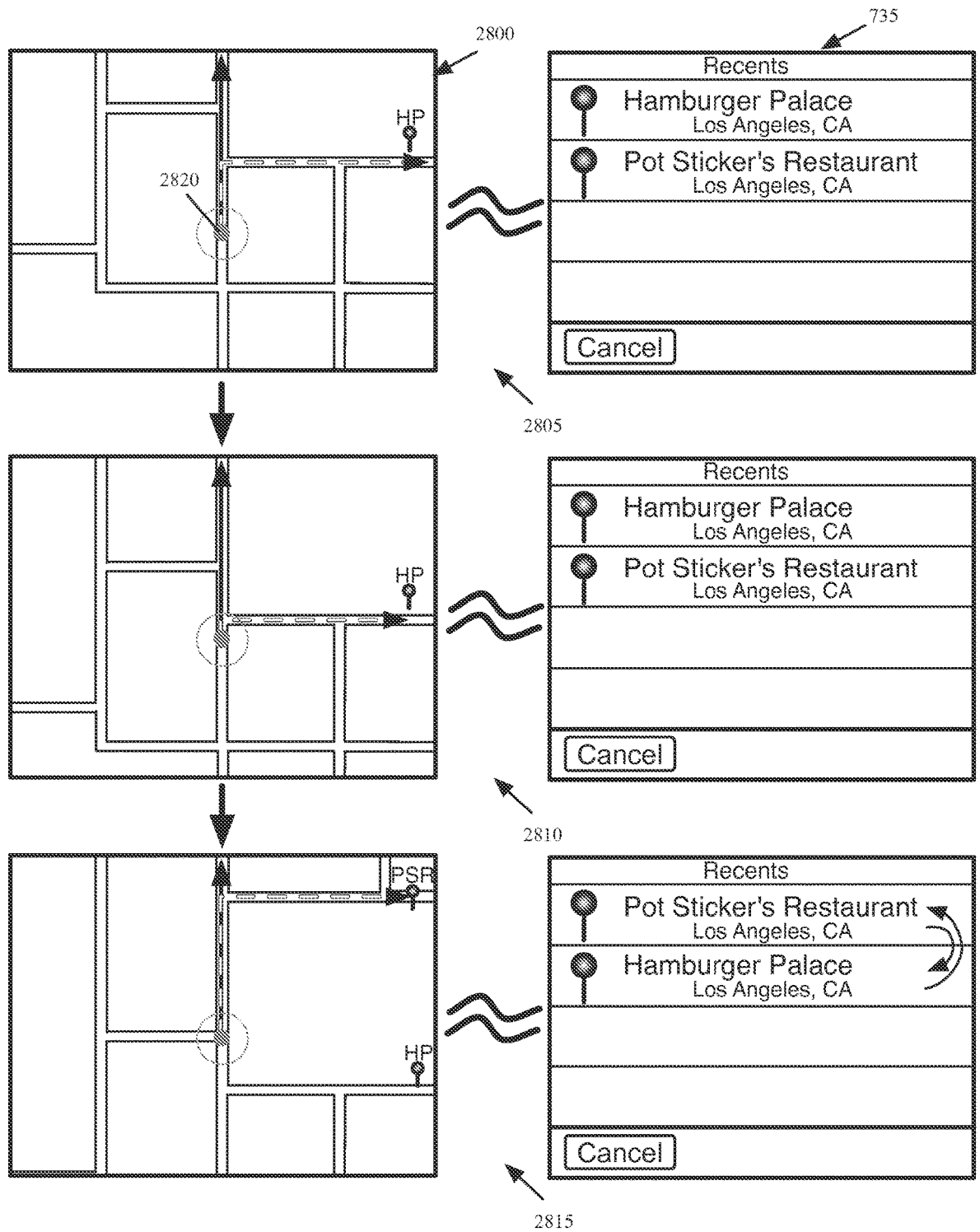
FIG. 28 illustrates a recent destinations page of some embodiments as the vehicle displaying the recent destinations page travels over a stretch of road.

FIG. 28 illustrates a recent destinations page 735 of some embodiments over three stages 2805-2815 in which the vehicle displaying the recent destinations page 735 travels over a stretch of road. Each stage illustrates, in addition to the recent destinations page 735, a conceptual map 2800 on which the vehicle location (and therefore the location of the device connected to the vehicle display system) is shown. This map 2800 does not represent a user interface display, but rather indicates a location on the shown streets of the vehicle.

The first stage 2805 illustrates the current location 2820 of the mobile device and vehicle to which it connects in the map 2800. In addition, the recent destinations page 735 includes two recently searched destinations (Hamburger Palace and Pot Sticker's Restaurant), both located in Los Angeles. The map 2800 additionally includes a pin drawn to represent a location of the first of these listed destinations (Hamburger Palace). Further drawn on the map are a solid arrow representing the current direction of travel of the vehicle (and device) as well as a dashed arrow representing an optimal route to the most likely of the recent destinations. Because Hamburger Palace is the closest of the recent destinations, and the direction of travel projected forward overlaps with a portion of the optimal route to Hamburger Palace, the application lists this destination first in the recent destinations page 735.

At the second stage 2810, the vehicle approaches the intersection at which the route to Hamburger Palace diverges from the current travel direction (i.e., the intersection at which the vehicle would turn right to travel to Hamburger Palace). At this point, the displayed recent destinations page 735 remains the same.

The third stage 2815 illustrates the map 2800 and the recent destinations page 735 after the user has passed the turn towards Hamburger Palace. The map now shows a route to Pot Sticker's Restaurant, which overlaps with the projection of the current travel direction. Hamburger Palace, on the other hand, is located behind the current location of the vehicle in its current direction of travel. As a result, the mapping application of some embodiments determines that Pot Sticker's Restaurant is a more likely destination for the user, and moves this destination ahead of Hamburger Palace in the recent destinations page 735. In some embodiments, a predictive routing engine of the mapping application performs the determination of which destination is more likely based on various factors, including direction of travel, routes to the different possible recent destinations, frequency of previous travel to the destination, etc. The predictive muting engine of some embodiments is described in further detail in U.S. Provisional Application 61/832,928, filed Jun. 9, 2013, as well as in U.S. patent application Ser. No. 14/081,899, filed Nov. 15, 2013, entitled "Warning for Frequently Traveled Trips Based on Traffic." U.S. Application 61/832,928 and U.S. patent application Ser. No. 14/081, 899 are both incorporated herein by reference.

Figure 29:
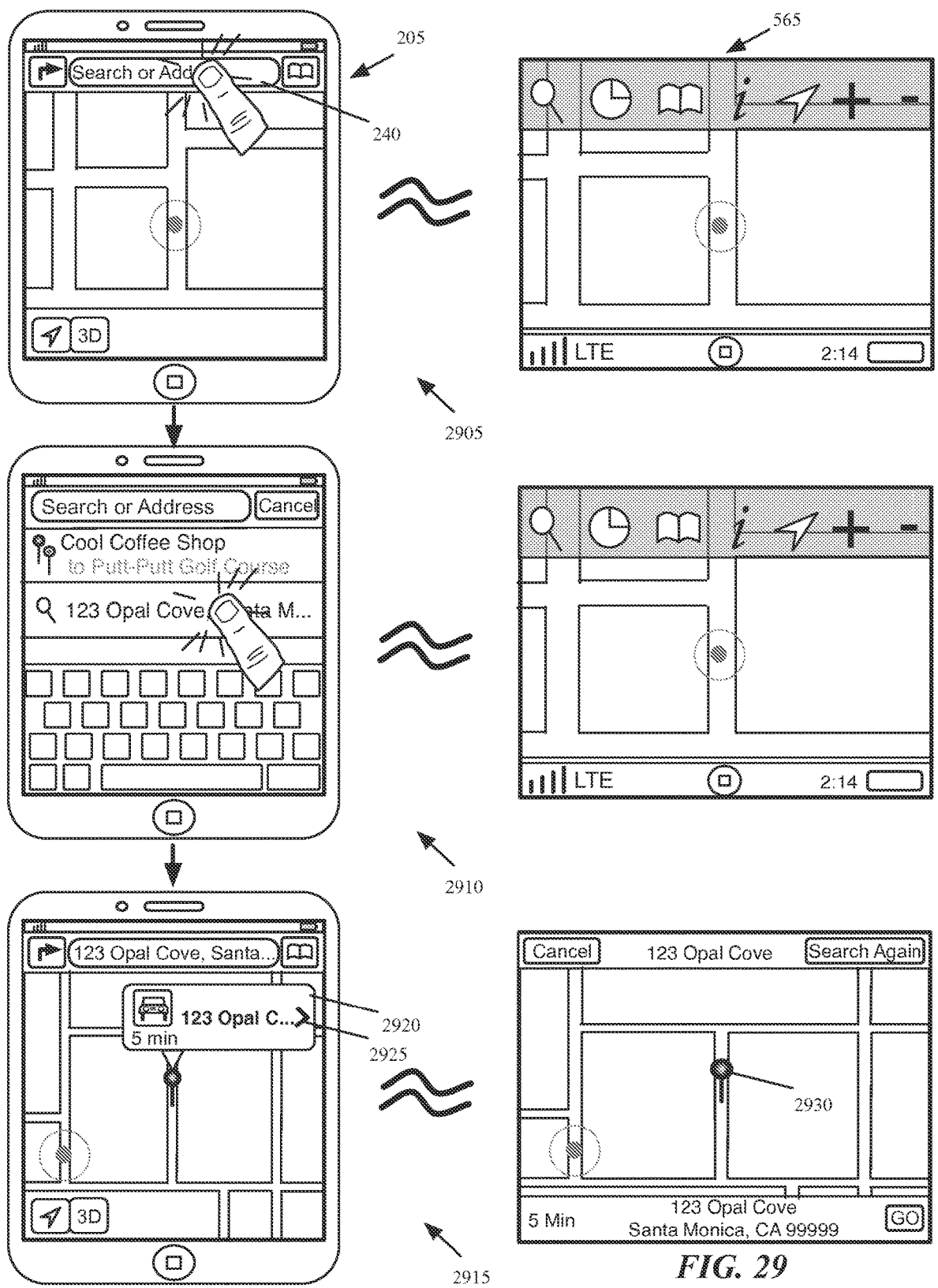
FIG. 29 illustrates a user utilizing the recents feature on a mobile device of some embodiments in order to select a destination.

Much like in the example in the previous section for the search feature, the mapping application of some embodiments only synchronizes the two interfaces (mobile device and vehicle display) once the user behavior results in a selected destination. FIG. 29 illustrates a user utilizing the recents feature on a mobile device in order to select a destination over three stages 2905-2915 of both the mobile device mapping application UI 205 and the high-quality touchscreen interface 565.

In the first stage 2905, both of the mapping application interfaces 205 and 565 display their respective standard map displays. In addition, in the first stage 2905, the user selects the search field 240 to initiate a search by the mapping application in the mobile device interface 205. The second stage 2910 illustrates that the mapping application vehicle interface 565 remains static while the mobile device interface 205 displays a recents list. As indicated above, in some embodiments when the user selects the search field of the mobile device interface, the application displays a list of recent destinations, routes, etc. until the user begins typing in a search query. The list of recents includes a previously requested mute from a particular coffee shop to a mini-golf course as well as a previously searched address (rather than a route).

At the second stage 2910, the user selects the destination 123 Opal Cove from the recents list. The third stage 2915 illustrates the result of this selection in both of the mapping application interfaces. In the mobile device interface 205, the mapping application displays a pin at the selected address as well as an expandable banner 2920 for the result. This banner 2920 includes a selectable item 2925 that enables the user to command the application to enter turn-by-turn navigation with 123 Opal Cove as the destination. At the same time, in the vehicle interface 565, the mapping application displays the search results map view with a pin 2930 for 123 Opal Cove as a selected destination. In this case, the application displays the selected destination in the center of the map view in both UIs.

Figure 30:
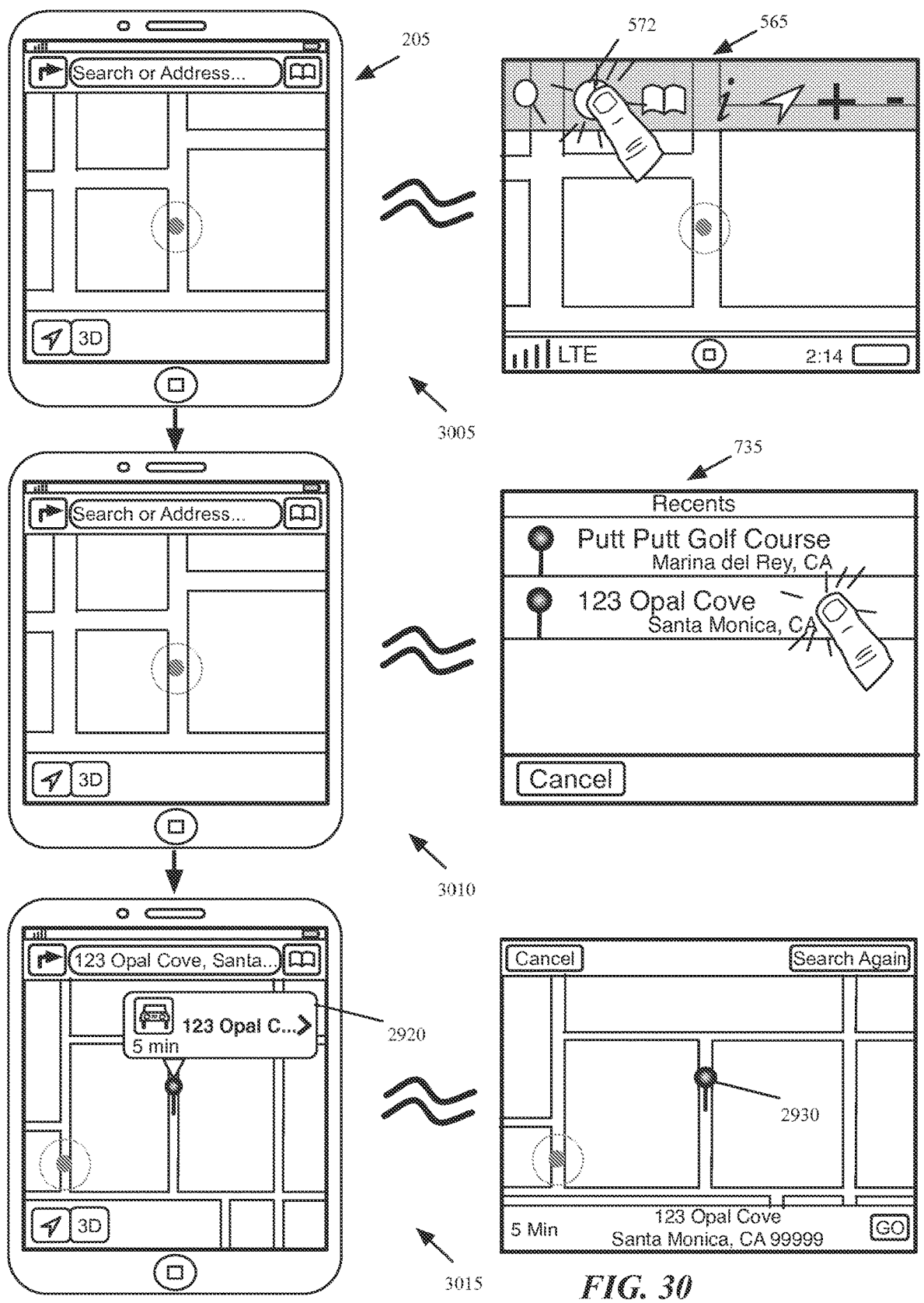
FIG. 30 illustrates a user utilizing the recents feature on the vehicle interface of some embodiments in order to select a destination.

FIG. 30 illustrates the corresponding action taken within the vehicle user interface 565 over three stages 3005-3015. The first stage 3005 displays the same mobile device UI 205 and vehicle user interface 565 for the mapping application as in the first stage of FIG. 29. In this case, however, the user selects the recents control 572 in the vehicle user interface 565. As a result, at the second stage 3010, the mapping application outputs the recent destinations page 735 to the vehicle display. Whereas the mobile device interface displayed both a location (123 Opal Cove) and a route (Cool Coffee Shop to Putt-Putt Golf Course), the vehicle user interface recent destinations page 735 only displays locations (i.e., possible destinations for navigation). In some embodiments, the mapping application does not display recent routes in the vehicle user interface, instead only displaying locations within the recent destinations page. However, when the user has recently searched for route directions on the mobile device, some embodiments display the destination of the route in the recents list as a possible destination. Some embodiments display these destinations as options irrespective of whether the searched route start point was the user's current location or a different location.

At the second stage 3010, the user selects the destination 123 Opal Cove from the recents destinations page 735. The third stage 3015 illustrates that the result of this selection in both of the mapping application interfaces is the same as when the destination was selected from the recents list on the mobile device. Specifically, the vehicle interface displays the search results map view with 123 Opal Cove as the selected destination, while at the same time the mobile device interface displays a pin at the selected destination as well as the expandable banner 2920.

V. Predictive Routing Interface

As mentioned in the previous section, the mapping application of some embodiments uses a predictive routing engine, which may be a part of the mapping application or operating separately from the mapping application on the mobile device. In some embodiments, the predictive routing engine can (1) formulate predictions about current or future destinations and/or routes to such destinations and (2) relay information to the user of the device about the predictions. In some embodiments, the predictive routing engine includes a machine-learning engine that facilitates the formulation of predicted future destinations and/or routes based on stored, user-specific data. The user-specific data may include any combination of the following in various embodiments: (1) previous destinations to which the user has traveled with the device, (2) previous routes taken by the user with the device, (3) locations and times of events stored in scheduling applications (e.g., electronic calendar, electronic ticket repository, etc.), and (4) addresses parsed from e-mails and/or messages sent to or from the user.

In some embodiments, when the mobile device is connected to a vehicle display system, the mapping application can output a series of predicted destinations and routes to those destinations when requested by the user. Through this interface, the user can view the different destinations and routes, and enter navigation towards one of the destination if desired.

Figure 31:
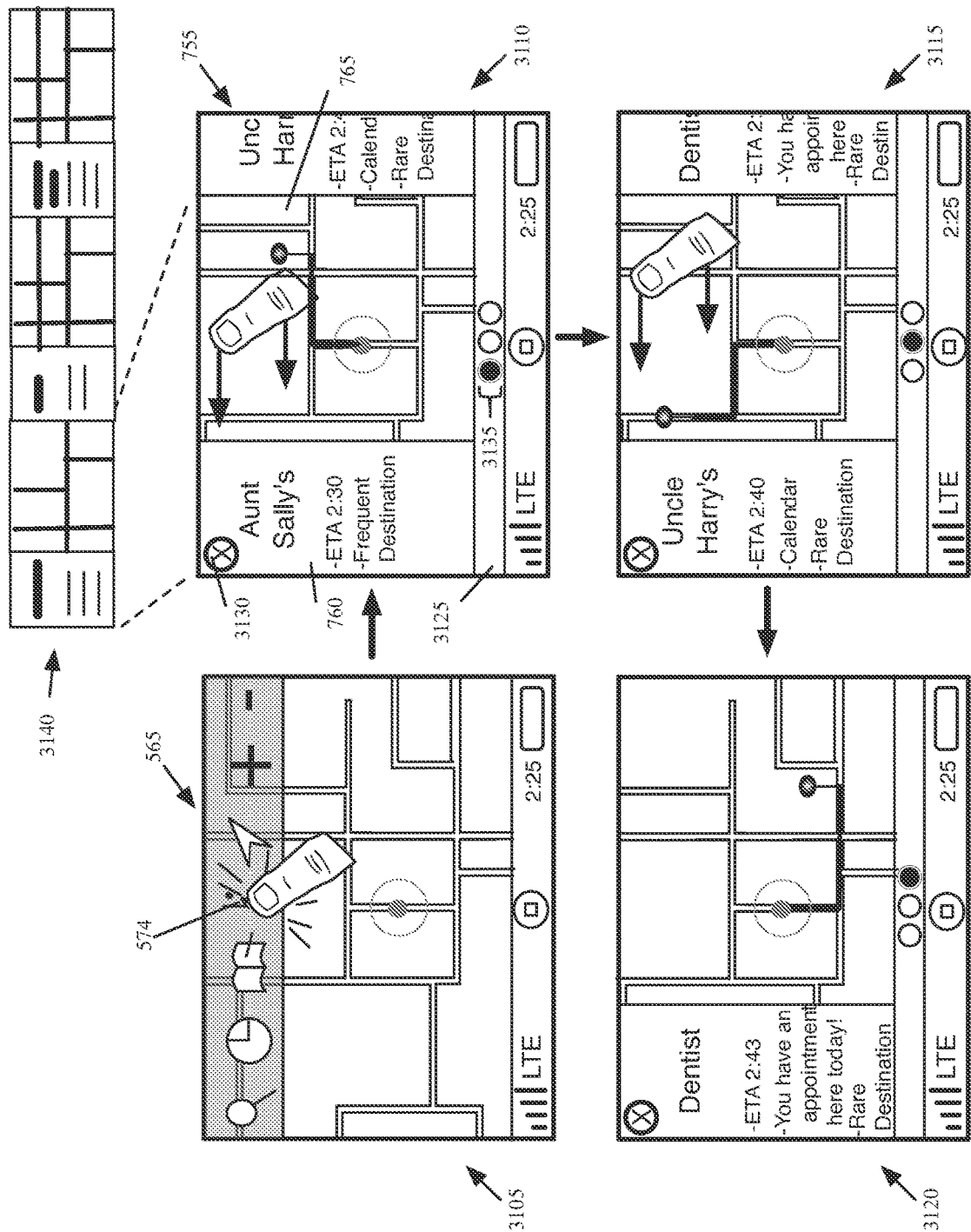
FIG. 31 illustrates the use of this predictive routing interface on the high-quality vehicle touchscreen display of some embodiments in which the user activates the interface and views several different predicted destinations.

FIG. 31 illustrates the use of this predictive routing interface on the vehicle display over four stages 3105-3120 in which the user activates the interface and views several different predicted destinations. The first stage 3105 illustrates the high-quality vehicle touchscreen interface 565 of some embodiments. At this stage, the user selects the predictive routing control 574 to activate a predictive routing feature.

The second stage 3110 illustrates the predictive routing user interface 755 of some embodiments. The predictive routing UI 755 displays, in order of likelihood as computed by the predictive routing engine, one or more likely destinations and routes to those destinations. As described above by reference to FIG. 7, the predictive routing UI 755 displays, for each predicted destination, a first panel 760 with information about the destination and a second panel 765 with a map view of a route to the destination.

In some embodiments, the information panel 760 displays a name for a current destination/route as well as metadata about the destination or route. This name may be based on a destination name identified from contact information, a calendar appointment name, a business name, an address, a primary road used by the route, etc. In addition, the displayed metadata may include an estimated arrival time, the source of the route for the predictive routing engine (i.e., how the predictive routing engine determined the destination as a likely end point for the current trip), whether the destination is a frequent or less traveled destination for the device (and therefore the user of the device), etc.

The map view 765, in some embodiments, displays a map with the current location of the device, the predicted destination, and a route generated from the current location to the predicted destination. In some embodiments, the mapping application factors in traffic information to select an optimal route to the destination, and may warn a user if a typically-traveled route has worse traffic than usual, or if the user will be late to an appointment due to traffic.

As shown in the second stage 3110, the predictive routing engine has determined that the user's most likely destination is her Aunt Sally's house. The information panel 760 for this destination includes a name for the destination (Aunt Sally's), an estimated time of arrival (2:30), and metadata indicating that this is a frequent destination for the user. Therefore, because the user regularly travels to her Aunt Sally's home, and is on a path regularly taken for that destination, the predictive routing engine concludes that this is a likely destination for the user's current travel. As shown, the information panel 760 displays a selectable control 3130 for canceling the predictive routing feature and returning to the standard map exploration view. In some embodiments, selecting the control 3130 removes the currently predicted route from the set of routes, causing a route for a different predicted destination to appear in the display. In this case, each predicted route has its own selectable cancellation control.

The map view 765 displays a route from the current user location to Aunt Sally's house. In addition, the predictive routing user interface 755 includes a predictive routing information bar 3125. The predictive routing information bar 3125 includes a set of circles that indicate (1) the number of predicted likely destinations and (2) which of these is currently displayed in the interface 755. Currently, the application displays three circles 3135 to indicate that there are three available predicted destinations. Furthermore, the first of these circles is filled in to indicate that the application currently is displaying information about the first (and therefore most likely according to the predictive routing engine) of these destinations. Because additional predicted destinations are available, the application displays a portion of the next destination at the right edge of the display screen. In some embodiments, when only one destination is predicted by the predictive routing feature, the application does not display the circles 3135, and in some such embodiments, eliminates the information bar 3125 altogether.

In some embodiments, the application displays the predicted routes in a filmstrip view, with two conceptual frames for each route. The first frame, or panel, for a route displays the metadata (e.g., name of destination, other data) and the second frame displays the map view. In the filmstrip view, the metadata panel for the second route comes after the map panel for the first route. The second stage 3110 additionally shows a condensed view 3140 of such a filmstrip, with the primary display of this stage illustrating the actual display of a portion of that filmstrip within the display screen. As shown, the condensed view illustrates three pairs of frames, each pair including a route metadata panel and a route map panel.

In addition, at this second stage 3110, the user performs a left swipe gesture on the vehicle touchscreen display. In some embodiments, the user can utilize such gestures (or similar touch gestures) in order to select different predicted destinations. Thus, as a result, the third stage 3115 displays the second of the predicted destinations, Uncle Harry's, and a route to this predicted destination. In some embodiments, the application animates this transition by sliding the first destination information off to the left while concurrently sliding the information for the second destination onto the display. This simulates the sliding of the filmstrip shown in condensed view 3140 leftwards in order to show the second pair of panels in the display.

As shown in the information panel 760, this new destination is the user's Uncle Harry's house, for which the estimated arrival time is 2:40. The metadata also indicates that the destination is a rare destination for the user, but is based on a calendar event at the location. As shown in lower the information bar 3125, the second of the three circles, rather than the first, is now filled in. Furthermore, the cancellation control 3130 remains within the information panel 760.

Furthermore, at the third stage 3115 the user again performs a leftward swipe gesture. As shown at the fourth stage 3120, this again causes the application to slide the information for the second destination to the left and indicate a third predicted destination. This third destination has a name of Dentist, an ETA of 2:43, and is a rare destination for the user. In addition, the metadata indicates that the user has an appointment at the dentist today. As an example, the user might have scheduled a dentist appointment for 4:00, and also added a calendar event to see her uncle at 3:00. In addition, the third of the circles 3135 is now filled in.

Figure 32:
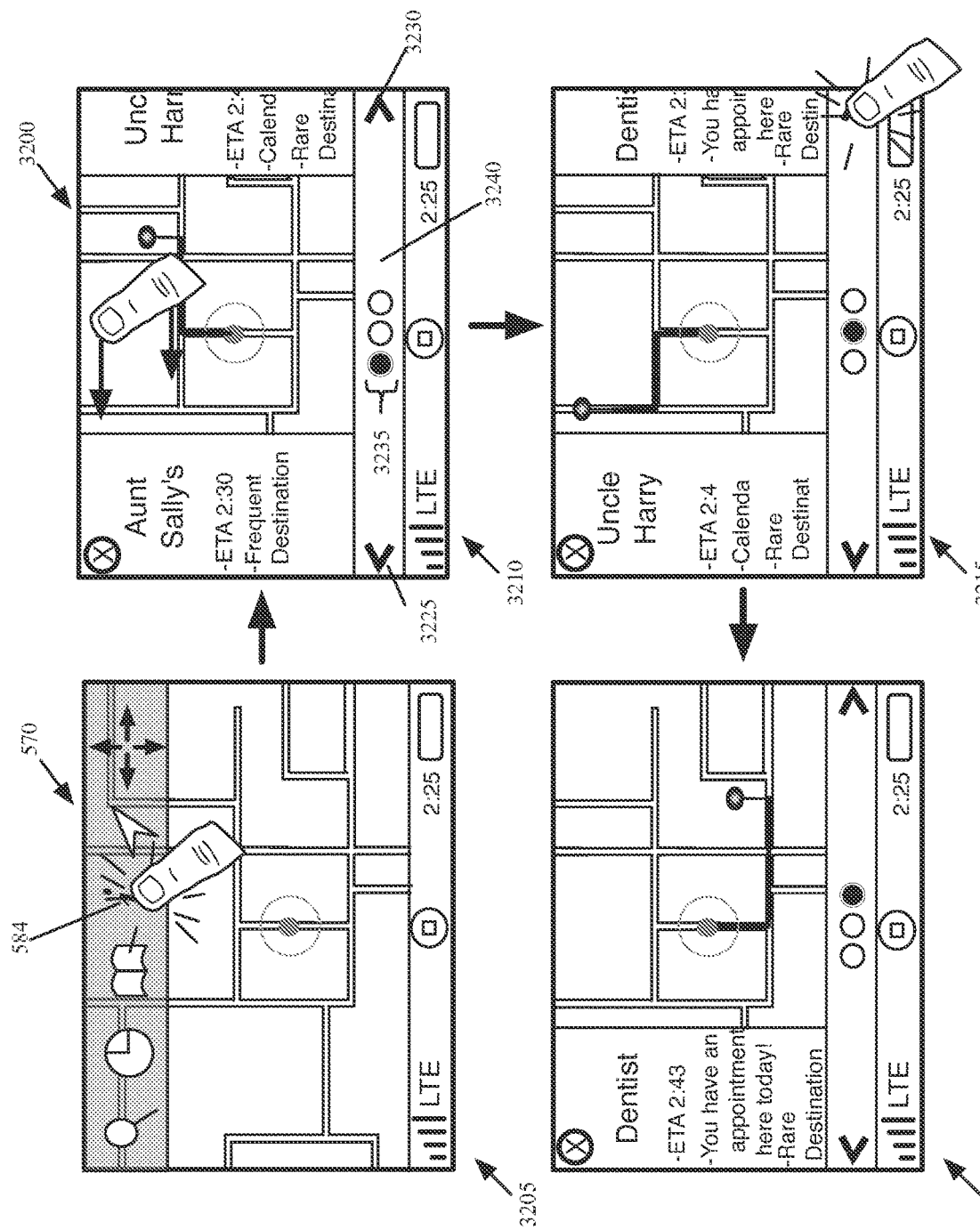
FIG. 32 illustrates the same scenario as FIG. 31, displayed in the low-quality touchscreen interface of some embodiments.

The previous figure illustrated the predictive routing interface for the high-quality touchscreen user interface of some embodiments. In some embodiments, the low-quality touchscreen interface and the non-touchscreen interface have similar predictive routing features. FIG. 32 illustrates the same scenario as the previous FIG. 31, displayed in the low-quality touchscreen interface of some embodiments, over four stages 3205-3220. The first stage 3205 illustrates the low-quality vehicle touchscreen interface 570, with the user selecting the predictive routing control 584 to open the predictive routing feature.

The second stage 3210 illustrates the low-quality touchscreen predictive routing interface 3200. For the most part, the low-quality touchscreen interface 3200 is the same as the high-quality touchscreen interface 755. However, the interface includes additional right and left arrow controls 3225 and 3230 within the information bar 3240, at the far ends of the bar. The circles 3235 representing the different predicted destinations are located in this information bar 3240, as in the high-quality touchscreen example. Because low-quality touchscreens often have high touch latency, they may have trouble detecting the swipe gestures used to select between different predicted destinations. Thus, the low-quality touchscreen interface of some embodiments includes the arrow controls 3225 and 3230 for selecting between different predicted destinations. In addition, the information bar 3240 is larger in the low-quality touchscreen situation so that the touch buffer around the arrows 3225 and 3230 can be made larger.

However, as shown in this figure, the low-quality predictive routing interface 3200 of some embodiments still accepts swipe gestures to change the displayed predicted destination. Thus, the second stage 3210 illustrates a user performing a leftward swipe gesture, and the third stage 3215 illustrates that the interface now displays the second of the predicted likely destinations (as in the third stage 3115 of FIG. 31). At this stage, rather than swiping, the user selects the right arrow control 3230. As shown at the fourth stage 3220, the selection of the right arrow causes the same action in the interface as a leftward swipe gesture, as the mapping application now displays the third predicted destination in the interface 3200.

The predictive routing feature is also available in the non-touchscreen vehicle interface of the mapping application. In some embodiments, the display for non-touchscreens appears the same as the high-quality touchscreen predictive routing interface, with the exception of the cancel button 3130. In order to select between predicted destinations, the user shifts a joystick left or right, turns a knob, rotates a trackball, etc. Because the cancel button is not available, the user can exit the predictive routing feature by using a back button or similar built-in vehicle control in order to return to the standard map view interface.

The above figures illustrate the predictive routing interface of some embodiments. In the example, three predicted destinations are shown in an order of decreasing likelihood of being the user's actual destination. In some embodiments, the predictive routing is regularly updating the likelihood of various possible destinations, and can add destinations to the display, remove destinations from the display, or modify the order of the destinations.

Figure 33:
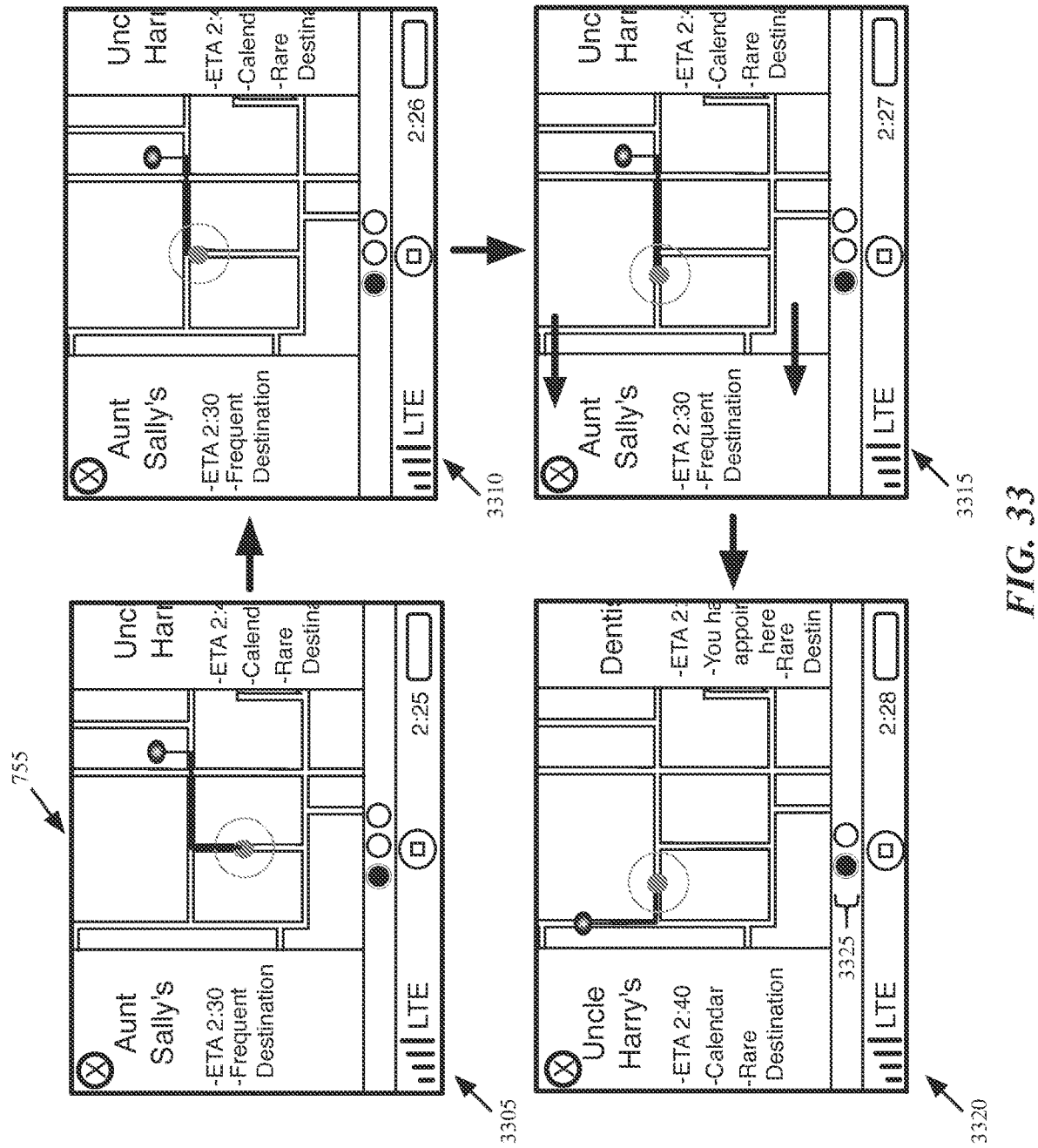
FIG. 33 illustrates an example of the predictive routing engine of some embodiments reordering the likelihood of various destinations, and the subsequent effects in the predictive routing interface.

FIG. 33 illustrates an example of the predictive routing engine reordering the likelihood of various destinations, and the subsequent effects in the predictive routing interface 755 over four stages 3305-3320. The first stage 3305 is the same as the second stage 3110 of FIG. 31, with the predictive routing interface 755 displaying Aunt Sally's as the most likely destination based on various factors, and two additional destinations available for the user to view. In the second stage 3310, the user has traveled towards an intersection at which she would turn right to travel to Aunt Sally's. At this point, the user interface is the same.

At the third stage, the user has reached the previously mentioned intersection and turned left, away from the route to Aunt Sally's. Thus, when the predictive routing engine updates its likelihood, it determines that Uncle Harry's is now a more likely destination than Aunt Sally's based on all of its collected information. Specifically, the predictive routing engine determines that Aunt Sally's is no longer a relevant destination, because the user is now driving away from that destination. Thus, as shown at this stage, the view for Aunt Sally's as a destination begins sliding to the left off of the screen. The fourth stage 3320 illustrates that the predictive routing interface 755 now displays the view for Uncle Harry's as the destination, because this is the most likely destination as calculated by the predictive routing engine. In addition, because the application has determined that Aunt Sally's is no longer a relevant destination, the application only has two possible destinations, and modifies the circles 3325 accordingly.

In some embodiments, if Aunt Sally's still remained a viable, relevant destination, the mapping application would not change the displayed destination even if a different destination (e.g., the dentist) became more likely. However, because Aunt Sally's was no longer a relevant route after the user turned left at the intersection (a bifurcation point), the application removed the route from the display. In some embodiments, if only one route was originally predicted, and the predictive routing engine then determines the route to not be relevant, the application would return to the map exploration user interface.

In some embodiments, the mapping application only changes the display within the context of the normal display of the interface. That is, the application does not suddenly switch the display order of the three destinations to match the newly calculated order, but instead slides the first destination off of the screen and slides the more likely destination into the view. However, in such embodiments, if the predictive routing engine determined that, rather than the dentist as a third most likely option, a different destination was more likely, then some embodiments would modify the user interface such that when the user performed a swipe gesture to view the second destination (Uncle Harry's), the new third destination would appear on the right side of the display (because this change could be performed off-screen and therefore would not be visually jarring). However, when the application determines that a mute partially shown on the display screen (e.g., Uncle Harry's in the first stage 3305) is no longer relevant at all, some embodiments will change the route in this panel, even though it may be a jarring change to the display, so as to avoid displaying information for which the user is not likely to have a use.

Figure 34:
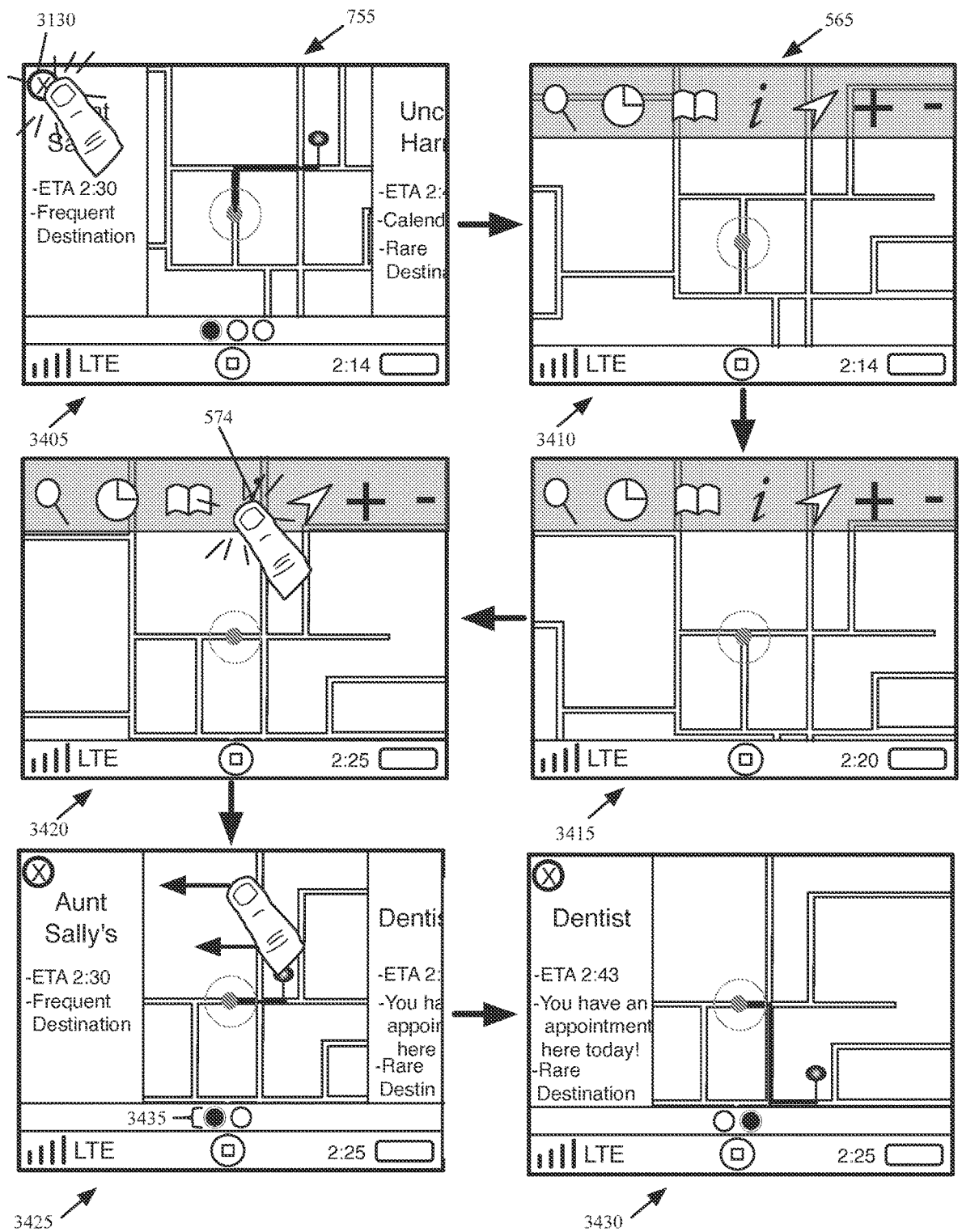
FIG. 34 illustrates another example of changes made by the predictive routing engine to the order of likely destinations.

FIG. 34 illustrates another example of changes made by the predictive muting engine to the order of likely destinations over six stages 3405-3430 in which the user, while traveling, exits the predictive routing interface 755 and then returns at a later time to the predictive routing interface. The first stage 3405 illustrates the predictive routing interface 755 in the same state as the second stage 3115 of FIG. 31, with Aunt Sally's as the displayed most likely destination and Uncle Harry's as the second most likely destination. At this stage, the user selects the cancelation control 3130 in order to leave the predictive routing interface.

As a result, the second stage 3410 illustrates the high-quality vehicle touchscreen interface 565 of some embodiments. The third stage 3415 illustrates this interface six minutes later as the user approaches an intersection. This intersection represents a decision point for the predictive routing engine, because a right turn takes the user towards Aunt Sally's house while a left turn takes the user towards Uncle Harry's house. As shown at the fourth stage 3420, five minutes later, the user has taken a right turn at the intersection.

Also at this fourth stage 3420, the user selects the predictive routing control 574 to re-enter the predictive routing interface 755, shown at the fifth stage 3425. At this stage, because the user turned right and remains along the optimal route towards Aunt Sally's, the calculated most likely destination (and therefore the first destination displayed in the predictive routing interface) is Aunt Sally's. However, as a result of turning to the right at the intersection, Uncle Harry's is no longer the second predicted destination. In fact, as shown by the circular indicators 3435, the mapping application only receives two destinations to display from the predictive routing engine. In some embodiments, only destinations that meet a minimum threshold for likeliness are displayed in the predictive routing interface. In the fifth stage 3425, the user also performs a leftward swipe gesture. As a result, the sixth stage 3430 illustrates the second predicted route, to the dentist.

Figure 35:
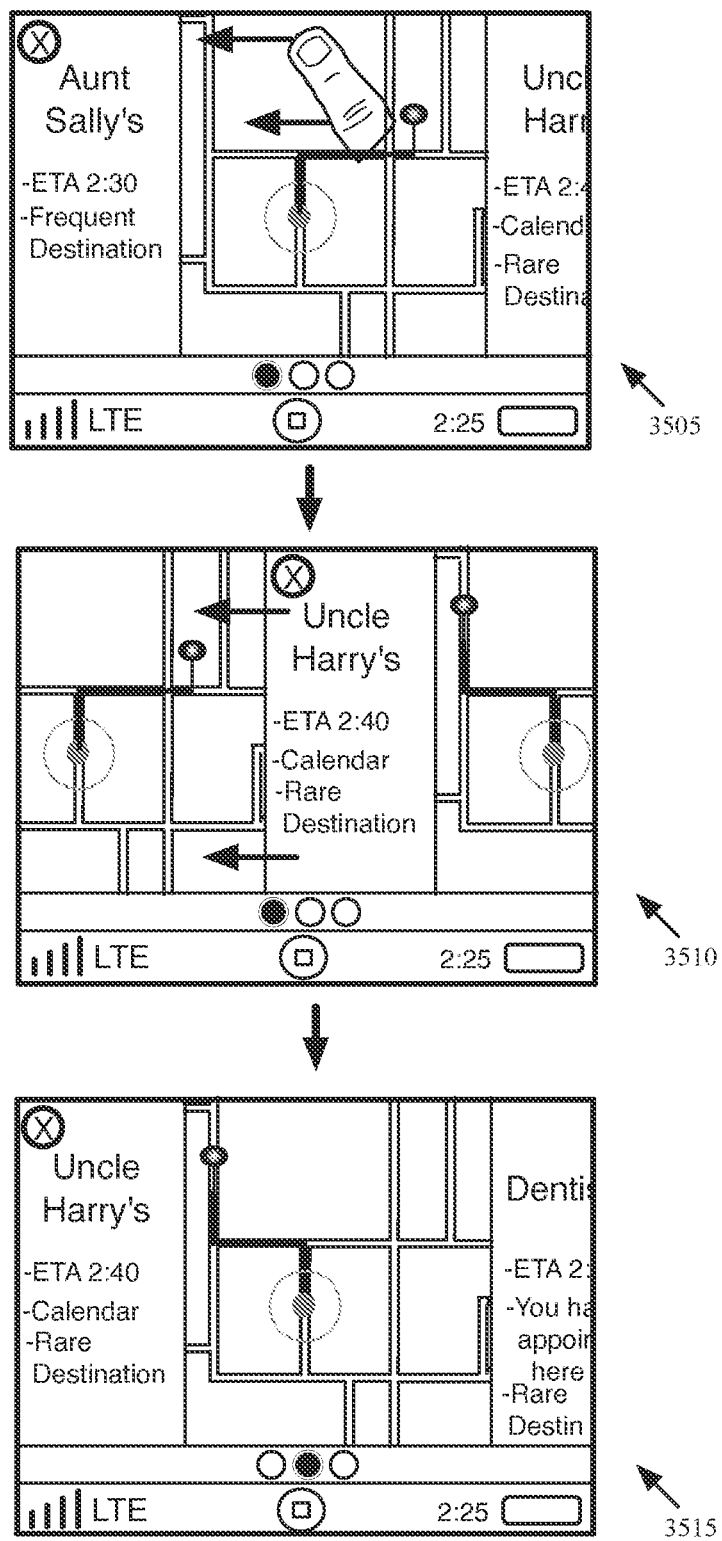
FIG. 35 illustrates the animation of sliding a conceptual filmstrip with different predicted routes through the display screen.

In the above examples, the different predicted destinations and associated routes are arranged in a filmstrip view. As the user performs a swipe gesture (or selects a scroll arrow, rotates a knob or other non-touchscreen control, etc.), the application animates the sliding of the conceptual filmstrip through the display screen. FIG. 35 illustrates this animation over three stages 3505-3515. The first stage 3505 is the same as the second stage 3110 of FIG. 31, and the third stage 3505 is the same as the third stage 3115 of that figure (without the additional swipe gesture shown in the third stage 3115 of FIG. 31). The second stage 3510 illustrates the animation of some embodiments to transition between these stages. Specifically, at this stage, the information panel and part of the map view for the first predicted route has slid off of the display, while the entirety of the information panel and part of the map view for the second predicted route has slid onto the display.

Figure 36:
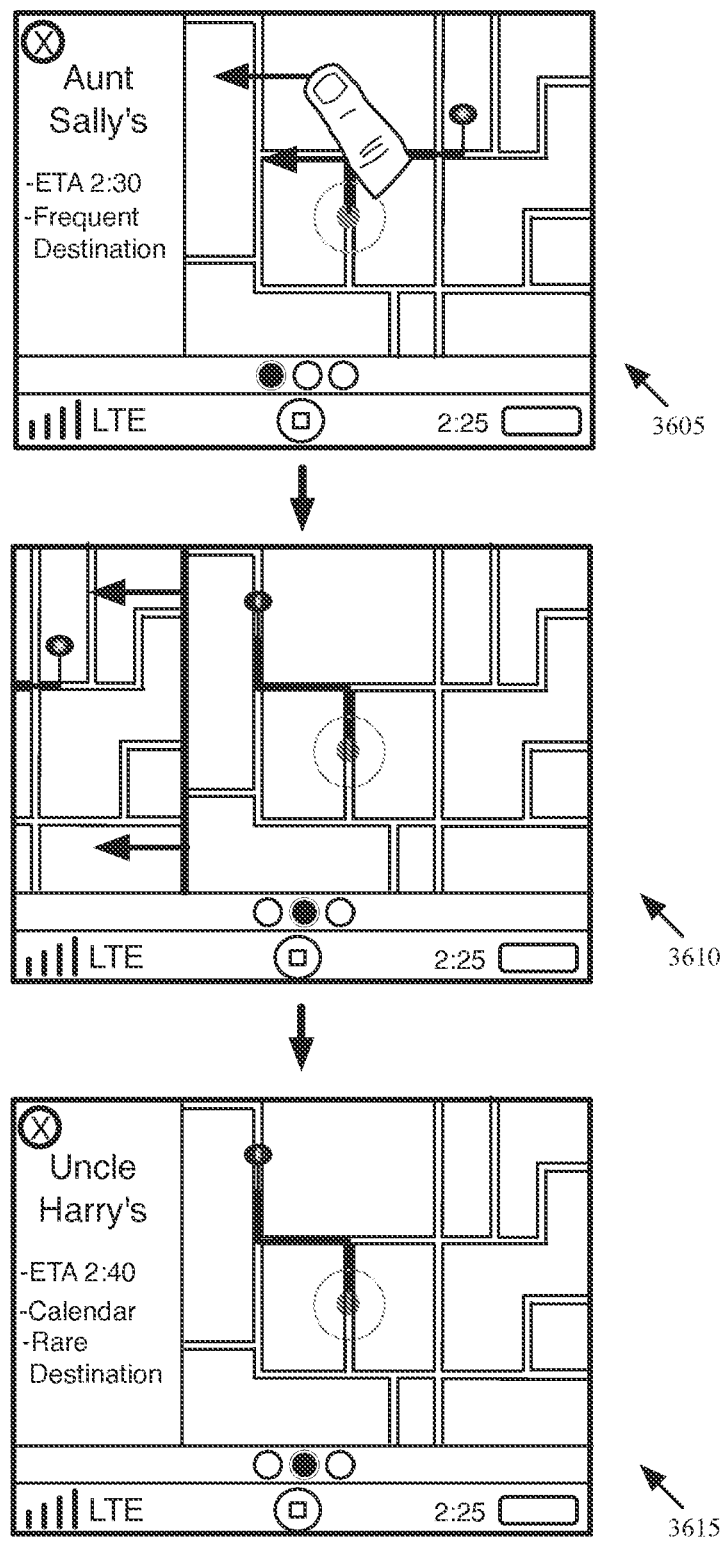
FIG. 36 illustrates the animation between two predicted route displays when the displays are arranged conceptually as stacked cards.

In some embodiments, a different arrangement and animation of the predicted routes is used. Rather than arranging the displays for the predicted routes one after another in a filmstrip, some embodiments conceptually treat the displays for different routes as cards stacked on top of each other. FIG. 36 illustrates the animation between two predicted route displays for this type of arrangement. As shown at the first stage 3605, in some embodiments, the application does not display a portion of the information for the second predicted route while showing the view for the first route. While this is shown for the stacked-card arrangement, one of ordinary skill will recognize that some embodiments that use the filmstrip arrangement will also not display any portion of the information panel for the next predicted route. As in the previous figure, at this stage the user performs a swipe gesture to cause the application to display the second predicted route.

The second stage 3610 illustrates that, rather than animating the display for the second predicted route sliding off of the screen as the first predicted route display slides onto the screen, in this example the application reveals the second predicted route display underneath as the first predicted route display slides off. In the third stage 3615, the animation has completed and the second predicted route display occupies the entire screen.

As with many of the other features described above, the predictive routing feature enables the user to quickly and easily find a desired destination and enter a turn-by-turn navigation mode towards that destination. While the illustrated interface for the predictive routing feature does not include a particular control for entering navigation, in some embodiments when the mapping application receives a tap gesture within the display, the application enters the turn-by-turn navigation mode towards the currently shown destination. In different embodiments, this tap input may be located within the map view for a destination, within the information panel for the destination, or within either of these areas.

Figure 37:
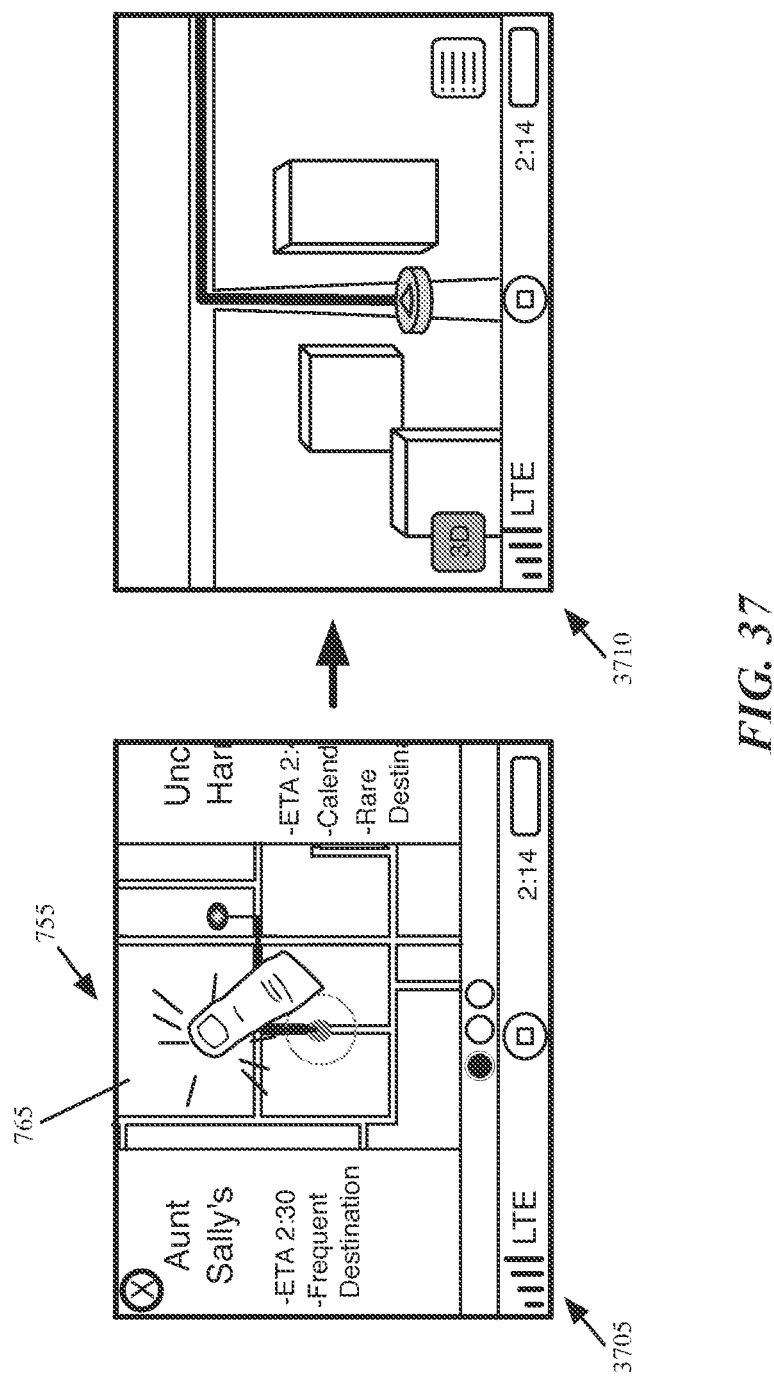
FIG. 37 illustrates a feature of the predictive routing interface of some embodiments for entering the turn-by-turn navigation mode of the mapping application.

FIG. 37 illustrates this feature of the predictive muting interface of some embodiments for entering the turn-by-turn navigation mode of the mapping application over two stages 3705-3710. The first stage 3705 illustrates the predictive routing interface 755 of some embodiments, as shown in the previous figures. In this stage, a user performs a tap gesture over the map view panel 765 with Aunt Sally's as the currently displayed destination. As shown at the second stage 3710, based on this gesture, the mapping application has entered its turn-by-turn navigation mode for a route heading to Aunt Sally's. In other embodiments, the application displays a specific selectable option for entering turn-by-turn navigation, and a tap gesture over the display instead returns the display to the map exploration user interface. The turn-by-turn navigation mode of some embodiments will be described in further detail in the following Section VI.

In the above examples, the predictive routing user interface displays a series of predicted destinations, as well as routes to those destinations. In some embodiments, when the user selects the predictive routing control, the application displays on the vehicle screen traffic information in the vicinity of the vehicle. For instance, if the vehicle is traveling on a freeway, some embodiments indicate whether the traffic is normal, lighter than usual, or heavier than usual on the freeway. Some embodiments display such a vicinity-based information panel first, then the user can swipe to view the above-described destination-based panels.

Figure 38:
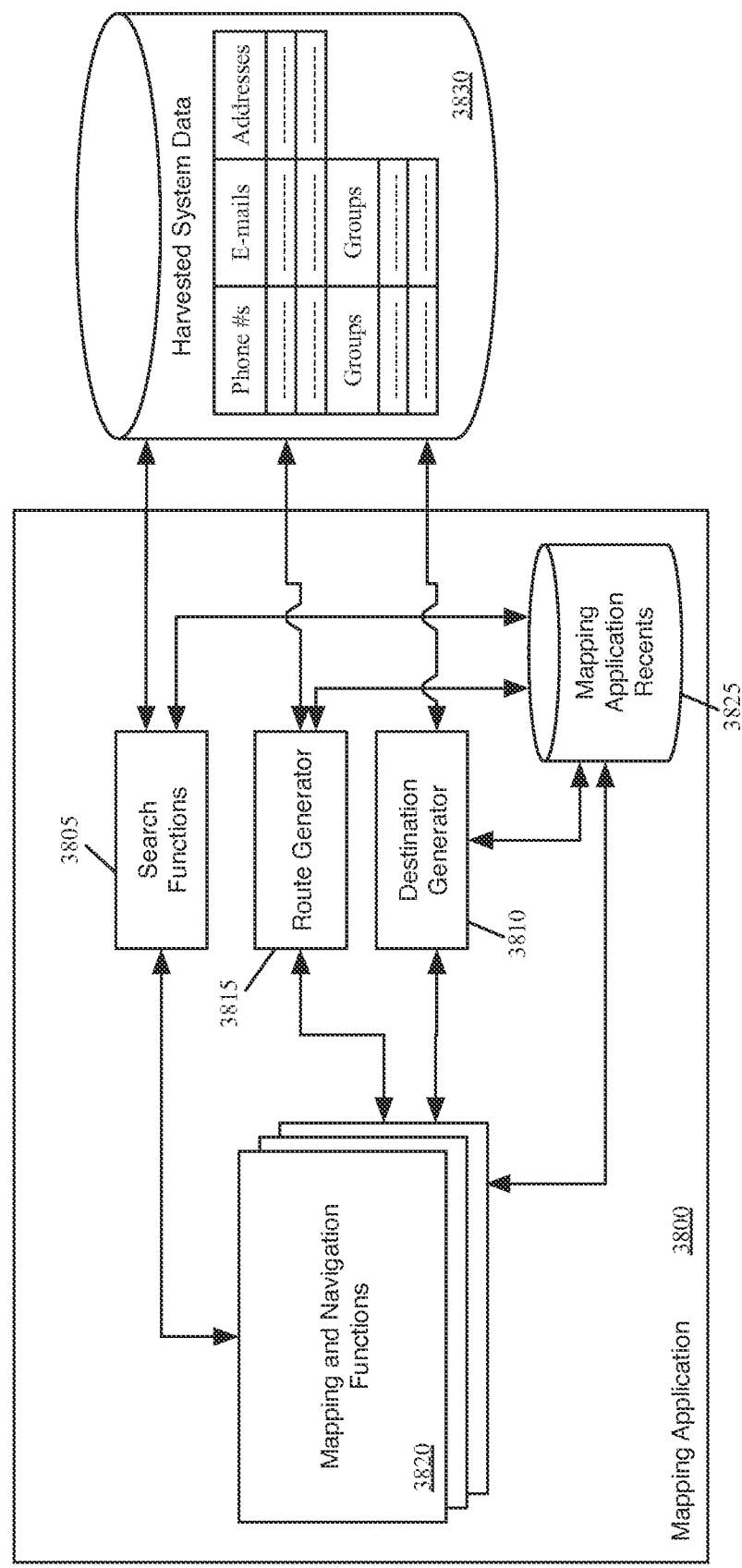
FIG. 38 conceptually illustrates a simplified software architecture of a mapping and navigation application of some embodiments that operates on a mobile device and performs predictive routing.

FIG. 38 conceptually illustrates a simplified software architecture of a mapping and navigation application 3800 of some embodiments that operates on a mobile device and performs the predictive routing features discussed above. As shown, the mapping application 3800 includes search functions 3805, a destination generator 3810, a route generator 3815, and additional mapping and navigation functions 3820. In addition, the mapping application stores a mapping application recents database 3825, and the mobile device stores harvested system data 3830.

The mapping application recents database 3825 stores, in some embodiments, data about recent searches performed by the mapping application (e.g., by the search functions 3805). For example, in the above examples, when a search result yields a specific destination, the application stores that destination in the recents database 3825. When the search is performed over a particular category (e.g., coffee shops), some embodiments store the category in the mapping application recents database 3825 as well.

The harvested system data 3830, in some embodiments, is not stored specifically by the mapping application. Instead, an address harvester that runs separately on the mobile device (e.g., within the operating system) stores various data within the harvested system data 3830. In some embodiments, the address harvester stores phone numbers, e-mail addresses, and physical addresses in the harvested system data 3830. In some embodiments, the phone numbers are harvested from phone calls and/or text messages, and the e-mail addresses are harvested from e-mails and/or text messages. In addition, the data may include groups of phone numbers and/or groups of e-mail addresses that were used to send messages or e-mails to several recipients at once.

The harvested physical addresses may come from numerous different sources in some embodiments. For instance, e-mails and text messages may include physical addresses that a harvester recognizes by their formatting and stores in the database 3830. Scheduled events (e.g., from an electronic calendar or an electronic ticket repository) may include a location and the system data 3830 stores this information (as well as times associated with the events, in some embodiments). In some embodiments, a web browser running on the mobile device allows a user to select addresses (e.g., of a place of business that the user looks up in the web browser) and add those addresses to the data store 3830. In some embodiments, the harvested system data 3830 includes contacts information from the user's address book, which may include phone numbers, e-mail addresses, and physical addresses.

The harvesting of both telecommunications addresses (e.g., e-mail addresses and phone numbers) and physical addresses is described in further detail in U.S. Provisional Application 61/832,850 and the concurrently filed U.S. patent application Ser. No. 14/081,852, entitled "Harvesting Addresses." which are incorporated by reference above.

The mapping and navigation functions 3820 perform a wide variety of mapping and/or navigation processes for the mapping application. These functions may include identifying map tiles from which to generate map displays and retrieving the map tiles from a remote server, matching a device location to a location on a map, retrieving route information from a server, generating text and/or graphical navigation instructions for a route based on the retrieved route information, generating one or more user interfaces for the application, and other functions.

The search functions 3805, in some embodiments, perform searches as described above by reference to FIG. 23. Thus, the search functions 3805 initially receive a search request (i.e., a set of search terms) and attempt to find one or more matching results (i.e., locations) within the physical addresses stored in the harvested system data. Thus, if a user has received an e-mail with an address on a particular street, the user can search for the street name on its own and the search functions 3805 will return the more specific address on the street by using the harvested system data 3830. When the search functions 3805 cannot find a result in the harvested system data 3830, then the search functions 3805 use a search engine to perform the search in some embodiments. Once search results are retrieved, from either source, the search functions 3805 store the search results to the mapping application recents database 3825 in some embodiments. Thus, when the user requests recent locations, the application uses the recents database 3825 to populate the fields in the requesting user interface. In addition, the search results are sent to the mapping and navigation functions 3820 for output to one or more user interfaces.

The destination generator 3810 of some embodiments uses travel history of the device, harvested physical locations from the harvested data 3830 (e.g., contact information, addresses received in messages or e-mails within a particular recent time period, locations of scheduled events, etc.), and/or locations from the mapping application recents database 3825, along with additional inputs such as the system clock (to retrieve the current time) and a location identification engine (to retrieve a current location). The destination generator 3810 uses this data to identify predicted destinations to which it expects the device (and thus the user) to travel. The mapping application can then retrieve routes to the predicted destinations from the current location (e.g., from a directions server that generates routes from one location to another), and use the predicted destinations and associated routes to populate various user interface features. For instance, the predictive routing interface for the vehicle display described in this section uses these predicted destinations and routes to the destinations in some embodiments.

In some embodiments, the route generator 3815 creates sets of associated destinations, with each set specified as a possible route for traveling. In some embodiments, each set of associated destinations includes start and end locations, a number of locations in between the start and end locations, and a number of motion records specifying rate of travel (e.g., between the locations). In some embodiments, the predicted route generator uses a machine-learning function to stitch together previously unrelated destination, location, and motion records into contiguous sets that specify potential routes. As with the output of the destination generator 3810, the routes generated by the route generator 3815 may be used by the mapping application of some embodiments to output useful prediction information (e.g., to identify that a user is likely to be following a particular route soon and warn the user about traffic along that route). The destination and route prediction functions of some embodiments are described in further detail in U.S. Provisional Application 61/832,928 and U.S. patent application Ser. No. 14/081,899, filed Nov. 15, 2013, entitled "Warning for Frequently Traveled Trips Based on Traffic." which are incorporated by reference above.

Figure 39:
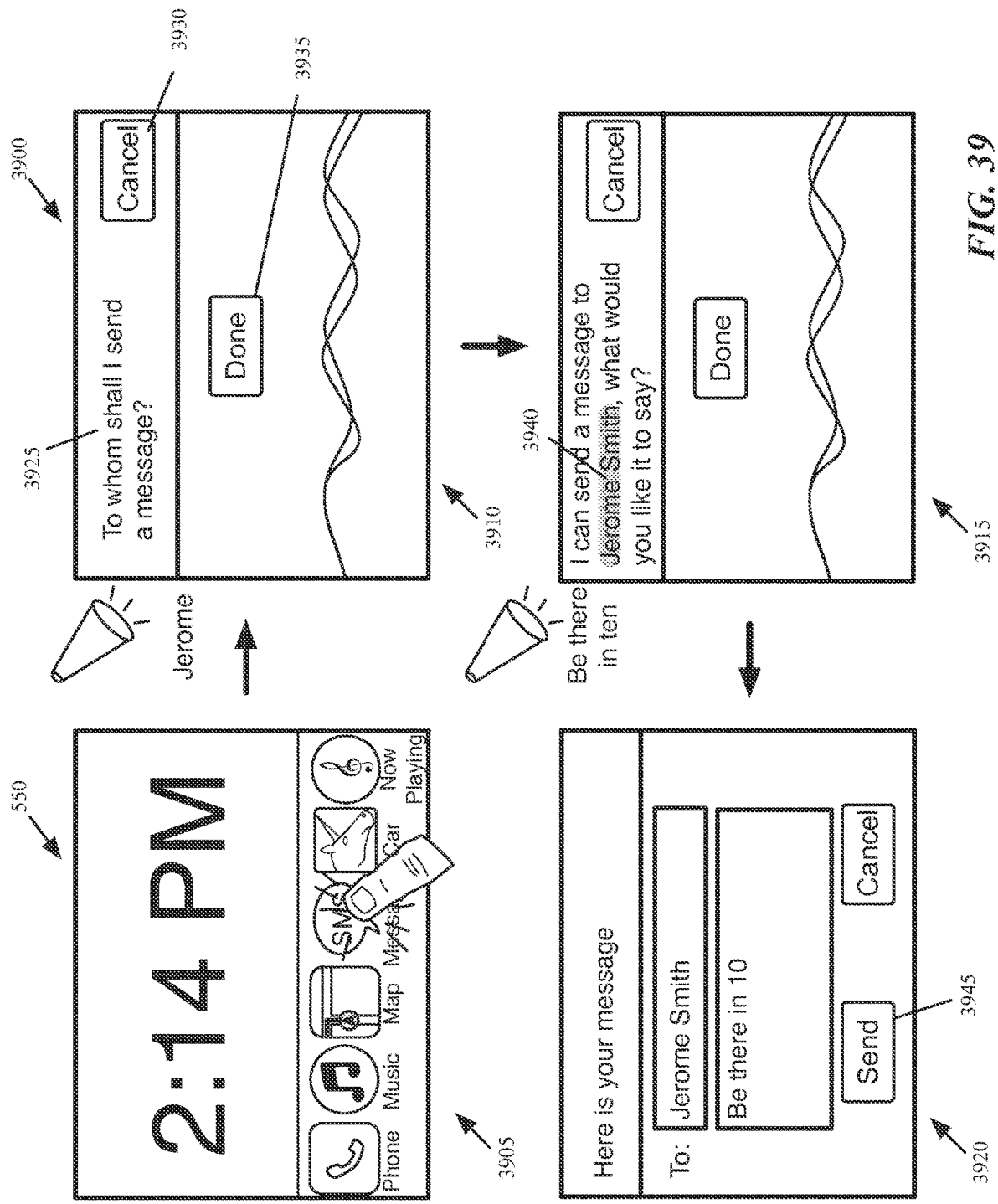
FIG. 39 illustrates the vehicle display screen over four stages in which a user activates a messaging function and dictates a message to a recipient.

In addition to the mapping application functions described above, the harvested system data may be used for other features of the mobile device. For instance, in some embodiments the harvested system data 3830 can be used by the e-mail or messaging functions to quickly identify a recipient for a message. This may be especially useful for the vehicle interface, which in some embodiments performs messaging through dictation, without any typing. FIG. 39 illustrates the vehicle display screen over four stages 3905-3920 in which a user activates a messaging function and dictates a message to a recipient. The first stage 3905 illustrates the touchscreen home page 550 of some embodiments. In this case, the user selects the messaging control 564, in order to activate a messaging (e.g., SMS) feature of the mobile device.

The second stage illustrates a messaging interface 3900 of some embodiments. The messaging interface 3900 includes a prompt 3925 (which may also be output as audio via the vehicle speakers), a cancel control 3930 for closing the messaging interface without sending a message, and a done control 3935 for indicating to the messaging application that dictation has completed. In some embodiments, unlike the search function of the messaging application, the messaging application uses a more interactive voice recognition feature, in which the answers to a first prompt may be used to inform recognition of answers to subsequent prompts. In the second stage 3910, the messaging feature requests a recipient for a message, and the user dictates "Jerome".

The third stage 3915 illustrates that the messaging feature uses the harvested data of some embodiments to identify a telecommunications address (e.g., phone number, e-mail) to which to send the data. In this case, although the user does not have any contacts named Jerome, a text message had previously been received correlating the name Jerome Smith to a phone number. Thus, the messaging interface 3900 now requests that the user dictate a message to Jerome Smith. As shown by the highlighting 3940, the recipient is a selectable item in some embodiments, which the user can select in order to change recipients for the message. Also, at this stage, the user dictates a message, "Be there in ten". The fourth stage 3920 illustrates the resulting message, with a control 3945 for allowing the user to send the message.

VI. Navigation Mode

As described above, the mapping application vehicle user interface of some embodiments is designed for the user to quickly and easily identify a destination for entering turn-by-turn navigation. When the mobile device on which the mapping application operates is connected to the vehicle display system, in some embodiments the mapping application outputs different views for navigation to the two different interfaces. Specifically, the mapping application outputs a map view from above and/or behind the vehicle to the vehicle display screen, while outputting only navigation instructions to the mobile device display screen.

Figure 40:
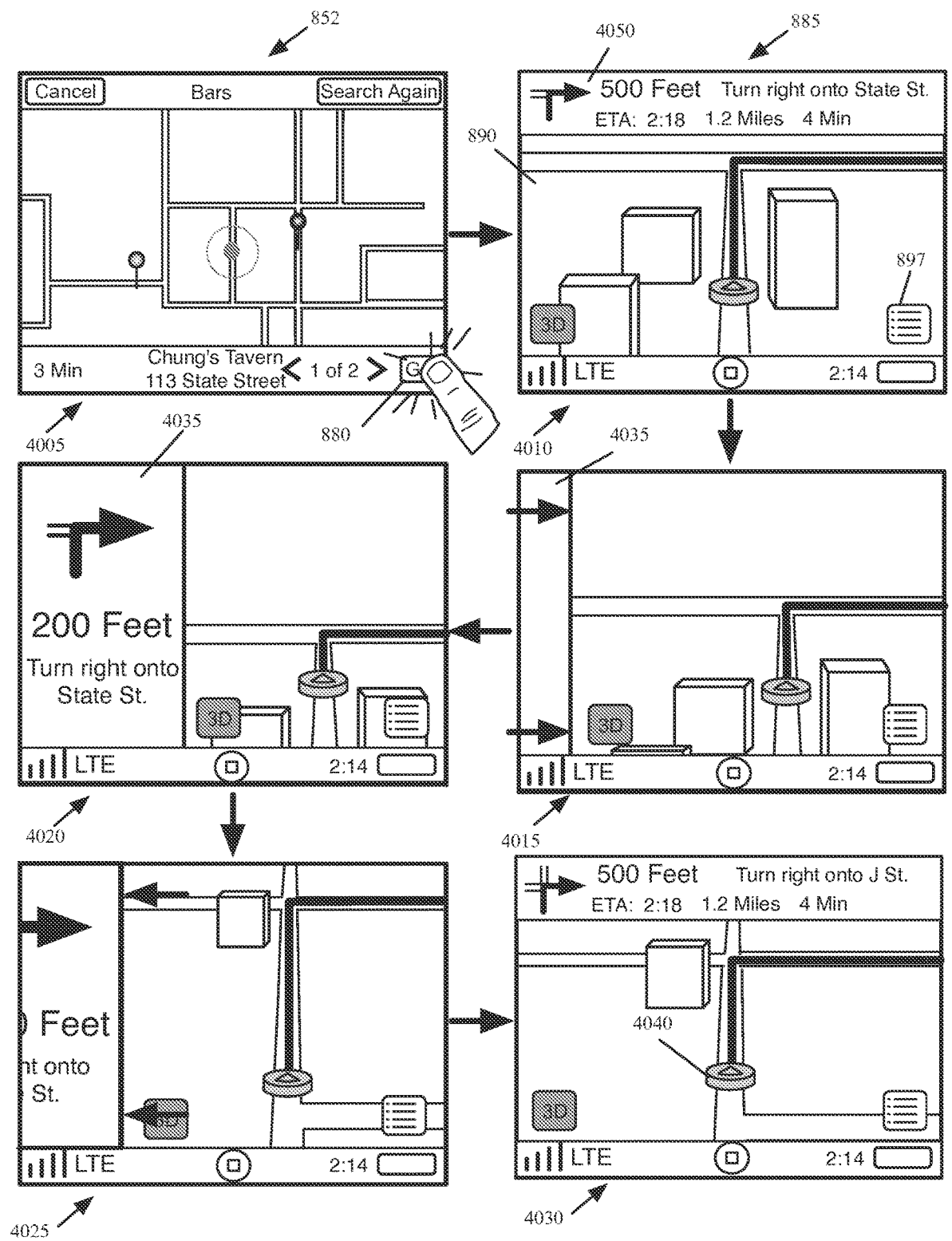
FIG. 40 illustrates the operation of the turn-by-turn navigation user interface of some embodiments for the vehicle display.

FIG. 40 illustrates the operation of the turn-by-turn navigation user interface of some embodiments for the vehicle display over six stages 4005-4030 in which the vehicle approaches an intersection and a user follows navigation instructions to perform a maneuver at the intersection. The first stage illustrates the search result map view page 852, with a particular search result and possible destination selected. In addition, at this stage 4005, the user selects the control 880 to enter turn-by-turn navigation.

The second stage 4010 illustrates that the mapping application has entered turn-by-turn navigation mode, and now displays the navigation mode user interface 885 of some embodiments on the vehicle display screen. As described above, the navigation user interface 885 includes the lower information bar, a navigation map 890, a 3D control 895, and a direction list control 897. The navigation user interface 885 additionally includes a navigation information bar 4050. In some embodiments, this bar is displayed in such a way as to appear similar to a street sign.

The 3D control 895 enables a user to toggle the navigation map 890 between 3D and 2D animation, while the direction list control 897 enables the user to view a list of instructions for upcoming maneuvers along the route being traveled. As shown, some embodiments automatically begin navigation with the 3D control 895 selected and the navigation map in three dimensions. Other embodiments begin navigation in two dimensions by default rather than the three dimensional view. In some embodiments, whether to begin in 2D or 3D is a user-selectable option within the mapping application. In addition, some embodiments animate the transition from the map view shown in the first stage 4005 to the navigation view shown in the second stage 4010.

The navigation information bar 4050 includes information about the next maneuver along the navigated route as well as route summary information. Specifically, the route summary information of some embodiments includes the estimated arrival time (2:18), distance remaining in the route (1.2 miles), and time remaining for the route (4 minutes). The summary of the next maneuver along the route includes a graphical representation of the maneuver and intersection, a distance to the next maneuver that counts down, and text instructions describing the maneuver. This maneuver summary information will be described additionally below by reference to the navigation instruction panel 4035, shown in subsequent stages of this figure.

As the vehicle to which the mobile device running the mapping application is connected approaches a maneuver, the application of some embodiments slides a navigation instruction panel into the navigation user interface 885 in order to alert the driver of the upcoming maneuver to perform. The third stage 4015 illustrates that as the vehicle approaches the intersection where the route turns right, a navigation instruction panel 4035 begins to slide onto the display, as represented by the right-facing arrows (which are not actually displayed within the user interface). The mapping application of some embodiments animates the introduction of this panel once the vehicle approaches within a threshold distance (e.g., 250 ft., 200 ft., 100 m, etc.) of the intersection at which the maneuver will be performed.

In some embodiments, the navigation instruction panels always appear on the driver side of the display. Therefore, in countries such as the United States, that drive on the right side of the road (with the driver seat on the left side of the car), the application places the panel on the left side of the display. On the other hand, in countries such as the United Kingdom that drive on the left side of the road (with the driver seat on the right side of the car), the application places the navigation instruction panel on the right side of the display.

The third stage 4015 also illustrates that the application no longer displays the navigation information bar 4050 in the UI. In some embodiments, the application either removes the information bar or animates out the information bar (e.g., by sliding the bar off of the display, fading out the bar, etc.) before sliding the information panel 4035 onto the screen (or otherwise animating its appearance). Because the next maneuver information is displayed in the information panel and the route summary information is not needed for the short period approaching a maneuver, the application can remove the bar for this period of time. In various other embodiments, the information panel 4035 slides over the information bar as the information bar animates off of the display, or the information bar shrinks so as to fit within the width of the display reserved for the map view 890.

The fourth stage 4020 illustrates the navigation user interface 885 after the animation to slide the navigation instruction onto the display has completed. The 3D map view at this stage has been compressed into a smaller region of the display. In some embodiments, the mapping application smoothly animates the compression of the navigation map 890, while sliding the 3D control 895 with the map.

The navigation instruction panel 4035 of some embodiments is designed to have the appearance of a road sign, such as one might see along the side of a freeway. Some embodiments use different colors, textures, or other aspects of the appearance of the navigation instruction panel to match the appearance of road signs in the location (e.g., country, state, etc.) of the vehicle. Within the panel, the application displays (1) a graphical instruction of the upcoming maneuver to perform and (2) a text instruction describing the maneuver.

In some embodiments, the mapping application generates, for each maneuver along a route, at least two different stylized graphical indicators. These include a complex graphical indicator that shows all roads entering and leaving the intersection as well as an arrow indicating the maneuver through the intersection, and a simpler graphical indicator that shows only an arrow indicating the maneuver (e.g., a right turn). In this case, the application uses the more complex graphical indicator in the navigation panel, as well as in the information bar 4050. The graphical maneuver indicators of some embodiments are described in greater detail in the U.S. application Ser. No. 13/632,117, filed Sep. 30, 2012, which is incorporated herein by reference.

The mapping application of some embodiments additionally generates several different sets of text instructions for each maneuver along a route based on information derived from the route. The application synthesizes various instruction elements based on route data, then combines these instruction elements in different ways to generate sets of text instructions. The application then uses one of the sets of text instructions based on the amount of space available, whether information is already displayed in a different form, and other factors. The text instructions of some embodiments are described in greater detail in the U.S. application Ser. No. 13/632,117, incorporated by reference above.

The fifth stage 4025 illustrates the navigation UI 885 after the vehicle (and therefore the device) has proceeded through the intersection along the route, as specified by the navigation instruction panel 4035. At this point, the panel 4035 begins sliding back off of the display (as indicated by the leftward facing arrows, which are not displayed in the UI). As the instruction panel slides off of the display, the map view increases in size and the 3D control moves back to the left, with the opposite animation as that used for sliding the instruction panel into the display.

While not shown in this figure, in some embodiments the navigation instruction panel counts down the distance to the intersection at which the vehicle will perform the displayed maneuver. In the fourth stage 4020, the instruction panel displays 200 feet as the distance to the next intersection. Before removing the sign in the fifth stage 4025, the application changes this displayed number at various threshold distances from the intersection (e.g., 150 ft., 100 ft., 50 ft., 40 ft., 30 ft., 20 ft., and 10 ft., or a different combination of distances).

The sixth stage 4030 illustrates the navigation UI 885 after the application has completed the removal of the instruction panel from the display. The navigation information bar 4050 has returned, and displays a summary of the new next maneuver. At this point, the navigation map view will follow along behind the indicator of the device location 4040 until the next intersection is approached, or the user selects one of the controls in the user interface (e.g., the 3D control or the list control).

Figure 41:
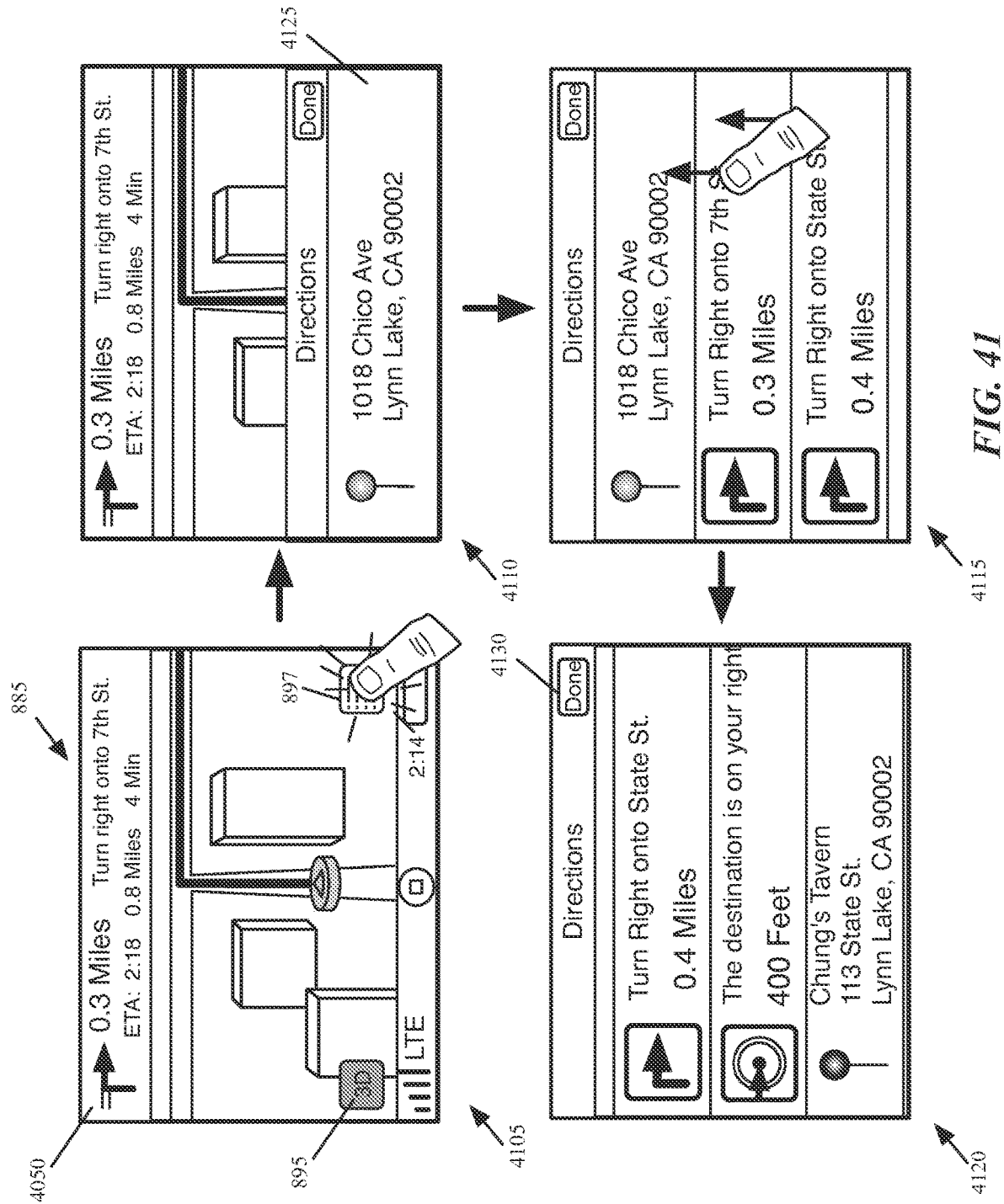
FIG. 41 illustrates the animation of the direction list in the vehicle interface of some embodiments.

When the user does select the direction list control during navigation, the mapping application of some embodiments animates a presentation of a list of maneuvers to perform for the currently presented route over the navigation view. FIG. 41 illustrates the animation of the direction list of some embodiments over four stages 4105-4120. The first stage 4105 illustrates the navigation user interface 885, as described above by reference to FIG. 40, with a 3D control 895 and direction list control 897, and navigation information bar 4050. In this first stage, the user selects the direction list control 897 (with a tap input) to cause the application to display the direction list rather than the navigation map presentation.

The second stage 4110 illustrates that, as a result of the user selection, the application begins animating a direction list 4125 onto the vehicle display. As shown, in some embodiments, the application slides the direction list upwards over the map view from the bottom of the display screen. In other embodiments, the direction list may slide in from the left or right, from the top, or may appear on the screen via a different animation (e.g., an enlargement of the direction list control to the size of the full screen).

The third stage 4115 illustrates the display after the animation to display the direction list 4125 has fully completed. As shown, in some embodiments, the direction list begins with a starting location (1018 Chico Ave . . . ). When a name for the location is available (e.g., based on contact information indicating a particular person's house, map data indicating a place of business, etc.), some embodiments additionally display this name as part of the starting address.

Next to the address, the application displays a pin to indicate that the entry in the direction list is a location, rather than a maneuver.

Below the starting location, the direction list includes an entry for each maneuver along the route. In some embodiments, the mapping application receives route data from a mapping server as a series of junctions through which the route travels. The mapping application identifies the junctions at which maneuvers will be performed, and generates graphical indicators and sets of instructions for these maneuvers (as described above). Within an entry in the direction list, some embodiments use the simplified graphical indicator for each maneuver (e.g., an arrow showing the maneuver that does not include the other roads at the intersection). In addition, each entry for a maneuver along the route includes a distance from the previous maneuver and a set of text instructions generated as described above.

In some cases, the entire direction list may not fit on the display screen. In order to view additional directions, the user can scroll through the list in some embodiments. The third stage 4115 illustrates a user performing an upward swipe gesture over the direction list 4125. As a result, the fourth stage 4120 illustrates that the application has scrolled the direction list to its end, such that the destination (and thus the end of the route) is now displayed. Some embodiments include two entries to indicate the destination. The second to last entry in the list includes an indicator of the end of the route, with information about the distance from the previous maneuver to the destination and information informing the user regarding on which side of the street the destination is located. The final entry includes name and address information for the destination, similar to the starting address information.

Because the user explores the direction list by using swipe gestures to scroll through the list, some embodiments include additional controls for scrolling up and down in the low-quality touchscreen interface. For instance, some embodiments display up and down arrows along the right or left side of the direction list that the user can select with a tap input in order to scroll the list by a particular amount (e.g., one entry, three entries, etc.).

The direction list 4125 additionally includes a control 4130 for returning to the navigation presentation 885. When a user selects this control, the application displays the reverse animation of that used to display the direction list. For instance, in this example, selecting the control 4130 would cause the application to slide the direction list downwards on the display, revealing the navigation map view underneath.

In this example, the direction list 4125 slides up and over the navigation information bar 4050. In other embodiments, however, the direction list 4125 only covers the display of the map view of navigation, and not the direction list. This enables the user to view the direction list while also able to see the summary information (e.g., the estimated arrival time, next maneuver) which may be useful to the user.

Figure 42:
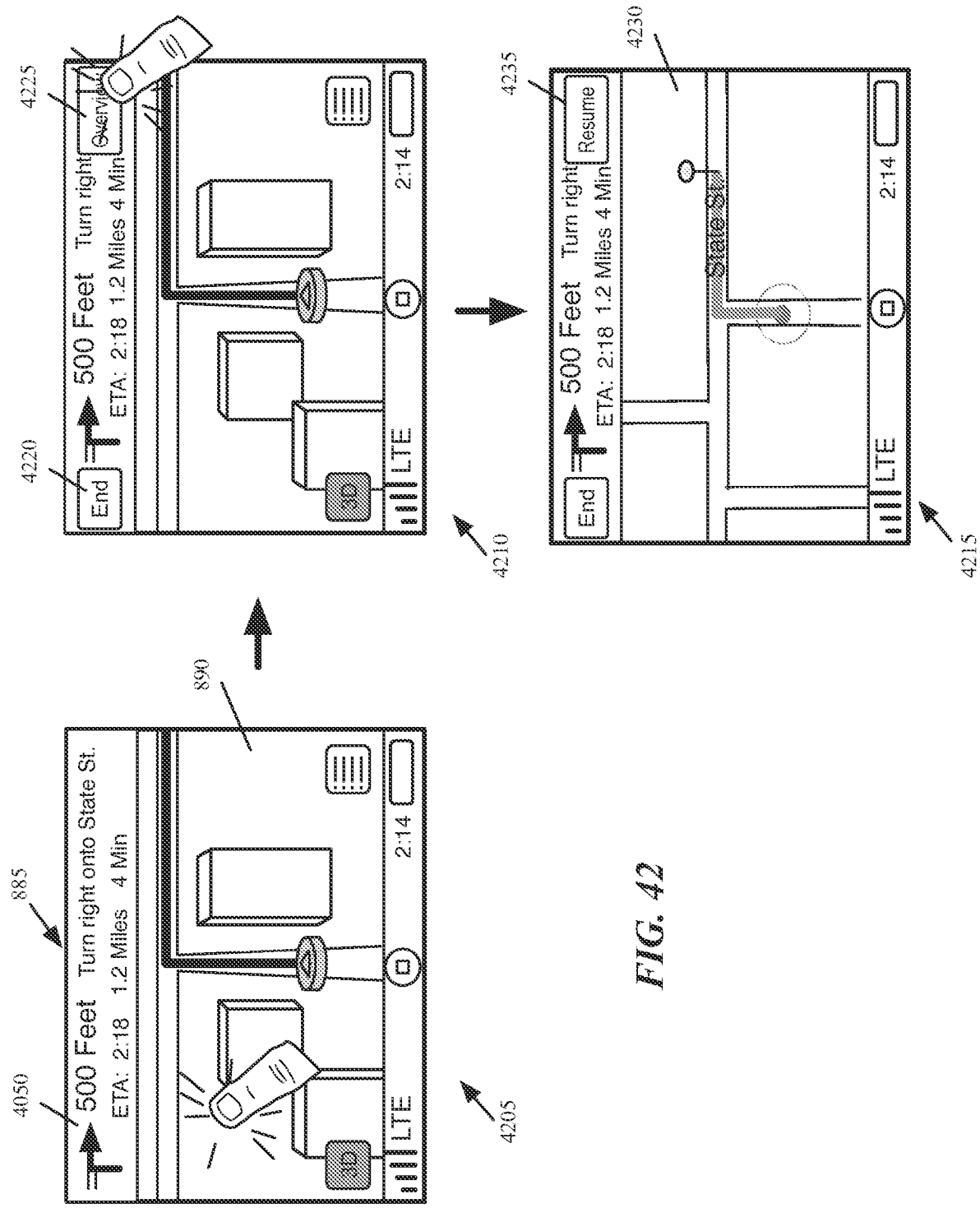
FIG. 42 illustrates a user accessing an overview mode in the vehicle user interface.

In some embodiments, the user can view the navigation map in overview mode, rather than the animated view from above and/or behind the representation of the moving vehicle. FIG. 42 illustrates a user accessing this overview mode in the vehicle user interface over three stages 4205-4215. In this first stage 4205, the user performs a specific type of touchscreen input (in this case, a tap, though in different embodiments different inputs may be used) over the animated map view 890 of the navigation user interface 885.

The second stage 4210 illustrates that this action causes the application to modify the navigation information bar 4050. The upper portion of the vehicle display now includes an end navigation control 4220 and an overview control 4225. The end navigation control 4220 allows the user to end the current turn-by-turn navigation mode and return to the map exploration interface. The overview control 4220 allows the user to view an overview of the route being navigated. In addition, the route and maneuver information in the navigation information bar is compressed to fit within a smaller area. This bar continues to display the same route summary information (arrival time, remaining distance, remaining time), and also displays the graphical representation and distance to the next maneuver in the same manner. The text instructions, however, use a shorter version in order to fit within the smaller area. Some embodiments remove the text instructions altogether.

The user selects the overview control 4225 at the second stage 4210 (via a tap input). As a result, the mapping application displays a mute overview map 4230 at the third stage 4215. The overview map of some embodiments displays a map at a zoom level such that the entirety of the remaining route, from the current location to the ending location, fits within the display. In addition, the map shows the route line for the remainder of the route. Some embodiments, rather than showing the remaining route, display the entirety of the route from the starting location to the destination. The display also includes a resume navigation control 4235 in place of the overview control 4225. Selection of the resume navigation control causes the application to resume the animated map view of navigation shown in the first stage 4205.

This figure (and the other figures in this section) illustrate turn-by-turn navigation within the touchscreen user interfaces of some embodiments. However, the non-touchscreen interfaces also have the capability to enter turn-by-turn navigation mode. Some embodiments limit the functionality for non-touchscreen displays (e.g., always displaying in either 2D or 3D with no control to switch back and forth, not having a direction list control, etc.), while other embodiments use various types of inputs from the built-in vehicle controls to toggle between 2D and 3D presentations or to cause the application to animate the direction list onto or off of the display. Some embodiments, in fact, modify the mobile device interface during navigation (described below) to include the 3D control and direction list control. Selection of these controls on the mobile device then affects the non-touchscreen vehicle interface.

The above examples illustrate the vehicle display screen when the mapping application enters turn-by-turn navigation mode. In some embodiments, when the application enters the turn-by-turn mode, it locks the mobile device interface into a corresponding display. Specifically, the application displays on the mobile device on which the application operates a large set of instructions for the upcoming maneuver along the route being navigated in some embodiments.

Figure 43:
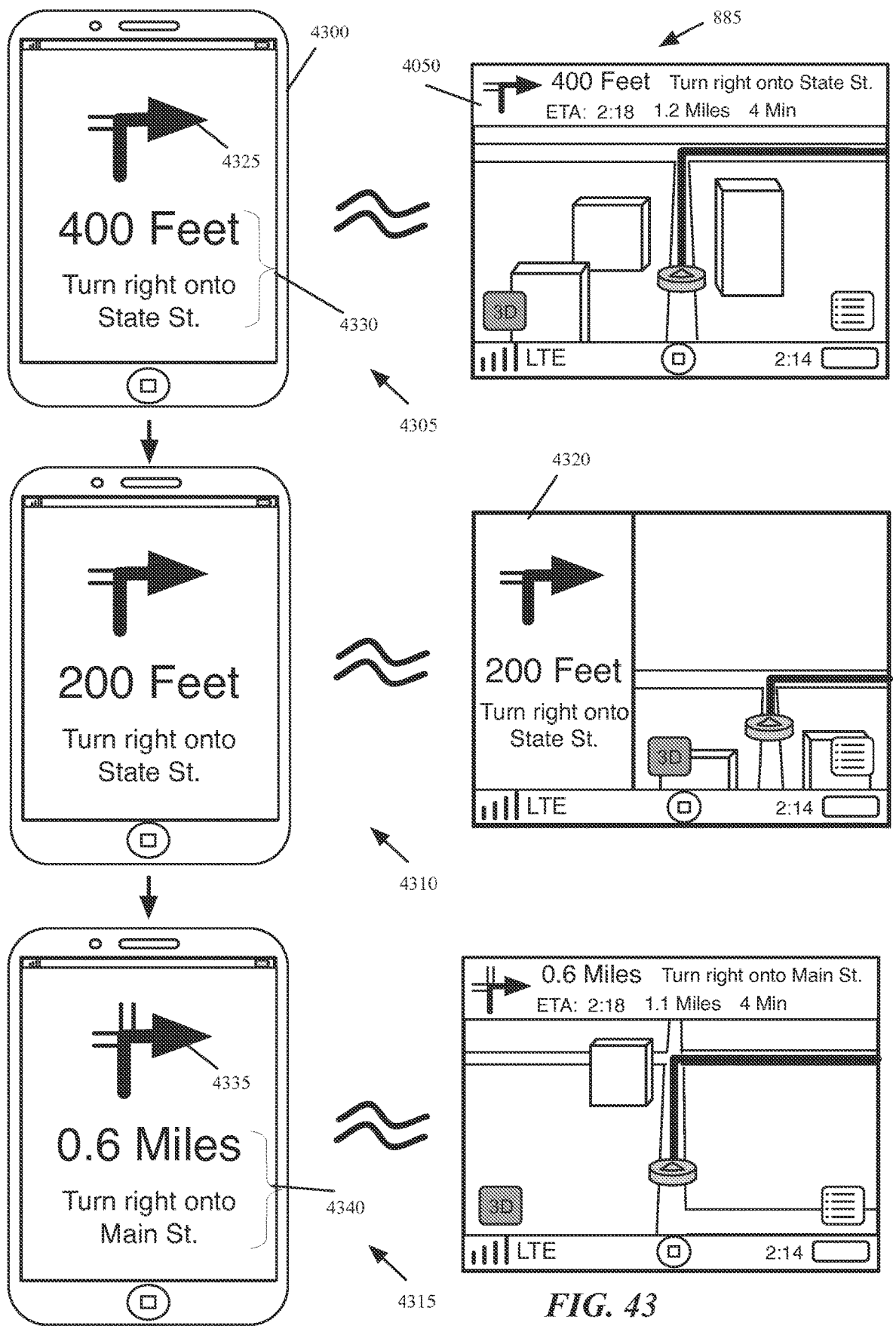
FIG. 43 illustrates the display of the mobile device during navigation according to some embodiments.

FIG. 43 illustrates the display of the mobile device during the turn-by-turn navigation mode according to some embodiments. Specifically, this figure illustrates the display of both the mobile device and the vehicle interface over three stages 4305-4315 as the user approaches and turns through an intersection. The first stage 4305 illustrates both a mobile device 4300 and the vehicle display screen after the mapping application has entered turn-by-turn navigation mode. As shown, the vehicle display screen displays the navigation mode user interface 885 of some embodiments.

The mobile device 4300 on which the mapping application operates displays a blank screen with only navigation instructions. Specifically, the mobile device displays a larger version of the navigation instruction panel for the next maneuver, irrespective of the distance to that next maneuver. This display includes the maneuver information also displayed in the navigation information bar 4050, without the route summary (e.g., ETA) information in some embodiments. Thus, until the navigation information bar 4050 is replaced with a navigation instruction panel, its distance to maneuver, graphical maneuver representation, and text instructions will be the same as the mobile device display. Once the navigation instruction panel is displayed on the vehicle screen, the mobile device display matches this instruction panel. While shown with a white background in these figures, some embodiments use a black background with white text and instructions rather than the other way around. At the first stage, the vehicle and device are beyond the threshold for displaying the navigation instruction panel within the vehicle display (400 ft. away from the next maneuver). However, the mobile device displays (1) a complex graphical indicator 4325 for the upcoming maneuver and (2) text instructions 4330 describing the maneuver.

As described above with respect to its display in the navigation instruction panel, the complex graphical indicator includes a thick arrow showing the maneuver through the intersection as well as lighter (e.g., dimmer, thinner, etc.) lines marking the other roads that enter and/or exit the intersection at which the maneuver will be performed. The text instructions indicate a regularly changing distance to the next maneuver, as well as information about the maneuver to perform (e.g., a particular type of turn onto a particular road). While this example shows a right turn, other instructions could include left turns, U-turns, merges, freeway exits, etc.

The second stage 4310 illustrates the two user interfaces as the vehicle and device approach the intersection at which the route makes a right turn onto State St. At this point, a navigation instruction panel 4320 has been animated onto the display, and the navigation information bar removed, because the vehicle and device are now closer to the intersection. Once present, the navigation instruction panel 4320 and the mobile device 4300 display the same information in some embodiments. However, the mobile device always displays the next instruction, enabling the driver or passenger to quickly view the next maneuver to perform irrespective of the distance to that next maneuver, without the need to view the entire direction list or even interact with either interface.

In the third stage 4315, the vehicle has maneuvered through the intersection and onto State St. Thus, the application has removed the navigation instruction panel 4320 from the display while enlarging the size of the navigation map presentation and returning the navigation information bar 4050. In addition, because the user has completed the maneuver, the mobile device 4300 now displays a new graphical indicator 4335 and text instructions 4340 for the new upcoming maneuver (another right turn, but at a four-way intersection rather than a three-way intersection), in both the mobile device display and the navigation information bar.

Figure 44:
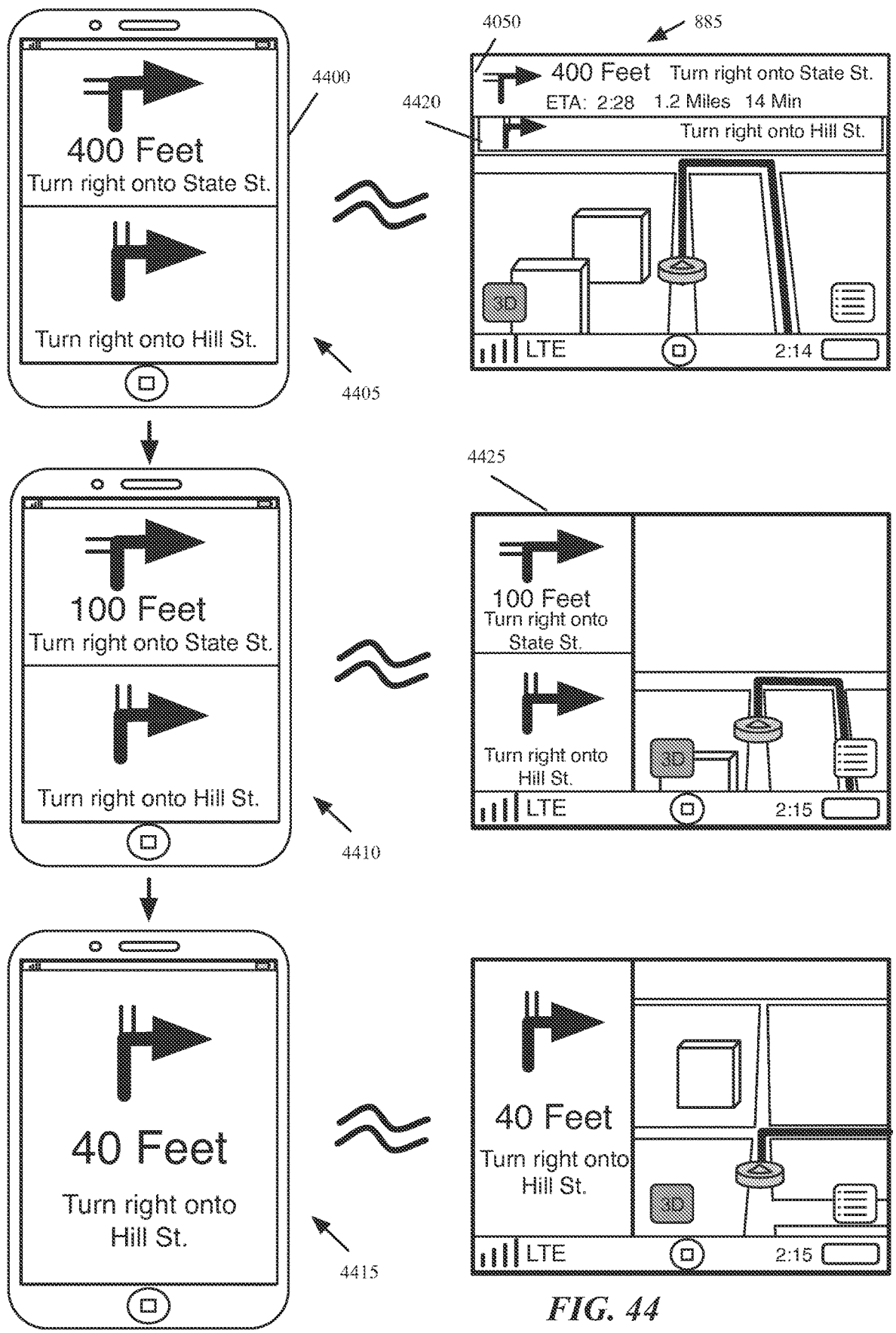
FIGS. 44 and 45 illustrate the display of both a mobile device and vehicle UIs of some embodiments in which the vehicle approaches a first maneuver with a second maneuver following the first in rapid succession.

In some cases, a navigated route will have two maneuvers within quick succession of each other. In some embodiments, the application modifies both the device and vehicle UIs to account for such maneuvers. FIG. 44 illustrates the display of both the mobile device and vehicle UIs over three stages 4405-4415 in which the vehicle approaches a first maneuver with a second maneuver following the first in rapid succession.

The first stage 4405 illustrates the two user interfaces when the vehicle (and device) are 400 feet from the first maneuver. At this stage, the navigation map UI 885 of the device does not yet display the navigation information panel, instead displaying the navigation information bar 4050. However, the subsequent maneuver will occur only a short distance (e.g., 50 ft.) after the next maneuver, and therefore the application displays a second navigation bar 4420 (or sign) below the information bar 4050. This second navigation bar 4420 only illustrates maneuver information, as including route summary information would be redundant. Thus, the navigation bar 4420 includes a stylized graphical representation of the second maneuver and text instructions for the maneuver. Because the second maneuver comes so quickly after the first, no distance from the first to second maneuver is presented. In addition, the mobile device 4400 displays a split screen to show the two maneuvers. In this example, the two maneuvers are given equal portions of the split screen, with the lower maneuver again not including a distance. However, other embodiments display the second maneuver in a smaller portion of the display screen.

The second stage 4410 illustrates the two displays after the vehicle has approached within a threshold distance of the first maneuver (e.g., within 200 feet). As a result, the application has slid a navigation instructions panel 4425 onto the left side of the display. As in the previous examples, this instructions panel mirrors the display shown on the mobile device. Thus, the instructions panel is split into an upper half displaying the summary information for the first maneuver and a lower half displaying the summary information for the subsequent maneuver.

The third stage 4415 illustrates the displays after the vehicle has performed the first maneuver. Because the maneuver after the turn onto Hill St, is more than a threshold distance (e.g., 200 ft.) of its previous maneuver, the application no longer displays a split screen for the device and split panel for the navigation instructions panel in the vehicle display. As shown, some embodiments display the distance to the maneuver once only one maneuver is shown, to give the same appearance as when the application had counted down to the maneuver from a greater distance.

Figure 45:
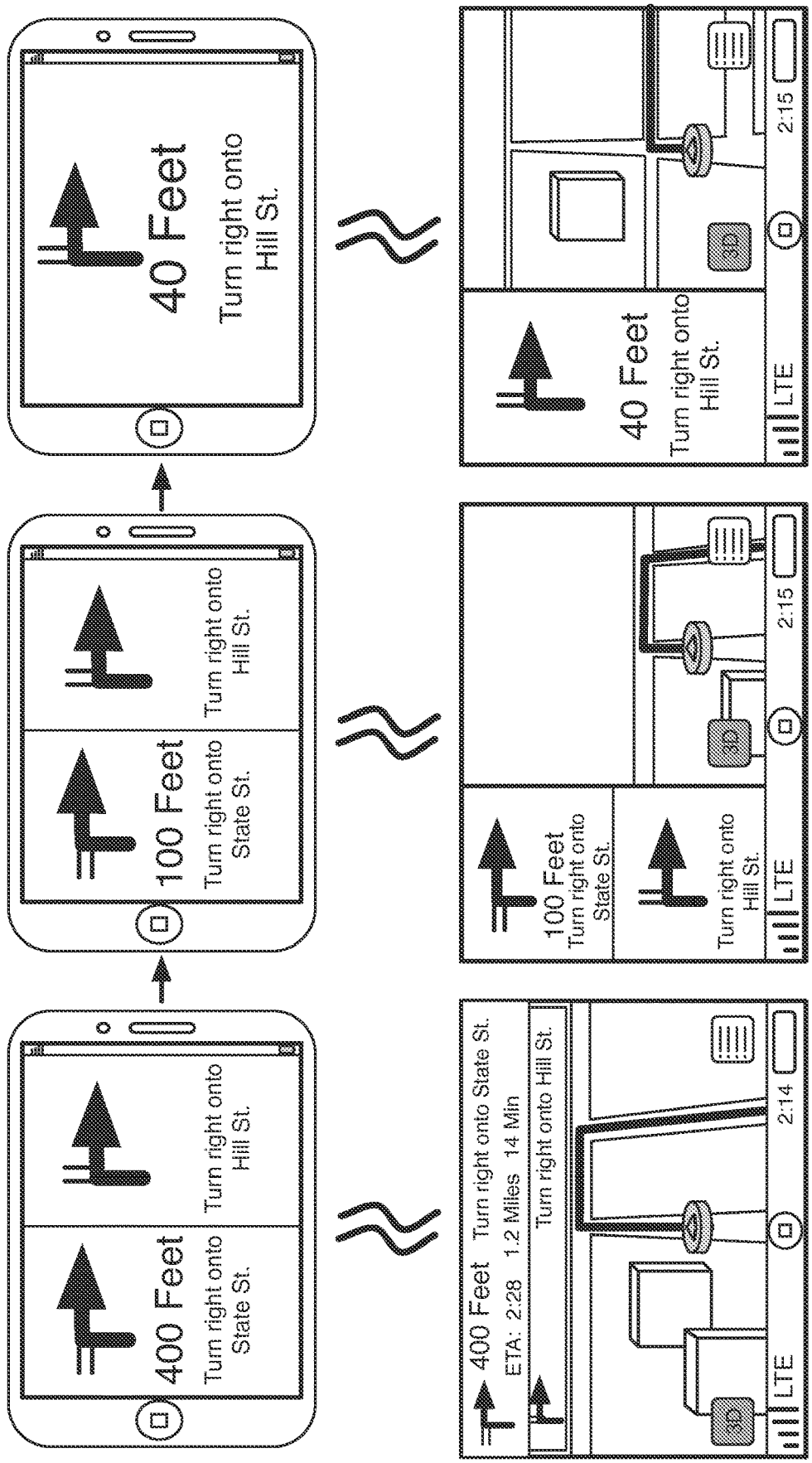

FIG. 45 illustrates the same situation, except that the mobile device is held in landscape orientation rather than portrait orientation. In this case, the progression of the vehicle display is unchanged from the previous figure. For the device in landscape orientation, the application splits the display horizontally rather than vertically for the two sets of maneuver instructions, with the instructions for the first maneuver appearing on the left side.

Figure 46:
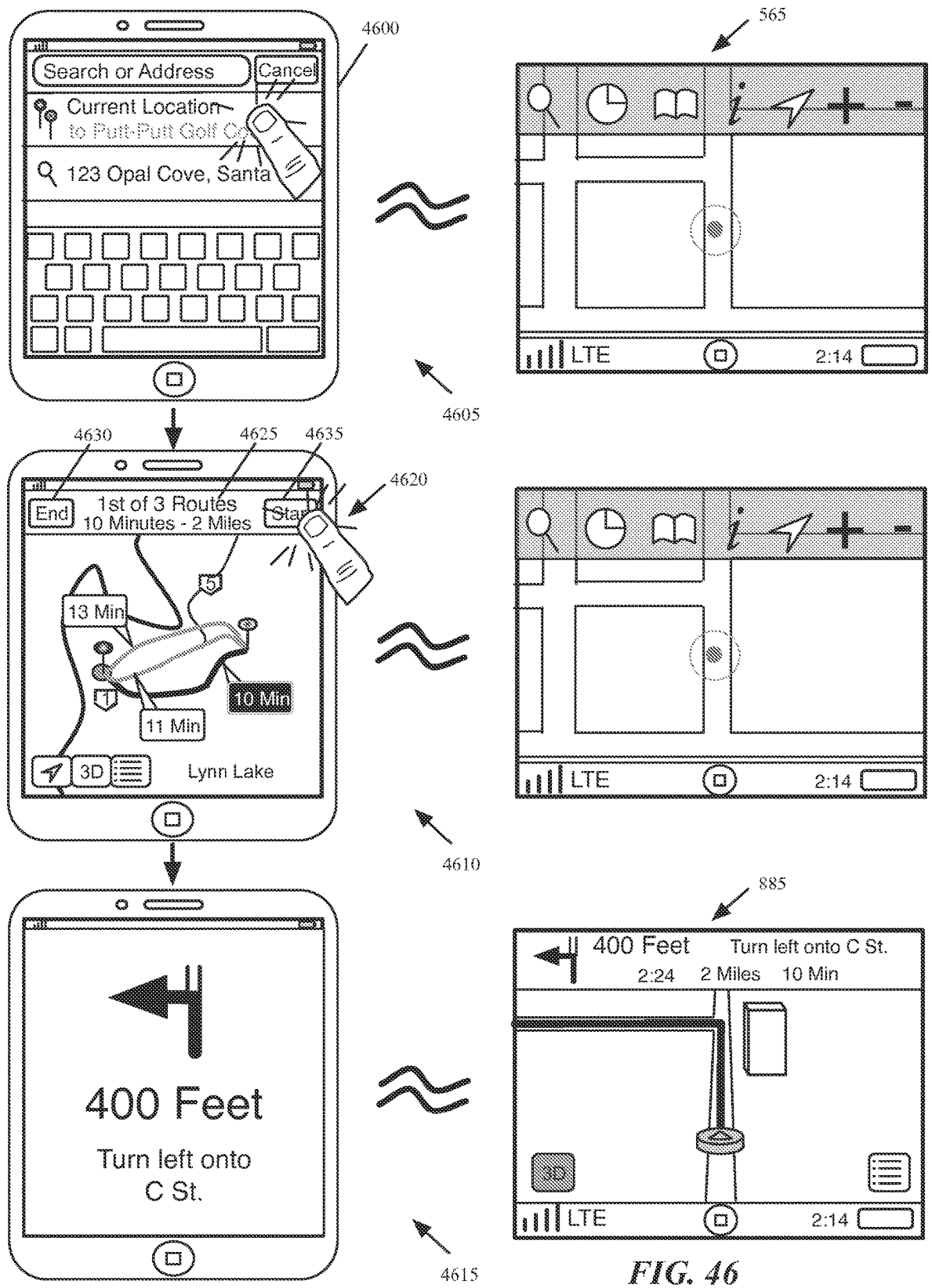
FIG. 46 illustrates a use of the device interface to request a mute from the device's current location to a destination location, then the subsequent selection to enter navigation.

In addition to entering navigation and arriving at the displays shown in FIGS. 43-45 by selecting a destination in the vehicle interface (as shown in FIG. 40), some embodiments also enable the user to select a destination and enter navigation via the mobile device interface. FIG. 46 illustrates a use of the device interface to request a route from the device's current location to a destination location, then the subsequent selection to enter navigation, over three stages 4605-4615.

The first stage 4605 illustrates that the mapping application is open on a mobile device 4600 while connected to a vehicle display. The vehicle touchscreen displays the high-quality touchscreen map exploration interface 565, while the user has previously selected a search field of the mobile device map interface to cause the application to display a list of recent routes and locations. The user selects a route from the device's current location to Putt-Putt Golf Course from this recents list.

As a result, the mobile device 4600 in the second stage displays a route display interface 4620 showing possible routes between the selected start and end locations. In addition to various map controls (e.g., a position control, 3D control, and a direction list control), the route display interface 4620 includes three selectable routes between the two locations. In some embodiments, the three labels that indicate the estimated travel time for each of the routes are selectable to select the corresponding routes. At the moment, a first route with a travel time of 10 minutes is selected. The route display interface also includes an information bar 4625, or banner, that includes information about the currently selected route. The information bar 4625 also includes an end route display control 4630 for returning to the standard map view interface 205 and a start navigation control 4635 for entering navigation along the selected route. Meanwhile, the vehicle display has not changed from the first stage to the second stage while the user views the route display interface 4620 on the mobile device.

In the second stage 4610, the user selects the start navigation control 4635 on the mobile device display. As a result, at the third stage 4615 the vehicle display screen now displays the navigation mode user interface 885, while the mobile device display shows a customized graphical indicator and set of text instructions describing the next maneuver along the selected route.

Figure 47:
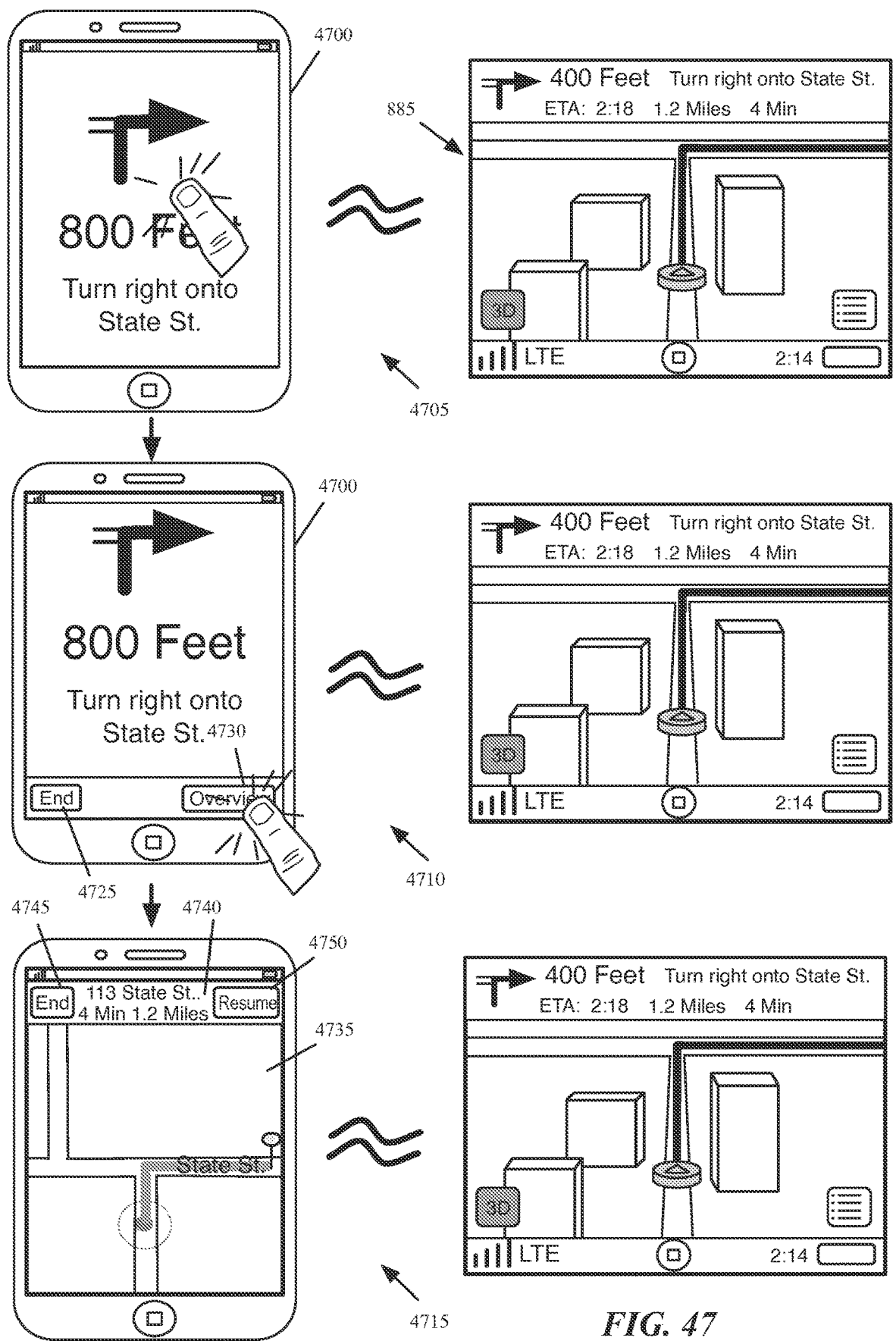
FIG. 47 illustrates the display and use of controls on the mobile device during navigation to enter a route overview display.

In some embodiments, the mapping application mobile device interface during navigation is not interactive. While the user can press the home button to exit the mapping application, some embodiments do not offer controls within the mobile device display of the upcoming maneuver instructions. Other embodiments, however, include a set of available controls on the mobile device. FIG. 47 illustrates the display and use of such controls on the mobile device during navigation. Specifically, this figure illustrates the activation of a set of controls and the selection of an overview control over three stages 4705-4715.

The first stage 4705 illustrates both a mobile device 4700 and the vehicle display screen to which the mobile device is connected after the mapping application running on the mobile device has entered turn-by-turn navigation mode. As shown, the vehicle display screen displays the navigation mode UI 885 while the mobile device displays instructions for the next maneuver along the route being navigated.

At this first stage 4705, the user taps the display screen of the mobile device 4700. As a result of this input, at the second stage 4710 the application displays a set of controls 4720 at the bottom of the display. The set of controls 4720 includes an end navigation control 4725 for ending the turn-by-turn navigation mode and returning to the standard map exploration mode of the mapping application, as well as an overview control 4730 for displaying an overview of the route being navigated.

The user selects the overview control 4730 at the second stage 4710 (via a tap input). As a result, the mapping application displays a route overview map 4735 at the third stage 4715. The overview map of some embodiments displays a map at a zoom level such that the entirety of the remaining route, from the current location to the ending location, fits within the display. In addition, the map shows the route line for the remainder of the route. Some embodiments, rather than showing the remaining route, display the entirety of the route from the starting location to the destination.

In addition to the overview map 4735, the overview display includes a banner 4740 with an end navigation control 4745, similar to the control 4725 in the previous stage 4710, as well as a control 4750 for returning to the standard navigation view on the mobile device (i.e., the display of graphics and text for the upcoming maneuver).

While the user views the overview map on the mobile device, some embodiments do not change the navigation view on the vehicle display screen (except to animate the movement along the route). Thus, as the user is not moving (e.g., is stopped at a traffic light) during this example, the vehicle display screen does not change during the stages 4705-4715.

Figure 48:
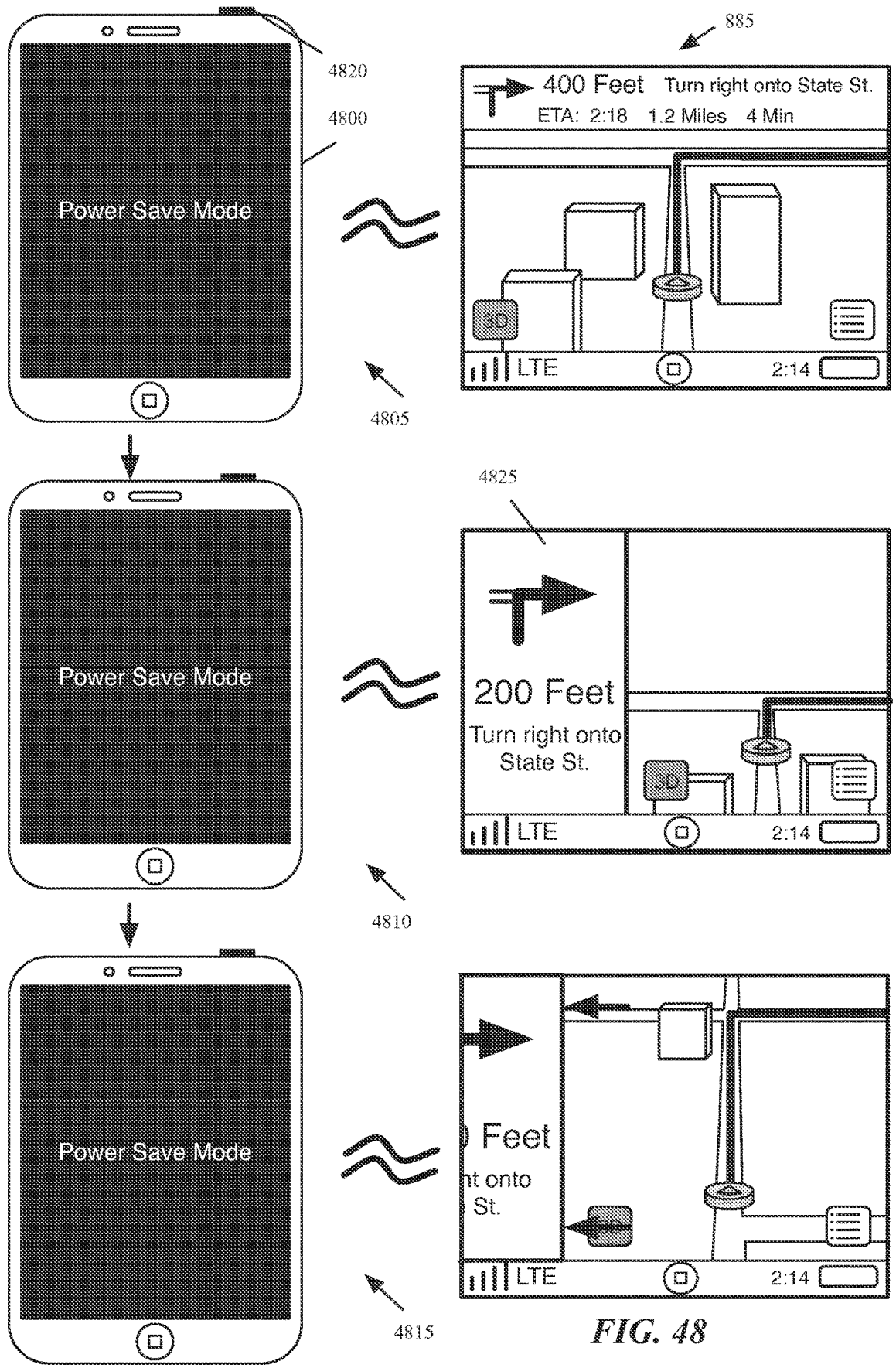
FIG. 48 illustrates a device in power-saving mode as well as the vehicle display screen to which the device is connected during turn-by-turn navigation.

In some cases, while the vehicle interface displays the turn-by-turn navigation map view, the user may not be interacting with the mobile device on which the mapping application operates. In some cases, the mobile device may enter a power-saving mode during navigation. FIG. 48 illustrates, over three stages 4805-4815, a device 4800 in power-saving mode as well as the vehicle display screen to which the device is connected during turn-by-turn navigation.

In the first stage 4805, the mobile device 4800 has already entered power-saving mode. In some embodiments, the displayed words "Power Save Mode" do not actually appear on the device's display, but are shown here for explanatory purposes. The device may enter power save mode when the user has not interacted with the device for a particular period of time, or because a user has pressed a particular hardware button or touchscreen control to do so (e.g., button 4820 of the mobile device 4800). In addition, at the first stage, the application displays the navigation map view 885 on the vehicle display screen. Thus, while in power-save mode, the mobile device still performs the various navigation operations, including rendering the animated 3D map view, required to output the display to the vehicle.

In the second stage, the application has animated a navigation instruction panel 4825 onto the vehicle display as a maneuver approaches. In the third stage 4815, the vehicle has maneuvered through the intersection causing the application to remove the navigation instruction panel. During these stages, even as the vehicle and device approach a maneuver, the mobile device 4800 remains in power-saving mode. As explained in detail in U.S. application Ser. No. 13/802,654, filed Mar. 13, 2013, which is incorporated herein by reference, when not connected to the vehicle display system, the mapping application displays (and may use voice prompts as well) navigation instructions on the mobile device as intersections approach even when the device has been placed in power-saving mode. However, because the user receives indications from the vehicle interface of the upcoming maneuver, some embodiments do not display corresponding indications on the device when in power-saving mode.

Figure 49:
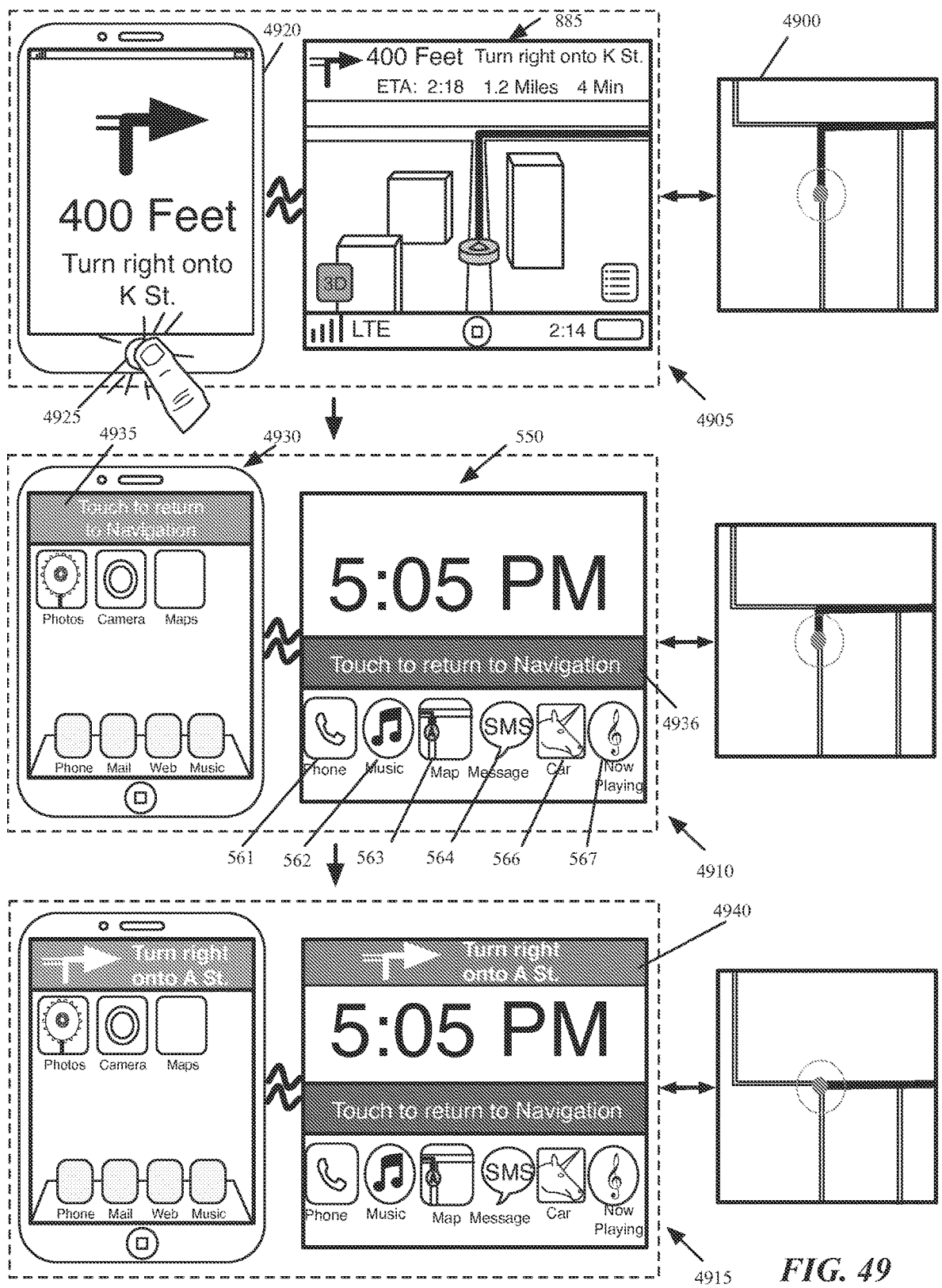
FIG. 49 illustrates the home pages of the mobile device and vehicle displays of some embodiments while turn-by-turn navigation mode is operational and the vehicle approaches a maneuver.

In some embodiments, while turn-by-turn navigation is running, the user may exit out of the mapping application via either the mobile device or the vehicle display screen, thereby returning both interfaces to their respective home pages of the mobile device operating system. The home page, in some embodiments, will then display a banner for the user to select in order to return to the navigation view. FIG. 49 illustrates the home pages of the mobile device and vehicle displays of some embodiments while turn-by-turn navigation mode is operational and the vehicle approaches a maneuver. This figure illustrates, for each of three stages 4905-4915, both of the displayed interfaces as well as a map 4900 that indicates the location of the vehicle and mobile device at the stage.

The first stage 4905 illustrates a mobile device 4920 and a vehicle display screen to which the mobile device is connected. The mapping application operating on the mobile device is in turn-by-turn navigation mode, and therefore the mobile device 4920 displays information about the next maneuver while vehicle display screen displays the navigation mode UI 885. At this stage, the user selects a home button 4925 on the mobile device to place the mapping application in the background and return to the home page of the mobile device. In some embodiments, selecting the home button on the vehicle touchscreen has the same effect.

Thus, at the second stage, both the mobile device 4920 and the vehicle display screen display their respective home pages. The mobile device home page 4930 displays various selectable items (also called affordances) for various applications that operate on the mobile device. The vehicle touchscreen interface 550 of some embodiments is described above by reference to FIG. 5. In addition to the standard selectable items in the home pages, both interfaces also display a selectable banner for returning to the turn-by-turn navigation. Specifically, the mobile device home page 4930 includes a banner 4935 at the top of the display with the text "Touch to return to Navigation". Similarly, the vehicle display screen displays a selectable banner 4936 above the set of controls 561-567 with the same text. In some embodiments, selecting either of these banners returns both of the displays to their respective turn-by-turn navigation displays, as shown in the first stage 4905.

While these banners are shown in particular locations in the two different interfaces in this figure, one of ordinary skill in the art will recognize that different embodiments may display similar banners in different locations (e.g., the banner 4936 displayed above the clock at the top of the vehicle display). Furthermore, for non-touchscreen interfaces, the banner displayed on the vehicle screen may indicate a particular action to take using the various vehicle controls in order to return to navigation (e.g., pressing a particular button).

In the third stage, the map 4900 illustrates that the vehicle is approaching an intersection at which the route makes a right turn onto a particular street. As a result, both of the display screens now display indicators to make a right turn onto the particular street. Specifically, the text in the mobile device banner 4935 has been replaced by a right turn graphical indicator with text instructions to turn right. The same graphical indicator and text are displayed in a newly added banner 4940 on the vehicle touchscreen above the clock, while the selectable banner 4936 for returning to navigation remains below the clock. After the vehicle completes the maneuver, some embodiments return the displays to the state shown in the second stage 4910, by modifying the content of the banner 4935 and removing the banner 4940.

Figure 50:
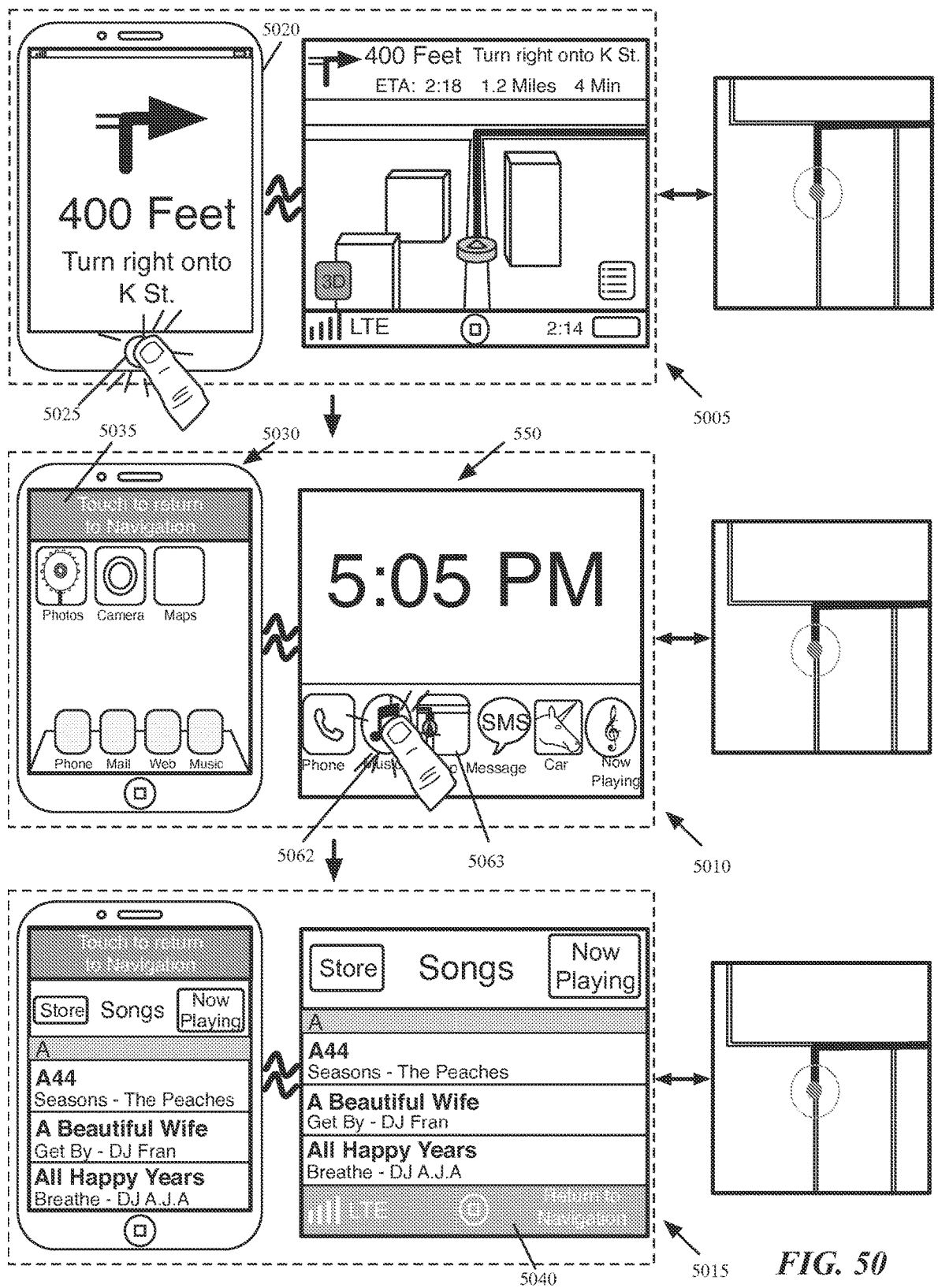
FIG. 50 illustrates the display outside the mapping application with turn-by-turn navigation operating according to some embodiments.

In some embodiments, unlike those shown in FIG. 49, the banner 4936 is not displayed in the home page of the vehicle screen. Instead, the return to navigation banner is displayed as part of the operating system information bar that includes the simulated home button, which is not shown in the vehicle screen home page of some embodiments. FIG. 50 illustrates the display outside the mapping application with turn-by-turn navigation operating according to some embodiments, over three stages 5005-5015. The first stage 5005 is the same as the first stage 4905 of FIG. 49, with the user selecting a home button 5025 on the mobile device 5020.

In the second stage, the display of the mobile device is the same as in FIG. 49, with the banner 5035 displayed at the top of the device screen. However, the vehicle display 5050 does not display a banner in this situation. Because the user is likely to only have exited to this stage in order to select another application, not having the return to navigation selection control is not worrisome. Furthermore, the user can select the mapping application control 5063 if need be, in order to return to the mapping application and therefore re-enter navigation. At this stage, the user selects the music control 5062 to enter a music application.

At the third stage 5015, the vehicle has not yet approached the upcoming intersection. Thus, no directions are yet given for this maneuver. However, within the music application on the vehicle screen, the lower information bar 5040 that includes the simulated home button includes text stating "Return to Navigation" and has changed color. This indicates that the user can select anywhere on this bar 5040 (other than the home button) to return to the turn-by-turn navigation view.

Figure 51:
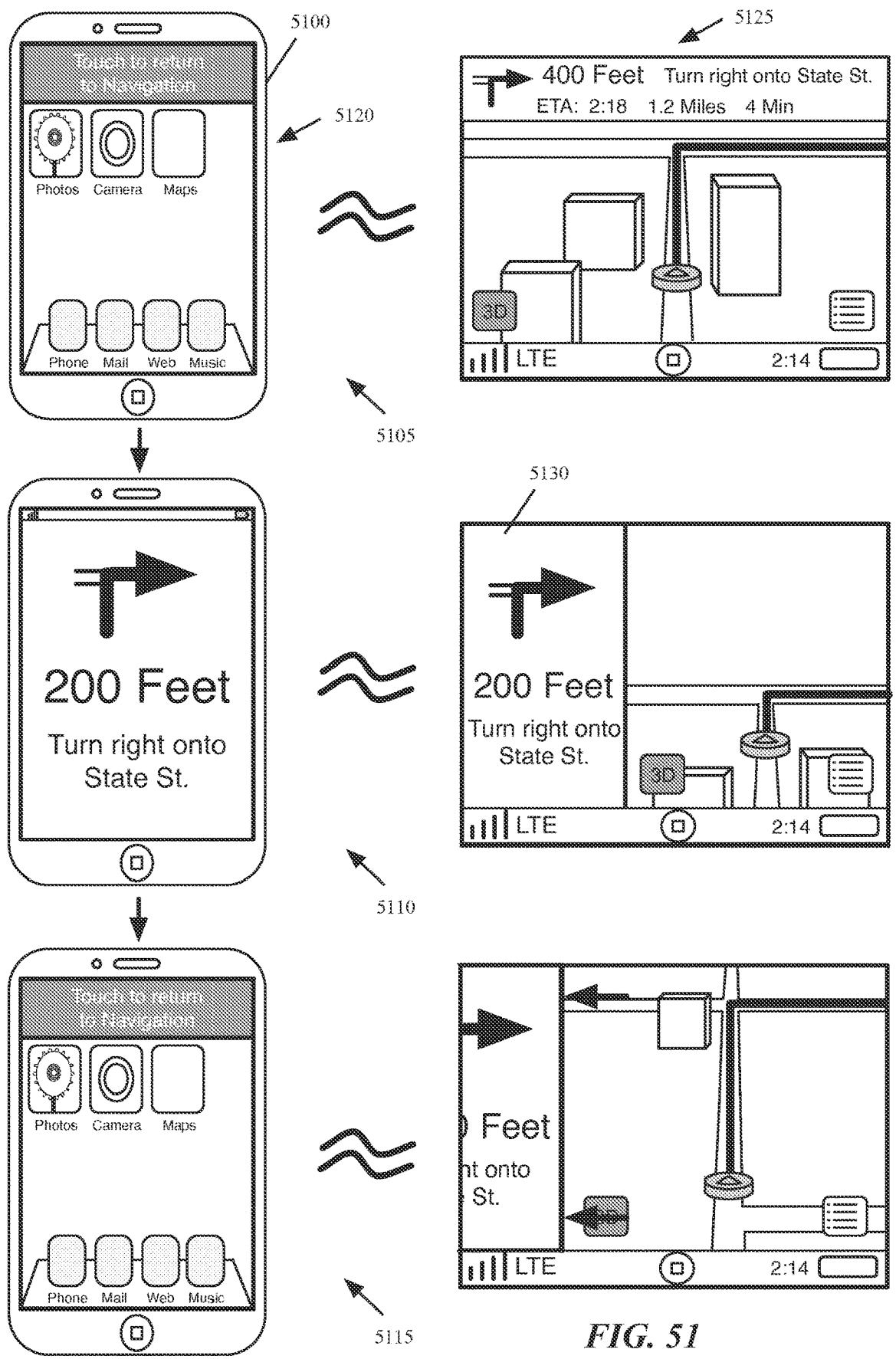
FIG. 51 illustrates a situation in which the mapping application of some embodiments in turn-by-turn navigation mode is open on the vehicle display while the mobile device displays its home page.

The above-displayed embodiments require the mobile device to output interfaces for the same application to both the mobile device display and the vehicle display. That is, when the user selects the mapping application in one display, the application opens in both. Similarly, when the user exits the mapping application (e.g., by pressing the home button) in one display, the home pages of both are displayed. In some embodiments, however, the user can have different applications open on the two different displays. FIG. 51 illustrates the situation in which the mapping application in turn-by-turn navigation mode is open on the vehicle display while the mobile device displays its home page over three stages 5105-5115 in which the vehicle approaches and passes through an intersection along the mute being navigated.

The first stage 5105 illustrates a mobile device 5100 that displays a mobile device home page 5120 of some embodiments, with several selectable items for opening various applications (including the mapping application). At the same time, the vehicle touchscreen displays a turn-by-turn navigation mode UI 5125. In the second stage 5110, the vehicle has approached within a threshold distance of the intersection at which the next maneuver will be performed along the route, and therefore the application displays a navigation instruction panel 5130 for the maneuver on the left side of the vehicle display, as shown in previous figures. At the same time, despite having exited out of the mapping application interface on the mobile device 5100, the device displays the maneuver instructions (with both a graphical indicator and text instructions). In some embodiments, both of these sets of instructions on the two displays count down the distance to the maneuver as the vehicle approaches the intersection. The third stage illustrates that after the vehicle passes through the intersection, the display on the mobile device 5100 returns to the home screen, while the navigation instruction panel 5130 is removed from the vehicle display.

The above examples illustrate situations in which the user performs various navigation actions (e.g., entering navigation, exiting navigation) while the mobile device is already connected to the vehicle electronic system. In addition, the user can enter the turn-by-turn navigation mode of the mapping application on the mobile device and then subsequently connect the mobile device to the vehicle system. In some embodiments, upon connection of the device to the system, the mapping application begins outputting the two user interfaces as shown in FIG. 43. That is, the application sends the navigation mode map view that follows the vehicle location to the vehicle display, and outputs the maneuver instructions to the mobile device display. When the user disconnects the device from the vehicle system while in navigation mode, the application does the reverse. The mobile device display transitions from the maneuver instructions to the standard turn-by-turn navigation mode when not connected. In addition, in some embodiments the device recognizes when the user has left her vehicle (e.g., based on the type of movement of the device consistent with walking) and transitions automatically from a driving navigation mode to a walking navigation mode.

VII. Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read-only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

A. Mobile Device

Figure 52:
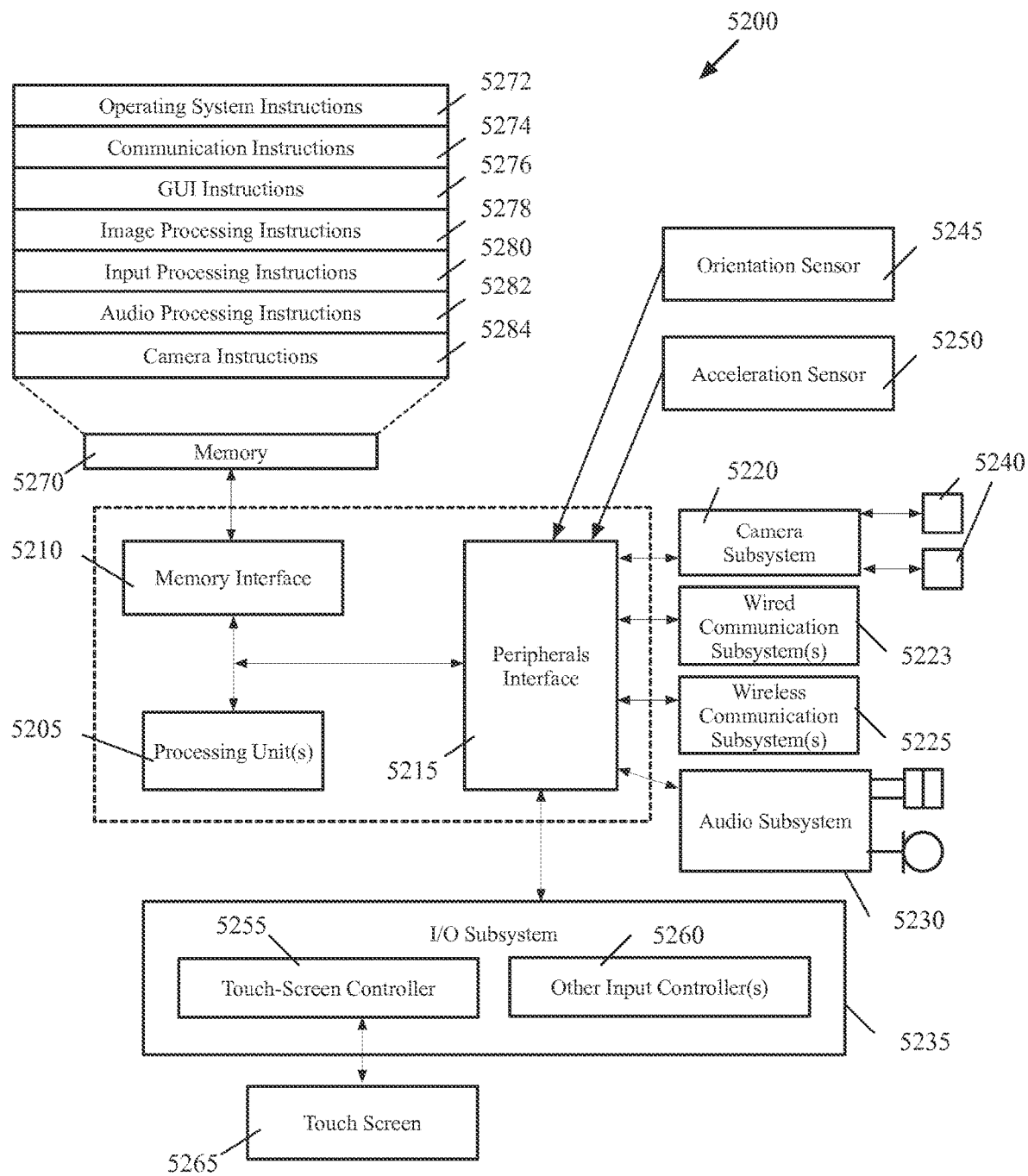
FIG. 52 illustrates an example of an architecture of a mobile computing device.

The mapping and navigation applications of some embodiments operate on mobile devices, such as smart phones (e.g., iPhones®) and tablets (e.g., iPads®). FIG. 52 is an example of an architecture 5200 of such a mobile computing device. Examples of mobile computing devices include smartphones, tablets, laptops, etc. As shown, the mobile computing device 5200 includes one or more processing units 5205, a memory interface 5210 and a peripherals interface 5215.

The peripherals interface 5215 is coupled to various sensors and subsystems, including a camera subsystem 5220, a wired communication subsystem(s) 5223, a wireless communication subsystem(s) 5225, an audio subsystem 5230, an I/O subsystem 5235, etc. The peripherals interface 5215 enables communication between the processing units 5205 and various peripherals. For example, an orientation sensor 5245 (e.g., a gyroscope) and an acceleration sensor 5250 (e.g., an accelerometer) is coupled to the peripherals interface 5215 to facilitate orientation and acceleration functions.

The camera subsystem 5220 is coupled to one or more optical sensors 5240 (e.g., a charged coupled device (CCD) optical sensor, a complementary metal-oxide-semiconductor (CMOS) optical sensor, etc.). The camera subsystem 5220 coupled with the optical sensors 5240 facilitates camera functions, such as image and/or video data capturing. The wired communication subsystem 5223 and wireless communication subsystem 5225 serve to facilitate communication functions. In some embodiments, the wired communication system includes a USB connector for connecting the mobile device 5200 to a vehicle electronic system. The interface of some embodiments for communicating with a vehicle electronic system is described in further detail in U.S. Patent Publications 2009/0284476, 2010/0293462, 2011/0145863, 2011/0246891, and 2011/0265003, which are incorporated by reference above.

In some embodiments, the wireless communication subsystem 5225 includes radio frequency receivers and transmitters, and optical receivers and transmitters (not shown in FIG. 52). These receivers and transmitters of some embodiments are implemented to operate over one or more communication networks such as a GSM network, a Wi-Fi network, a Bluetooth network, etc. The audio subsystem 5230 is coupled to a speaker to output audio (e.g., to output voice navigation instructions). Additionally, the audio subsystem 5230 is coupled to a microphone to facilitate voice-enabled functions, such as voice recognition (e.g., for searching), digital recording, etc.

The I/O subsystem 5235 involves the transfer between input/output peripheral devices, such as a display, a touch screen, etc., and the data bus of the processing units 5205 through the peripherals interface 5215. The I/O subsystem 5235 includes a touch-screen controller 5255 and other input controllers 5260 to facilitate the transfer between input/output peripheral devices and the data bus of the processing units 5205. As shown, the touch-screen controller 5255 is coupled to a touch screen 5265. The touch-screen controller 5255 detects contact and movement on the touch screen 5265 using any of multiple touch sensitivity technologies. The other input controllers 5260 are coupled to other input/control devices, such as one or more buttons. Some embodiments include a near-touch sensitive screen and a corresponding controller that can detect near-touch interactions instead of or in addition to touch interactions.

The memory interface 5210 is coupled to memory 5270. In some embodiments, the memory 5270 includes volatile memory (e.g., high-speed random access memory), non-volatile memory (e.g., flash memory), a combination of volatile and non-volatile memory, and/or any other type of memory. As illustrated in FIG. 52, the memory 5270 stores an operating system (OS) 5272. The OS 5272 includes instructions for handling basic system services and for performing hardware dependent tasks.

The memory 5270 also includes communication instructions 5274 to facilitate communicating with one or more additional devices; graphical user interface instructions 5276 to facilitate graphic user interface processing; image processing instructions 5278 to facilitate image-related processing and functions; input processing instructions 5280 to facilitate input-related (e.g., touch input) processes and functions; audio processing instructions 5282 to facilitate audio-related processes and functions; and camera instructions 5284 to facilitate camera-related processes and functions. The instructions described above are merely exemplary and the memory 5270 includes additional and/or other instructions in some embodiments. For instance, the memory for a smartphone may include phone instructions to facilitate phone-related processes and functions. Additionally, the memory may include instructions for a mapping and navigation application as well as other applications. The above-identified instructions need not be implemented as separate software programs or modules. Various functions of the mobile computing device can be implemented in hardware and/or in software, including in one or more signal processing and/or application specific integrated circuits.

While the components illustrated in FIG. 52 are shown as separate components, one of ordinary skill in the art will recognize that two or more components may be integrated into one or more integrated circuits. In addition, two or more components may be coupled together by one or more communication buses or signal lines. Also, while many of the functions have been described as being performed by one component, one of ordinary skill in the art will realize that the functions described with respect to FIG. 52 may be split into two or more integrated circuits.

B. Computer System

Figure 53:
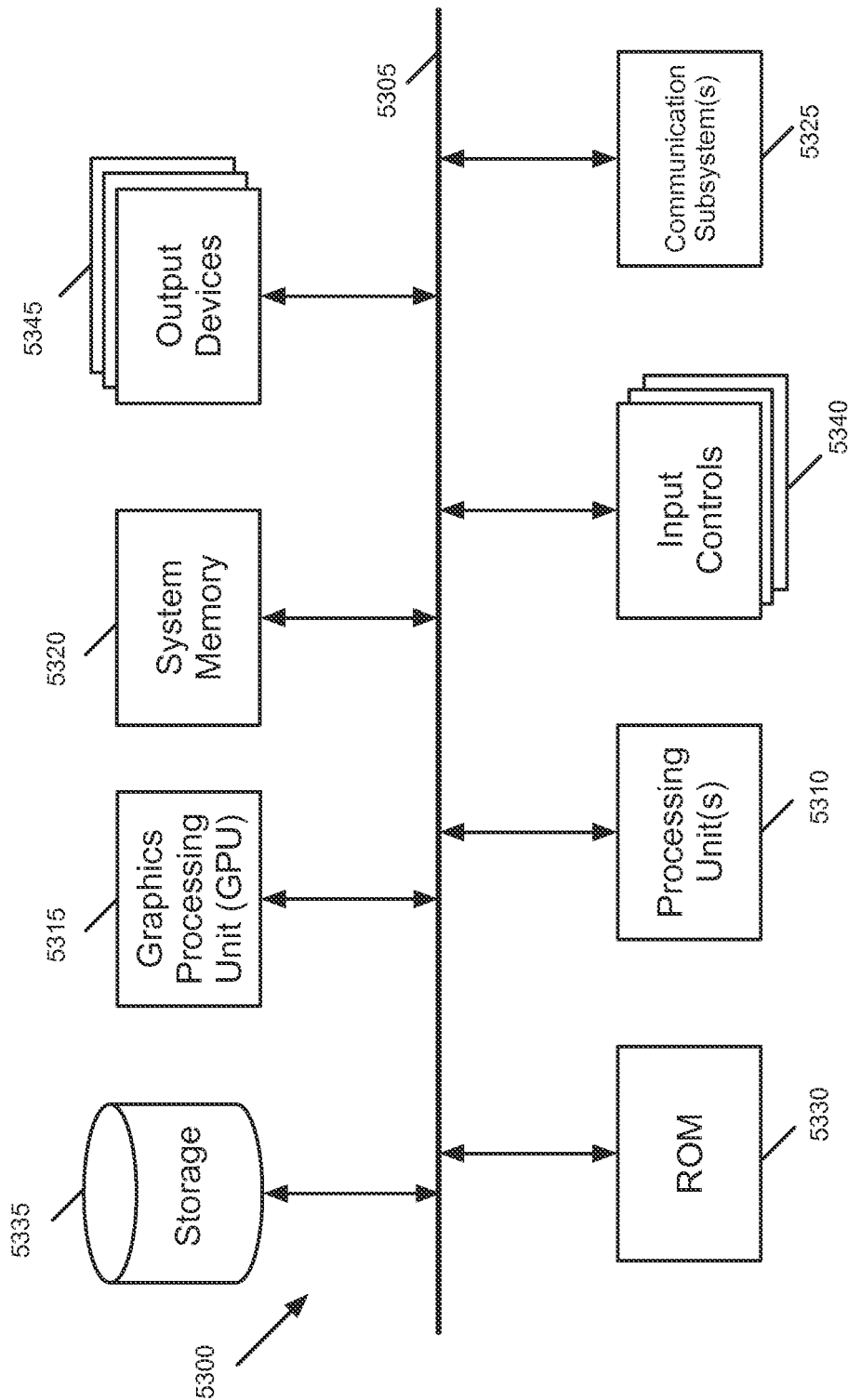
FIG. 53 conceptually illustrates an example of an electronic system with which some embodiments of the invention are implemented.

FIG. 53 conceptually illustrates an example of a vehicle electronic system 5300 with which some embodiments of the invention are implemented. Such an electronic system includes various types of computer readable media and interfaces for various other types of computer readable media. Electronic system 5300 includes a bus 5305, processing unit(s) 5310, a graphics processing unit (GPU) 5315, a system memory 5320, communication subsystem(s) 5325, a read-only memory 5330, a permanent storage device 5335, input controls 5340, and output devices 5345.

The bus 5305 collectively represents all system, peripheral, and chipset buses that communicatively connect the numerous internal devices of the electronic system 5300. For instance, the bus 5305 communicatively connects the processing unit(s) 5310 with the read-only memory 5330, the GPU 5315, the system memory 5320, and the permanent storage device 5335.

From these various storage units, the processing unit(s) 5310 retrieves instructions to execute and data to process in order to execute the processes of the invention performed by the vehicle electronic system. The processing unit(s) may be a single processor or a multi-core processor in different embodiments. Some instructions are passed to and executed by the GPU 5315. The GPU 5315 can offload various computations or complement the image processing provided by the processing unit(s) 5310. In some embodiments, the vehicle system uses a system-on-a-chip that includes one or more CPU cores as well as one or more GPU cores.

The read-only-memory (ROM) 5330 stores static data and instructions that are needed by the processing unit(s) 5310 and other modules of the vehicle electronic system. The permanent storage device 5335, on the other hand, is a read-and-write memory device. This device is a non-volatile memory unit that stores instructions and data even when the electronic system 5300 is off. Some embodiments of the invention use a mass-storage device (such as a magnetic or optical disk and its corresponding disk drive, integrated flash memory) as the permanent storage device 5335.

Other embodiments use a removable storage device (such as a floppy disk, flash memory device, etc., and its corresponding drive) as the permanent storage device. Like the permanent storage device 5335, the system memory 5320 is a read-and-write memory device. However, unlike storage device 5335, the system memory 5320 is a volatile read-and-write memory, such a random access memory. The system memory 5320 stores some of the instructions and data that the processor needs at runtime. In some embodiments, the invention's processes are stored in the system memory 5320, the permanent storage device 5335, and/or the read-only memory 5330. For example, the various memory units include instructions for processing multimedia clips in accordance with some embodiments. From these various memory units, the processing unit(s) 5310 retrieves instructions to execute and data to process in order to execute the processes of some embodiments.

The bus 5305 also connects to the input controls 5340 and output devices 5345. The input devices 5340 enable the user to communicate information and select commands to the electronic system. The input controls 5340 include various different inputs in different embodiments, including touchscreens, other hardware controls such as buttons, knobs, joysticks, trackballs, etc., microphones for receiving audio, and others. The output devices 5345 include touchscreen and non-touchscreen displays, as well as speakers for producing audio.

Finally, as shown in FIG. 53, bus 5305 also couples the vehicle electronic system 5300 to one or more communication subsystems 5325 through which the vehicle system can communicate with a mobile device, such as that shown above in FIG. 52. These communication subsystems may include both wireless (e.g., Bluetooth®, Wi-Fi, etc.) communication subsystems and wired (e.g., USB, Firewire®, etc.) communication subsystems. Any or all components of the vehicle electronic system 5300 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

VIII. Map Service Environment

Figure 54:
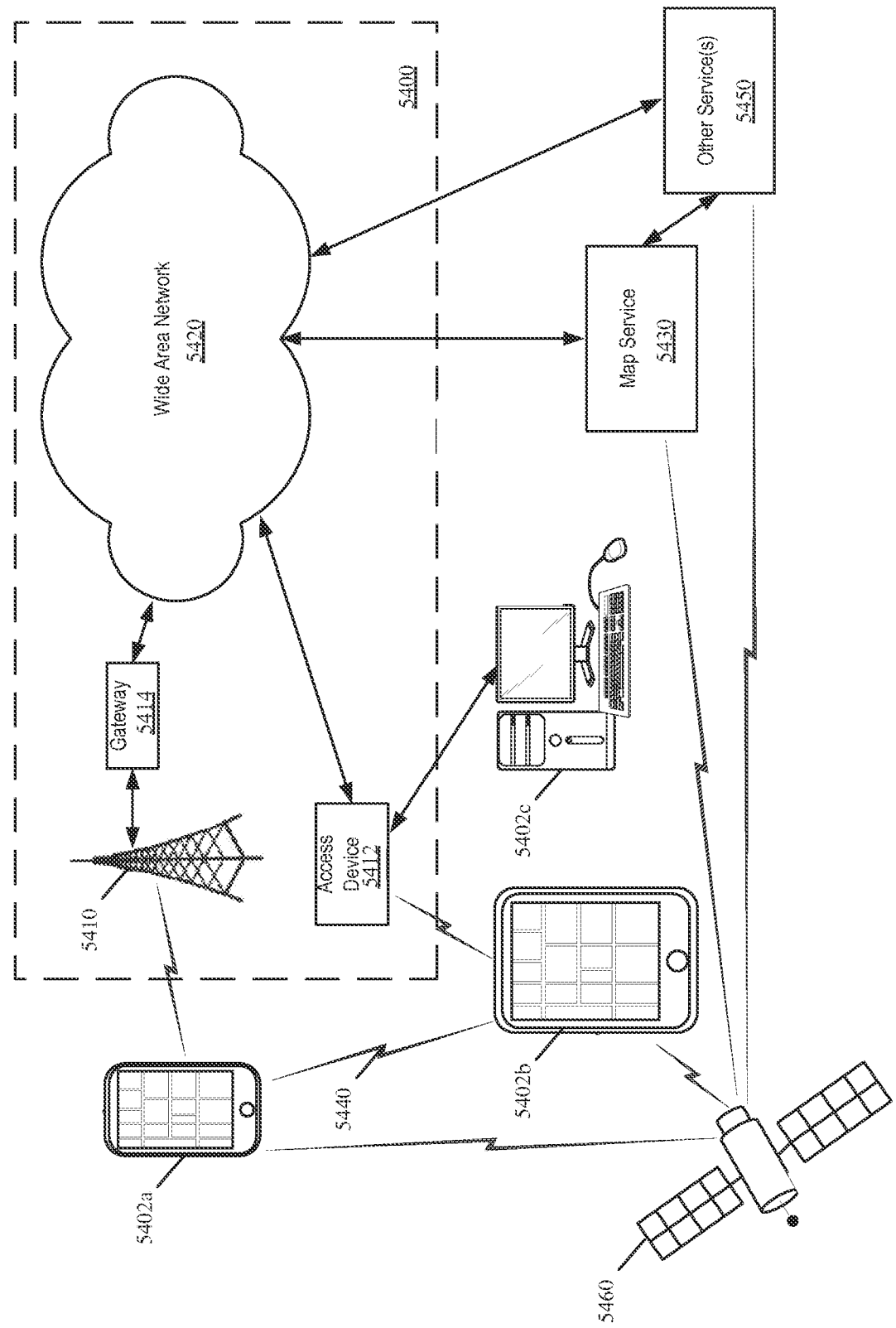
FIG. 54 illustrates a map service operating environment according to some embodiments.

Various embodiments may operate within a map service operating environment. FIG. 54 illustrates a map service operating environment, according to some embodiments. A map service 5430 (also referred to as mapping service) may provide map services for one or more client devices 5402a-5402c in communication with the map service 5430 through various communication methods and protocols. A map service 5430 in some embodiments provides map information and other map-related data, such as two-dimensional map image data (e.g., aerial view of roads utilizing satellite imagery), three-dimensional map image data (e.g., traversable map with three-dimensional features, such as buildings), route and direction calculation (e.g., ferry route calculations or directions between two points for a pedestrian), real-time navigation data (e.g., turn-by-turn visual navigation data in two or three dimensions), location data (e.g., where is the client device currently located), and other geographic data (e.g., wireless network coverage, weather, traffic information, or nearby points-of-interest). In various embodiments, the map service data may include localized labels for different countries or regions; localized labels may be utilized to present map labels (e.g., street names, city names, points of interest) in different languages on client devices. Client devices 5402a-5402c may utilize these map services by obtaining map service data. Client devices 5402a-5402c may implement various techniques to process map service data. Client devices 5402a-5402c may then provide map services to various entities, including, but not limited to, users, internal software or hardware modules, and/or other systems or devices external to the client devices 5402a-5402c.

In some embodiments, a map service is implemented by one or more nodes in a distributed computing system. Each node may be assigned one or more services or components of a map service. Some nodes may be assigned the same map service or component of a map service. A load balancing node in some embodiments distributes access or requests to other nodes within a map service. In some embodiments a map service is implemented as a single system, such as a single server. Different modules or hardware devices within a server may implement one or more of the various services provided by a map service.

A map service in some embodiments provides map services by generating map service data in various formats. In some embodiments, one format of map service data is map image data. Map image data provides image data to a client device so that the client device may process the image data (e.g., rendering and/or displaying the image data as a two-dimensional or three-dimensional map). Map image data, whether in two or three dimensions, may specify one or more map tiles. A map tile may be a portion of a larger map image. Assembling together the map tiles of a map produces the original map. Tiles may be generated from map image data, routing or navigation data, or any other map service data. In some embodiments map tiles are raster-based map tiles, with tile sizes ranging from any size both larger and smaller than a commonly-used 256 pixel by 256 pixel tile. Raster-based map tiles may be encoded in any number of standard digital image representations including, but not limited to, Bitmap (.bmp), Graphics Interchange Format (.gif), Joint Photographic Experts Group (.jpg, .jpeg, etc.), Portable Networks Graphic (.png), or Tagged Image File Format (.tiff). In some embodiments, map tiles are vector-based map tiles, encoded using vector graphics, including, but not limited to, Scalable Vector Graphics (.svg) or a Drawing File (.drw). Some embodiments also include tiles with a combination of vector and raster data. Metadata or other information pertaining to the map tile may also be included within or along with a map tile, providing further map service data to a client device. In various embodiments, a map tile is encoded for transport utilizing various standards and/or protocols.

In various embodiments, map tiles may be constructed from image data of different resolutions depending on zoom level. For instance, for low zoom level (e.g., world or globe view), the resolution of map or image data need not be as high relative to the resolution at a high zoom level (e.g., city or street level). For example, when in a globe view, there may be no need to render street level artifacts as such objects would be so small as to be negligible in many cases.

A map service in some embodiments performs various techniques to analyze a map tile before encoding the tile for transport. This analysis may optimize map service performance for both client devices and a map service. In some embodiments map tiles are analyzed for complexity, according to vector-based graphic techniques, and constructed utilizing complex and non-complex layers. Map tiles may also be analyzed for common image data or patterns that may be rendered as image textures and constructed by relying on image masks. In some embodiments, raster-based image data in a map tile contains certain mask values, which are associated with one or more textures. Some embodiments also analyze map tiles for specified features that may be associated with certain map styles that contain style identifiers.

Other map services generate map service data relying upon various data formats separate from a map tile in some embodiments. For instance, map services that provide location data may utilize data formats conforming to location service protocols, such as, but not limited to, Radio Resource Location services Protocol (RRLP), TIA 801 for Code Division Multiple Access (CDMA), Radio Resource Control (RRC) position protocol, or LTE Positioning Protocol (LPP). Embodiments may also receive or request data from client devices identifying device capabilities or attributes (e.g., hardware specifications or operating system version) or communication capabilities (e.g., device communication bandwidth as determined by wireless signal strength or wire or wireless network type).

A map service may obtain map service data from internal or external sources. For example, satellite imagery used in map image data may be obtained from external services, or internal systems, storage devices, or nodes. Other examples may include, but are not limited to GPS assistance servers, wireless network coverage databases, business or personal directories, weather data, government information (e.g., construction updates or road name changes), or traffic reports. Some embodiments of a map service may update map service data (e.g., wireless network coverage) for analyzing future requests from client devices.

Various embodiments of a map service may respond to client device requests for map services. These requests may be a request for a specific map or portion of a map. Some embodiments format requests for a map as requests for certain map tiles. In some embodiments, requests also supply the map service with starting locations (or current locations) and destination locations for a route calculation. A client device may also request map service rendering information, such as map textures or style sheets. In at least some embodiments, requests are also one of a series of requests implementing turn-by-turn navigation. Requests for other geographic data may include, but are not limited to, current location, wireless network coverage, weather, traffic information, or nearby points-of-interest.

A map service, in some embodiments, analyzes client device requests to optimize a device or map service operation. For instance, a map service may recognize that the location of a client device is in an area of poor communications (e.g., weak wireless signal) and send more map service data to supply a client device in the event of loss in communication or send instructions to utilize different client hardware (e.g., orientation sensors) or software (e.g., utilize wireless location services or Wi-Fi positioning instead of GPS-based services). In another example, a map service may analyze a client device request for vector-based map image data and determine that raster-based map data better optimizes the map image data according to the image's complexity. Embodiments of other map services may perform similar analysis on client device requests and as such the above examples are not intended to be limiting.

Various embodiments of client devices (e.g., client devices 5402a-5402c) are implemented on different portable-multifunction device types. Client devices 5402a-5402c utilize map service 5430 through various communication methods and protocols. In some embodiments, client devices 5402a-5402c obtain map service data from map service 5430. Client devices 5402a-5402c request or receive map service data. Client devices 5402a-5402c then process map service data (e.g., render and/or display the data) and may send the data to another software or hardware module on the device or to an external device or system.

A client device, according to some embodiments, implements techniques to render and/or display maps. These maps may be requested or received in various formats, such as map tiles described above. A client device may render a map in two-dimensional or three-dimensional views. Some embodiments of a client device display a rendered map and allow a user, system, or device providing input to manipulate a virtual camera in the map, changing the map display according to the virtual camera's position, orientation, and field-of-view. Various forms and input devices are implemented to manipulate a virtual camera. In some embodiments, touch input, through certain single or combination gestures (e.g., touch-and-hold or a swipe) manipulate the virtual camera. Other embodiments allow manipulation of the device's physical location to manipulate a virtual camera. For instance, a client device may be tilted up from its current position to manipulate the virtual camera to rotate up. In another example, a client device may be tilted forward from its current position to move the virtual camera forward. Other input devices to the client device may be implemented including, but not limited to, auditory input (e.g., spoken words), a physical keyboard, mouse, and/or a joystick.

Some embodiments provide various visual feedback to virtual camera manipulations, such as displaying an animation of possible virtual camera manipulations when transitioning from two-dimensional map views to three-dimensional map views. Some embodiments also allow input to select a map feature or object (e.g., a building) and highlight the object, producing a blur effect that maintains the virtual camera's perception of three-dimensional space.

In some embodiments, a client device implements a navigation system (e.g., turn-by-turn navigation). A navigation system provides directions or route information, which may be displayed to a user. Some embodiments of a client device request directions or a route calculation from a map service. A client device may receive map image data and route data from a map service. In some embodiments, a client device implements a turn-by-turn navigation system, which provides real-time route and direction information based upon location information and route information received from a map service and/or other location system, such as Global Positioning Satellite (GPS). A client device may display map image data that reflects the current location of the client device and update the map image data in real-time. A navigation system may provide auditory or visual directions to follow a certain route.

A virtual camera is implemented to manipulate navigation map data according to some embodiments. Some embodiments of client devices allow the device to adjust the virtual camera display orientation to bias toward the route destination. Some embodiments also allow virtual camera to navigation turns simulating the inertial motion of the virtual camera.

Client devices implement various techniques to utilize map service data from map service. Some embodiments implement some techniques to optimize rendering of two-dimensional and three-dimensional map image data. In some embodiments, a client device locally stores rendering information. For instance, a client stores a style sheet which provides rendering directions for image data containing style identifiers. In another example, common image textures may be stored to decrease the amount of map image data transferred from a map service. Client devices in different embodiments implement various modeling techniques to render two-dimensional and three-dimensional map image data, examples of which include, but are not limited to: generating three-dimensional buildings out of two-dimensional building footprint data; modeling two-dimensional and three-dimensional map objects to determine the client device communication environment; generating models to determine whether map labels are seen from a certain virtual camera position; and generating models to smooth transitions between map image data. Some embodiments of client devices also order or prioritize map service data in certain techniques. For instance, a client device detects the motion or velocity of a virtual camera, which if exceeding certain threshold values, lower-detail image data is loaded and rendered of certain areas. Other examples include: rendering vector-based curves as a series of points, preloading map image data for areas of poor communication with a map service, adapting textures based on display zoom level, or rendering map image data according to complexity.

In some embodiments, client devices communicate utilizing various data formats separate from a map tile. For instance, some client devices implement Assisted Global Positioning Satellites (A-GPS) and communicate with location services that utilize data formats conforming to location service protocols, such as, but not limited to, Radio Resource Location services Protocol (RRLP), TIA 801 for Code Division Multiple Access (CDMA), Radio Resource Control (RRC) position protocol, or LTE Positioning Protocol (LPP). Client devices may also receive GPS signals directly. Embodiments may also send data, with or without solicitation from a map service, identifying the client device's capabilities or attributes (e.g., hardware specifications or operating system version) or communication capabilities (e.g., device communication bandwidth as determined by wireless signal strength or wire or wireless network type).

FIG. 54 illustrates one possible embodiment of an operating environment 5400 for a map service 5430 and client devices 5402*a*-5402*c*. In some embodiments, devices 5402*a*, 5402*b*, and 5402*c* communicate over one or more wire or wireless networks 5410. For example, wireless network 5410, such as a cellular network, can communicate with a wide area network (WAN) 5420, such as the Internet, by use of gateway 5414. A gateway 5414 in some embodiments provides a packet oriented mobile data service, such as General Packet Radio Service (GPRS), or other mobile data service allowing wireless networks to transmit data to other networks, such as wide area network 5420. Likewise, access device 5412 (e.g., IEEE 802.11g wireless access device) provides communication access to WAN 5420. Devices 5402*a* and 5402*b* can be any portable electronic or computing device capable of communicating with a map service. Device 5402*c* can be any non-portable electronic or computing device capable of communicating with a map service.

In some embodiments, both voice and data communications are established over wireless network 5410 and access device 5412. For instance, device 5402*a* can place and receive phone calls (e.g., using voice over Internet Protocol (VoIP) protocols), send and receive e-mail messages (e.g., using Simple Mail Transfer Protocol (SMTP) or Post Office Protocol 3 (POP3)), and retrieve electronic documents and/or streams, such as web pages, photographs, and videos, over wireless network 5410, gateway 5414, and WAN 5420 (e.g., using Transmission Control Protocol/Internet Protocol (TCP/IP) or User Datagram Protocol (UDP)). Likewise, in some implementations, devices 5402*b* and 5402*c* can place and receive phone calls, send and receive e-mail messages, and retrieve electronic documents over access device 5412 and WAN 5420. In various embodiments, any of the illustrated client device may communicate with map service 5430 and/or other service(s) 5450 using a persistent connection established in accordance with one or more security protocols, such as the Secure Sockets Layer (SSL) protocol or the Transport Layer Security (TLS) protocol.

Devices 5402*a* and 5402*b* can also establish communications by other means. For example, wireless device 5402*a* can communicate with other wireless devices (e.g., other devices 5402*b*, cell phones, etc.) over the wireless network 5410. Likewise devices 5402*a* and 5402*b* can establish peer-to-peer communications 5440 (e.g., a personal area network) by use of one or more communication subsystems, such as Bluetooth® communication from Bluetooth Special Interest Group, Inc. of Kirkland, Washington. Device 5402*c* can also establish peer to peer communications with devices 5402*a* or 5402*b* (not shown). Other communication protocols and topologies can also be implemented. Devices 5402*a* and 5402*b* may also receive Global Positioning Satellite (GPS) signals from GPS satellites 5460.

Devices 5402*a*, 5402*b*, and 5402*c* can communicate with map service 5430 over the one or more wire and/or wireless networks, 5410 or 5412. For instance, map service 5430 can provide a map service data to rendering devices 5402*a*, 5402*b*, and 5402*c*. Map service 5430 may also communicate with other services 5450 to obtain data to implement map services. Map service 5430 and other services 5450 may also receive GPS signals from GPS satellites 5460.

In various embodiments, map service 5430 and/or other service(s) 5450 are configured to process search requests from any of client devices. Search requests may include but are not limited to queries for business, address, residential locations, points of interest, or some combination thereof. Map service 5430 and/or other service(s) 5450 may be configured to return results related to a variety of parameters including but not limited to a location entered into an address bar or other text entry field (including abbreviations and/or other shorthand notation), a current map view (e.g., user may be viewing one location on the multifunction device while residing in another location), current location of the user (e.g., in cases where the current map view did not include search results), and the current route (if any). In various embodiments, these parameters may affect the composition of the search results (and/or the ordering of the search results) based on different priority weightings. In various embodiments, the search results that are returned may be a subset of results selected based on specific criteria include but not limited to a quantity of times the search result (e.g., a particular point of interest) has been requested, a measure of quality associated with the search result (e.g., highest user or editorial review rating), and/or the volume of reviews for the search results (e.g., the number of times the search result has been review or rated).

In various embodiments, map service 5430 and/or other service(s) 5450 are configured to provide auto-complete search results that are displayed on the client device, such as within the mapping application. For instance, auto-complete search results may populate a portion of the screen as the user enters one or more search keywords on the multifunction device. In some cases, this feature may save the user time as the desired search result may be displayed before the user enters the full search query. In various embodiments, the auto complete search results may be search results found by the client on the client device (e.g., bookmarks or contacts), search results found elsewhere (e.g., from the Internet) by map service 5430 and/or other service(s) 5450, and/or some combination thereof. As is the case with commands, any of the search queries may be entered by the user via voice or through typing. The multifunction device may be configured to display search results graphically within any of the map display described herein. For instance, a pin or other graphical indicator may specify locations of search results as points of interest. In various embodiments, responsive to a user selection of one of these points of interest (e.g., a touch selection, such as a tap), the multifunction device is configured to display additional information about the selected point of interest including but not limited to ratings, reviews or review snippets, hours of operation, store status (e.g., open for business, permanently closed, etc.), and/or images of a storefront for the point of interest. In various embodiments, any of this information may be displayed on a graphical information card that is displayed in response to the user's selection of the point of interest.

In various embodiments, map service 5430 and/or other service(s) 5450 provide one or more feedback mechanisms to receive feedback from client devices 5402*a*-5402*c*. For instance, client devices may provide feedback on search results to map service 5430 and/or other service(s) 5450 (e.g., feedback specifying ratings, reviews, temporary or permanent business closures, errors etc.); this feedback may be used to update information about points of interest in order to provide more accurate or more up-to-date search results in the future. In some embodiments, map service 5430 and/or other service(s) 5450 may provide testing information to the client device (e.g., an A/B test) to determine which search results are best. For instance, at random intervals, the client device may receive and present two search results to a user and allow the user to indicate the best result. The client device may report the test results to map service 5430 and/or other service(s) 5450 to improve future search results based on the chosen testing technique, such as an A/B test technique in which a baseline control sample is compared to a variety of single-variable test samples in order to improve results.

While the invention has been described with reference to numerous specific details, one of ordinary skill in the art will recognize that the invention can be embodied in other specific forms without departing from the spirit of the invention. For instance, many of the figures illustrate various touch gestures (e.g., taps, double taps, swipe gestures, press and hold gestures, etc.). However, many of the illustrated operations could be performed via different touch gestures (e.g., a swipe instead of a tap, etc.) or by non-touch input (e.g., using a cursor controller, a keyboard, a touchpad/ trackpad, a near-touch sensitive screen, etc.). In addition, a number of the figures conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

What is claimed is:

1. A method comprising:
receiving, by a vehicle communication system from a mobile device, a first vehicle user interface corresponding to a display type of a display screen of the vehicle communication system, the first vehicle user interface being operable independently of a mobile device user interface corresponding to the mobile device;
receiving, by the vehicle communication system from the mobile device, a command initiating a first navigation presentation comprising a first set of navigation instructions for a first route from a first starting location to a first destination location;
displaying, by the vehicle communication system, the first vehicle user interface comprising the first navigation presentation including the first set of navigation instructions for the first route;
receiving, via the display screen of the vehicle communication system, a request corresponding to initiation of a second route from a second starting location to a second destination location; and
responsive to the request, displaying, by the vehicle communication system, a second vehicle user interface comprising a second navigation presentation including a second set of navigation instructions for the second route.

2. The method of claim 1, further comprising:
generating, by the mobile device, the first vehicle user interface corresponding to the display type of the display screen of the vehicle communication system; and
transmitting, by the mobile device to the vehicle communication system, the first vehicle user interface.

3. The method of claim 2, further comprising:
determining, by the mobile device, the display type of the display screen, wherein the display type includes one of a high-quality touchscreen display, low-quality touchscreen display, and a non-touch screen display; and
based on the determination, generating, by the mobile device, the first vehicle user interface.

4. The method of claim 1, further comprising:
receiving, by the mobile device, a second request to initiate a third route from a third starting location to a third destination location;
generating, by the mobile device, a third vehicle user interface corresponding to the display type, the third vehicle user interface being operable independently of the mobile device user interface;
transmitting the third vehicle user interface to the vehicle communication system; and
initiating, by the mobile device, a third navigation presentation displaying a third set of navigation instructions for the third route by the third vehicle user interface displaying on the display screen.

5. The method of claim 1, further comprising:
generating, by the mobile device, the second vehicle user interface; and
transmitting, by the mobile device to the vehicle communication system, the second vehicle user interface.

6. The method of claim 1, wherein the first vehicle user interface includes one of:
a first map the presentation of which is modifiable with touch input received through a touch-sensitive display screen of the vehicle communication system; or
a second map the presentation of which is modifiable through physical controls mounted in the vehicle.

7. The method of claim 1, further comprising:
generating, by the vehicle communication system, the second vehicle user interface comprising the second navigation presentation.

8. The method of claim 1, wherein the first vehicle user interface includes one or more controls that are not included in the mobile device user interface.

9. The method of claim 1, further comprising:
establishing a communication channel between the mobile device and the vehicle communication system;
wherein the mobile device obtains information about the display screen of the vehicle through the established communication channel.

10. A non-transitory computer readable medium including one or more sequences of instructions that, when executed by one or more processors, cause the processors to perform operations comprising:
receiving, by a vehicle communication system from a mobile device, a first vehicle user interface corresponding to a display type of a display screen of the vehicle communication system, the first vehicle user interface being operable independently of a mobile device user interface corresponding to the mobile device;
receiving, by the vehicle communication system from the mobile device, a command initiating a first navigation presentation comprising a first set of navigation instructions for a first route from a first starting location to a first destination location;
displaying, by the vehicle communication system, the first vehicle user interface comprising the first navigation presentation including the first set of navigation instructions for the first route;
receiving, via the display screen of the vehicle communication system, a request corresponding to initiation of a second route from a second starting location to a second destination location; and
responsive to the request, displaying, by the vehicle communication system, a second vehicle user interface comprising a second navigation presentation including a second set of navigation instructions for the second route.

11. The non-transitory computer readable medium of claim 10, wherein the first vehicle user interface includes one of:
- a first map the presentation of which is modifiable with touch input received through a touch-sensitive display screen of the vehicle communication system; or
- a second map the presentation of which is modifiable through physical controls mounted in the vehicle.

12. The non-transitory computer readable medium of claim 10, the operations further comprising:
- generating, by the vehicle communication system, the second vehicle user interface comprising the second navigation presentation.

13. The non-transitory computer readable medium of claim 10,
- wherein the first vehicle user interface includes one or more controls that are not included in the mobile device user interface.

14. The non-transitory computer readable medium of claim 10, the operations further comprising:
- establishing a communication channel between the mobile device and the vehicle communication system;
- wherein the mobile device obtains information about the display screen of the vehicle through the established communication channel.

15. A vehicle communication system comprising:
one or more processors; and
a non-transitory computer readable medium including one or more sequences of instructions that, when executed by the one or more processors, cause the processors to perform operations comprising:
- receiving, by a vehicle communication system from a mobile device, a first vehicle user interface corresponding to a display type of a display screen of the vehicle communication system, the first vehicle user interface being operable independently of a mobile device user interface corresponding to the mobile device;
- receiving, by the vehicle communication system from the mobile device, a command initiating a first navigation presentation comprising a first set of navigation instructions for a first route from a first starting location to a first destination location;
- displaying, by the vehicle communication system, the first vehicle user interface comprising the first navigation presentation including the first set of navigation instructions for the first route;
- receiving, via the display screen of the vehicle communication system, a request corresponding to initiation of a second route from a second starting location to a second destination location; and
- responsive to the request, displaying, by the vehicle communication system, a second vehicle user interface comprising a second navigation presentation including a second set of navigation instructions for the second route.

16. The vehicle communication system of claim 15, wherein the first vehicle user interface includes one of:
- a first map the presentation of which is modifiable with touch input received through a touch-sensitive display screen of the vehicle communication system; or
- a second map the presentation of which is modifiable through physical controls mounted in the vehicle.

17. The vehicle communication system of claim 15, the operations further comprising:
- generating, by the vehicle communication system, the second vehicle user interface comprising the second navigation presentation.

18. The vehicle communication system of claim 15, the operations further comprising:
- receiving the second vehicle user interface from the mobile device.

19. The vehicle communication system of claim 15, wherein the first vehicle user interface includes one or more controls that are not included in the mobile device user interface.

20. The vehicle communication system of claim 15, the operations further comprising:
- establishing a communication channel between the mobile device and the vehicle communication system;
- wherein the mobile device obtains information about the display screen of the vehicle through the established communication channel.

* * * * *